Oct. 4, 1960 W. A. BUDLONG ET AL 2,955,165

ELECTRONIC TELEPHONE SWITCHING SYSTEM

Filed Oct. 7, 1957 53 Sheets-Sheet 1

INVENTORS: W. A. BUDLONG
G. G. DREW
J. A. HARR

BY [signature]

ATTORNEY

INVENTORS: W. A. BUDLONG
G. G. DREW
J. A. HARR
BY [signature]
ATTORNEY

INVENTORS: W. A. BUDLONG
G. G. DREW
J. A. HARR
BY [signature]
ATTORNEY

INVENTORS: W. A. BUDLONG
G. G. DREW
J. A. HARR
BY
ATTORNEY

Oct. 4, 1960 W. A. BUDLONG ET AL 2,955,165

ELECTRONIC TELEPHONE SWITCHING SYSTEM

Filed Oct. 7, 1957 53 Sheets-Sheet 5

INVENTORS: W. A. BUDLONG
G. G. DREW
J. A. HARR

BY James Falk

ATTORNEY

INVENTORS: W. A. BUDLONG
G. G. DREW
J. A. HARR
BY [signature]
ATTORNEY

Oct. 4, 1960 W. A. BUDLONG ET AL 2,955,165

ELECTRONIC TELEPHONE SWITCHING SYSTEM

Filed Oct. 7, 1957 53 Sheets-Sheet 7

INVENTORS: W. A. BUDLONG
G. G. DREW
J. A. HARR

BY [signature]

ATTORNEY

Oct. 4, 1960 W. A. BUDLONG ET AL 2,955,165

ELECTRONIC TELEPHONE SWITCHING SYSTEM

Filed Oct. 7, 1957 53 Sheets-Sheet 8

INVENTORS: W.A. BUDLONG
G.G. DREW
J.A. HARR

BY [signature]

ATTORNEY

ELECTRONIC TELEPHONE SWITCHING SYSTEM

Filed Oct. 7, 1957 53 Sheets-Sheet 9

INVENTORS: W. A. BUDLONG
G. G. DREW
J. A. HARR
BY [signature]
ATTORNEY

INVENTORS: W. A. BUDLONG
G. G. DREW
J. A. HARR
BY
ATTORNEY

INVENTORS: W. A. BUDLONG
G. G. DREW
J. A. HARR
BY [signature]
ATTORNEY

Oct. 4, 1960 W. A. BUDLONG ET AL 2,955,165

ELECTRONIC TELEPHONE SWITCHING SYSTEM

Filed Oct. 7, 1957 53 Sheets-Sheet 12

INVENTORS: W. A. BUDLONG
G. G. DREW
J. A. HARR
BY [signature]
ATTORNEY

INVENTORS: W. A. BUDLONG
G. G. DREW
J. A. HARR
BY [signature]
ATTORNEY

INVENTORS: W. A. BUDLONG
G. G. DREW
J. A. HARR
BY [signature]
ATTORNEY

INVENTORS: W. A. BUDLONG
G. G. DREW
J. A. HARR
BY [signature]
ATTORNEY

INVENTORS: W. A. BUDLONG
G. G. DREW
J. A. HARR
BY [signature]
ATTORNEY

INVENTORS: W. A. BUDLONG
G. G. DREW
J. A. HARR
BY [signature]
ATTORNEY

INVENTORS: W. A. BUDLONG
G. G. DREW
J. A. HARR
BY [signature]
ATTORNEY

INVENTORS: W. A. BUDLONG
G. G. DREW
J. A. HARR
BY [signature]
ATTORNEY

ELECTRONIC TELEPHONE SWITCHING SYSTEM

Filed Oct. 7, 1957 53 Sheets-Sheet 20

INVENTORS: W. A. BUDLONG
G. G. DREW
J. A. HARR
BY [signature]
ATTORNEY

INVENTORS: W. A. BUDLONG
G. G. DREW
J. A. HARR
BY [signature]
ATTORNEY

INVENTORS: W. A. BUDLONG
G. G. DREW
J. A. HARR
BY [signature]
ATTORNEY

ELECTRONIC TELEPHONE SWITCHING SYSTEM

Filed Oct. 7, 1957 53 Sheets-Sheet 23

INVENTORS: W. A. BUDLONG, G. G. DREW, J. A. HARR

BY [signature]

ATTORNEY

INVENTORS: W. A. BUDLONG
G. G. DREW
J. A. HARR
BY [signature]
ATTORNEY

INVENTORS: W. A. BUDLONG
G. G. DREW
J. A. HARR
BY [signature]
ATTORNEY

INVENTORS: W. A. BUDLONG
G. G. DREW
J. A. HARR

BY [signature]

ATTORNEY

INVENTORS: W. A. BUDLONG
G. G. DREW
J. A. HARR
BY [signature]
ATTORNEY

INVENTORS: W. A. BUDLONG
G. G. DREW
J. A. HARR
BY [signature]
ATTORNEY

INVENTORS: W. A. BUDLONG
G. G. DREW
J. A. HARR
BY [signature]
ATTORNEY

INVENTORS: W. A. BUDLONG
G. G. DREW
J. A. HARR
BY [signature]
ATTORNEY

Oct. 4, 1960 W. A. BUDLONG ET AL 2,955,165

ELECTRONIC TELEPHONE SWITCHING SYSTEM

Filed Oct. 7, 1957 53 Sheets-Sheet 31

INVENTORS: W. A. BUDLONG
G. G. DREW
J. A. HARR

BY [signature]

ATTORNEY

FIG. 32

COMPRESSION OF 8 BIT CODE OF DIGITS 4 AND 5 TO A 7 BIT FSS X ADDRESS:

SET THE LAST 14 CELLS OF THE ACCESS REG. 1150 SO THAT CELL GROUPS 19-25 AND 26-32 EACH HAVE THE DECIMAL VALUE 32 — THIS ESTABLISHES THE X AND Y ADDRESSES OF THE BASE OF THE CODE COMPRESSION TRANSLATION TABLE IN THE FSS

SET CELLS 22, 23, 24 AND 25 IN ACCESS REG. TO HAVE IN COMBINATION THE CODE STORED IN DS4 OF THE ORIG. REG. — TO ESTABLISH THE Y ADDRESS OF THE DESIRED CODE COMPRESSION TRANSLATION WORD

SET CELLS 29, 30, 31, 32 IN ACCESS REG. TO HAVE IN COMBINATION THE CODE STORED IN DS5 OF THE ORIG. REG. — TO ESTABLISH THE X ADDRESS OF THE DESIRED CODE TRANSLATION WORD

TRANSFER FSS TO THE MODIFIED ADDRESS IN CELLS 19 THRU 32 OF THE ACCESS REG. AND SET CELLS 1-7 OF FIRST MEMORY REG. IN ACCORDANCE WITH B AND C CODES OF THE ORDER WORD AT THAT ADDRESS — TO OBTAIN THE X ADDRESS OF THE DIRECTORY NUMBER TO EQUIPMENT NUMBER TRANSLATION AREA OF THE CALLED SUBSCRIBER

COMPRESSION OF 8 BIT CODE OF DIGITS 6 AND 7 TO A 7 BIT FSS Y ADDRESS:

SIMILARLY THE CODES FOR DIGITS 6 AND 7 OF THE CALLED DIRECTORY NUMBER ARE COMPRESSED TO PROVIDE A 7 BIT FSS Y ADDRESS WHICH IS REGISTERED IN CELLS 8-14 OF THE 1ST MEMORY REG.

SET MEM. AND MATCH REG. 743 IN ACCORDANCE WITH CODES IN CELLS 1-14 OF THE FIRST MEMORY REGISTER

INVENTORS: W. A. BUDLONG, G. G. DREW, J. A. HARR
BY [signature]
ATTORNEY

FIG. 33

COMPARE SPOTS 1-14 OF FIRST RECENT CHANGE REGISTER WITH CODES IN MEMORY AND MATCH REG.

MATCH

OBTAIN EQ. NUMBER OF CALLED SUBSCRIBER FROM SPOTS 15-32 OF MATCHING RECENT CHANGE REGISTER

MISMATCH

CHECK SUCCEEDING RECENT CHANGE REGISTER UNTIL LAST REGISTER HAS BEEN CHECKED (NO RECENT CHANGE INDICATED SO PROCEED TO DIRECTORY NUMBER TO EQUIP. NUMBER TRANSLATION IN FSS)

TRANSFER FSS TO THE XY ADDRESS IN CELLS 1-14 OF FIRST MEMORY REG. SET CELLS 1-18 OF ACCESS REG. IN ACCORDANCE WITH TRANSLATION WORD AT THIS ADDRESS

18 BIT TRANSLATION WORD COMPRISES THE 12 BIT EQUIPMENT NUMBER OF THE CALLED SUBSCRIBER AND 6 BITS CODED TO DEFINE CLASS OF SERVICE OF THE CALLED SUBSCRIBER AND THE APPROPRIATE RINGING TONE

| | RINGING | | | CLASS | | |
|---|---|---|---|---|---|---|
| BIT | 1 | 2 | 3 | 4 | 5 | 6 |
| VACANT | X | X | X | X | X | 1 |
| INDIVIDUAL | X | X | X | X | 1 | 0 |
| 1ST PARTY | 0 | 0 | 0 | X | 0 | 0 |
| 2ND PARTY | 0 | 0 | 1 | X | 0 | 0 |
| 3RD PARTY | 0 | 1 | 0 | X | 0 | 0 |
| 4TH PARTY | 0 | 1 | 1 | X | 0 | 0 |
| 5TH PARTY | 1 | 0 | 0 | X | 0 | 0 |
| 6TH PARTY | 1 | 0 | 1 | X | 0 | 0 |

INVENTORS: W. A. BUDLONG
G. G. DREW
J. A. HARR
BY [signature]
ATTORNEY

INVENTORS: W. A. BUDLONG
G. G. DREW
J. A. HARR
BY [signature]
ATTORNEY

ELECTRONIC TELEPHONE SWITCHING SYSTEM

Filed Oct. 7, 1957

INVENTORS: W. A. BUDLONG
G. G. DREW
J. A. HARR
BY [signature]
ATTORNEY

W. A. BUDLONG
INVENTORS: G. G. DREW
J. A. HARR
BY [signature]
ATTORNEY

INVENTORS: W. A. BUDLONG
G. G. DREW
J. A. HARR
BY [signature]
ATTORNEY

INVENTORS: W. A. BUDLONG
G. G. DREW
J. A. HARR
BY [signature]
ATTORNEY

INVENTORS: W. A. BUDLONG
G. G. DREW
J. A. HARR
BY [signature]
ATTORNEY

INVENTORS: W. A. BUDLONG
G. G. DREW
J. A. HARR
BY [signature]
ATTORNEY

INVENTORS: W. A. BUDLONG
G. G. DREW
J. A. HARR
BY [signature]
ATTORNEY

INVENTORS: W. A. BUDLONG, G. G. DREW, J. A. HARR
BY [signature]
ATTORNEY

INVENTORS: W. A. BUDLONG
G. G. DREW
J. A. HARR
BY [signature]
ATTORNEY

INVENTORS: W. A. BUDLONG
G. G. DREW
J. A. HARR
BY
ATTORNEY

INVENTORS: W. A. BUDLONG
G. G. DREW
J. A. HARR
BY [signature]
ATTORNEY

INVENTORS: W. A. BUDLONG
G. G. DREW
J. A. HARR
BY [signature]
ATTORNEY

INVENTORS: W. A. BUDLONG
G. G. DREW
J. A. HARR
BY [signature]
ATTORNEY

INVENTORS: W. A. BUDLONG
G. G. DREW
J. A. HARR
BY [signature]
ATTORNEY

INVENTORS: W. A. BUDLONG, G. G. DREW, J. A. HARR

BY [signature]

ATTORNEY

INVENTORS: W. A. BUDLONG
G. G. DREW
J. A. HARR
BY [signature]
ATTORNEY

INVENTORS: W. A. BUDLONG
G. G. DREW
J. A. HARR
BY [signature]
ATTORNEY

OUTGOING CALL

DIAL TONE CONNECTION

SIGNALING CONNECTION

TALKING CONNECTION

INVENTORS: W. A. BUDLONG
G. G. DREW
J. A. HARR
BY [signature]
ATTORNEY

INCOMING CALL

RINGING CONNECTION

TALKING CONNECTION

INVENTORS: W. A. BUDLONG
G. G. DREW
J. A. HARR
BY [signature]
ATTORNEY

United States Patent Office 2,955,165

Patented Oct. 4, 1960

2,955,165

ELECTRONIC TELEPHONE SWITCHING SYSTEM

Willis A. Budlong, Morristown, Glen G. Drew, Franklin Township, Somerset County, and John A. Harr, Morris Plains, N.J., assignors to Bell Telephone Laboratories, Incorporated, New York, N.Y., a corporation of New York Filed Oct. 7, 1957, Ser. No. 688,386

48 Claims. (Cl. 179—18)

This invention relates to switching systems and particularly to electronic automatic telephone systems.

Automatic telephone systems have been employed throughout the world for more than fifty years and in this time many advances have been made in the art. Although these advances have improved telephone service, there has been a remarkable lack of change in overall switching system philosophy. Consequently, there have been no significant reductions in equipment bulk, system cost, or power requirements, nor has there been any marked increase in switching system flexibility.

Prior art electromechanical systems generally employ large numbers of slow-speed unifunctional devices along with varying degrees of functional concentration and to date electronic systems have followed the same broad system concepts. That is, there has been a more or less direct substitution of electronic means for electromechanical means to implement prior art switching system concepts. In such arrangements the full potential of electronic technology is not realized.

Accordingly it is a general object of this invention to provide an improved electronic telephone switching system employing new and novel system concepts.

More particularly, an object of this invention is the provision of an improved electronic telephone switching system whereby the advantages of modern electronic technology are more fully and effectively utilized.

It is another object of this invention to increase the flexibility of telephone switching systems in order to permit rapid and inexpensive rearrangements to meet changes in traffic and other environmental conditions and to facilitate the addition of new and unusual functions in telephone switching systems.

It is another object of this invention to reduce the physical size of telephone switching systems to permit substantial savings in the cost of buildings housing such systems.

It is a further object of this invention to reduce the equipment cost of telephone switching systems.

It is another object of this invention to increase the reliability of telephone switching systems and to reduce the cost of maintenance of such systems.

It is still another object of this invention to reduce the power required to operate a telephone switching system.

These and other objects of this invention are attained in one specific illustrative embodiment wherein the system philosophy is characterized by functional concentration and the employment of random access permanent memory to store the system logic. In the implementation of this philosophy, the switching network comprising the talking transmission path between subscriber lines is relieved of control and decision functions. These functions are performed serially by a time division common control circuit. Therefore, the switching network becomes a relatively simple matrix arrangement comprising many standard building blocks; and the common control circuit which performs the control and decision functions, wherein the major complexity resides, is a universal control network.

Heretofore, switching systems have employed wired logic, and a change in traffic requirements or changes to provide new service functions have been major undertakings. In the system of the present invention, photographic memory plates interrogated by a cathode ray light beam provide the system logic previously contained in system wiring. Therefore, changes, whether occasioned by the demands of traffic or by provision of new or unusual service features, are accomplished by merely changing photographic plates. This is a small undertaking compared to rearrangements by rewiring.

In accordance with a primary feature of this invention, the system logic is stored in a random access permanent memory having non-destructive read-out rather than in conventional permanently wired apparatus.

In accordance with another feature of this invention, the stored logic comprises sequences of plural bit program order words which define the rule of action of the system.

In accordance with another feature of this invention, a random access temporary memory is used to maintain a record of the service states of lines and trunks served by the system and to maintain a record of the progress of calls through the system.

In accordance with another feature of this invention, a multistage gas tube switching network is controlled by the stored program and the common control circuit selectively to provide transmission connections between lines and trunks served by the system.

In accordance with another feature of this invention, a random access permanent memory is employed to translate called directory numbers to called equipment numbers in the switching network.

In accordance with another feature of this invention, a random access temporary memory is used to maintain a record of recent changes in subscriber directory number to subscriber equipment number translation data to keep the translation information in the permanent memory up to date.

In accordance with another feature of this invention, all control operations are on a serial, one-at-a-time basis, and all decisions are binary in nature.

In accordance with another feature of this invention, the frequency with which a call in progress is served is dependent upon the rate at which changes on a line or trunk are calculated to occur in order to conserve time rather than on a single periodic basis.

In accordance with another feature of this invention, a common busbar transmission system is employed to transfer information in, out and through the control system.

In accordance with another feature of this invention, the common control circuits operate at a much faster rate than the switching network and the common control circuit expects and awaits signals from the network indicating the receipt of orders and the completion of actions within the switching network.

In accordance with another feature of this invention, a single out-pulsing signaling selector is employed to provide dial pulses and supervisory information to all outgoing trunks.

In accordance with another feature of this invention the two storage areas, which are assigned to each line and trunk to maintain a record of the service states thereof, are at identical addresses in separate portions of the temporary memory. Accordingly, the address of the second area may be obtained by merely complementing one bit in the address of the first area.

In accordance with another feature of this invention, serial common control actions are initiated at substantially regular intervals in time; an approximately 2½ microsecond operating cycle is advantageously employed in the system disclosed herein. The control actions may be of the non-decision type employed to establish initial conditions within the system or they may be actions requiring a binary decision. In each decision action a choice is made between advancing in the current program sequence or transferring to a new sequence.

In accordance with another feature of this invention, the program sequences are all calculated to minimize the interruption of sequences. This is accomplished by taking into account the probability of an event occurring or not occurring in dictating the terms of transfer from the current sequence on decision orders.

In accordance with another feature of this invention, certain decision orders require two 2½ microsecond operating intervals to reach a decision and in such instances, overlap programming is employed to effect savings in time. In overlap programming, each program word comprises an order to operate upon information presently available in the system in addition to new information for the succeeding decision order.

In accordance with another feature of this invention, each decision order culminates in the generation of either an advance or a transfer signal. The advance signal is referred to herein as an Execute Present Order (EPO) signal and the transfer signal is referred to as a Conditional Transfer (CTR) signal.

In accordance with another feature of this invention, means are provided to convert serial information to parallel information and vice versa to allow the storage and reading of blocks of information from the random access temporary memory. These means include a register having a plurality of cells which may be individually set and read as opposed to a shift register.

In accordance with another feature of this invention, the conventional 4-digit decimal directory number representative of a called station within the local office of this system is compressed to a more efficient code to address the permanent memory to the storage area containing the directory number to line equipment number translation for the called line.

In accordance with another feature of this invention, all information regarding the establishment of a call through the switching network is erased once a talking connection has been established through the switching network and the common control circuit merely maintains an indication that the connected lines are each in the talking condition.

In accordance with another feature of this invention, all information regarding the progress of calls through the system are maintained in registers in a random access temporary memory and the timing of all critical intervals in the system is accomplished by periodic actions at discrete storage areas or groups of storage areas within these registers.

In accordance with another feature of this invention, discrete orders are transmitted to the switching network which proceeds independently of other actions in the system and the common control circuit may proceed with regard to other calls while awaiting completion of current actions within the switching network.

The above and other objects and features of this invention will be more readily understood from the following description when read with respect to the drawing in which:

Figs. 20 through 50 are a sequence or flow chart showing system actions with regard to an illustrative call;

Figures 1, 54:
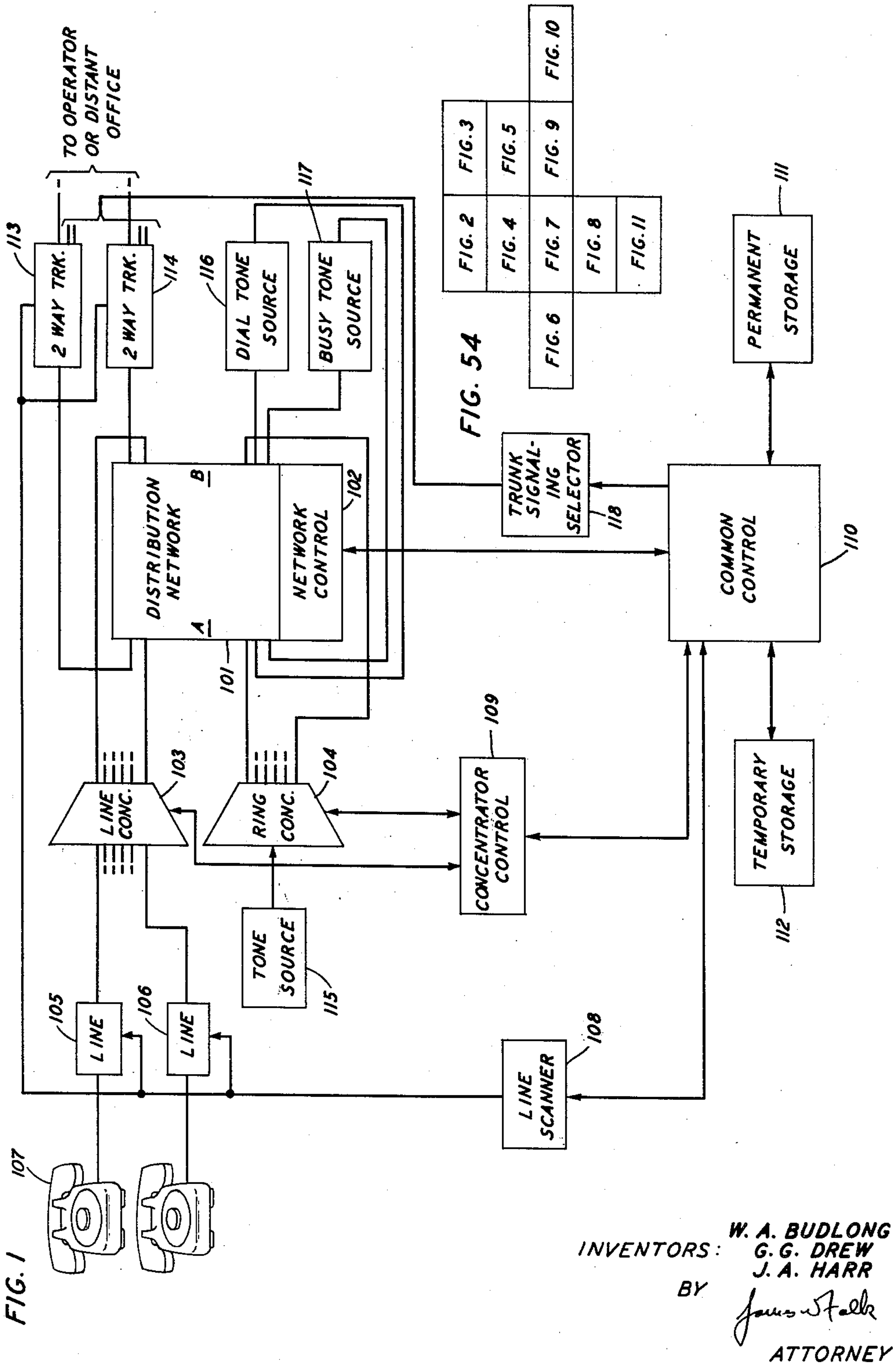
Fig. 1 is a general block diagram of a switching system in accordance with the broad aspects of this invention.
Fig. 54 shows the arrangement of Figs. 2 through 11.

The principal divisions of a telephone switching system in accordance with this invention are shown in Fig. 1. The functional designations therein are broadly descriptive of the tasks assigned each block in the figure. A short functional description of each block of Fig. 1 is given below to establish a background of knowledge to promote an understanding of the system. This description is followed by a general discussion of the progress of a telephone call without regard for the complexities occasioned by time division operation of the common control equipment.

The Common Control 110 is a flexible universal information processing center which, under orders from the Permanent Storage 111, serves to process, on a time division basis, all of the actions necessary to the handling of telephone switching traffic.

The Permanent Storage 111 utilizes photographic storage and is of the type designated as a Flying Spot Store; as described in detail below it has eighteen information light channels and two servo light channels. Such a Flying Spot Store is described in R. C. Davis-R. E. Staehler application Serial No. 541,195, filed October 18, 1955, now Patent 2,830,285, issued April 8, 1958. An eighteen-bit Order Word, which dictates the work operation to be performed, is read in parallel from the photographic storage plates by means of the information light beam channels. The Order Words comprise the address of scenes of action in the switching system as well as commands to be undertaken.

The system logic, which in prior art systems is in the form of permanently or semipermanently placed wiring, is contained in the photographic storage of this invention.

In addition to program information, other information of a substantially unchanging nature is also stored in and obtained from the Flying Spot Store. Subscriber directory number to equipment number translations are of the latter type.

The Temporary Store 112 is a destructive read-out memory wherein a record is kept of the progress of telephone calls through the switching system and wherein information is stored to bring the translation information of the permanent store up to date. For example, current directory number to equipment number translations are maintained in the Temporary Store until changes are effected in the Permanent Store.

The Temporary Store 112 is advantageously a Barrier Grid Tube storage arrangement which is addressed in accordance with information from the Common Control. Knowledge obtained at each address is passed to the Common Control where it is stored in registers and processed in accordance with program orders.

The Common Control 110, as previously stated, is an information-processing center acting under orders from the Permanent Store 111. The Common Control is a high-speed device performing a new order operation approximately each 2½ microseconds. The allocation of time to the various functions is dictated by the main program in Permanent Store and this program is calculated to ensure that all subscribers and trunks of the switching system are adequately served.

The signals from the Common Control 110 to the Barrier Grid Store comprise an address and an order. The address positions the beam and the order indicates the action to be taken at the addressed storage spot. Since the information in the Barrier Grid Tube is destroyed when read out, an order must indicate whether the read spot should be regenerated or changed. In response to commands the Temporary Store indicates to Common Control the state of the addressed storage spot.

Common Control, in accordance with the program in Permanent Store 111, also passes information in the form of addresses and commands to the Line Scanner 108, the Concentrator Control 109, the Distribution Network Control 102, and to trunks 113 and 114 through the Trunk Signaling Selector 118.

The Line Scanner 108 receives an address from Common Control and interrogates Line and Trunk Circuits represented by 105, 106, 113 and 114 to determine the supervisory state of a line or trunk. The current supervisory state of a line or trunk is compared, in common control, with the prior state to detect changes in supervisory state. In this system changes from on-hook to off-hook and off-hook to on-hook are noted for purposes of supervision as well as to determine the content of subscriber dialing signals.

The Distribution Network 101 is a six-stage end-marked gas tube crosspoint matrix which has an equal number of trunk terminations on the A and B sides of the Network. The Network provides transformer input unbalanced voice frequency transmission paths between any desired A trunk terminations and any desired B trunk terminations. A connection between trunks is effected by selectively applying a marking potential to the desired A and B trunk terminations. Networks of this general type are disclosed, inter alia, in Bruce-Straube Patent 2,684,405, and in K. S. Dunlap application Serial No. 672,651, filed July 18, 1957.

As seen in Fig. 1, information is passed from Common Control 110 to the Network Control 102 and from Network Control back to Common Control. The Network Control 102 may be of the type disclosed in the above-mentioned Dunlap application. The information to the Network Control is generally in the form of an address and a command to either establish or disconnect a connection to a trunk terminal. Information from the Network Control to Common Control is a response indicating whether or not the command has been obeyed and also address information determined by the actions within the network and concentrator.

Trunk terminations of the Distribution Network provide access to the Network for concentrator trunks, trunks to an operator or a distant office, administrative tone sources, such as dial tone and busy tone, and ringing and supervisory tones.

The trunk signalling selector 118 receives a message from Common Control which is a combined address and command. The address identifies the particular trunk such as 113 or 114 and the command indicates the supervisory state that the trunk is to assume. Accordingly, when a trunk is seized on an outgoing call, the trunk signalling selector command to the chosen trunk places the trunk in the off-hook condition and when out pulsing on a trunk, the commands place the trunk sequentially in on-hook and off-hook conditions in accordance with the dial pulses to be transmitted.

Calling habits of subscribers are such that it would be impractical to provide a trunk termination on the Distribution Network for each subscriber served in the system. Therefore, subscriber access to the Distribution Network is through a Line Concentrator Switch 103 which, in this system, has thirty subscriber lines and ten Line Concentrator to Distribution Network trunks. Half of the Line Concentrator trunks terminate on the A side of the Distribution Network and the other half terminate on the B side of the Distribution Network, and each of the thirty subscribers' lines has possible access to either the A or B side of the Distribution Network.

The Line Concentrator 103 is a single-stage gas tube crosspoint end-marked switch which provides a transformer input unbalanced transmission path between any desired subscriber's line termination and an idle trunk termination. Commands from Common Control to Concentrator Control are effective to mark the line termination of a subscriber requesting service and to sequentially scan the line concentrator trunk terminations until an idle trunk is found at which time a crosspoint breaks down to connect the marked subscriber's line and the idle trunk from the Line Concentrator to the Distribution Network. Upon completion of the connection of a subscriber's line to an idle trunk, the Concentrator Control 109 indicates to Common Control 110 that the mission is completed, and identifies the concentrator trunk used.

A Ringing Concentrator 104, also under command of the Concentrator Control, is analogous to the subscriber's Line Concentrator. However, ringing tones appear on the line terminals of the Ringing Concentrator rather than subscribers' lines.

The Subscribers' Sets such as 107 are responsive to interrupted single-frequency ringing signals and selective signaling is accomplished through the use of six separate signaling tones applied individually to a called line. A ringing induction signal is returned to the calling party to indicate that ringing is in progress.

Under command from the Common Control, the Concentrator Control 109 establishes two paths through the Ringing Concentrator. The first path connects one of the six tones to one trunk of the Ringing Concentrator while the other path connects ringing induction to an associated second trunk of the Ringing Concentrator. Connection of thsee ringing trunks to the called and calling subscribers, respectively, is accomplished through the Distribution Network at the command of Common Control. Therefore, during ringing, two connections are established in the Distribution Network: the first connection is between the called subscriber and the ringing tone, and the second connection is between the calling subscriber and ringing induction.

Subscriber information tone sources, such as Dial Tone Source 116 and Busy Tone Source 117, appear at trunk terminations on both sides of the Distribution Network and connection of these tones to a subscriber's line is effected by marking the trunk to which a subscriber's line is connected and one of the trunk terminations carrying the desired tone. As in the case of establishing a connection between trunks on opposite sides of the Distribution Network, the establishment of a connection between a subscriber's line and either dial or busy tone is by means of the Network Control 102 under command from Common Control 110. Completion of this connection, as in the case of completion of other connections in the Network, is indicated to the Common Control.

Communication with a distant office or an operator is accomplished over Two-way Trunks such as 113 and 114 which appear as trunk terminations on both sides of the Distribution Network. Network Control 102, upon command from Common Control 110, marks the termination of a Two-way Trunk and the termination of a Line Concentrator trunk to establish a transmission path through the Distribution Network. Supervision to the operator or the distant office and dial pulsing outgoing from the trunk to the distant office are under control of Common Control.

The subscribers' Line Circuits represented by 105 and 106 in Fig. 1 provide power to the subscriber's line and contain the scanning point interrogated by the Line Scanner. The line condition whether on-hook or off-hook is indicated by the potential at the point of interrogation.

We will now proceed to the general discussion of the progress of a call through the office. Assuming, as a starting point, that an interrogation of the Permanent Store 111 has commanded the scanning of subscribers' lines and office trunks, the Line Scanner 108 will sequentially interrogate Subscribers' Lines such as 105 and 106, representative of all lines in the office, and Two-way Trunks 113 and 114, similarly representative of all the trunks in the office, to determine changes in supervisory state.

The lines and trunks can assume two supervisory states, either on-hook or off-hook, and these may be represented as a binary "0" or "1," respectively. The state of each line in the system is kept in the Temporary Store 112 in spots specifically assigned to the line, and each time a line is scanned a comparison is made between its present supervisory state and its previously recorded state to recognize requests for service. It should be noted that each line is scanned for supervision approximately once every one-tenth of a second.

Having detected an initial change from on-hook to off-hook condition, indicative of a request for service, Common Control 110 arranges to serve the line requesting service at a high scanning rate, approximately once every ten milliseconds, to ensure detection of all subscriber dial pulses. Having noted a request for service, the Common Control performs various other functions over and above the arrangements for more rapid scanning of the line. For example, commands are given to the Concentrator Control 109 to establish a connection between the line requesting service and an idle trunk to the Distribution Network; a command is given to Network Control 102 to establish a connection between the Line Concentrator trunk which is connected to the subscriber requesting service and to a Dial Tone trunk terminating on the opposite side of the Distribution Network. Originating registers comprising pluralities of spots in the Temporary Storage are scanned to find an idle register and, having found one idle, the address of the line requesting service is stored therein and the assigned line spots of the Temporary Store are changed to indicate that the line is being served by Common Control.

Subscriber dial pulses are detected at the high scanning rate and the number of the called line, in binary decimal code, is stored in the originaitng register assigned to this call. Upon detection of the first dial pulse, Common Control orders Network Control to release the connection between the Dial Tone Source and the calling subscriber. Having completed storage of the code of the called line in the originating register, the Common Control must determine the nature of the call, i.e., an operator call or an intra-office or interoffice call. In the case of an intra-office call Common Control 110, in conjunction with information from the Flying Spot Store, determines the line equipment number of the called subscriber. Common Control is then ready to test the supervisory condition of the called line and establish the ringing or busy connection as is appropriate.

Common Control interrogates the line spots in the Temporary Store assigned to the called subscriber to determine whether or not the called line is busy. If a busy condition is found, this information is returned to the calling subscriber by connecting a busy tone trunk to the Line Concentrator trunk associated with the calling subscriber through a Distribution Network transmission path. In this event, the calling subscriber releases and attempts a connection at a later time.

If the called line is found to be idle, its associated line spots, in Temporary Store, are changed to indicate that the line is being processed by Common Control.

Common Control 110 orders Concentrator Control 109 to establish the transmission path between the called subscriber line and an idle trunk to the Distribution Network, preferably a trunk terminating on the side of the Distribution Network which is distant from the trunk which is connected to the calling subscriber.

If the called subscriber's line is idle, Common Control, by means of Concentrator Control, establishes two transmission paths through the Ringing Concentrator. The first path connects ringing induction to a Ringing Concentrator trunk to be associated with the calling subscriber, and the second transmission path connects the proper ringing frequency to a second Ringing Concentrator trunk to be associated with the called subscriber. Common Control is now ready to establish the connection of the ringing trunks to the calling and called subscribers. Common Control therefore commands Network Control to establish transmission paths between the calling and called subscribers and the proper Ringing Concentrator trunks.

Common Control then orders scanning of the ringing registers in the Temporary Store and, upon finding an idle register, records therein the line equipment numbers of the called and calling lines for later reference.

As ringing of the called subscriber progresses, Common Control orders the Line Scanner 108 to interrogate the called line at the high 10 millisecond scanning rate. Upon detection of a called line transition from the on-hook to the off-hook condition, the Common Control acts to release the connections to the ringing trunks and to establish a direct transmission path in the Distribution Network between the Line Concentrator trunks of the calling and called subscribers.

The Common Control also changes the called subscriber's line spots of the Temporary Store to the "talking" state for reference on future scans of the called line.

The subscribers' lines are now in the talking condition and nothing more need be done until one or the other subscriber indicates that the connection may be released.

The Common Control proceeds with the other tasks required in the operation of a telephone switching system; however, it continues on a time division basis to scan both the calling and called subscribers' lines at 100 millisecond intervals to detect a transition from off-hook to on-hook. Having noted such a transition, Common Control orders Concentrator Control to release the connection between the line requesting the release and the trunk from the Concentrator to the Distribution Network. This is also effetcive to release the transmission path in the Distribution Network and the Line Concentrator transmission path associated with the other party of the connection.

A call to a switchboard operator or to a distant office progresses in a similar manner up to the point where Concentrator Control 109 establishes a connection in the Concentrator between the line equipment termination of the called subscriber and the idle trunk from the Concentrator to the Distribution Network. Trunks to an operator or a distant office do not appear in a concentrator; therefore, in the case of a call to a switchboard or a distant office, Common Control orders a connection between the Line Concentrator trunk associated with the calling line and the Distribution Network termination associated with an idle Two-way Trunk in the proper trunk group. Supervision to the operator or distant office is under the control of the Trunk Signalling Selector 118 and outpulsing to the distant office is accomplished thereby.

Completion of an outgoing call to an operator or a distant office is dependent upon an answer from the switchboard operator or subscriber at the distant office.

Again upon completion of a call Common Control is free to perform its other assigned work operations; however, as before, it makes a 100 millisecond supervisory scan of the calling line and the called trunk to detect the release of the connection. Having detected the release, Common Control orders Concentrator Control to release the connection between the calling subscriber and the associated trunk from the Line Concentrator to the Distribution Network. Similarly the Common Control effects a release at the Distribution Network transmission path to the Two-way Trunk.

Having considered an intraoffice call and a call from a subscriber to the operator or a distant office in a very general manner, we will now progress to a detailed description of the apparatus and operation of this system.

EQUIPMENT DESCRIPTION

The drawing employed herein in many instances shows single lines as the connections between blocks; it is to be understood that these single lines are merely symbolic and may indicate numerous connections such as a cable.

In certain instances, the binary states of a circuit are provided on separate output conductors which are alternatively energized. Such an arrangement is called a 2-rail circuit and binary devices which provide individual "0" and "1" state output signals are called 2-rail logic elements herein. In other instances, only one of the two states of a binary device are employed, and such arrangements are called single rail circuits.

Figure 4:
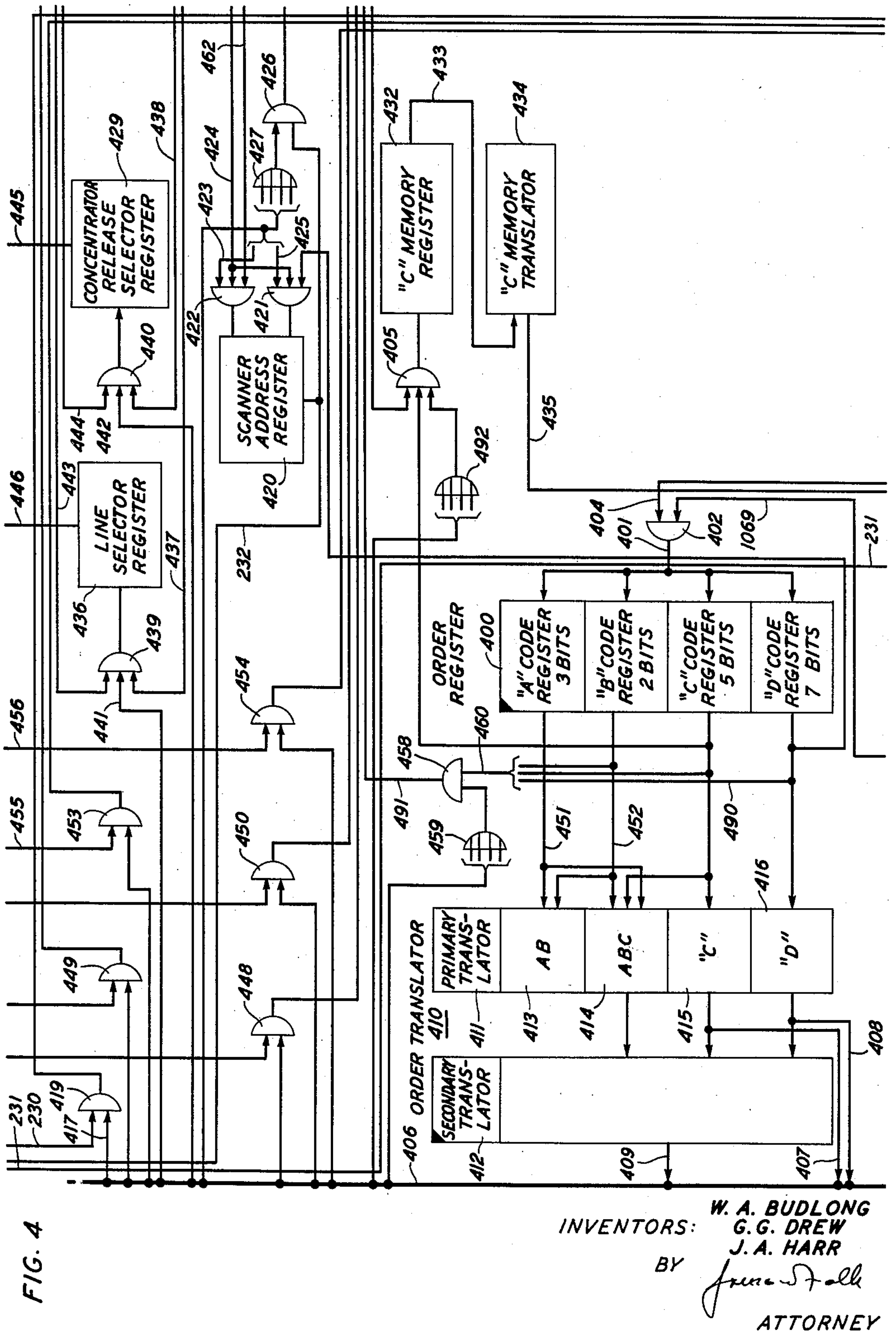

Throughout the drawing gate and amplifier symbols are understood to be a plurality of gates or amplifiers having a number of channels equal to the number of individual signals to be transmitted therethrough. For example, in Fig. 4 Gate 405, when enabled, transmits the five bits in the C Code Register to the C Memory Register 432. Accordingly, Gate 405 comprises five 2-rail gate circuits.

Similarly, Output Amplifier 1065 has eighteen channels to handle the eighteen single rail output signals from the phototubes of the Flying Spot Store and the Pulse Stretcher 1080 comprises thirty-six channels to handle the eighteen 2-rail output signals from the Output Register 1068.

*Flying Spot Store*

Figure 10:
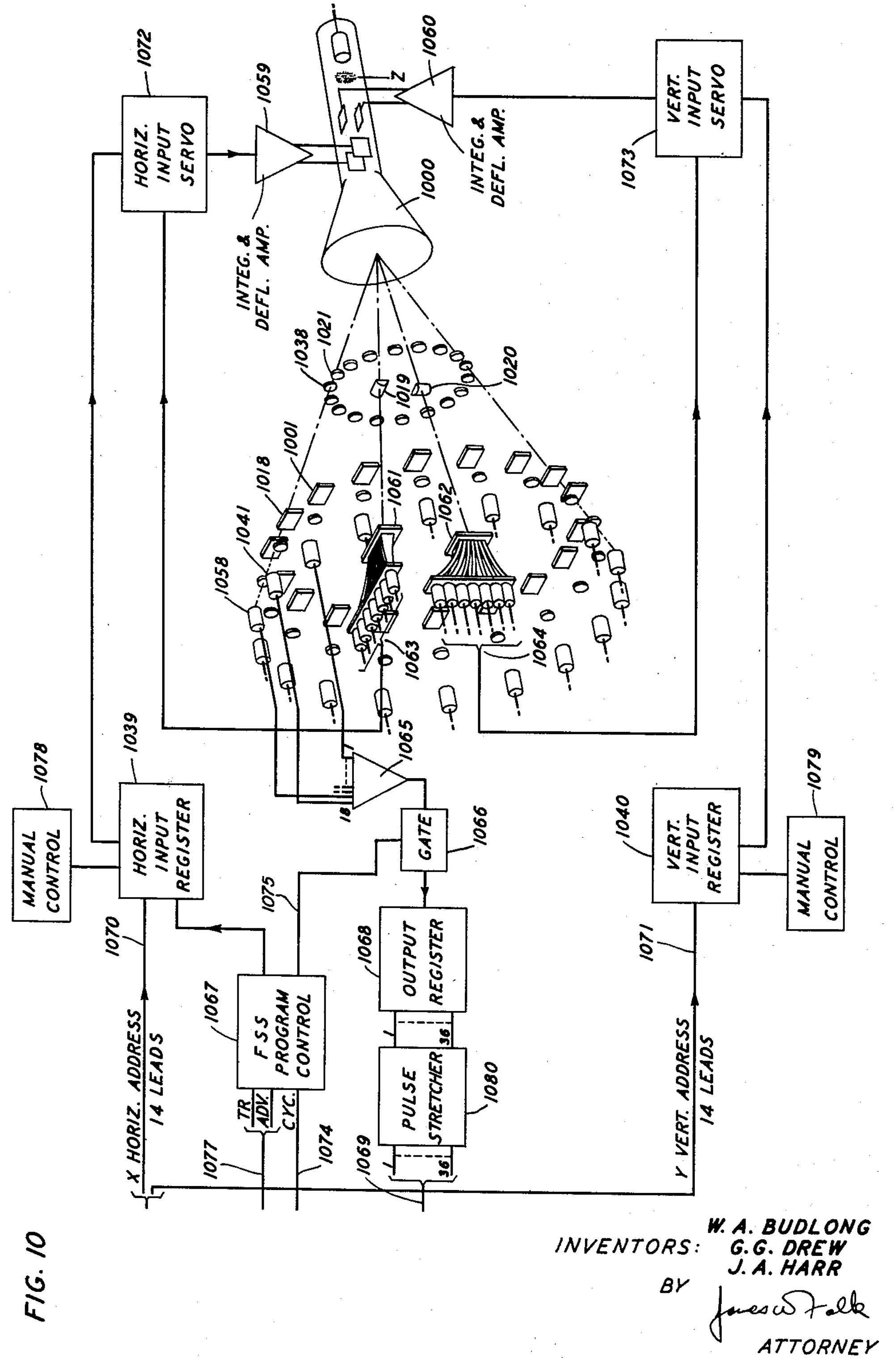
Figure 11:
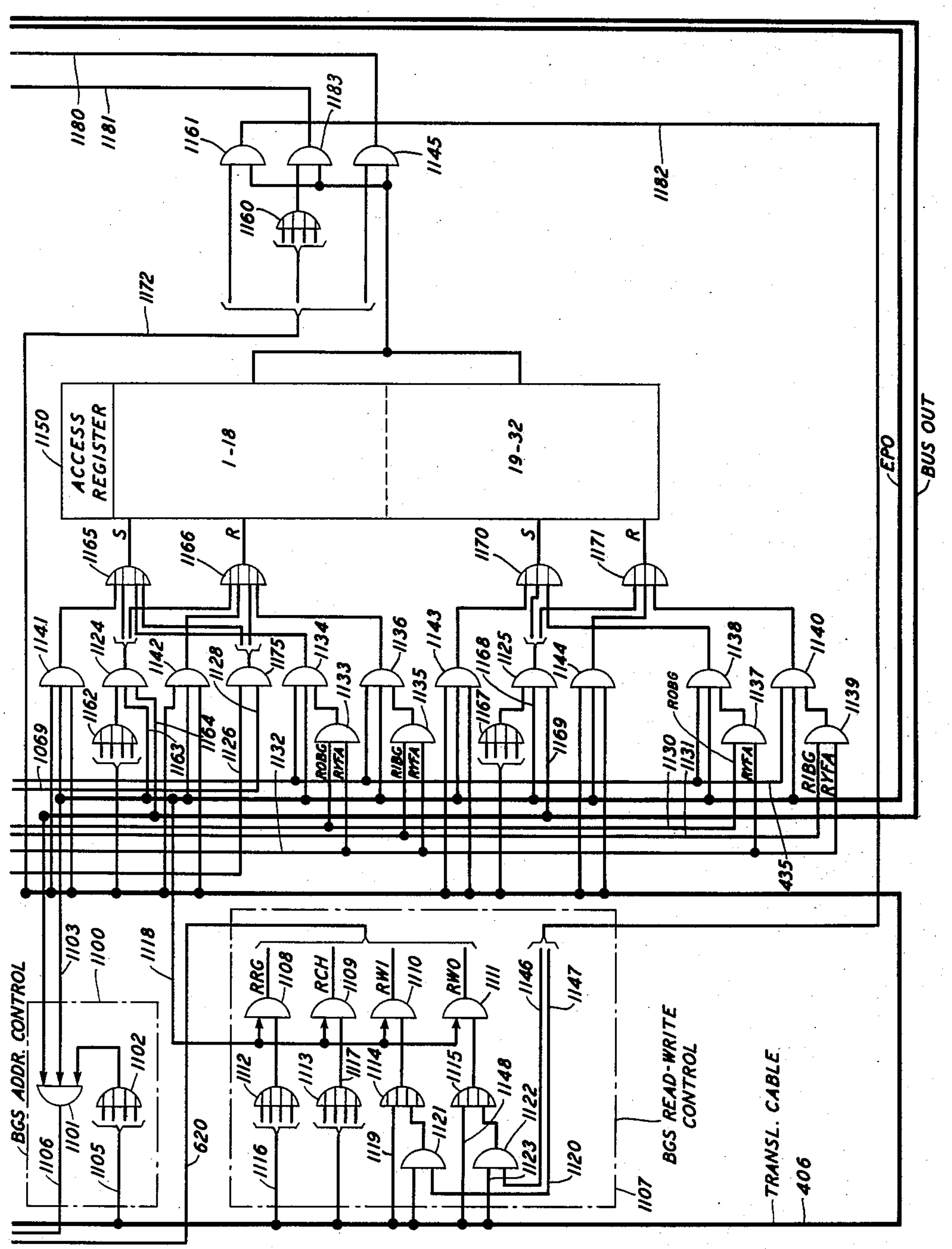

The Permanent Store 111 of Fig. 1 is a Flying Spot Store having eighteen information channels and is shown in greater detail in Fig. 10.

A Flying Spot Store Memory System is fully described in the copending application of R. C. Davis and R. E. Staehler, filed October 18, 1955, Serial No. 541,195, now Patent 2,830,285, issued April 8, 1958, and in C. W. Hoover, Jr., and R. W. Ketchledge application Serial No. 581,073, filed April 27, 1956, now Patent 2,855,540, issued September 7, 1958.

The semipermanent information required in the applicants' invention is stored on a plurality of high resolution photographic plates. Each plate has a rectangular array of definable storage areas, commonly referred to as "spots." Each storage area may be set to one of two conditions characterized as binary "0" and "1." In applicants' one particular embodiment, an opaque storage area represents a binary "0" and a transparent area represents a binary "1."

The Flying Spot Store in Fig. 10 has eighteen information photographic plates, 1001 through 1018, not all of the plates being numbered in the figure.

A Cathode Ray Tube 1000 provides an extremely small and intense spot of light which is focused by means of eighteen separate objective lenses, for example 1021 through 1038, onto eighteen individual spots of the previously recited eighteen photographic plates. Photosensitive elements, such as 1041 through 1058, are placed to receive the eighteen separate light channels with the photographic plates 1001 through 1018 arranged to intercept or pass the light, dependent upon the state of the stored spot to which the beam is directed. The output signals obtained from the photosensitive elements comprise in parallel an eighteen-bit binary word.

The spots of the photographic plates are addressed by positioning the cathode ray light beam under control of the Horizontal and Vertical Deflection Amplifiers 1059 and 1060, respectively. Horizontal and vertical addresses to be assumed by the Flying Spot Store light beam are passed to the Horizontal and Vertical Input Registers 1039 and 1040 in binary code over conductor groups 1070 and 1071, respectively. The Horizontal and Vertical Input Registers 1039 and 1040 are also settable by manipulation of the manual input controls 1078 and 1079. In the particular photographic plates employed in this invention, a photographic storage array of 16,384 spots in an array of spots 128 by 128 is employed. A binary code signal having seven bits for the horizontal address and seven bits for the vertical address is therefore required.

It should be noted at this point that in general 2-rail logic is employed throughout the applicants' invention. That is, individual conductors which are selectively energized are employed for each of the two binary states of a binary bit. For example, a seven-bit binary word requires fourteen conductors which are selectively energized. Conductor groups 1070 and 1071 therefore each comprise fourteen conductors.

The horizontal and vertical binary addresses stored in Input Registers 1039 and 1040 are processed separately in the horizontal and vertical input servo mechanisms 1072 and 1073 to develop cathode ray beam deflecting potentials, as described further in the above mentioned Hoover application.

In positioning the light beam, the two ribbon-shaped light channels obtained through cylindrical lenses 1019 and 1020 are projected onto photographic code plates 1061 and 1062. The light passing through the transparent areas of these code plates falls upon the groups of photosensitive elements 1063 and 1064. The plates 1061 and 1062 are encoded in binary code; therefore, the code signals present on the output conductors of photosensitive elements 1063 and 1064 should be the same as the code signals stored in Horizontal and Vertical Input Registers 1039 and 1040. The code signals derived from the output of photosensitive elements 1063 and 1064 are employed as feedback information into horizontal and vertical input servo mechanisms 1072 and 1073. These feedback signals and the servo input signals from the Horizontal and Vertical Input Registers are combined to position the light beam to the proper horizontal and vertical address.

The eighteen-bit word obtained from interrogation of the photographic storage plates 1001 through 1018 appears as binary signals on the output conductors of photosensitive elements 1041 through 1058. One-rail logic is employed at this point of applicants' invention as one conductor connects each of the photosensitive elements 1041 through 1058 to the input terminals of the Logic Amplifier 1065 which is employed to bring the Flying Spot Store output signals to a usable level.

The output signals of Logic Amplifier 1065 are present at the input terminals of the parallel AND gate 1066. When the gate 1066 is enabled by means of control signals from the Flying Spot Store Program Control Circuit 1067, the eighteen-bit binary word is passed to and stored in the Output Register 1068. At this point a conversion is made from single-rail to two-rail logic and thirty-six conductors in conductor group 1069 are selectively energized to convey the eighteen-bit Flying Spot Store output word to the Common Control area.

Within the Flying Spot Store, one-tenth microsecond positive pulses comprise the information signals. The Common Control requires five-tenth microsecond pulses to set registers therein; consequently one-tenth microsecond to five-tenths microsecond Pulse Stretchers 1080 are included at the output of the Flying Spot Store output register 1068.

The Flying Spot Store Program Control Circuit 1067 is responsive to two discrete orders over 1077 from the Common Control area, namely, "Transfer to the new horizontal and vertical address now being transmitted to the Horizontal and Vertical Input Registers 1039 and 1040 over conductor groups 1070 and 1071" and "Advance to the horizontal address adjacent to the horizontal address last registered in the Horizontal Input Register without changing the vertical address." This latter order is accomplished by incrementing the X address by 1 with an add 1 circuit internal to the Flying Spot Store Program Control Circuit 1067. An advance order is employed wherever possible in this system as the time required to advance the beam one horizontal position without changing the vertical position is less than the time required to reposition the light beam to a completely new vertical and horizontal address.

The Program Control Circuit 1067 among other things performs a timing function to generate output signals to gate the output word from the Logic Amplifiers 1065 to the Output Register 1068 and to provide a reply to the Common Control area 110 indicating that the last-received Flying Spot Store order has been completed. The signal over 1075 to enable gate 1066 appears a fixed time after the receipt of a transfer or advance order at a time calculated to ensure completion of the repositioning of the cathode ray light beam. Because of the difference in time required to reposition the beam in these two orders, the interval of time between the receipt of a transfer order and its attendant gate signal is greater than the time interval between the receipt of an advance signal and its gate signal. The program control generally comprises logic and timing circuitry arranged to perform the above-described function.

The "cycle complete" signal on conductor 1074 appears a short period of time after each of the gate signals. The "cycle complete" signal indicates to the Common Control, as will be later seen, that the last-ordered Flying Spot Store command has been completed.

In summary, signals from the Common Control area 110 to the Flying Spot Store area 111 are horizontal and vertical light beam addresses in a fourteen-bit binary code over input conductor groups 1070 and 1071 and orders to the Flying Spot Store Program Control Circuit over conductor group 1077.

Output signals from the Flying Spot Store to the Common Control area 110 are eighteen-bit binary words over the thirty-six output conductors of conductor group 1069 and the "cycle complete" signal to the Common Control over conductor 1074.

Figure 18:
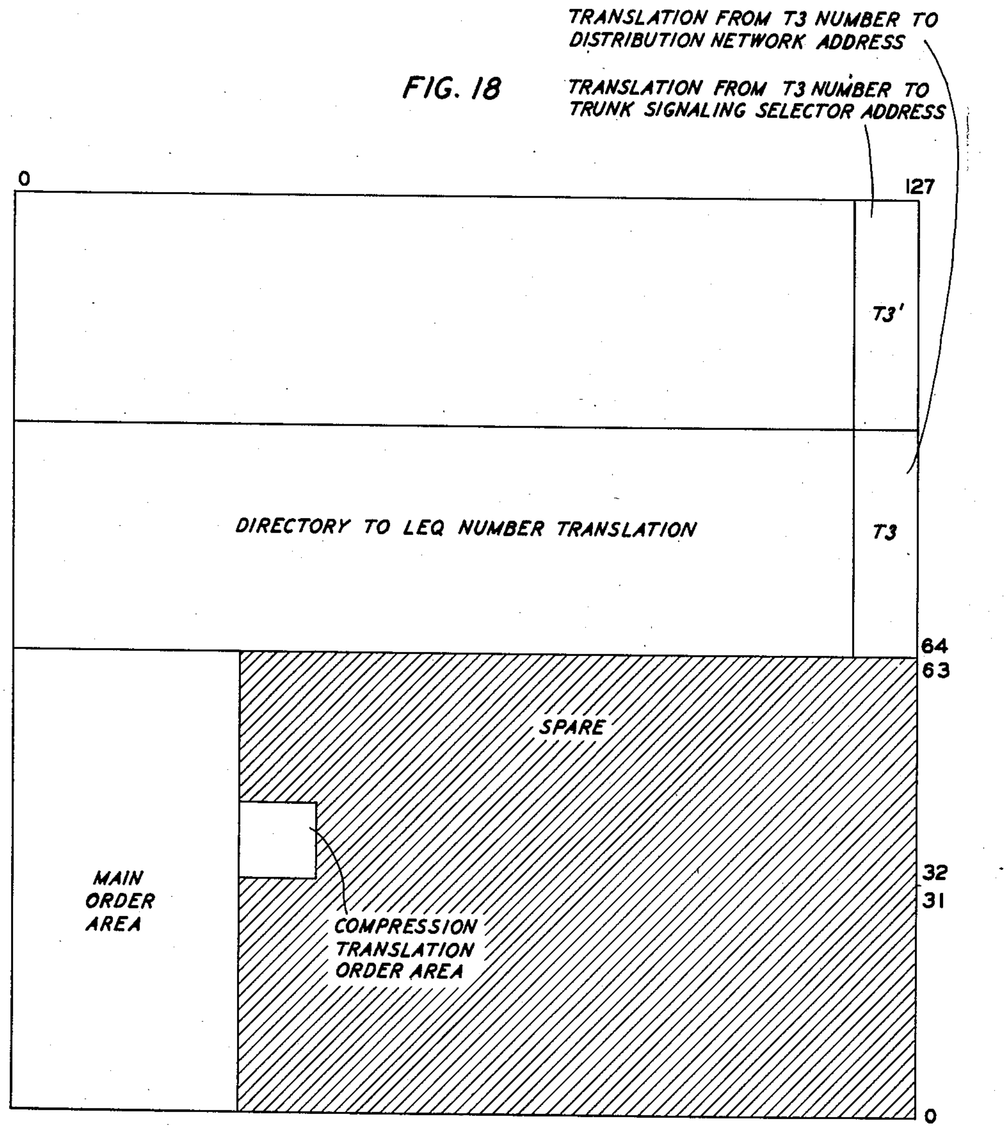
Fig. 18 illustrates the layout of information in the permanent memory.

The assignment of storage areas in the Flying Spot Store photographic plates employed in one specific embodiment of applicants' invention is shown in Fig. 18. The upper half of each storage plate is dedicated to translation words employed to convert directory numbers to equipment numbers and to obtain trunk equipment information in the case of outgoing calls. The lower one-half of each photographic plate comprises program order areas with the main order area situated in the left one-quarter of the lower one-half of each plate. The main order area occupies the X addresses 0 through 31 and Y addresses 0 through 63.

A code compression translation order area is situated at X addresses 32 through 63 and Y addresses 32 through 39. This area is employed in converting the last four digits of a directory number to a more efficient fourteen-bit code which is the address in the Flying Spot Store of that line's directory number to equipment number translation word.

*Barrier Grid Store*

Figure 6:
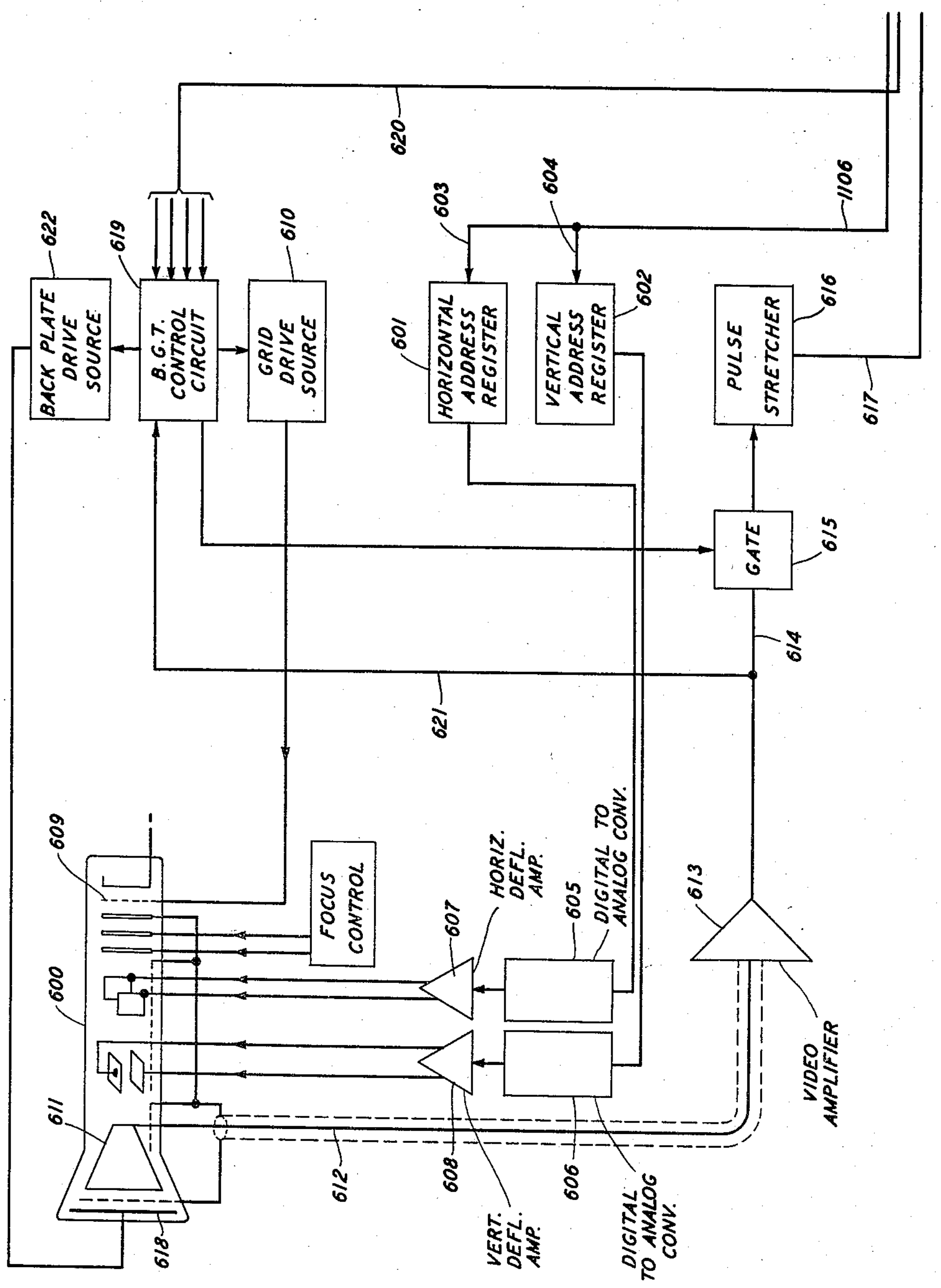

Thte Temporary Store 112 of Fig. 1 is a barrier grid storage system shown in greater detail in Fig. 6.

The barrier grid type of storage system as a destructive read-out semipermanent memory is well known in the electronic art. A description of such a system may be found in the Bell System Technical Journal of November, 1955, at pages 1241 through 1264.

As previously stated, input signals from the Common Control area 110 to the Temporary Store area 112 comprise horizontal and vertical addresses to be assumed by the barrier grid beam and commands to be performed at the addressed storage area.

As in the case of the Flying Spot Store, a fourteen-bit binary word comprising seven bits for the horizontal address and seven bits for the vertical address is passed to the Horizontal and Vertical Address Registers 601 and 602 over conductor groups 603 and 604. Again, as in the case of the Flying Spot Store, two-rail logic is employed in the input to the Address Registers, and conductor groups 603 and 604 each comprise fourteen conductors. The horizontal and vertical binary addresses are processed in the Horizontal and Vertical Digital to Analog Converters 605 and 606 to develop, in conjunction with the Horizontal and Vertical Deflection Amplifiers 607 and 608, beam deflecting potentials for the Barrier Grid Tube 600. As in the case of the Flying Spot Store, a storage array of 16,384 storage areas in an array of 128 by 128 is employed.

Without delving into the details of the operation of the Barrier Grid Storage Tube itself, let us review the input signals required to read and write in such a tube operating with collector read-out.

To read a storage area, the cathode ray beam is directed to the desired area under control of the Deflection Amplifiers and, having settled at the desired position, the grid 609 is pulsed from Grid Drive Source 610. If a binary "0" was just previously written in the interrogated storage area, a small amplitude negative pulse will be present at the collector 611 and output cable 612. If a binary "1" was just previously written in the interrogated storage area, a larger amplitude negative pulse will occur at the collector and its output cable. The collector output is therefore in the form of single-rail logic as was the output from the photosensitive elements in the Flying Spot Store. The Video Amplifier 613 is a voltage-sensitive device which amplifies and converts the collector output signals on conductor 612 from single-rail to two-rail signals on amplifier output uonductors 614. The amplifier output signals are positive voltage one-tenth microsecond pulses.

In a Barrier Grid Store, one storage area is addressed at a time, as opposed to the addressing of eighteen storage areas simultaneously in the Flying Spot Store. The Barrier Grid Store output signal is therefore a series of pulses indicating the states of the serially addressed storage areas. The Barrier Grid output signals from the Video Amplifier 613 are gated to Pulse Stretcher 616 through gate 615.

The Pulse Stretcher 616 converts the one-tenth microsecond Barrier Grid Store output signals to five-tenths microsecond signals on conductor pair 617. The Barrier Grid Store internally operates on one-tenth microsecond pulses; however, as previously mentioned, processing in the Common Control area 110 is through the use of five-tenths microsecond position pulses.

In addition to reading the state of a desired storage area, one must be able to establish the desired state at any desired storage area. A binary "0" is written whenever a storage area is interrogated. Therefore, to either read a storage area or to write a "0" in a storage area, the beam is addressed to that area and, after the beam has settled, the grid drive source provides a pulse to the grid 609. A binary "1" is written in a storage area by first pulsing the grid 609 and then pulsing the back plate 618 during the grid pulse period. The grid and back plate drive are terminated simultaneously.

There are four possible orders of action to be taken at an addressed storage area. These are "Read and Regenerate," "Read and Change," "Read and Write '1'," and "Read and Write '0'." These orders are provided to the Barrier Grid Tube Control Circuit 619 over conductor group 620. The Control Circuit 619 may comprise logic elements arranged to provide the functions described herein.

The first two orders require a knowledge of the prior state of the addressed storage area to complete their cycle; therefore a second output from the Video Amplifier 613 is connected to the Barrier Grid Tube Control Circuit over Conductor 621.

Upon receipt of a Read and Regenerate order, which we may designate as an RRG order, the deflection potentials are established to direct the beam to the address stored in the Horizontal and Vertical Address Registers. Grid 609 is then pulsed to unblank the cathode ray beam. The output signal at the collector 611 is transmitted, after amplification and conversion to two-rail logic, to the Barrier Grid Control Circuit 619 via Conductor 621. If a binary "0" was previously written in the interrogated storage area, no further control of the grid and back plate will be effected as the process of reading is the same as writing a "0"; therefore when one reads and regenerates a "0," only a pulsing of the grid 609 is required.

If a binary "1" is previously stored in the addressed storage area, the Barrier Grid Tube Control Circuit must effect regeneration of the destroyed "1." After the reading of the addressed area has been completed, but before the grid drive is removed, the back plate 618 is pulsed from 622 to store a "1." The back plate and grid drive are removed simultaneously.

The second type of order, Read and Change, which we may designate as RCH, is similar to the Read and Regenerate order except that if a binary "0" is read in the addressed storage area, the Barrier Grid Tube Control Circuit, with knowledge of the prior state as indicated over Conductor 621, will effect writing of the state opposite to the prior state. For example, if a binary "0" was previously written, the Read and Change order will be effective to read the state of the addressed area and to store a "1" in place of the prior "0."

In the Read and Write "1" order, the Barrier Grid Tube Control Circuit operates without knowledge of the prior state indicated over Conductor 621 as the operations to be performed are fully defined. In this instance, the beam is positioned, the grid drive activates grid 609 to read the addressed area, and then the back plate 618 is pulsed during the duration of the grid pulse. A binary "1" is thereby written in the addressed area.

The Read and Write "0" order is the easiest to perform as in this instance the pulsing of the grid 609 to read the addressed area is also effective to write a "0" in the addressed area.

In summary, input signals to the Barrier Grid Store are in the form of seven-bit binary addresses over conductor groups 603 and 604 and commands to the Barrier Grid Tube Control Circuit over conductor group 620.

Output signals from the Barrier Grid Store to the Common Control area 110 are serial positive pulses on one of the two binary conductors in conductor pair 617.

As is known, continued reading and writing in a Barrier Grid Store affects to a degree storage areas not directly interrogated. Therefore, all of the storage areas are advantageously regenerated from time to time to prevent loss of information.

*Assignment of Storage Area in Barrier Grid Store*

Figure 17:
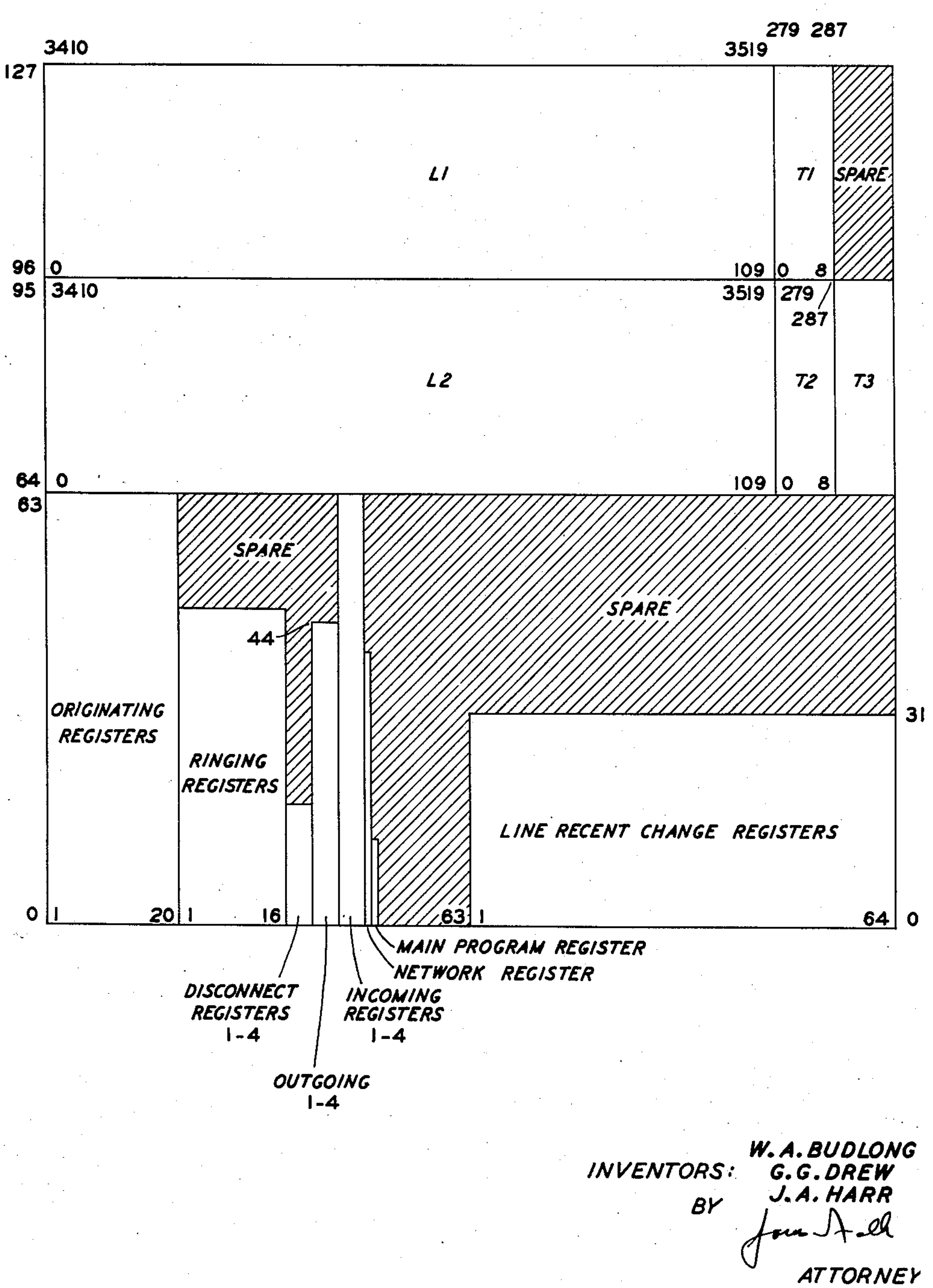
Fig. 17 illustrates the layout of information in the temporary memory.

The arrangement of Barrier Grid Storage areas employed in one specific embodiment of applicants' invention is shown in Fig. 17. The number of registers shown is not necessarily adequate to handle all the traffic in a switching office and there are not enough spots shown to handle all of the lines and trunks in a large office. Fig. 17, however, is representative of a typical layout and is adequate to describe the progress of various types of calls. It is to be understood that in an actual system more than one such Barrier Grid Tube would be employed and that the spot assignments might be drastically different.

In Fig. 17, the upper two quadrants of the tube are dedicated to the L1 and L2 and T1, T2, and T3 spots which are used in combination to denote the state of the associated line or trunk circuit, respectively. The L1 and L2 spots are both in the "0" state when a line is in the idle condition, the L1 spot is in its "1" state and the L2 spot in the "0" state after a talking connection has been established through the Distribution Network between a calling and called party, and the L1 spot is in its "0" state and the L2 spot in its "1" state when a line is being served by a register in Common Control. The combination wherein both line spots are in their "1" state designates a line denied service.

The T1 and T2 spots are the Trunk counterparts of the Line L1 and L2 spots and the combinational codes of their states are employed to denote the same information as the L1 and L2 spot codes.

Since trunks in traffic groups are not assigned to adjacent equipment locations on the Distribution Network, the supervisory state of these trunks are gathered together in adjoining T3 spots to facilitate a rapid hunting of a traffic group for an idle trunk. Tone trunks such as dial tone and busy tone trunks are assigned only T3 spots as changes in supervisory state cannot originate with the tone source itself. Other trunks such as operator, incoming, and two-way trunks are assigned T1 and T2 spots in addition to their T3 spot as supervisory state changes may be initiated at the distant end of these trunks.

The T3 spots are set to the "0" state when a trunk is idle and to their "1" state when the trunk is busy. The translation word, from which the trunk equipment number of a trunk associated with a particular T3 spot is obtained, is found in the Flying Spot Store translation area at an address identical to the T3 spot's Barrier Grid Store address.

The lower half of the Barrier Grid Tube Storage area shown in Fig. 17 is dedicated to the various registers employed in this system which are described below.

*Originating registers*

The originating registers each comprise a single vertical column of storage spots in which dialed information is accumulated and recorded along with the equipment location of the calling party. Twenty originating registers are shown in Fig. 17 having X addresses 0 through 19 and each having Y addresses 0 through 63.

The following is a table of spot assignments within each originating register with symbolic codes employed to denote the spots and a short word description of their use.

| Y Address | Symbolic Code | Description |
|---|---|---|
| 0 | O-A1 | First activity spot. |
| 1 through 12 | O-LE0 through O-LE11 | Originating line equipment number. |
| 13 | O-LL | Last look spot. |
| 14 | O-A2 | Second activity spot. |
| 15 | O-AIT | Abandoned call and interdigital interval timer. |
| 16 through 19 | O-PC0 through O-PC3 | Pulse counter. |
| 20 through 22 | O-DLC0 through O-DLC2 | Digit location counter. |
| 23 through 26 | O-DS1-0 through O-DS1-3 | First digit storage slot. |
| 27 through 30 | O-DS2-0 through O-DS2-3 | Second digit storage slot. |
| 31 through 34 | O-DS3-0 through O-DS3-3 | Third digit storage slot. |
| 35 through 38 | O-DS4-0 through O-DS4-3 | Fourth digit storage slot. |
| 39 through 42 | O-DS5-0 through O-DS5-3 | Fifth digit storage slot. |

| Y Address | Symbolic Code | Description |
|---|---|---|
| 43 through 46 | O-DS6-0 ... O-DS6-3 | Sixth digit storage slot. |
| 47 through 50 | O-DS7-0 ... O-DS7-3 | Seventh digit storage slot. |
| 51 | | Spare. |
| 52 | O-DT | Dial tone connection indication. |
| 53 | O-PSPD | Permanent signal and partial dialing detector. |
| 54 | O-OGC | Outgoing call indicator. |
| 55 | | Spare. |
| 56 | O-BY | Terminating Line Busy. |
| 57 | | Spare. |
| 58 | O-RN | Request for network service. |
| 59 through 62 | O-CLN-0 ... O-CLN-3 | Concentrator level of calling subscriber's line. |
| 63 | | Spare. |

The A1 and A2 activity spots at Y addresses 0 and 14 are used in combination to indicate the state of an originating register and the progress of call in which the register is employed. If the A1 and A2 spots are both in their "0" state, the register is idle; if the A1 and A2 spots are both in their "1" state, the register is busy and dialing is in progress; and if the A1 spot is in its "0" state and the A2 spot is in its "1" state, the register is busy but scanning for dial pulses is not being conducted. The latter code is used, for example, when an order has been sent to the Distribution Network to establish a dial tone connection. The scanning of the calling subscriber's line for dial pulses is not started until after a response is received from the network indicating that the dial tone connection has been established. This scheme is adopted since the subscriber is directed to not start dialing until after receipt of dial tone. The code combination in which A1 equals 1 and A2 equals 0 is not employed.

Similarly, after dialing is completed, the scanning of the calling line is temporarily discontinued until after the appropriate ringing connections have been established through the Distribution Network.

The originating register is released after a ringing connection is established through the network and, upon release, the A1 and A2 activity spots are reset to their "0" state.

Upon the occurrence of a service request from a subscriber, Common Control interrogates the activity spots of the originating registers until an aidle register is found at which time the activity spots are changed to indicate that the register is now busy and the line equipment number of the calling subscriber is written in the originating register Y addresses 1 through 12. The line equipment number comprises a twelve-bit binary address in which the O–LE0 bit stored at Y address 1 is the least significant bit and the O–LE11 bit stored at Y address 12 is the most significant bit.

A record of the state of the calling subscriber on the previous supervisory scan is maintained in the last look spot at address Y13.

The AIT spot is employed to detect abandoned calls on the part of calling subscribers and the occurrence of an interdigital period. The AIT timer is addressed once every 100 milliseconds, at which time the state of the spot is read and changed. Also upon the detection of each transition in the state of the subscriber's line, the AIT spot is addressed and set to "0." Accordingly, if a line transition occurs between 100-millisecond scans of the AIT spot, the spot will always be set to its "1" state at the time of the 100-millisecond scan. However, if line transitions do not occur between 100-milisecond scans of the AIT spot, the spot will be changed from its "1" to its "0" state at the second scan to indicate that either a call has been abandoned or the end of a series of dial pulses of a single digit have been completed. An abandoned call time-out is distinguished from an interdigital time-out by interrogating the last look spot at address Y13. ILf the last look spot was in the "0" state, the AIT time-out indicates an abandoned call and if the last look spot is in the "1" state, the AIT time-out indicates the end of a digit and therefore an interdigital time-out.

The four-bit pulse counter at Y addresses 16 through 19 is employed to count incoming dial pulses. In this counter the PC0 spot is the least significant bit in the code and has the value 1. The PC1, PC2 and PC3 spots have the binary values 2, 4 and 8, respectively. Upon seizure of an originating register, the pulse counter spots, the digit location spots and the digit storage spots are all reset to their "0" state to prepare for registration of a called number.

The binary pulse counter is incremented by 1, to record the detection of a line transition from off-hook to on-hook, by reading and changing the spots in the pulse counter starting with the least significant bit so long as the change is from the "1" state to the "0" state. Whenever the change is from the "0" to the "1" state, the action of incrementing the counter is complete. When all bits of the counter are in their "0" state the counter is at zero count. At the first pulse the counter is incremented by reading and changing the PC0 spot from "0" to "1." In accordance with our foregoing rules, our action is now complete as we have made a change from "0" to "1" and examination of the code 0001 stored in the counter shows that we are correct in that the new code has the binary value 1.

Upon the occurrence of the second dial transition, the PC0 spot is changed from its "1" to "0" state and the PC1 spot is changed from its "0" to "1" state and again the action of incrementing the counter is completed. The code stored in the counter is now 0010 which is the binary code for the decimal 2.

The three-bit digit location counter at Y addresses 20, 21 and 22 maintains a record of which digit of the called directory number is being counted in the pulse counter so that upon the completion of receipt of the current digit it may be transferred to its proper digit slot.

The digit slots 1 through 7 at Y addresses 23 through 50 are merely four-bit registers in which the directory number of the called subscriber is recorded.

The dial tone spot at Y address 52 is set to its "1" state whenever a dial tone connection is established and, as previously indicated, Supervisory scans for the detection of dial pulses are not undertaken until after the dial tone spot is in its "1" state.

The PSPD spot at Y address 53 is a timing circuit similar to the AIT timer. This timer is scanned once every 10 seconds and the information stored therein changed. The timer spot is reset to its "0" state each time information is taken from the pulse counter and written in the digit storage slots.

A lapse of ten seconds between a request for service and the first dialed digit is considered to indicate a permanent signal and a similar lapse of time between dialed digits is considered to indicate a partially dialed number. Trouble action in the form of a distinctive tone to the subscriber or automatic connection of the subscriber to a trouble operator is effected upon occurrence of either of these conditions.

The OGC spot is set to its "1" state upon an indication that the call is to an operating intercept trunk, a distant office, a reverting call, or one of the several service code operations, and is in its "0" state upon the occurrence of an intraoffice call.

When the OGC spot is in its "1" state, the further distinguishing information as to whether this is a call from a subscriber denied originating service, a call to an operator, a reverting call or a call to one of the service code numbers, et cetera, is stored in digit slot 3 at Y addresses 31 through 34. If the call is to one of the Service Codes of the form 11X, the X portion of the code is stored in digit slot 3 and is employed to effect the connection to the desired service.

The RN spot is set to its "1" state whenever the originating register requires service of the network and must wait as the network is busy handling other requests.

The BY spot is set to its "1" state whenever the called line is found in the busy state.

The concentrator level storage spots at Y addresses 59 through 62 comprise a four-bit storage space in which the number of the concentrator trunk connected to the calling subscriber's line is recorded upon the occurrence of a dial tone connection.

*Incoming registers*

The four incoming registers 1 through 4 are shown at X addresses 44 through 47 and at Y addresses 0 through 63. These registers are in effect originating registers for incoming calls from a distant office or operator and are accordingly similar to the originating registers employed with subscribers' lines. These registers must record only four digits since it is previously established that these calls are to the office to which the trunks are incoming. The following table, like our preceding table of the originating registers, shows the Y address, the symbolic code of the spot at these addresses and a short description of the use to which these spots are put.

| Y Address | Symbolic Code | Description |
|---|---|---|
| 0 | I-A1 | First activity spot. |
| 1 through 12 | I-ITE0 through I-ITE11 | Incoming trunk equipment number. |
| 13 | I-LL | Last look spot. |
| 14 | I-A2 | Second activity spot. |
| 15 | I-AIT | Interval timer. |
| 16 through 19 | I-PC0 through I-PC3 | Pulse counter. |
| 20 | I-DLC0 | Digit location counter. |
| 21 | I-DLC1 | |
| 22 | | Spare. |
| 23 through 26 | I-DS1-0 through I-DS1-3 | First digit storage slot. |
| 27 through 30 | I-DS2-0 through I-DS2-3 | Second digit storage slot. |
| 31 through 34 | I-DS3-0 through I-DS3-3 | Third digit storage spot. |
| 35 through 52 | | Spare. |
| 53 | I-PSPD | Permanent signal partial dial detector. |
| 54 through 57 | | Spare. |
| 58 | I-RN | Request for network service. |
| 59 through 63 | | Spare. |

The incoming trunk equipment numbers at Y addresses 1 through 12 are the counterparts of the originating line equipment number and describe a trunk scanner address rather than a line scanner address.

The remainder of the spots serve the same purpose in the incoming register as their similarly labeled counterparts in the originating registers.

It should be noted that although four digits are to be recorded in the incoming register, only three digit storage slots have been provided and the fourth digit is stored directly in the pulse counter and not transferred to a digit storage slot.

*Ringing registers*

The ringing registers 1 through 16 at X addresses 20 through 35 and Y addresses 0 through 46 are employed during the time that a ringing connection is established to store information necessary to the detection of answers and the abandonment of a call.

The answering timer is a two-bit timer comprising the storage spots TA0 and TA1. This timer is in effect a pulse counter which starts timing from the assumption of the "0" states by both spots. This counter is pulsed once every three-quarters of a minute and its count is incremented by 1 as described in our description of the pulse counter in the originating register. At the end of the first three-quarters of a minute, the TA0 spot is changed to its "1" state and the TA1 spot remains in its "0" state and at the occurrence of the second pulse at the end of one and one-half minutes, the TA0 spot is reset to its "0" state and the TA1 spot to its "1" state. At two and one-quarter minutes both spots are set to their "1" state and at the end of three minutes both spots are reset to their "0" state to indicate that an answer time out has occurred.

| Y Address | Symbolic Code | Description |
|---|---|---|
| 0 | R-A | Activity spot. |
| 1 through 12 | R-CDE0 through R-DCE11 | Called equipment number. |
| 13 | | Spare. |
| 14 | | Spare. |
| 15–17 | | Ringing code. |
| 18–19 | | Spare. |
| 20 | R-TA0 | Answer Timer. |
| 21 | R-TA1 | |
| 22–35 | | Spare. |
| 36 through 46 | R-RTE0 through R-RTE10 | Ringing trunk equipment number. |

The called equipment number at Y addresses 1 through 12 is the called line counterpart of the originating line equipment number stored in the originating register. The called equipment number and ringing code are obtained by a translation of the called directory number which was stored in the originating register.

The ringing trunk equipment number at Y addresses 36 through 46 is the equipment address of the signaling trunk between the ringing concentrator 204 and the distribution network.

*Disconnect registers*

Disconnect registers 1 through 4 located at X addresses 36 through 39 and Y addresses 0 through 16 are employed to ensure that a line or trunk transition from off-hook to on-hook is not merely a hit.

| Y Address | Symbolic Code | Description |
|---|---|---|
| 0 | D-A | Activity spot. |
| 1 through 12 | D-EN0 through D-EN11 | Equipment number of line being scanned for disconnect. |
| 13 | D-DT | This spot is in its "1" state when disconnect timing is being performed. |
| 14 | D-TA<br>D-TB | A two-bit timing counter which, when recycled, indicates termination of a fixed timing period. |
| 16 | D-TG | When in its "1" state, indicates that trunk guard timing is being performed. |

The disconnect timer is engaged whenever an off-hook to on-hook transition is detected on a line in the talking condition not being served by a register. This register is employed to ensure that a hit on line or trunk indicating a possible disconnect does not result in an erroneous release of a talking connection. Accordingly, upon receipt of a disconnect indication, the disconnect register is seized and the disconnect or on-hook condition must prevail for at least three-tenths of a second after the original disconnect signal before the Common Control orders release of the talking path. The A spot at address 0 is an activity spot which is set to its "1" state whenever the disconnect register is busy and reset to its "0" state whenever the register is idle. The equipment number spots at Y addresses 1 through 12 are the twelve-bit address of the line being investigated in regard to a disconnect request.

The DT spot is set to its "1" state whenever the disconnect timer is being used in conjunction with the disconnect timing of subscribers' lines and the TG spot at Y address 16 is set to its "1" state whenever the timer is being employed with relation to trunk disconnect timing.

The TA and TB spot is a two-bit timing counter which is incremented every 100 milliseconds and therefore recycles once every 400 milliseconds. Accordingly, a disconnect or guard time-out occurs between 300 and 400 milliseconds after the disconnect and guard register is seized.

*Out-pulsing registers*

The out-pulsing registers 1 through 4 shown at X addresses 40 through 43 and at Y addresses 0 through 44 are employed to store the last four digits of the directory number of an outgoing call and to perform the timing functions attendant to the out-pulsing of that number. The out-pulsing register storage spots, along with their Y address, symbolic code and short description thereof, are shown in the following table:

| Y Address | Symbolic Code | Description |
|---|---|---|
| 0 | L-A | Activity spot. |
| 1 through 4 | L-DS1-0 through L-DS1-3 | First digit slot. |
| 5 through 8 | L-DS2-0 through L-DS2-3 | Second digit slot. |
| 9 through 12 | L-DS3-0 through L-DS3-3 | Third digit slot. |
| 13 | L-PTA | Pulse timing indicator. |
| 14 | L-ITA | Interdigital timing indicator. |
| 15 | L-TA | Four-bit timer. |
| 16 | L-TB | |
| 17 | L-TC | |
| 18 | L-TD | |
| 19 | L-LS | Last signal generated. |
| 20 through 23 | L-PC0 through L-PC3 | Pulse counter. |
| 24 | L-DC0 | Digit counter. |
| 25 | L-DC1 | |
| 26 through 34 | L-TSN0 through L-TSN8 | Trunk signal selector equipment number. |
| 35 through 44 | L-TE0 through L-TE10 | Distribution network address of outgoing trunk. |

The out-pulsing register is the inverse of an originating register in that dial signaling information to be transmitted to a distant office is stored therein and transmitted at the dial pulse rate in accordance with timing signals supplied by the out-pulsing register. The activity spot at address 0 is set to its "1" state when a register is seized to indicate the busy condition. The four-digit directory code to be transmitted to the distant office is stored in the pulse counter at Y addresses 20 through 23 and in the digit slot registers at Y addresses 1 through 12. The first digit to be out-pulsed is stored in the pulse counter, the second digit in the first digit slot, the third digit in the second digit slot, and the fourth digit in the third digit slot. It should be noted that only four digits are transmitted since the terminating office is known and therefore the office codes need not be transmitted.

The pulse counter at Y addresses 20 through 23 is actually employed as a pulse subtracting arrangement. That is, the order transmitted to the Barrier Grid Store is to read and change what is found in this pulse counter, starting with the least significant bit, i.e., the bit stored in the PC0 spot, and continue to change the states of spots until a "1" is changed to a "0." The number stored in the pulse counter is thereby one step at a time decreased until the pulse counter has been reset so that all bits are in their "0" state. After the first digit has been out-pulsed, the second digit which is stored in digit slot 1 at Y addresses 1 through 4 is shifted to the pulse counter at Y addresses 20 through 23 and it, as in the case of the first digit, is out-pulsed. This process continues until all four digits have been transmitted. Four basic timing intervals must be established in conjunction without pulsing. These intervals are: (1) the initial seizure interval of approximately 150 milliseconds which is employed to ensure seizure of incoming equipment at the distant office; (2) the basic pulse interval of 55 milliseconds: (3) the interpulse period of 45 milliseconds; and (4) the interdigital period of 600 milliseconds.

A nine-bit trunk address to direct the trunk signaling selector to one of the possible 512 trunks is stored in the trunk selector equipment spots at Y addresses 26 through 34. These nine bits comprise the nine most significant bits of a ten-bit signal to the trunk signal selector translator 551. The tenth or least significant bit dictates the supervisory state to be transmitted to the distant office. For example, if the least significant bit is "0," an on-hook supervisory condition is transmitted to the distant office and if the tenth bit is a "1," the off-hook supervisory condition is transmitted.

*Network register*

The operations of establishing and releasing connections through the Distribution and Concentrator Networks are slow compared to the 2.5 microsecond operating cycle employed in the Common Control portion of this system. In fact, the network operations occur at approximately 2.5 millisecond intervals which is one thousand times slower than the basic 2.5 microsecond Common Control operating cycle. Since the network operates so slowly, a record must be maintained of the Flying Spot Store address to be interrogated upon completion of the current network operation as well as the address of the register from which commands are to be taken. There is but one network register employed in this system as the concentration and distribution networks are considered to comprise a single network for purposes of job assignments. This register is at X address 44 and Y address 0 through 40.

| Y Address | Symbolic Code | Description |
|---|---|---|
| 0 | N-A | Activity spot. |
| 1 through 14 | N-NPA0 through N-NPA13 | Flying Spot Store network program address to which a transfer should be made after completion of the current job in the network. |
| 15 | | Spare. |
| 16 | | Spare. |
| 17 through 23 | N-RAD0 through N-RAD6 | Register address from which current task was obtained. |
| 24 | | Spare. |
| 25 through 36 | N-TSN0 through N-TSN11 | General purpose register spots. |
| 37 | N-RWR | Request waiting from ringing register. |
| 38 | N-RWD | Request waiting from disconnect register. |
| 39 | N-RWI | Request waiting from incoming register. |
| 40 | N-RWO | Request waiting from originating register. |

As in other registers, the activity spot is set to its "1" state when the network register is busy. The program address spots at Y addresses 1 through 14 comprise the fourteen-bit Flying Spot Store program address to which the transfer is made upon completion of the current work operation of the network.

The register address at Y addresses 17 through 23 is a record of the particular register in the Barrier Grid Store from which the current network task was obtained.

The register spots at Y addresses 25 through 36 comprise a general purpose register without specific assignment.

The request waiting spots at Y addresses 37 through 40 indicate that one of the various registers in the Barrier Grid Store is awaiting the services of the network.

*Main program register*

The main program of Common Control is divided into basic 10 millisecond work intervals and, in addition, various other timer intervals are required to provide Common Control actions which occur on a less frequent basis. The main program register comprises the following spots:

| Y Address | Symbolic Code | Description |
|---|---|---|
| 0 | M-RS | Ringing scan. |
| 1 | M-TF | Timer function. |
| 2 | M-IC0 | Interval counter. |
| through | | |
| 5 | M-IC3 | |
| 6 | M-T0 | Timer. |
| through | | |
| 12 | M-T6 | |

The ringing scan spot at Y address 0 is in its "1" state during the time that it is permissible to scan lines for answers.

The timer function spot at Y address 1 is in its "1" state when a timing function is being performed.

The indications of the seven-bit timer at Y addresses 6 through 12 and the interval counter at Y addresses 2 through 5 are taken in combination to provide 10 millisecond, 50 millisecond, 100 millisecond and 300 millisecond timing pulses to the Common Control. The combination of the codes in the interval counter and the timer defines the current position in the main program.

*Line recent change registers*

Directory number to line equipment number translation information is maintained in the line recent change registers 1 through 64 shown at X addresses 64 through 127 and Y addresses 0 through 29. Each register comprises one vertical column of storage areas wherein the storage areas at Y addresses 0 through 15 comprise the four-digit directory code of a local line which has been the subject of a recent traffic change and wherein the fourteen bits at Y addresses 16 through 29 comprise the line equipment number of that directory number.

Whenever an order requests the translation code of a called subscriber, the recent change registers are scanned sequentially to determine whether the called line translation information is stored in the recent change registers. If the called line is not the subject of a recent traffic change, the translation from directory number to line equipment number is obtained from the Flying Spot Store directory translation to line equipment number storage area.

*Bus circuit*

We will now proceed to an explanation of the functional divisions of the Common Control area 110 which are shown in greater detail in Figs. 4, 5, 7, 8, 9 and 11.

In our time division common control system, the wiring between units of Common Control is greatly simplified by the use of a multiconductor Bus Circuit. The output of the conductors from the various memory units of Common Control form the input to a plurality of OR gates in the Bus Circuit 900. These memory unit output conductors are shown entering an avenue of communication labeled "Bus Input."

The output terminals of the OR gates in the Bus Circuit 900 are connected in parallel to the various divisions of Common Control served by the bus. The gating of information over the Bus Circuit is under control of activating signals from the Order Translator 410. These activating signals are effective to gate information out of a memory unit and into the desired division of Common Control.

*Order Register*

The Order Register 400 has as its input the seventeen-bit parallel order word from the Flying Spot Store, Fig. 10, over conductor group 1069. The input is through conductor group 401 which comprises thirty-four conductors in familiar two-rail logic. The information stored in the Flying Spot Store Output Register 1068 may be Order Words comprising addresses for scenes of action and commands to be performed by Common Control, or it may be translation information of a non-order type such as translations from line directory number to line equipment number.

Access to the Order Register is through the input AND gate 402. The information from the Flying Spot Store enters gate 402 over conductor group 1069 and this information is selectively gated through gate 402 under commands from the Flying Spot Store Translation Control 901 described below over conductor 404. A record is kept in the Flying Spot Store Translation Control 901 of the class of information being obtained from the Flying Spot Store. The translation information is confined to one-half of the area of each photographic plate of the Flying Spot Store and the order type of information is in the other half of each photographic plate, as seen in Fig. 18 and described above. Only order information is to be entered into the Order Register; therefore, the gating signal on conductor 404 is present only when the Flying Spot Store beam is directed to an order area.

It might be well at this point to outline the make-up of the Order Word obtained from the Flying Spot Store. The Order Word is divided into A, B, C and D code words. The A code comprises three bits and may assume the values 0 through 7. The B code comprises two bits and may assume the values 0 through 3. The C code comprises five bits and may assume the values 0 through 31. The D code comprises seven bits. Five of the D bits are used as input codes to the Order Translator 410 and the full seven-bit D code word is employed elsewhere in the Common Control, as will be seen later in the discussion. The output conductors of gate 402 are connected to the Order Register 400.

The Order Register 400 comprises seventeen transistor flip-flop memory cells. Three cells are assigned to the A code, two cells are assigned to the B code, five cells are assigned to the C code, and the remaining seven cells are assigned to the D code.

The output conductors of the Order Register 400 convey the state of the memory cells therein to the Order Translator 410 and the state of the D code memory cells only to the Scanner Address Register 420 through its input gate 421. The state of the B, C and D word cells may be also selectively gated to the Bus Input circuit through AND gate 458 under commands from the Order Translator through OR gate 459 and conductor group 460. The state of the C code memory cells may be gated through AND gate 405 to the C Memory Register 432.

In summary, whenever order information from the Flying Spot Store is present in the Flying Spot Store Output Register 1068, this information is gated into the Order Register 400 through input gate 402 under commands from the Flying Spot Store Translation Control 901.

*Order Translator*

The Order Translator 410 is, in general, an arrangement for translating binary input codes to one out of N output codes and combinations thereof. Translation is obtained through simple gate logic wherein binary code elements are combined to obtain one out of N output signals and combinations thereof.

The Order Translator 410 comprises a Primary Translator 411 and a Secondary Translator 412. The Primary Translator 411 in turn comprises an AB translator 413, an ABC translator 414, a C translator 415 and a D translator 416. Each of these translators and their attendant input and output signals will be considered separately.

The AB translator 413 has as its input the three-bit binary A code over conductor group 451 and the two-bit binary B code over conductor group 452.

The operation of the translators within the Primary Translator 411 and the operation of the Secondary Translator 412 will be defined in the following discussion in terms of Boolean expressions. Boolean switching algebra is discussed quite completely in "The Design of Switching Circuits," by Keister, Ritchie and Washburn and in the AIEE Transactions, Part 1, Communications and Electronics, vol. 72, September 1953, at pages 380 and forward, in an article by S. H. Washburn.

In the present discussion binary code conductors are identified by labels which comprise in sequence a number representative of the particular binary bit, a letter designating the code of the order word and the numeral "0" or "1" indicating which state of the binary bit the particular conductor represents. In two-rail logic, each binary bit requires two conductors to define the state of the bit. For example, transmission of the "two" bit of the A code requires two conductors, namely, 2A0 and 2A1. All other binary conductors are similarly labeled.

The products of translation, whether they be conductors energized by the presence of a single value of a binary input code or combinations of values of the various binary input codes, bear labels which comprise a letter representative of one of the codes of the Order Word followed by the decimal value represented by the input conductors of that code. Where a conductor is selectively energized by the appearance of specific values of several of the codes of the Order Word, such conductors are designated by series of letters and numbers alternately arranged. For example, a conductor from the output of the Secondary Translator may be energized when the A code input has the value of 3 and the B code has the value of 0. A conductor energized under these conditions would be designated A3B0. Under certain conditions, it is desirable to have an indication that one specific code has a discrete value while some other specific code may have one of two or more values, in which case the above scheme of designation is slightly altered. For example, an indication may be required when the A code has the value of 3 and the B code has the value 0 or 1. A conductor energized under these conditions would be designated A3B0–1.

In summary, binary code conductors are designated by a number representative of the binary bit position followed by a letter designation of the code to which that bit belongs and the value 0 or 1 indicating which rail of the bit the particular conductor represents. Conductors conveying the products of translation are labeled in accordance with the values of the various input codes required to energize the output conductor.

The following table of Boolean expression defines the operation of the AB translator:

AB TRANSLATOR (1) 1A0·2A0·1B0=A0–1B0–1
(2) 1A0·2A0·0B1·1B0=A0–1B1
(3) 1A0·2A0·0B0·1B1=A0–1B2
(4) 0A1·1A1·2A0·0B1·1B1=A3B3
(5) 0A1·1A1·2A1·1B0=A7B0–1
(6) 0A1·1A1·2A1·0B0·1B1=A7B2
(7) 0A1·1A1·2A1·0B1·1B1=A7B3
(8) 0A0·1A0·2A0=A0
(9) 1A0·2A0=A0–1
(10) 0A1·1A0·2A0=A1
(11) 0A0·1A1·2A0=A2
(12) 0A0·1A0·2A1=A4
(13) 0A1·1A0·2A1=A5
(14) 0A0·1A1·2A1=A6
(15) 0A1·1A1·2A1=A7
(16) 0B0·1B0=B0
(17) 0B1·1B0=B1

The operation of the ABC Translator is defined by the following table of Boolean expressions:

ABC TRANSLATOR (1) 1A0·2A0·0C0·1C0·2C0·3C0·4C1=A0–1C16
(2) 1A0·2A0·0C1·1C0·2C0·3C0·4C1=A0–1C17
(3) 1A0·2A0·0C0·1C1·2C0·3C0·4C1=A0–1C18
(4) 0A1·1A1·2A1·0B1·1B1·0C0·1C0·2C1·3C1·4C0=A7B3C12
(5) 0A1·1A1·2A1·0B1·1B1·0C1·1C0·2C0·3C0·4C1=A7B3C17
(6) 0A1·1A1·2A1·0B1·1B1·0C0·1C1·2C0·3C0·4C1=A7B3C18

The C Code Translator and the D Code Translator each providesa direct translation from binary to one out of N code. The table of expressions defining the operation of the C Code Translator is as follows:

C CODE TRANSLATOR (1) 0C0·1C0·2C0·3C0·4C0=C0
(2) 0C1·1C0·2C0·3C0·4C0=C1
(3) 0C0·1C1·2C0·3C0·4C0=C2
(4) 0C1·1C1·2C0·3C0·4C0=C3
(5) 0C0·1C0·2C1·3C0·4C0=C4
(6) 0C1·1C0·2C1·3C0·4C0=C5
(7) 0C0·1C1·2C1·3C0·4C0=C6
(8) 0C1·1C1·2C1·3C0·4C0=C7
(9) 0C0·1C0·2C0·3C1·4C0=C8
(10) 0C1·1C0·2C0·3C1·4C0=C9
(11) 0C0·1C1·2C0·3C1·4C0=C10
(12) 0C1·1C1·2C0·3C1·4C0=C11
(13) 0C0·1C0·2C1·3C1·4C0=C12
(14) 0C1·1C0·2C1·3C1·4C0=C13
(15) 0C0·1C1·2C1·3C1·4C0=C14
(16) 0C1·1C1·2C1·3C1·4C0=C15
(17) 0C0·1C0·2C0·3C0·4C1=C16
(18) 0C1·1C0·2C0·3C0·4C1=C17
(19) 0C0·1C1·2C0·3C0·4C1=C18
(20) 0C1·1C1·2C0·3C0·4C1=C19
(21) 0C0·1C0·2C1·3C0·4C1=C20
(22) 0C1·1C0·2C1·3C0·4C1=C21
(23) 0C0·1C1·2C1·3C0·4C1=C22
(24) 0C1·1C1·2C1·3C0·4C1=C23
(25) 0C0·1C0·2C0·3C1·4C1=C24
(26) 0C1·1C0·2C0·3C1·4C1=C25
(27) 0C0·1C1·2C0·3C1·4C1=C26
(28) 0C1·1C1·2C0·3C1·4C1=C27
(29) 0C0·1C0·2C1·3C1·4C1=C28
(30) 0C1·1C0·2C1·3C1·4C1=C29
(31) 0C0·1C1·2C1·3C1·4C1=C30
(32) 0C1·1C1·2C1·3C1·4C1=C31

The operation of the C and D Code translators is identical and if the letter D is substituted in each of the above equations for the letter C, the operation of the D code translator is fully defined and the details need not be repeated.

The Secondary Translator 412 performs a combining operation on the products of translation of the foregoing Translators and its operation is defined in part by the following table of expressions:

SECONDARY TRANSLATOR (1) A0–1·C0=A0–1C0
(2) A0–1·C1=A0–1C1
(3) A0–1·C2=A0–1C2
(4) A0–1·C3=A0–1C3
(5) A0–1·C4=A0–1C4
(6) A0–1·C5=A0–1C5
(7) A0–1·C6=A0–1C6
(8) A0–1·C7=A0–1C7
(9) A0–1·C8=A0–1C8
(10) A0–1·C9=A0–1C9
(11) A0–1·C10=A0–1C10
(12) A0–1·C11=A0–1C11
(13) A0–1·C12=A0–1C12
(14) A0–1·C13=A0–1C13
(15) A0–1·C14=A0–1C14
(16) A0–1·C15=A0–1C15

Similarly, the products of translation of the Primary Translator are combined in simple AND gate logic to energize code conductors which are required in the operation of applicants' invention. These conductors, which are selectively energized from the output of the Primary Translator, are labeled in accordance with the foregoing discussion and the input codes which prevail when they are energized are obvious from the labeling of the conductors.

In summary, the Order Translator 410 translates the various code words of the Order Word from binary codes to one out of N codes and also performs a secondary combining translation in which the one out of N codes obtained from the primary translation are combined to provide multidigit combinational output codes. The translator output conductors 407, 408 and 409 are shown entering translator cable 406. The translator cable is not in the form of a common bus circuit but is rather a schematic representation of an avenue of communication between the output of the Order Translator 410 and the areas in Common Control requiring Order Translator output signals.

*Subscribers' line circuits*

Figure 2:
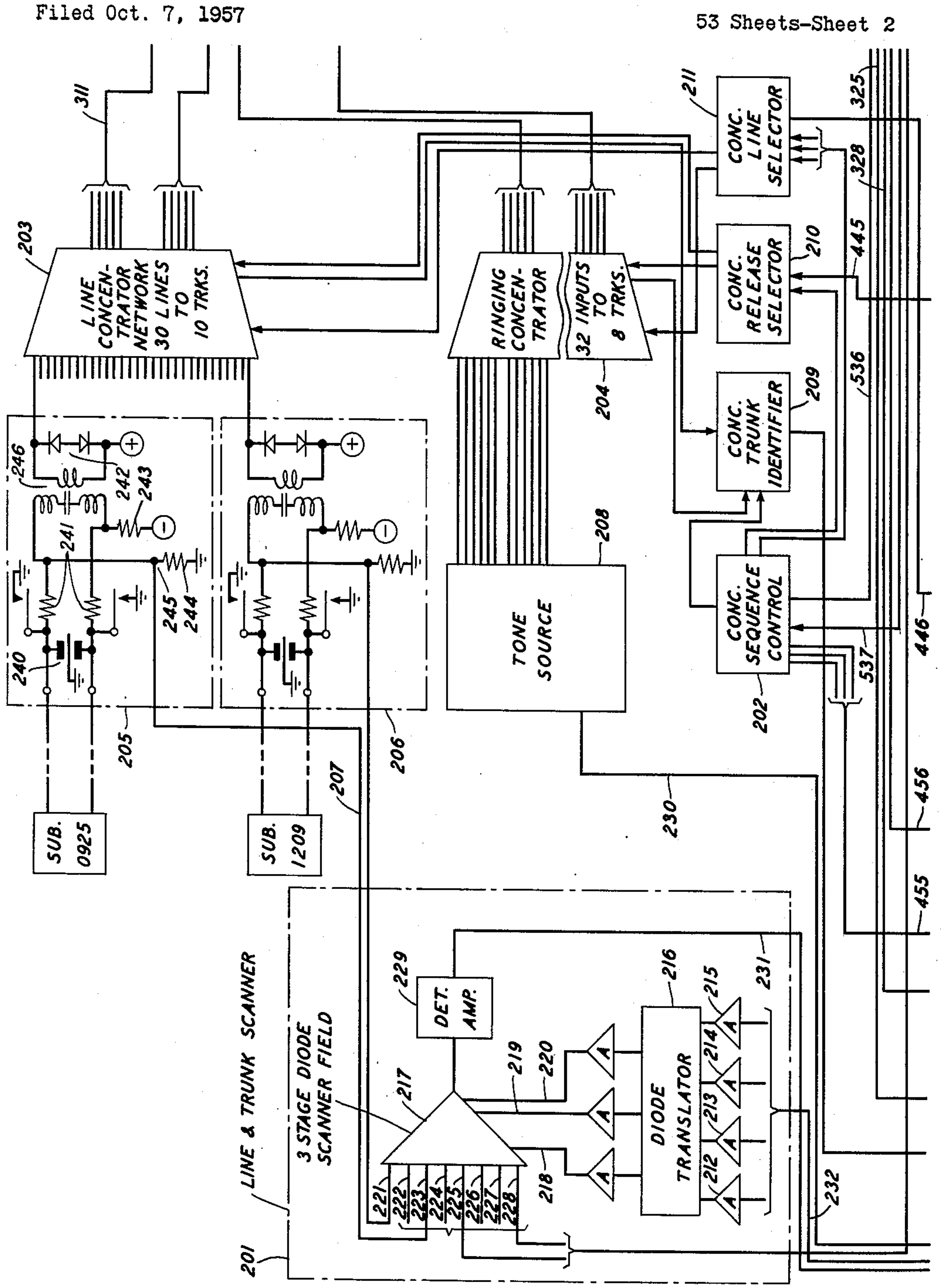
Figs. 2 through 11 are a schematic representation of one illustrative embodiment of this invention.

The subscribers' line circuits, represented in Fig. 2 by boxes 205 and 206, provide means for protecting the central office equipment from lightning and stray voltages and, in addition, provide a scanning point which reflects the supervisory state of the subscriber's line. The Line Scanner 201 has access to the scanning point on all subscribers' lines and states, either on-hook or off-hook, are determined by momentary examination of the potential of the scanning point. A simplified diagram of a subscriber's line circuit is shown in Fig. 2.

Protection against lightning is provided by the carbon blocks 240 and protection against high currents as a result of foreign potentials on the line is afforded by heat coils 241. To further protect the switching network to which the line equipment is connected, the silicon diodes 242 are provided to limit the voltage across the network input to about 10 volts.

Power to the subscriber is provided through line feed resistors 243 and 244. The line scanning point 245 is at a low potential when the subscriber's set is in the on-hook condition, and, when the subscriber places the line in the off-hook condition, the current flowing through the line and resistor 244 raises the potential at line scanning point 245. This change in state is recognized by the Line Scanner.

*Line and Trunk Scanner*

The Line and Trunk Scanner 201 serves to interrogate the scanning point in all line and trunk terminals to recognize any changes in supervisory state of the lines and trunks. The address to the Line Scanner on conductor group 232 is a twelve-bit binary word, of which in one instance five bits are established by program information from the Flying Spot Store and the remaining seven bits comprise the D code of the previously mentioned Order Word. In other instances the Scanner Address may be information from an originating register, from the Access Register or from other general purpose registers.

A scanner of this general type on a small-scale basis is shown in Fig. 2.

The scanner address signal elements are amplified by Logic Amplifiers such as 212 and 215 and then translated by the diode translator 216 to provide the three stages of control leads for the three-stage diode scanner 217. The first two conductor groups 218 and 219 connected to the first two stages of the diode scanner 217 each comprise thirty-two conductors and the third conductor group 220 comprises four control conductors which are connected to the third stage of the diode scanner field 217. Control potentials on the three conductor groups 218, 219 and 220 are effective to cause one of the scanning leads 221, 222, etc., to interrogate the scanning point of its associated line circuit. The detector amplifier 229 converts the single-rail output from the diode scanner 217 to two-rail logic on 231. The state of the interrogated line is therefore indicated on scanner output conductor pair 231.

In summary, the twelve-bit binary word, on conductor group 232, is effective to interrogate one out of the N subscribers' lines or trunks and a binary indication of the supervisory state of the interrogated line or trunk is given to the Common Control on a pair of output conductors 231.

*Scanner Address Register*

The Scanner Address Register 420 comprises fourteen transistor flip-flop memory cells. This Register is employed to store Line Scanner addresses and when the services of the Line Scanner are not required, this Register may be used as a general purpose memory unit.

Figure 5:
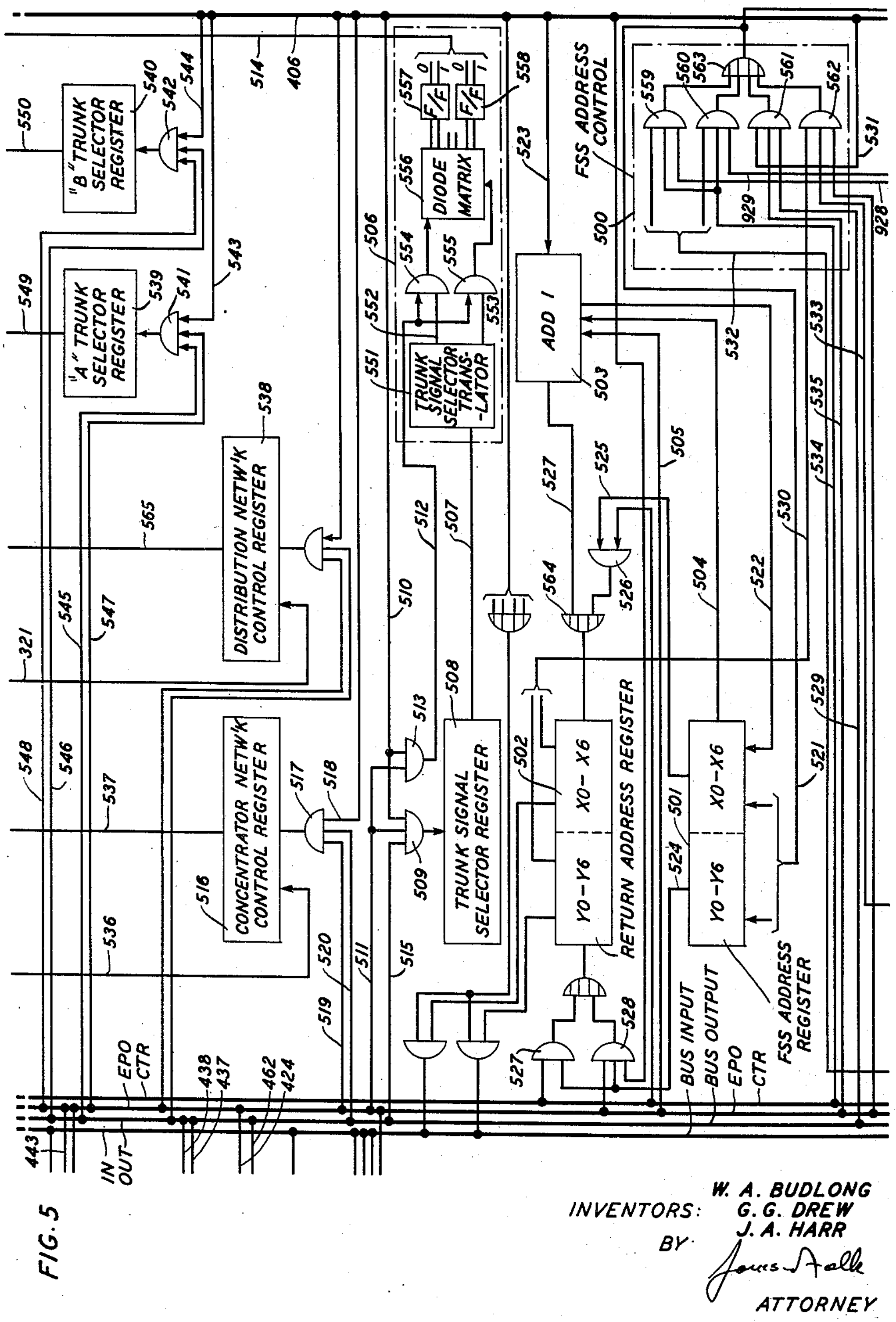

Addresses on conductor 462 from the Bus Output, Fig. 5, are selectively gated to the Scanner Address Register 420 through AND gate 422 under control of the Order Translator signal A3B3D5 on conductor 423. Gating through 422 is in synchronism with the EP0 pulse which enters on conductor 424.

As previously indicated, the D code, as obtained from the output of the Order Register 400, comprises a second input to the Scanner Address Register. The D code enters through gate 421 which is enabled by Order Translator signal A0–1C10 on conductor 425 and synchronized by EP0 pulses on conductor 424.

The output conductors of the Scanner Address Register memory cells are connected directly by conductor group 232 to the Line and Trunk Scanner Input Control Amplifiers 212 through 215 and to the Bus Input circuit through gate 426. The output gate 426 is enabled by any one of a plurality of Order Translator signals which enter gate 426 by way of the OR gate 427. The Order Translator signals effective to enable gate 426 are: A0–1C10, A0–1C16D5, A0–1C17D5, A0–1C18D5, A3B3C5, A7B3C12D5, A7B3C17D5 and A7B3C18D5.

Conductor group 232 comprises twenty-four conductors and conveys a seven-bit X address and a five-bit Y address. Conductor groups 461 and 462 each comprise twenty-eight conductors. In summary, the Scanner Address Register 420 maintains a record of addresses to be interrogated by the Line Scanner 201, and when not so required may be employed as a general purpose memory unit. Information is selectively gated into and out of the Register under control of Order Translator signals and EP0 pulses.

*Barrier Grid Store Address Register*

The Barrier Grid Store Address Register 700, the Add 1 X Control 701 and the Add 1 Y Control 702 are closely allied and will be considered together.

Figure 7:
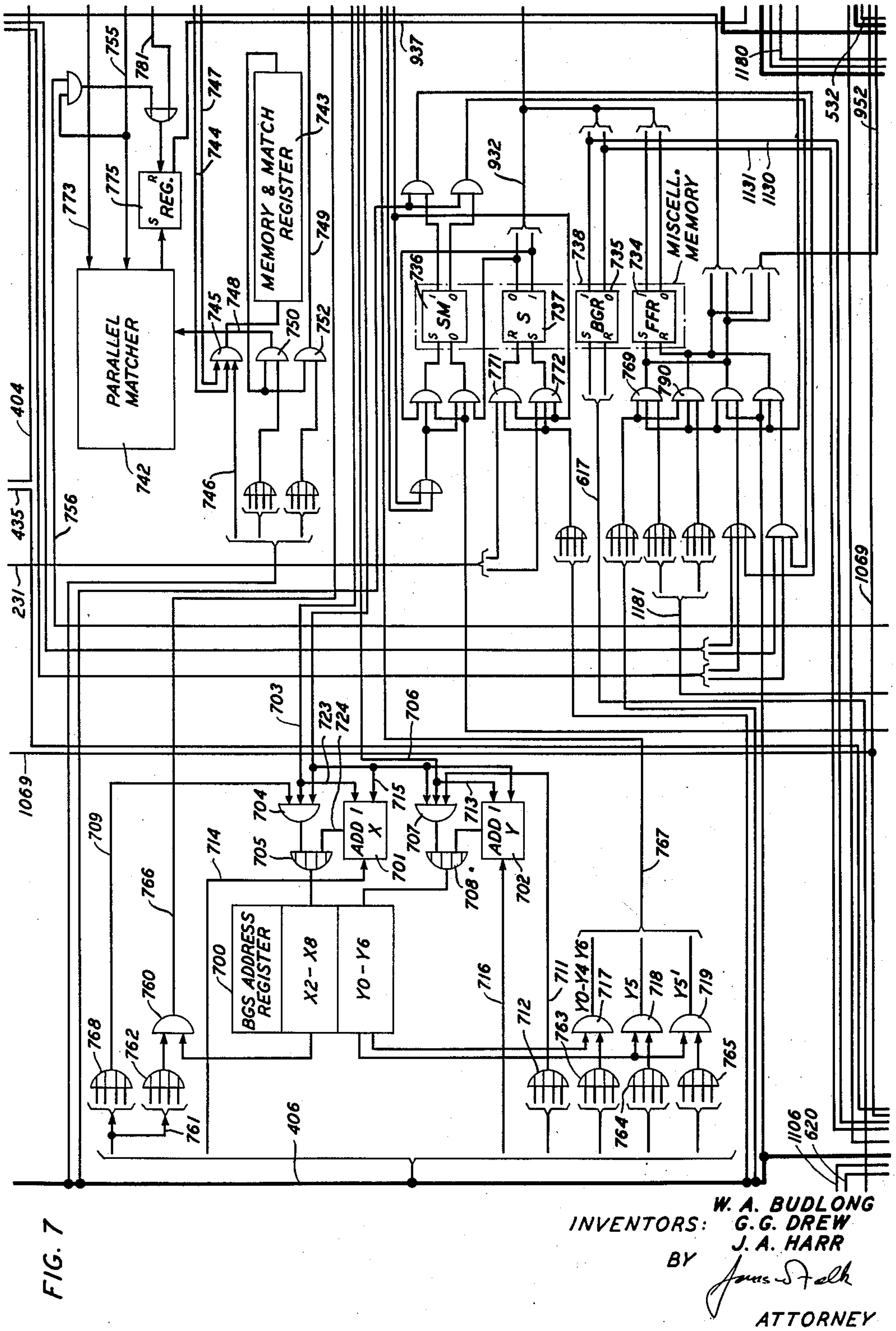
Figure 8:
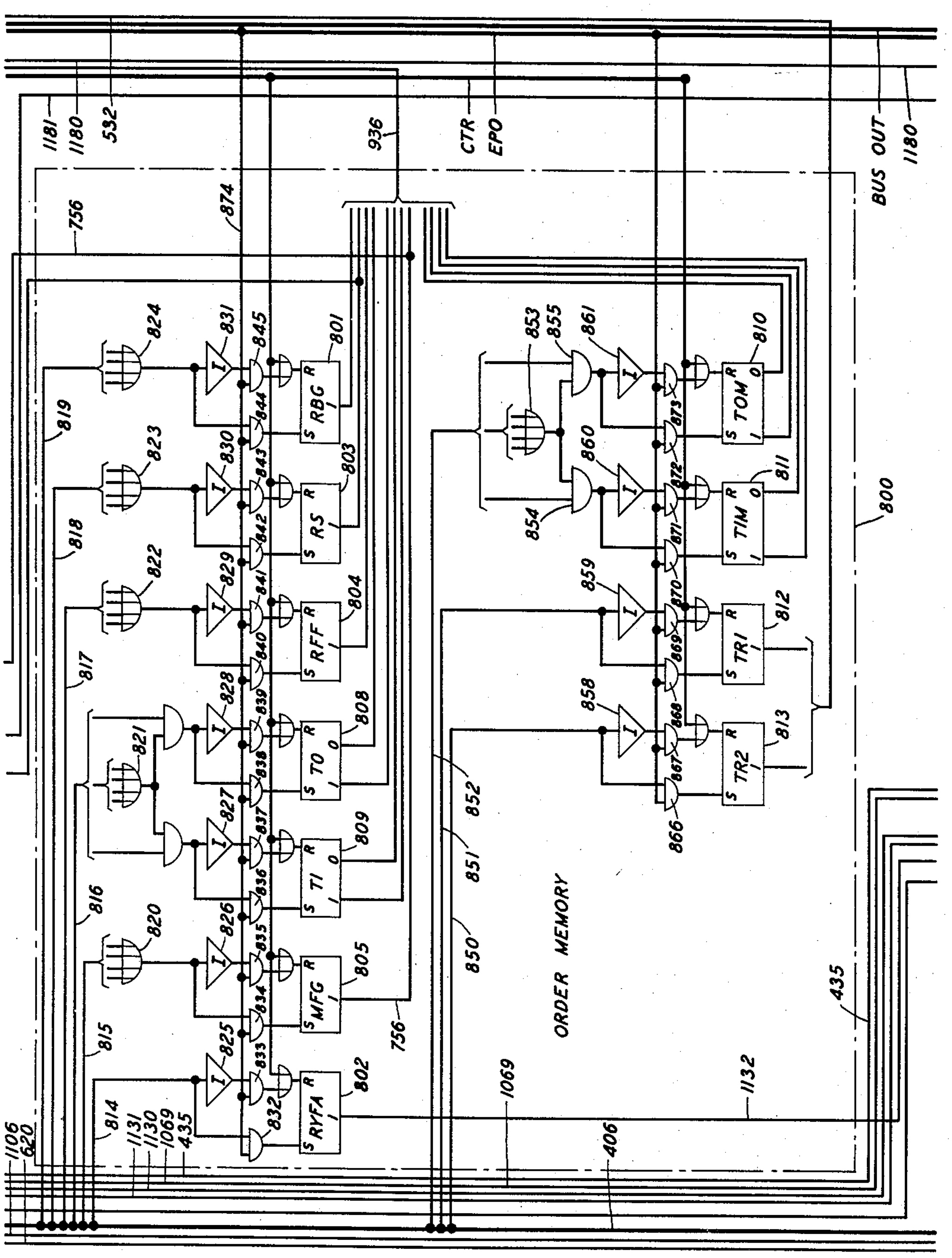

The Barrier Grid Store Address Register comprises fourteen transistor flip-flop memory cells. These memory cells are divided into two groups. One group of seven cells is employed to store Barrier Grid Store X addresses and the other seven are employed to store Barrier Grid Store Y addresses. As can be seen in Fig. 7, a new X or Y address can be selectively gated into or out of the Barrier Grid Store Address Register without disturbing the address of the other axis.

Information is gated to the Barrier Grid Store Address Register 700 either directly from the Bus Output or from the Bus Output through either or both of the Add 1 X and Add 1 Y circuits 701 and 702. Order Translator signals determine which of these inputs is to be gated into the Barrier Grid Store Address Register.

A seven-bit word, X2 through X8 on conductor group 703 enters the Barrier Grid Store Address Register through AND gate 704 and OR gate 705. A seven-bit Y address, Y0 through Y6 on 706, enters the Barrier Grid Store Y Address Register through AND gate 707 and OR gate 708. Each of these gates requires the presence of an EP0 signal and an order from the Order Translator, Each of the Order Translator signals A0–1C1, A0–1C3, A0–1C5, A0–1C10, A0–1C12, A3B3D4, A3B3D20, A7B3C2, A7B3C3, A7B3C9 and A7B3C11 is an enabling signal for gate 704. These signals enter over 709 which is the output conductor of the combining OR gate 768. Similarly, each of the Order Translator signals A0–1C0, A0–1C2, A0–1C4, A0–1C10, A3B3D4, A3B3D21, A7B0, A7B1, A7B2, A7B3C0, A7B3C1, A7B3C8, A7B3C10 and A7B3C20 which enter over 711 is effective to enable AND gate 707. These last enumerated Order Translator signals are combined in OR gate 712.

Addresses from the Bus Output circuit are also present at the inputs to the Add 1 X and Add 1 Y circuits 701 and 702 on conductor groups 723 and 713, respectively. These Add 1 circuits may be operated independently of each other under commands from the Order Translator and are effective to increment either of the X and Y addresses received from the Bus Output circuit. The simultaneous appearance of the Order Translator signal A7B3C17 on conductor 714 and the EP0 pulse on conductor 715 energizes the Add 1 X circuit 701. This is effective to increment the X address present on conductor group 723 and to provide a new X address on conductor group 724 for entry in the Barrier Grid Store Address Register through OR gate 705.

Similarly, the Order Translator command A7B3C18 on conductor 716 and the EP0 pulse are effective to enable the Add 1 Y circuit 702.

The output conductors of the Barrier Grid Store Address Register X axis memory cells are connected to the Bus Input circuit through AND gate 760 which is selectively enabled by any one of the Order Translator commands A0–1C0, A0–1C2, A0–1C4, A0–1C7, A0–1C8, A0–1C11, A0–1C14, A3B3C4, A3B3C20, A7B0, A7B1, A7B2, A7B3C0, A7B3C1, A7B3C4, A7B3C5, A7B3C8, A7B3C13, A7B3C14, A7B3C20, A7B3C12D4 and A7B3C17D4. The Order Translator signals enter over conductor group 761 and are combined in OR gate 762 whose output conductor is connected to AND gate 760.

The gating of the output conductors of the Y axis memory cells is slightly more complex. As previously indicated, the L1 and L2 spots in the Barrier Grid Store storage area are in similar X addresses but at Y addresses in different quarters of the storage area. The Barrier Grid Store beam may be shifted from a subscriber's L1 spot to the same subscriber's L2 spot by merely complementing the second most significant bit of the Barrier Grid Store Y address. In our particular illustrative embodiment, the Y5 bit is the second most significant. Accordingly, the Y0 through Y4 and the Y6 bits are gated simultaneously through AND gate 717 and the Y5 bit is separately gated through AND gates 718 or 719.

Each of the Order Translator commands A0–1C1, A0–1C3, A0–1C5, A0–1C7, A0–1C8, A0–1C12, A0–1C12, A0–1C15, A0–1C17D4, A0–1C18D4, A3B3C4, A3B3C21, A7B3C2, A7B3C3, A7B3C4, A7B3C5, A7B3C9, A7B3C13, A7B3C14, A7B3C12D4 and A7B3C18D4 is effective to gate the Y0 to Y4 and the Y6 bits through AND gate 717 to the Bus Input circuit. Each of the Order Translator signals A0–1C1, A0–1C3, A0–1C5, A0–1C7, A0–1C12, A0–1C15, A0–1C17D4, A0–1C18D4, A3B3C4, A3B3C21, A7B3C2, A7B3C3, A7B3C4, A7B3C5, A7B3C9, A7B3C12D4 and A7B3C18D4 is effective to enable AND gate 718 and thereby transmit the state of the Y5 memory cell to the Bus Input circuit without conversion.

Each of the Order Translator signals A0–1C8, A7B3C13 and A7B3C14 is effective to enable AND gate 719 and therefore transmit to the Bus Input circuit the complement of the Y5 bit stored in the Barrier Grid Store Address Register 700. The Order Translator enabling signals for AND gates 717, 718 and 719 are combined in OR gates 763, 764 and 765, respectively.

In summary, the Barrier Grid Store Address Register 700, under control of program orders from the Order Translator, receives a fouteen-bit Barrier Grid Store address directly from the Bus Output or the fourteen-bit address from the Bus Output incremented by 1 in either of the coordinates.

The X and Y addresses, also under program orders, are simultaneously or independently selectively gated to the Bus Input circuit. In addition, the second most significant Y bit stored in the Register may be selectively inverted to rapidly transfer the Barrier Grid Store beam from a spot in one quarter of the Barrier Grid tube storage area to the complementary spot in another quarter of the storage area.

*Barrier Grid Store Address Control*

The Barrier Grid Store Address Control 1100, under program orders from the Order Translator 410, selectively gates addresses from the Bus Output to the Barrier Grid Store Horizontal and Vertical Address Registers 601 and 602. The Bus Output signals are transmitted through AND gate 1101, under control of the output signal from OR gate 1102 and the EP0 pulse on conductor 1103. OR gate 1102 is energized by the following Order Translator signals: A0–1C0, A0–1C1, A0–1C2, A0–1C3, A0–1C4, A0–1C5, A0–1C7, A0–1C8, A0–1C10, A0–1C11, A0–1C12, A0–1C14, A0–1C15, A7B0–1, A7B2, A7B3C0, A7B3C1, A7B3C2, A7B3C3, A7B3C4, A7B3C5, A7B3C8, A7B3C9, A7B3C13, A7B3C14 and A7B3C20, which enter OR gate 1102 over conductor group 1105. Output addresses to the Barrier Grid Store Address Registers 601 and 602 leave gate 1101 over conductor group 1106.

*Barrier Grid Store Read-Write Control*

Commands to be undertaken by the Barrier Grid Store at the address received from the Barrier Grid Store Address Control 1100 are generated in the Barrier Grid Store Read-Write Control 1107. As previously indicated, there are four possible commands to be undertaken by the Barrier Grid Store Control Circuit 619. These are: Read and Regenerate, Read and Change, Read and Write "1" and Read and Write "0."

The output of the Barrier Grid Store Read-Write Control 1107 is over conductor group 620 which comprises four conductors. Each conductor in this group is the output conductor of one of the four AND gates 1108 through 1111. These AND gates have as their input the output signals from OR gates 1112 through 1115 which combine Order Translator program signals and signals representative of selected memory cells in the Access Register 1150.

The program orders A0–1C0, A0–1C1, A0–1C7, A0–1C8, A0–1C10, A0–1C11, A0–1C12, A0–1C14, A0–1C15, A7B0, A7B3C8 and A7B3C9 enter OR gate 1112 over conductor group 1116. Each of these signals enables OR gate 1112 whose output, in conjunction with an EP0 pulse, is effective to enable AND gate 1108 which provides a Read and Regenerate signal to the Barrier Grid Tube Control Circuit 619.

The program signals A0–1C4, A0–1C5 and A7B3C20 are combined in OR gate 1113. The output of 1113 on conductor 1117, in conjunction with the EP0 pulse on 1118, enables AND gate 1109 to generate a Read and Change order.

The Read and Write "1" and the Read and Write "0" gates 1110 and 1111 are selectively energized under the control of program signals from the Order Translator taken separately or in conjunction with signals indicating the state of chosen memory cells in the Access Register 1150. The program orders A7B3C1, A7B3C3, A7B3C5 and A7B3C14, which enter OR gate 1114 over conductor group 1119, are individually effective to enable gate 1114 and provide an enabling signal to gate 1110. The output signal from 1114, in conjunction with an EP0 pulse, generates a Read and Write "1" signal for the Barrier Grid Tube Control Circuit.

The program order A7B2 in conjunction with an indication, over conductor group 1120, that a selected memory cell in the Access Register 1150 is in the "1" state, enables gate 1121 which, in turn, also energizes OR gate 1114 to generate a Read and Write "1" order for the Barrier Grid Tube Control Circuit.

The order translator signals A0–1C2, A0–1C3, A7B1, A7B3C0, A7B3C2, A7B3C4, and A7B3C13 on conductor group 1148 are individually effective to enable OR gate 1115 and its output in conjunction with an EP0 pulse, to energize the Read and Write "0" gate 1111.

The program order A7B2 on conductor 1123, in conjunction with a signal on conductor 1146, indicating that the selected memory cell in the access register is in the 0 state enables AND gate 1122. The output of gate 1122 also enables OR gate 1115 and as previously stated, the output of gate 1115, in conjunction with an EP0 pulse, enables AND gate 1111.

*Access Register*

The Access Register 1150 is a large capacity general purpose memory unit which comprises thirty-two transistor flip-flop memory cells which are divided into a first group of eighteen cells and a second group of fourteen cells. Information may be gated into the Access Register from the Bus Output circuit, from the Flying Spot Store Output Register 1068 over conductor group 1069, and from the Barrier Grid Store output circuit 616 over conductor 617 and through flip-flop 735 and conductors 1130 and 1131 and, in accordance with program commands, any one of the thirty-two cells may be selectively set or reset.

The Access Register accepts parallel words from both the Bust Output circuit and Flying Spot Store Output Register and serial words from the Barrier Grid Store Output circuit and from the program orders. The serial words of the Barrier Grid Store are registered in the Access Register cells and read out in parallel thereby effecting a conversion from serial to parallel words.

Information stored in the Access Register is selectively gated as a parallel word to the Bus Input Circuit or as a serial word to the Barrier Grid Store Read-Write Control 1107 or to the Miscellaneous Memory 738.

The Order Translator program commands A5 and A3B3D6 through OR gate 1162 are effective to gate information from the Bus Output circuit through gate 1124 into the first eighteen memory cells and the program commands A6 and A3B3D7 through OR gate 1167 are effective to gate information from the Bus Output circuit through gate 1125 into the last fourteen memory cells.

Signals from the Flying Spot Store Translation Control 901 on conductors 1126 and 1127 indicating that the Flying Spot Store is addressed to a translation area are effective to gate Flying Spot Store translation words on conductor groups 1128 and 1129, of conductor group 1069, into the first and second groups of Access Register memory cells.

The R0BG and R1BG conductors 1130 and 1131 from the Miscellaneous Memory 738 indicate whether the spot interrogated by the Barrier Grid Store was in the "0" or "1" state, respectively. A signal from the Order Memory Fig. 8, on conductor 1132 indicates that the information read from the Barrier Grid Store is to be stored in an Access Register memory cell determined by the C code of the Order Word. Therefore, the information from the Barrier Grid Store is selectively gated into any one of the Access Register memory cells. For example, the combined presence of the RYFA signal on conductor 1132 and the R0BG signal on conductor 1130 will enable AND gates 1133 and 1137 to provide signals to AND gates 1134 and 1138. Only one of the AND gates 1134 and 1138, however, will be enabled to gate the state of the spot interrogated by the Barrier Grid Store as these gates are selectively enabled by the value of the C code. The C code assumes the values C0 through C17 to gate Barrier Grid Store output information to one of the first eighteen memory cells of the Access Register and the values C18 through C31 to gate information to the last fourteen cells of the Access Register.

The individual cells of the Access Register are also selectively set or reset through gates 1141, 1142, 1143 and 1144 by a program order in conjunction with a D code signal which defines the cell to be operated upon.

Figure 9:
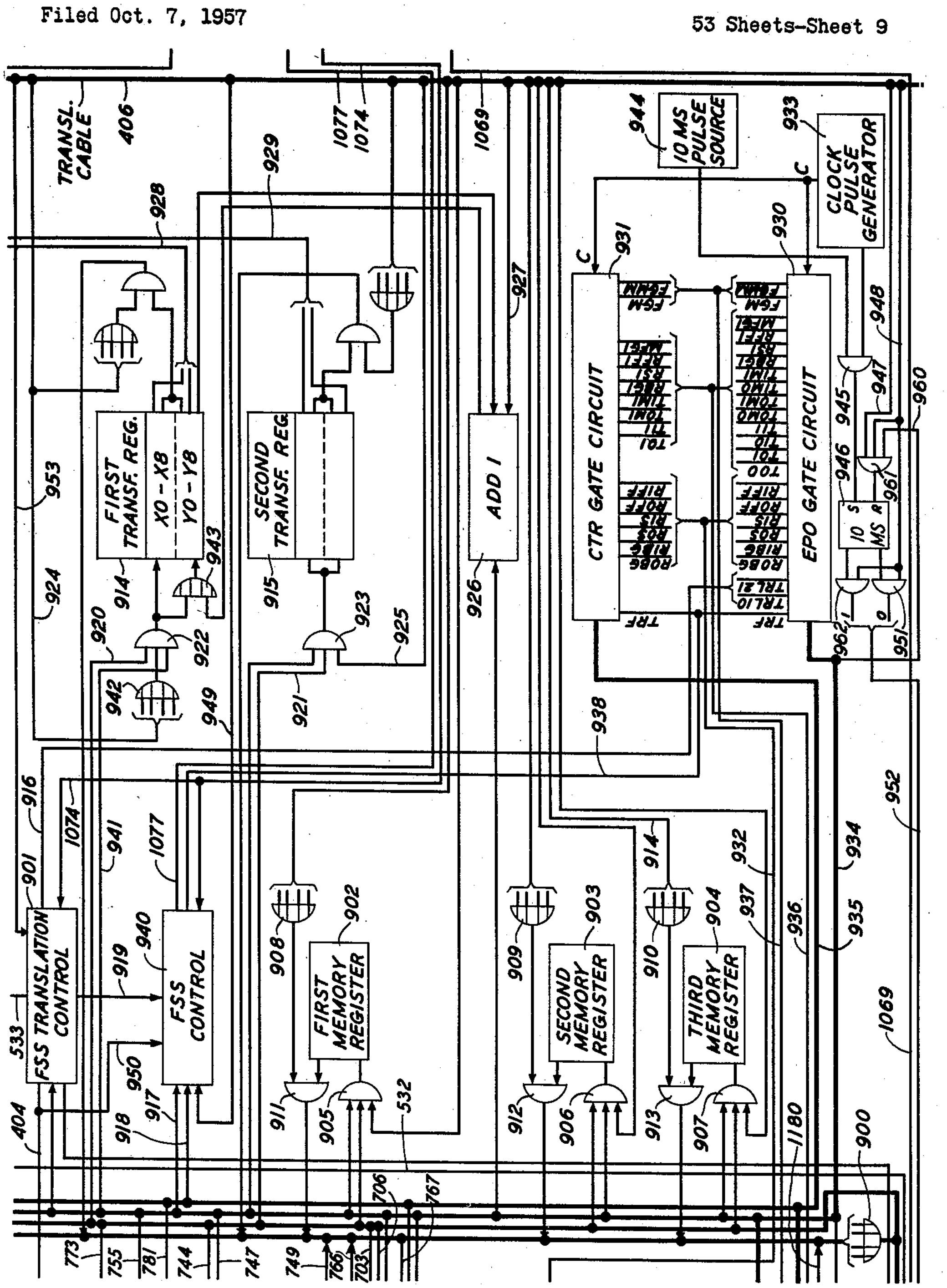

Information stored in the first eighteen cells of the Access Register may be gated to the Bus Input circuit, Fig. 9, through gate 1145 and conductor 1180 under the following program commands from the Order Translator: A0–1C16D6, A0–1C17D6, A0–1C18D6, A3B3C6, A7B3C12D6, A7B3C17D6, and A7B3C18D6. Similarly, information may be gated in parallel from the last fourteen cells of the Access Register by the following commands from the Order Translator: A0–1C16D7, A0–1C17D7, A0–1C18D7, A3B3C7, A7B3C12D7, A7B3C17D7 and A7B3C18D7.

The information stored in the Access Register is also selectively gated through gate 1183 to the Miscellaneous Memory Fig. 7 over conductor group 1181 or to the Barrier Grid Store Read-Write Control 1107 serially through AND gate 1161 and conductor group 1182. The particular cell to be read to Miscellaneous Memory or to the Barrier Grid Store Read-Write Control is indicated by the D or C code of the order word, respectively.

*C Memory Register*

The "C" Memory Register 432 comprises five transistor flip-flop memory cells in which the C code of the Order Word is stored. Upon commands from the Order Translator 410 the C code of the Order Word is read into the C Memory Register. New information is read into the C Memory Register only when the Flying Spot Store is in the order area as the input to the C Memory Register is taken from the output of the Order Register 400, which was previously described.

The Order translator command A7B0–1 individually through OR gate 492, in conjunction with the EP0 pulse, is effective to gate the C code of the Order Word stored in the Order Register into the C Memory Register 432 through AND gate 405. The output conductors of the C Memory Register cells are connected to the C Memory Translator 434. Both states of each bit of the C word stored in the C Memory Register are transmitted to the C Memory Translator. Accordingly, conductor group 433 comprises ten conductors.

*C Memory Translator*

The C Memory Translator 434 is identical to the C and D code translators 415 and 416 of the Primary Translator 411. The operation of the C Code Translator 415 has been previously described and this type of translator need not be redefined at this point.

Through conductor group 435 eighteen of the thirty-two output conductors of the C Memory Translator, 0 through 17, are connected to the first eighteen cells of the Access Register 1150 and output conductors, 18 through 31, are connected to the remaining fourteen memory cells of the Access Register 1150.

*Memory Registers*

The first, Second and Third Memory Registers 902, 903 and 904 individually comprise pluralities of transistor flip-flop memory cells. These are general purpose registers for temporary storage of information obtained from the Bus Output circuit which is to be subsequently used in other areas of Common Control served by the bus circuit. The gating of information to and from these registers is under command of program orders from the Order Translator. The input AND gates 905, 906 and 907 are each enabled by Order Translator commands, the EP0 pulse and signals from the Bus Output circuit. The Order Translator commands A3B3D8, A3B3D10 and A3B3D11 in conjunction with the EP0 pulse are effective to gate information from the Bus to the First, Second and Third Memory Registers, respectively.

Information is gated from the Memory Registers to the Bus Input circuit under the command of a plurality of Order Translator signals.

The Order Translator signals A0–1C16D8, A0–1C17D8, A0–1C18D8, A3B3C8, A7B3C12D8, A7B3C17D8 and A7B3C18D8 are each effective to gate information from the First Memory Register through AND gate 911 to the Bus Input circuit. These Order Translator signals are combined in OR gate 908.

The Order Translator signals A0–1C16D10, A0–1C17D10, A0–1C18D10, A3B3C10, A7B3C12D10, A7B3C17D10 and A7B3C18D10 are individually effective to gate information from the Second Memory Register through AND gate 912 to the Bus Input circuit. These Order Translator signals are combined in OR gate 909.

The Order Translator signals A0–1C16D11, A0–1C17D11, A0–1C18D11, A3B3C11, A7B3C12D11, A7B3C17D11 and A7B3C18D11 are individually effective to gate information from the Third Memory Register through AND gate 913 to the Bus Input circuit. The Order Translator signals over conductor group 914 are combined in OR gate 910.

*The Flying Spot Store Address Control*

The Flying Spot Store Address Control 500 is primarily a gating circuit through which the proper Flying Spot Store address is entered into the Horizontal and Vertical Address Registers 1039 and 1040 which are internal to the Flying Spot Store. The operation of the Flying Spot Store Address Control cannot be fully understood without touching upon a few of the complexities occasioned by time division operation of the Common Control equipment.

The program stored in Common Control is calculated to ensure adequate service to all subscribers and trunks served by the Common Control and does not always progress along a simple path of advancing from one step to another but, rather, must often interrupt a work operation such as a scanning of subscribers' lines and transfer to perform other functions for a short period of time and then return to the original action. It may even be necessary to cut short the operation to which the transfer was made and transfer to a second work operation to ensure adequate service. A transfer to a new address in the Flying Spot Store, if indicated in the program, is termed a "direct transfer." Other transfers result from Flying Spot Store program orders upon which a decision is made, in which case they are termed "conditional transfers." On the occurrence of decision orders the absence of a particular condition in the switching system will cause the Flying Spot Store to advance, and the presence of that particular condition will effect a transfer to a new Flying Spot Store address.

The Flying Spot Store Address Register 501, the Flying Spot Store Return Address Register 502, the Flying Spot Store Add 1 Control 503 and the First and Second Transfer Registers 914 and 915 are all necessary to the operation of the Flying Spot Store Address Control 500 and will be considered at this time.

The Flying Spot Store Address Register 501 maintains a record for the Common Control of the current address registered in the Horizontal and Vertical Input Registers 1039 and 1040. The Flying Spot Store Address Register 501 comprises a plurality of transistor flip-flop memory cells which are divided into two groups, X0 through X6 and Y0 through Y6. The input conductors of both groups of cells are connected in parallel with the input conductors to the Horizontal and Vertical Input Registers 1039 and 1040. Therefore whenever a new address is gated to the Flying Spot Store, it is also gated to the Flying Spot Store Address Register 501.

One address input to the Flying Spot Store Address Register 501 is over conductor group 521 which comprises twenty-eight conductors. These conductors convey a seven-bit Y address Y0 through Y6 and a seven-bit X address X0 through X6. A second input to the Flying Spot Store Address Register 501 is over conductor group 522 which comprises fourteen conductors and conveys an X address. This latter conductor group connects the Add 1 Control 503 to the X cells of the Address Register 501.

The Return Address Register 502 comprises fourteen transistor flip-flop memory cells divided into two groups, Y0 through Y6 and X0 through X6. On the occurrence of a transfer of the Flying Spot Store, as opposed to an advance, a record is maintained in the Return Address Register of the address to which the Flying Spot Store may be returned after the action at the transfer address has been completed. In the case of a conditional transfer, the Flying Spot Store will return to the address which is current in the Flying Spot Store Address Register at the time of the transfer; therefore, both the X and Y portions of the address in the Address Register 501 are gated to the Return Address Register 502 over conductor groups 524 and 525. The X and Y portions of the address are gated through AND gates 526 and 527, respectively, which are enabled upon the occurrence of a conditional transfer CTR pulse.

In the case of a direct transfer, the Flying Spot Store may return, after acting upon the transfer, to a point having the same Y address as that in the Flying Spot Store Address Register at the time of the transfer and to an X address 1 larger than the X address in the Flying Spot Store Address Register at the time of the transfer.

The Add 1 Control 503 accepts address information from the Flying Spot Store Address Register 501 over conductor group 504 which conveys only the X portion of the address. Under program orders from the Order Translator over 523, the Add 1 Control 503 will increment the address received over conductor group 504 and pass the increased X address to the Return Address Register 502 or to the Flying Spot Store Address Register 501 over conductor groups 527 and 522 respectively. The action with the Add 1 Control is synchronized by the EP0 pulse over conductor 505. Upon the occurrence of a direct transfer, the incremented X address is gated to the Return Address Register over conductor group 527 and, in an advance, the incremented address is transmitted to the Flying Spot Store Address Register 501 over conductor group 522.

The First and Second Transfer Registers 914 and 915, respectively, each comprises a plurality of transistor flip-flop memory cells. These registers are employed to store the address to which the Flying Spot Store is to transfer upon the presence of the condition required for transfer under a decision order. Both the First and Second Transfer Registers receive their basic address information from the Bus Output over conductor groups 920 and 921, respectively. These addresses are gated into their respective registers through AND gates 922 and 923 under program orders from the Order Translator on conductor groups 924 and 925.

The First Transfer Register has an Add 1 Control 926 associated with it so that the Y address stored in the First Register may be incremented by 1 upon program orders received over translator conductor group 927. The Second Transfer Register does not have provisions for increasing the addresses therein.

As previously indicated, the Flying Spot Store Address Control 500 is a gating network which is effective to direct the proper address to the Horizontal and Vertical Address Registers 1039 and 1040. Addresses to be gated through the Flying Spot Store Address Control at various times are received from the Bus Output circuit over conductor group 529, from the Return Address Register 502 over conductor group 530, from the First Transfer Register 914 over conductor group 928, and from the Second Transfer Register over conductor group 929. Signals to select the proper address to be gated through the Flying Spot Store Address Control are received from the Order Translator over conductor 531, from the Order Memory over 532, from the Flying Spot Store Translator Control over 533, in synchronism with the CTR pulse over 534 or the EP0 pulse over 535.

*Flying Spot Store Translation Control*

The Flying Spot Store Translation Control is employed when the Common Control is obtaining translation data from the Flying Spot Store. It ensures that the Flying Spot Store output words are entered in the proper Register in Common Control, causes the information in the Return Address Register to be gated into the Flying Spot Store Horizontal and Vertical Input Registers 1039 and 1040, and aids in the generation of EP0 and CTR pulses.

When the Flying Spot Store is addressed to an order area, a signal from the Flying Spot Store Translation Control 901 to the Order Register 400 over conductor 404 is effective to gate the Order Word into the Order Register. When the Flying Spot Store output information results from the interrogation of a translation area, the Flying Spot Store Translation Control 901 directs the eighteen bit translation word into desired locations in the Access Register 1150 by means of signals on conductors 1126 and 1127.

A transfer of the Flying Spot Store to a translation area is always done on a direct transfer and not on a conditional transfer. The fact that the Flying Spot Store is to be directed to a translation area is indicated to the Flying Spot Store Translation Control first by a nondecision order which sets a memory cell in the Translation Control to indicate that a direct transfer is to be made, followed by the simultaneous occurrence of a direct transfer order and an EP0 pulse. This sequence of orders sets a TRL1 memory cell in the Flying Spot Store Translation Control 901.

There are three memory cells within the Flying Spot Store Translation Control, namely, TRL0, TRL1, and TRL2. The TRL0 memory cell is set upon the occurrence of the first above-mentioned order indicating that a direct transfer is to be made. The remaining memory cells, TRL1 and TRL2 are employed in a chain or sequence circuit and the states of these memory cells in combination indicate to Common Control whether the Flying Spot Store has been addressed to an order or a translation area and operations to be performed during the time the Flying Spot Store is in the translation area. The following is a chart showing the states of the TRL1 and TRL2 memory cells and the indications obtained thereby.

| TRL1 | TRL2 | |
|---|---|---|
| 0 | 0 | Flying Spot Store is in an order area. |
| 1 | 0 | The word obtained from the Flying Spot Store is to be entered in the first eighteen memory cells of the Access Register 1150. |
| 1 | 1 | A transfer is being made back to the order area. |

The TRL1 and TRL2 memory cells are in a chain circuit. If the TRL0 memory cell is in the "1" state, the simultaneous occurrence of a direct transfer order and an EP0 pulse will set the TRL1 flip-flop to its "1" state and the order obtained from the translation area will be gated to the first eighteen memory cells of the Access Register through AND gate 1175 and OR gates 1165 and 1166.

Upon the occurrence of a Cycle Complete pulse from the Flying Spot Store Program Control to the Flying Spot Store Translation Control over conductor 1074, the TRL2 memory cell will be set if the TRL1 memory cell was previously in its "1" state and the TRL2 memory cell was previously in its "0" state. Upon the occurrence of the first EP0 pulse succeeding the Cycle Complete signal, the TRL0, TRL1 and TRL2 memory cells will be reset and the Flying Spot Store returns to the order area at the Flying Spot Store address obtained from the Return Address Register.

*Flying Spot Store Control*

The Flying Spot Store Control 940 provides transfer and advance commands to the Flying Spot Store Program Control Circuit 1067 over conductor group 1077 and, by a signal over 938, inhibits the generation of CTR and EP0 pulses during the time that the Flying Spot Store beam is being repositioned during a transfer. The Flying Spot Store Control comprises a plurality of AND gates which are selectively energized by information from the Order Translator over conductor group 949, from the Flying Spot Store Translation Control 901 over conductor group 919 and the EP0 conductor 917 or the CTR conductor 918. The output signals of these gates are the transfer and advance signals to the Flying Spot Store Program Control 1067 over conductor group 1077.

A transistor flip-flop memory cell in the Flying Spot Store Control is in the set state during the time that a transfer is being accomplished within the Flying Spot Store and in the reset state after the transfer is finished. The conductor 938 connected to this flip-flop is de-energized when the flip-flop is in the set condition. As will be seen later, the conductor 938 must be active to effect generation of an EP0 or CTR pulse.

*Two-way trunks*

The two-way trunks such as 314 and 315 are transmission and signaling links between the switching network of our invention and an operator or a distant office. The trunk transmission path is a balanced line which terminates on the A or B side of the Distribution Network as do trunks from the subscriber line concentrator networks. Each trunk circuit has a scanning point, such as is found in the subscriber's line circuit, and the supervisory state of the distant operator or subscriber is reflected in the potential found at this point. Consequently, the line and trunk scanner 201 may be addressed to interrogate the scanning points of the two-way trunks such as 314 and 315 to detect the supervisory state of the distant operator or subscriber.

Signaling from the switching network of the applicant's invention to the distant office or operator is accomplished by selective energization of trunk signaling conductors such as 322 and 323. When the "0" conductor 322 is energized, an on-hook or open loop condition is transmitted by trunk 314 to the distant office over line 324. When the "1" conductor 323 is energized, an off-hook or closed loop condition is transmitted to the distant office over line 324. Signaling between the two-way trunk circuit such as 314 or 315 and the distant operator or office over transmission line 324 is on a loop basis and signaling from the Trunk Signal Selector 506 in the Common Control to the two-way trunk is on an E and M basis.

*Trunk Signal Selector*

The two-way trunks represented by 314 and 315 are selectively enabled and outpulsed under control of the Trunk Signal Selector 506. Input signals comprising trunk equipment numbers and supervisory states to be assumed by the chosen trunk enter the Trunk Signal Selector over conductor group 507.

The Trunk Signal Selector Register 508 comprises ten transistor flip-flop memory cells. Addresses are gated into this Register from the Bus output through AND gate 509 which is enabled by the program order A3B3D23 over 510 and an EP0 pulse on conductor 511.

The information gated from the bus is a ten-bit binary word which indicates the equipment number of the trunk to be employed and the supervisory state to be assumed by the trunk of that address.

Trunk Signal Selector 506 under control of the binary input word on 507 from the Trunk Signal Selector Register 508 selectively marks one conductor out of N pairs of conductors in conductor group 514 wherein one pair of conductors is associated with each trunk in the system. A signal on one conductor of each pair is effective to give an on-hook supervisory signal to the distant office or operator and activation of the other conductor of the pair is effective to give an off-hook supervisory signal to the distant operator or office.

The ten-bit code on conductor group 507 is processed in the Trunk Signal Selector Translator 551 to provide one out of thirty-two X addresses and one out of thirty-two Y addresses on conductor groups 552 and 553, respectively. These X and Y addresses are gated through X and Y gates 554 and 555, respectively, upon the occurrence of an enabling signal on conductor 512 from enabling gate 513. The enabling gate 513 is itself enabled upon the occurrence of an EP0 pulse and the A3B3D23 order from the Order Translator. The X and Y codes enter the diode matrix 556 wherein these codes are effective to mark one out of 1024 conductors which comprise 512 pairs of conductors. Therefore, the ten-bit binary code on conductor group 507 selectively marks one conductor from one of 512 pairs of conductors. The output conductors of diode matrix 556 are connected in pairs to memory cells such as 557 and 558 wherein the state to be assumed by a particular trunk is stored.

*Concentrator Control Register*

The Concentrator Control Register 516 comprises six transistor flip-flop memory cells which are selectively energized through AND gate 517 to provide control signals to the Concentrator Sequence Control 202 over conductor group 537. As previously indicated in the discussion of the Concentrator, there are five discrete orders from Common Control to the Concentrator Sequence Control. These orders are "Connect a subscriber's line to an idle concentrator trunk terminated on the A side of the distribution network"; "Connect a subscriber's line to an idle concentrator trunk terminated on the B side of the distribution network"; "Release the concentrator trunk which is separately identified"; "Override the busy indication and make a connection even though a busy is indicated"; "Perform a trace operation in the concentrator."

The input signals to selectively set the flip-flops in the Concentrator Control Register 516 are gated from the Bus Output circuit through AND gate 517. The program order A3B3D24 received over the translator conductor 518 in conjunction with the EP0 pulse on conductor 519 gates information from the Bus Output into the Concentrator Control Register 516 over conductor group 520.

In addition to the above-recited action commands to the Concentrator Sequence Control 202, there is a reset command over conductor group 537 which recycles the Concentrator Sequence Control.

In return for the orders to the Concentrator transmitted over 537, the Concentrator Sequence Control 202 transmits a check signal to the Concentrator Control Register 516 over conductor 536 to indicate that a command has been received and acted upon. Conductor group 437 from the Concentrator Control Register 516 to the Concentrator Sequence Control comprises six conductors, namely, Reset, Trace, Connect A, Connect B, Release Concentrator and Override Busy. The check signal transmitted from the Sequence Control 202 to the Concentrator Control Register 516 over conductor 536 is effective to reset all of the flip-flops in the Concentrator Control Register.

*Distribution Network Control Register*

The Distribution Network Control Register 538 is similar to the Concentrator Control Register 516 in that it comprises a plurality of transistor flip-flop memory cells which store commands to the Distribution Network Sequence Control 302. As previously indicated, there are three possible action commands plus the Reset command to the Distribution Network Sequence Control. These are "Connect," "Release A," and "Release B" commands which are orders to the Distribution Network Sequence Control to respectively effect a connection through the Distribution Network between the trunk terminals marked on the A and B sides of the network, release the connection to the marked trunk on the A side of the Distribution Network, and release the connection to the marked trunk on the B side of the Distribution Network. The Reset signal from Common Control resets the Network Response memory cells within the Distribution Network Sequence Control.

A check signal indicating that the Network Sequence Control has received a new command is transmitted to the Network Control Register 538 over conductor 321. Only the "1" state conductors of the Distribution Network Control Register Memory cells are connected to the Distribution Network Sequence Control. The check signal resets the Distribution Network Control Register memory cells and therefore removes the command signals to the Distribution Network Sequence Control.

*Trunk Selector Register*

The Distribution Network Trunk Selector A Register 539 and the Distribution Network Trunk Selector B Register 540 each comprises a plurality of transistor flip-flop memory cells in which network trunk addresses for the A and B sides of the network are stored. Information is gated from the Bus Output circuit to these Registers through AND gates 541 and 542 under program orders from the Order Translator over conductors 543 and 544, respectively. Addresses are gated from the Bus Output circuit over conductor groups 545 and 546 in synchronism with EP0 pulses on conductors 547 and 548.

The output conductors of the Trunk Selector Registers 539 and 540 are connected to the Distribution Network A Selector 303 and the Distribution Network B Selector 306. The information on conductor groups 549 and 550 from the Trunk Selector Registers to the Trunk Selectors is sufficient to identify one out of N trunks on the A or B side of the Distribution Network.

*Concentrator Release Selector Register*

The Concentrator Release Selector Register 429 and the Line Selector Register 436 are both similar to the Distribution Network Trunk Selector Registers 539 and 540. Each of the Registers 429 and 436 comprises a plurality of transistor flip-flop memory cells which store addresses of trunks and lines appearing on the various line and ringing concentrator networks.

Addresses are gated from a Bus Output to the Line Selector Register 436 and to the Concentrator Release Selector Register 429 over conductor groups 437 and 438, respectively, through AND gates 439 and 440. Gating of addresses is under program orders from the Order Translator on conductors 441 and 442 in synchronism with the EP0 pulse on conductors 443 and 444.

The binary address stored in the Release Selector Register 429 is connected to the Concentrator Release Selector 210 over conductor group 445 and the word stored in the Line Selector Register 436 is connected to the Concentrator Line Selector 211 over conductor group 446.

*Identifier Gates*

The output signals from the Concentrator Trunk Identifier 209, the Distribution Network A Trunk Identifier 304, and the Distribution Network B Trunk Identifier 305 are binary words indicating the particular line or trunk which has been acted upon. These output signals are selectively gated to the Bus Input circuit through AND gates 448, 449 and 450, respectively. Program orders from the Order Translator selectively enable these gates. The Order Translator signals A3B3C29, A3B3C30 and A3B3C31, respectively, enable AND gates 448, 449 and 450.

*Network Response Gates*

The Response Gates 453 and 454 are similar to each other and to the previously described Identifier Gates. As indicated in the discussion of the Concentrator and Distribution Networks, three replies are possible from the Networks to Common Control after a command has been sent to one of the Networks. These replies are "Busy," "Operation Successful" and "Operation Ended." These signals are transmitted from the Concentrator Sequence Control 202 to the Concentrator Network Response Gate 453 over conductor group 455 and from the Distribution Network Sequence Control 302 to the Distribution Network Response Gate 454 over conductor group 456. These signals are transmitted in two-rail logic and conductor groups 455 and 456 each comprises six conductors.

The network responses are selectively gated to the Miscellaneous Memory under program orders from the Order Translator.

*Order Memory*

The Order Memory 800 maintains a record of and indicates to Common Control the action in process within the Common Control. Input signals to the Order Memory comprise signals from the Order Translator and operation within is in synchronism with the EP0 pulse over conductor 874. A summary of the various conditions stored in the Order Memory flip-flops is as follows:

(*a*) An indication whether or not the Barrier Grid Store is being read is maintained in the RBG flip-flop 801.

(*b*) An indication that when the Barrier Grid Store is being read, the state of the addressed storage area should be stored in the Access Register is maintained in the RYFA cell 802.

(*c*) A record of scanner use is maintained in the RS flip-flop 803.

(*d*) An indication that memory cells in various areas of Common Control are being read is maintained in the RFF cell 804.

(*e*) An indication that information in one of the Registers in Common Control is being matched against the information in the Memory and Match Register is maintained in the MFG cell 805.

(*f*) On decision orders, an indication as to the condition under which a transfer will be made is maintained in flip-flops 808, 809, 810 and 811, and (*g*) The state of flip-flops 812 and 813 indicates which transfer register will be employed.

Each of the memory cells 801 through 813 has been given an identifying label which roughly describes its function and, for convenience, this functional label followered by a "0" or a "1" when applied to the cell output conductors indicates the state of that particular memory cell. For example, flip-flop 801, which indicates whether or not the Barrier Grid Store is being read is labeled RBG, Read Barrier Grid. Its output conductors are labeled RBG0 and RBG1 which indicate the Barrier Grid Store is not being read and the Barrier Grid Store is being read, respectively. The setting of each of the memory cells in the Order Memory can best be defined in terms of Boolean expressions. These cells are reset whenever the conditions for setting are not met and whenever a CTR pulse appears.

Read Barrier Grid—RBG:

EP0(A0–1C0+A0–1C1+A0–1C2+A0–1C3+A0–1C4 +A0–1C5+A0–1C7+A0–1C8+A0–1C10+A0–1C11 +A0–1C12+A0–1C14+A0–1C15+A7B0–1)=RBG1

Read BGS and Store Result in Access Register—RYFA:

EP0·A7B0–1=RYFA1

Read Scanner—RS:

EP0(A0–1C9+A0–1C10+A0–1C11+A0–1C12)=RS1

Read Flip-Flops in Common Control—RFF:

EP0(A0–1C6+A0–1C13)=RFF1

Matching Flip-Flop Groups—MFG:

EP0(A0–1C16+A0–1C17+A0–1C18)=MFG1

Transfer if a "0" is Read—T0:

EP0·A0(C0+C1+C2+C3+C4+C5+C6 +C7+C8+C9+C13+C14+C15)=T01

Transfer if "1"—T1:

EP0·A1(C0+C1+C2+C3+C4+C5+C6 +C7+C8+C9+C13+C14+C15)=T11

Transfer if No Match—T0M:

EP0·A0(C10+C11+C12+C16+C17+C18)=T0M1

Transfer if Match—T1M:

EP0·A1(C10+C11+C12+C16+C17+C18)=T1M1

Transfer to the Address in the First Transfer Register—TR1:

EP0·A0–1B0–1=TR11

Transfer to the Address in Second Transfer Register—TR2:

EP0·A0–1B2=TR21

As will be seen in the detailed discussion of the progress of a call through our system, the above indications will be advantageously employed.

*Miscellaneous Memory*

The Miscellaneous Memory 738 comprises four transistor flip-flop memory cells wherein the record is kept of the state of the last line interrogated by the Scanner, the last-read storage area in the Barrier Grid Store, and the last-read flip-flop memory cell in any of the various divisions of the Common Control. This information is gathered and transmitted to the EP0 gate circuit 930 and to the CTR gate circuit 931 to aid in the decision as to whether an EP0 or CTR pulse is to be generated.

The Miscellaneous Memory comprises four transistor flip-flop memory cells. The S Memory cell 737 maintains a record of the state of the last line interrogated by the Line and Trunk Scanner 201. The indication from the Scanner to Miscellaneous Memory is over conductor 231 which comprises two conductors in single-bit two-rail logic. The output of the S memory cell is connected to the EP0 and CTR Control Circuits 930 and 931 over conductor group 932. The "0" and "1" states of the S flip-flop are conveyed to the EP0 and CTR gate circuits over conductors labeled R0S and R1S. Another memory cell SM736 associated with the Scanner retains a record of the state of lines interrogated by the Scanner for a second cycle of the synchronizing EP0 or CTR pulse. The output of this memory cell is connected to the input of the memory cell within the Miscellaneous Memory which retains a record of the last-read flip-flop.

The BGR memory cell 735 is set in accordance with the state of the last-read spot in the Barrier Grid Store. Its output conductors are connected to the EP0 and CTR gate circuits 930 and 931 also over conductor group 932. The "0" and "1" output conductors of the BGR flip-flop are labeled R0BG and R1BG, respectively.

The state of the BGR flip-flop is also conveyed to the Access Register input circuitry over conductors 1130 and 1131 and these conductors are also labeled R0BG and R1BG.

The FFR memory cell 734 maintains a record of the state of the last-read flip-flop of the various memory cells in Common Control. The output of this flip-flop, as in the case of the BGR and S flip-flops, is connected to the EP0 and CTR gate circuits over conductor group 932. The states of this flip-flop are conveyed over conductors labeled R0FF and R1FF denoting the "0" and "1" states, respectively.

*Pulse sources*

The clock pulse source 933 is a pulse generator operating at approximately 400 kilocycles. This clock source is connected to the EP0 gate circuit 930 and the CTR gate circuit 931 which selectively gate the clock pulse generated in 933 to the EP0 Bus 934 or to the CTR Bus 935.

The 10 millisecond pulse source 944 provides a 10 microsecond pulse once every 10 milliseconds. The 10 millisecond pulse source and the clock pulse generator outputs are connected to AND gate 945 which is enabled upon the simultaneous occurrence of these pulses. The 10 millisecond pulse width covers several cycles of the clock pulse; therefore, gate 945 is enabled once every 10 milliseconds. The output of gate 945 sets the 10 millisecond memory cell 946 to its "1" state.

The main program under which this system operates is divided into basic 10 millisecond intervals and the setting of the 10 millisecond memory cell 946 indicates to Common Control that a new sequence in the main program may be started.

The 10 millisecond memory cell 946 is reset upon the simultaneous occurrence of the Translator signals A7B3C15, D8 and an EP0 pulse on conductors 947, 948 and 960, respectively. The output conductors of the 10 millisecond memory cell 946 are connected to the set and reset terminals of the FFR memory cell 734 in Miscellaneous Memory 738.

*EP0 and CTR Gate Circuits*

A CTR pulse is required in the system whenever a decision order is stored in the Order Register and the conditions in Common Control require a transfer of the Flying Spot Store as opposed to an advance.

An EP0 pulse is required on the occurrence of non-decision orders and of decision orders not requiring a transfer.

Input signals which, in combination, selectively enable the CTR gate and the EP0 gate are obtained from the Order Memory over conductor group 936, from the Parallel Matcher Register 775 over conductor group 937, from the Flying Spot Store Translation Control 901 over conductor group 916, from the Flying Spot Store Control over 938 and from Miscellaneous Memory over 932. The generation of EP0 and CTR pulses is best understood from the Boolean expressions for these gates which follow:

$$\begin{aligned}C\cdot TF(&T01\cdot RBG\cdot R1BG+T11\cdot RBG\cdot R0BG\\&+T01\cdot RFF\cdot R1FF+T11\cdot RFF\cdot R0FF\\&+T01\cdot RS\cdot R1S+T11\cdot RS\cdot R0S\\&+T00\cdot T10\cdot T0M0\cdot T1M0\cdot TRL10+TRI21\\&+T1M1\cdot RS\cdot R0S\cdot RBG\cdot R1BG\\&+T1M1\cdot RS\cdot R1S\cdot RBG\cdot R0BG\\&+T1M1\cdot MFG\cdot FGMM+T0M1\cdot MFG\cdot FGM\\&+T0M1\cdot RS\cdot R1S\cdot RBG\cdot R1BG\\&+T0M1\cdot RS\cdot R0S\cdot RBG\cdot R0BG)=EP0\end{aligned}$$

$$\begin{aligned}C\cdot TF(&T01\cdot RBG\cdot R0BG+T11\cdot RBG\cdot R1BG\\&+T01\cdot RFF\cdot R0FF+T11\cdot RFF\cdot R1FF\\&+T01\cdot RS\cdot R0S+T11\cdot RS\cdot R1S\\&+T1M1\cdot RS\cdot R0S\cdot RBG\cdot R0BG\\&+T1M1\cdot RS\cdot R1S\cdot RBG\cdot R1BG\\&+T1M1\cdot MFG\cdot FGM+T0M1\cdot MFG\cdot FGMM\\&+T0M1\cdot RS\cdot R1S\cdot RBG\cdot R0BG\\&+T0M1\cdot RS\cdot R0S\cdot RBG\cdot R1BG)=CTR\end{aligned}$$

*Memory and Match Register*

The Memory and Match Register 743 comprises fourteen flip-flop memory cells which are employed in conjunction with the Parallel Matcher 742 or as a general purpose memory unit. Information is gated in parallel to the memory cells of 743 from the Bus Output circuit over conductor group 744. AND gate 745 is enabled by Order Translator command A3B3D12 over 746 and the EP0 pulse over 747.

Information stored in the Memory and Match Register 743 is selectively gated to the Parallel Matcher 742 over conductor group 748 or to the Bus Input circuit over conductor group 749.

The memory cells in the Memory and Match Register 743 are divided into an X and a Y group, each comprising seven cells. The information in either or both groups of cells may be gated to the Parallel Matcher 742 through AND gate 750. The choice as to whether the X or Y or both X and Y information is gated to the Parallel Matcher is determined by the Order Translator code entering over conductor group 751. The Order Translator command A0–1C16 is effective to gate the X portion of the stored information to the Parallel Matcher and the Order Translator command A0–1C17 is effective to gate the Y portion of the information stored to the Parallel Matcher. The Order Translator command A0–1C18 is effective to gate both the X and Y portions to the Parallel Matcher.

Information is gated from both groups of cells in the Memory and Match Register to the Bus Input circuit over conductor group 749 under a plurality of orders. The Order Translator commands A0–1C16D12, A0–1C17D12, A0–1C18D12, A3B3C12, A7B3C12D12, A7B3C17D12 and A7B3C18D12 are individually effective to enable gate 752 and thereby gate information to the Bus Input circuit.

*Parallel Matcher*

The Parallel Matcher 742 has provisions for comparing a seven or fourteen-bit word gated from the Memory and Match Register 743 with a word gated from the Bus Output circuit over conductor group 773 and for providing a mismatch signal to the FGM Register 775.

The Parallel Matcher is really a mismatch circuit and in all of its operations, whether a seven or fourteen-bit word is being compared, the full fourteen-bit word from the Bus output circuit is present on conductor group 773. If a seven-bit word such as the X or Y codes separately are to be compared, only the word to be compared is gated from the Memory and Match Register 743 to the Parallel Matcher over conductor group 748. Accordingly, gating the X word from the Memory and Match Register to the Parallel Matcher causes the Matcher to compare X words; gating the Y codes from the Memory and Match Register to the Parallel Matcher over conductor group 748 causes the Matcher to operate upon the Y word and gating of both the X and Y words from the Memory and Match Register 743 to the Parallel Matcher 742 causes a match to be made of both the X and Y words.

The FGM Register 775 maintains a record of the Parallel Matcher output condition and transmits this information to the EP0 and CTR gate circuits 930 and 931 over conductor group 937. This conductor group comprises two conductors labeled FGM and FGMM which indicate a match and a mismatch condition, respectively.

The FGM Register is set upon the occurrence of a mis-match and reset upon the occurrence of a CTR pulse over conductor 781. It is also reset upon the concurrent appearance of an EP0 pulse over conductor 755 and an MFG pulse over conductor 756.

*Ringing supply*

The ringing tone source 208 comprises a plurality of tone oscillators along with interrupting means.

There are six separate ringing tones which are employed to selectively signal the six possible parties on a single line. These tones are interrupted to provide a basic ringing cycle wherein the tone is on for two seconds and off for four seconds. The tones are chopped during the two-second on period of the ringing cycle so that during the two-second on period the tone is actually on for 50 milliseconds, then off for 50 milliseconds, and so forth. The ringing tones must be chopped as it is impossible for the Scanner to detect an answer during the time the ringing tone is on. Accordingly, there are means provided within the ringing tone source to indicate to Common Control whether the tone is on or off. This indication is transmitted as a binary signal in two-rail logic over conductor pair 230. This information is gated through AND gate 419 upon the occurrence of a program order in which the D code has a decimal value 8 and upon this order the FFR flip-flop 734 is set if ringing is in progress and reset if ringing is not in progress indicating that it is permissible to scan for an answer on a called line.

*Distribution Network*

The Distribution Network 301 is a six-stage, transformer input, end-marked transmission network comprising pluralities of gas tube crosspoints. Switching networks of this general type are known in the prior art. In such networks gas tubes, which are employed as the crosspoint devices of the network, are rendered selectively conductive to establish transmission paths between predetermined input and output terminals. Such a network is fully described in Patent 2,684,405, issued July 20, 1954, of E. Bruce and H. M. Straube, which patent also discloses supervisory and other circuits for recognition of the condition of subscribers' lines and trunks and for manually acomplishing the necessary switching actions.

Another switching network containing crosspoint devices is disclosed in B. J. Bjornson and E. Bruce application Serial No. 334,552, filed February 2, 1953, now Patent 2,876,285, issued March 3, 1959. As therein disclosed, the crosspoint devices are transistors which are connected to operate as bilateral devices. Here, also, supervisory and other circuits are disclosed for recognition of the condition of subscribers' lines and for manually accomplishing the necessary switching actions.

The particular switching Distribution Network employed in one embodiment of the applicants' invention with its attendant control circuitry is disclosed in K. S. Dunlap application Serial No. 672,651, filed July 18, 1957.

The Distribution Network 301, in conjunction with the Distribution Network Sequence Control 302 and the Distribution Network A and B Selectors 303 and 306, responds to switching orders from Common Control selectively to establish or release connections between predetermined input and output trunks on the Distribution Network.

There are three basic commands from Common Control to the Distribution Network, namely, Connect, Release A and Release B, which are orders to effect connection between predetermined input and output trunks on the switching network, release a connection to a predetermined trunk on the A side of the network, and release a connection to a predetermined trunk on the B side of the network.

In each instance, the trunk or trunks to be acted upon are identified by binary addresses to the A and B Selectors 303 and 306 over conductor groups 549 and 550, respectively. The Selector comprises a translator which converts an eleven-bit binary input code to a one out of N output code where N equals the number of trunks on one side of the Distribution Network. The output of the translator within the Selector is connected to the individual trunk terminals through a gas tube which is selectively fired when a new address is read into the Selector.

The commands indicating the action to be taken at the marked trunk terminals are transmitted from Common Control to the Distribution Network Sequence Control 302 wherein work operations to implement the command are initiated. Responses to Common Control are generated in the Distribution Network Sequence Control to indicate the receipt of a command and to indicate whether or not the command was successfully executed.

On a Connect order, addresses are sent from Common Control to both the A and B Selectors to indicate the trunks to be connected and a Connect order is transmitted to the Distribution Network Sequence Control. The Distribution Network Sequence Control gates these addresses through the Selector to mark the desired trunks, checks whether either or both of the trunks are busy and, if one or the other is busy, transmits this information to Common Control and terminates the Connect sequence and, if neither trunk is busy, effects a connection between the marked trunks, recycles the Sequence Control to await another order, and transmits Operation Successful and Operation Ended signals to the Common Control.

In the case of a Release order, the A or B trunk to be acted upon is marked by means of a new address from Common Control which is gated through the A or B Selector 303 or 306. The Release command is transmitted from Common Control to the Distribution Network Sequence Control over conductor group 565 to initiate the release sequence of operations.

In the release sequence, control signals are transmitted from the Sequence Control to the A or B Selectors, as the case may be, to gate in the new address from Common Control; to the release pulser 316 to deionize the gas tubes in the path to which the marked trunk is connected; to a timing circuit whose period is calculated to slightly exceed the time required to effect a release through the network; and to a Sequence Control Clear circuit which recycles the Sequence Control and prepares it for a subsequent order from Common Control.

The commands from Common Control to the Distribution Network Sequence Control over conductor group 565 are stored in memory cells within the Sequence Control. These memory cells are reset to the "0" state, in preparation for receipt of a new signal from Common Control, upon completion of the recycle sequence within the Distribution Network Sequence Control.

Four responses, as are appropriate to the situation, are transmitted from the Distribution Network Sequence Control to Common Control, namely, Check, Busy, Operation Successful, and Operation Ended.

The Check signal indicates that one of the command flip-flops, namely, Connect, Release A or Release B, has been set to its "1" state. The Busy signal indicates that one of the trunks to which a connection was attempted was busy. The Operation Successful signal indicates that the commanded sequence has been undertaken within the Network Sequence Control and that the mission apparently has been successfully completed, and the Operation Ended signal indicates that a sufficient period of time has elapsed between the receipt of a network command to ensure completion of that command.

The A and B Identifiers 304 and 305 are translating circuits which convert the one out of N code from the network terminals to a binary code for transmission to Common Control on conductor groups 325 and 328, respectively. The Identifier circuits have transistor flip-flop memory cells included in their output conductors to Common Control and these are selectively set in accordance with the input signal by commands from the Distribution Network Sequence Control 302 over conductor 326.

Figure 12:
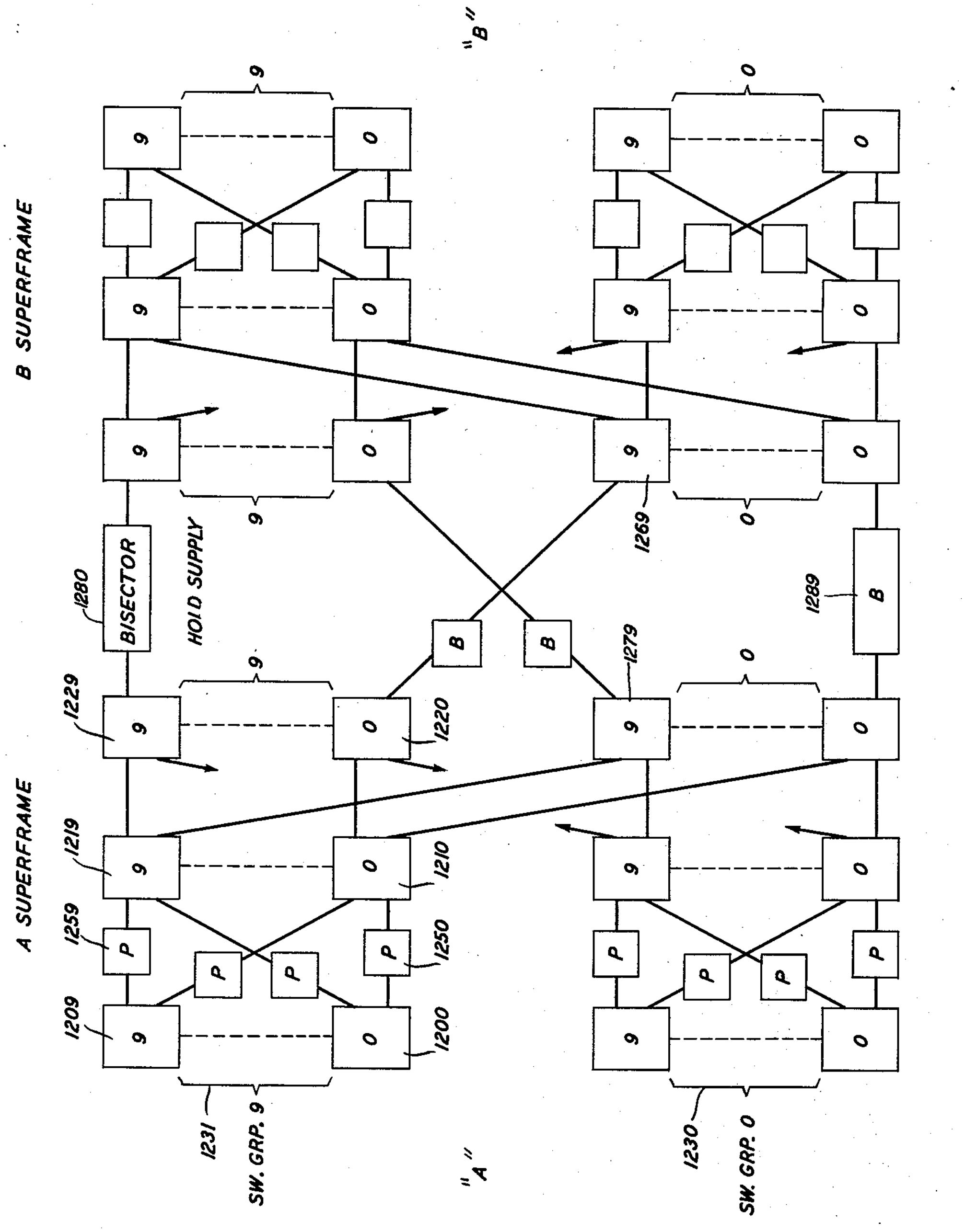
Fig. 12 is a schematic representation of the wiring pattern between the various stages of the distribution switching network employed herein.
Figure 13:
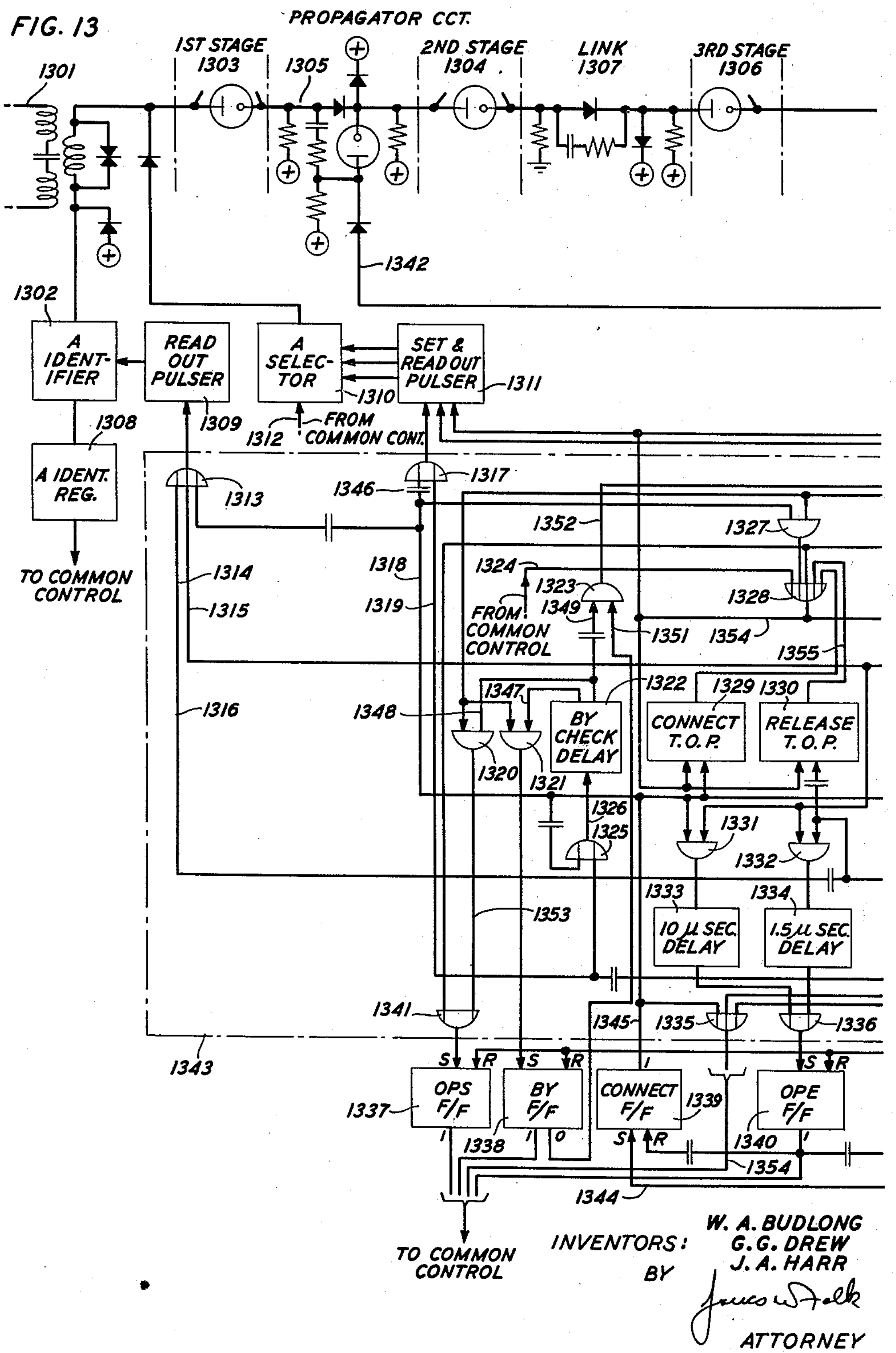
Figs. 13 and 14 are a detailed representation of a single transmission path through the distribution network and the attendant control circuitry.
Figure 14:
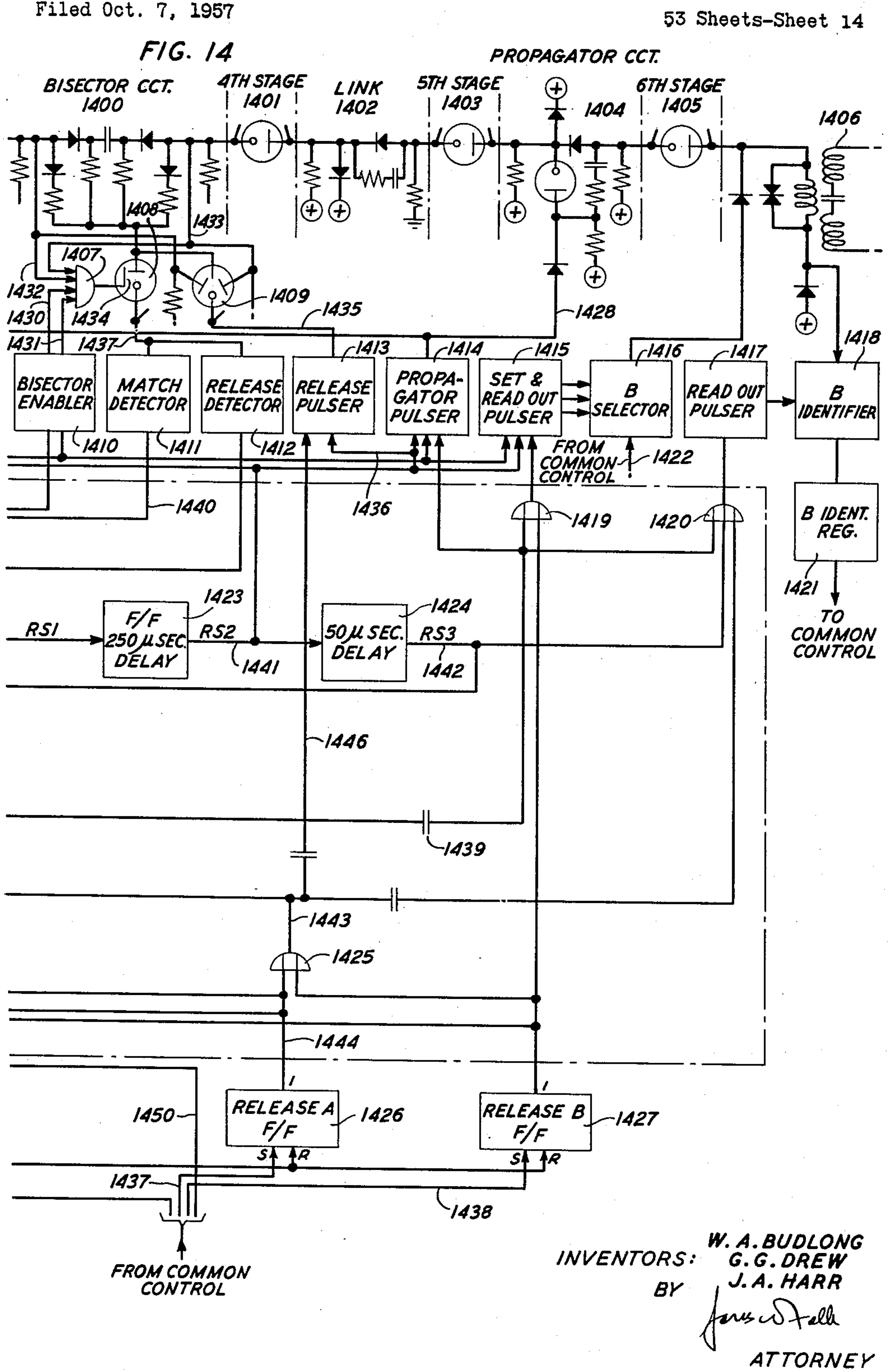

The Distribution Network 301 and its control and output circuitry is shown in greater detail in Figs. 12, 13 and 14.

The wiring pattern for a typical Distribution Network having 1000 trunks on the A side of the Network and 1000 trunks on the B side of the Network is shown in Fig. 12.

The basic building block of this Network is a gas tube matrix switch having ten input terminals and ten output terminals. In Fig. 12 the blocks labeled 1200, 1209, 1210, 1219, 1220 and 1229 are examples of such 10 by 10 switches. In these switches a connection is effected between any desired input terminal and any desired output terminal by selectively marking the input and output terminals with voltages adequate to break down the desired gas tube crosspoint. The gas tubes employed as the crosspoints in the Distribution Network may be of the types disclosed in M. A. Townsend Patent 2,804,565, August 27, 1957, A. D. White application Serial No. 583,671, filed May 9, 1956, now Patent 2,926,277, issued February 23, 1960, or Mueller-Stieritz application Serial No. 583,665, filed May 9, 1956, now Patent 2,899,588, issued August 11, 1959.

The boxes labeled "P" such as 1250 and 1259 are active propagator circuits which overcome the fan-out loss encountered in propagating the marking signal through the Network. Examples of active propagator circuits are disclosed in application Serial No. 426,338, filed April 29, 1954, of R. W. Ketchledge, now Patent 2,883,467, issued April 21, 1959, and application Serial No. 617,060, filed October 19, 1956, of K. S. Dunlap and J. P. Taylor, now Patent 2,859,282, issued November 4, 1958. In Fig. 12, the Network circuits to the left and right of the bisector circuits are identical. The bisector circuits advantageously are of the type disclosed in application Serial No. 617,131, filed October 19, 1956, of G. E. Jacoby and J. W. Rieke, now Patent 2,883,470, issued April 21, 1959. The switch groups such as 1230 and 1231 each comprise ten of the basic 10 by 10 switches and therefore have 100 input terminals and 100 output terminals.

The wiring scheme adopted, in one particular embodiment employed in the applicants' invention, between the first, second and third stages and between the fourth, fifth and sixth stages, is similar to the wiring pattern employed in a crossbar telephone office. For example, the ten output conductors of a single first-stage switch such as 1200 are connected to the ten second-stages of the same switch group with the output terminals of the first-stage switch connected individually to each of the ten second-stage switches. For example, the zero level output terminal of the first-stage switch 1200 is connected to the zero level input terminal of the second stage switch 1210 and the ninth output terminal of switch 1200 is connected to the zero level input terminal of switch 1219. Similarly, output terminals on levels 1 through 8 of switch 1200 are connected to the zero level input terminals of the second-stage switches in switch group 9 intermediate to switches 1210 and 1219. The wiring pattern between the switches of stage 6 and stage 5 is identical to that between stage 1 and stage 2.

The second stage of switches comprises ten switch groups numbered 0 through 9 as in the first stage each switch group has 100 input terminals and 100 output terminals. Accordingly, the second stage has 1000 output terminals which must be connected to the 1000 input terminals of the third-stage switches. In Fig. 12 the ten output terminals of switch 1219, which is switch 9 of switch group 9, are connected to the ninth-level input terminals in each of the switches labeled 9 in the third stage. For example, the ninth-level output terminal of switch 1219 is connected to the ninth-level input terminal of switch 1229 and the zero-level terminal of switch 1219 is connected to the ninth-level input terminal of switch 1279. The levels on switch 1219 intermediate to the zero and ninth level are connected to the ninth-level trunks of the third-stage switches labeled 9 in such groups intermediate to the zero and 9 switch group.

An identical wiring pattern is employed between the fifth stage and the fourth stage.

To effect a connection through the Distribution Network, significant marking potentials are applied to trunks terminating on the first and sixth stages and these marking signals are propagated from the A and B sides toward the bisectors such as 1280 and 1289. There are 1000 trunks on the center sides of both the third and fourth crosspoint stages. However, in a distribution network having only 1000 input and 1000 output terminals, not all 1000 terminals at the center of the network need be connected from the third to the fourth stage to ensure adequate service.

Figure 3:
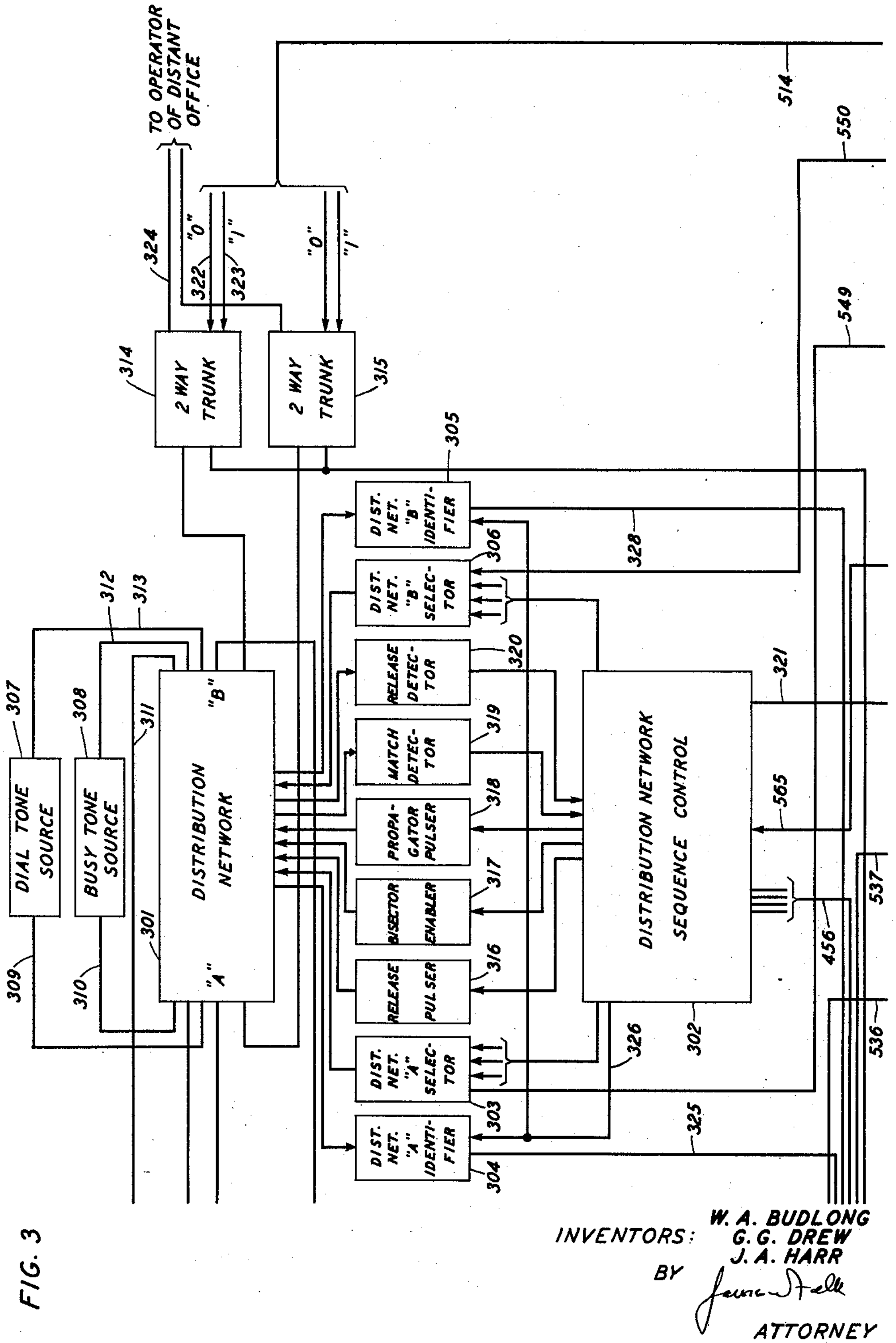

A three-stage distribution network having 1000 input terminals and 1000 output terminals is termed a superframe. The six-stage network in Fig. 12 comprises two superframes, namely A and B. When connected to concentrator networks as shown in Figs. 2 and 3, such a six-stage network will generally adequately serve 4500 subscribers.

In a large electronic central office as many as ten six-stage networks may be connected together and therefore a large distribution network may serve as many as 45,000 customers.

The bisector wiring pattern adopted for this specific embodiment of our invention provides adequate service whenever a single 1000 by 1000 terminal distribution network is employed and permits an orderly growth to a 10,000 by 10,000 network with a minimum amount of rearrangement.

The first such superframe is labeled 0 and subsequent superframes are labeled 1 through 9. Where a single superframe is required, 400 to 500 bisectors will be employed to provide adequate service. The bisector wiring pattern can best be understood by way of example.

The 1000 point network of Fig. 12 is the 0 superframe and in this arrangement the zero-level trunks of each of the switches in switch groups 0 through 9 of the third stage are connected through bisectors to zero-level trunks in each of the switch groups 0 through 9 in the fourth stage. Therefore 100 bisectors are employed to connect zero-level trunks of the hundred third-stage switches in switch groups 0 through 9 to the hundred zero-level trunks in the hundred fourth-stage switches in switch groups 0 through 9. Similarly, to provide the additional 400 bisectors required for adequate service, the sixth, seventh, eighth and ninth-level trunks of each of the third-stage switches in switch groups 0 through 9 are connected to the corresponding level trunks in the fourth-stage switches in switch groups 0 through 9.

When the second superframe is added, the 1-level trunks of each of the 100 third-stage switches in switch groups 0 through 9 of superframe 0 are connected to the zero-level trunks of the 100 fourth-stage switches in superframe 1 and the zero-level trunks of the 100 third-stage switches of superframe 1 are connected to the 100 first-level trunks of the fourth-stage switches in superframe 0.

A unique bisector wiring pattern has been adopted to minimize blocking through the network. As indicated, in a fully equipped distribution network comprising ten six-stage networks the levels of the third-stage switch output terminals are connected to similarly numbered superframes. In addition, the switch from which an output connection is taken determines the switch group to which that terminal will be connected and the switch group in which that output terminal is located determines which switch of the fourth stage it will be connected to. For example, in the zero pair of superframes of Fig. 12, the zero-level trunk of zero switch 1220 in switch group 9 connects to the zero-level trunk of switch 9 in switch group 0. Further, the zero-level trunk of switch 9 in switch group 9 of the A superframe connects to the zero-level trunk of switch 9 in switch group 9 of the B superframe.

A one-line diagram of a six-stage gas tube switching network such as is employed in the Distribution Network of 301 and the attendant control and output circuitry is shown in Figs. 13 and 14. The trunk terminations on the A and B sides of the Network are balanced transmission paths and entry is through transformers such as 1301 and 1406 which convert the balanced transmission path to an unbalanced path for use within the Network. The first-stage gas tube 1303 and the second-stage gas tube 1304 are connected through an active propagator circuit 1305 and the second-stage tube 1304 and the third-stage tube 1306 are connected through a passive propagator or link circuit 1307. Similarly the sixth-stage tube 1405 is connected to the fifth-stage tube 1403 through an active propagator 1404 and the fifth-stage 1403 is connected to the fourth-stage 1401 through a passive propagator or link circuit 1402.

An example of a passive type propagator circuit is disclosed in R. W. Ketchledge application Serial No. 617,189, filed October 19, 1956, now Patent 2,859,284, issued November 4, 1958. The principal distinctions between the active and passive propagators are that the active propagator contains active elements such as gaseous triodes; in order to activate the gaseous propagator tube, it is necessary to apply an enabling pulse. The passive propagator circuits contain only passive elements such as resistors, capacitors, and semiconductor diodes, and do not require the application of an enabling pulse but are controlled solely by the receipt of a marking pulse from the preceding stage and they, in response to this marking pulse, deliver a new marking pulse to the subsequent stage of the network.

In the Distribution Network the marking of trunk terminals with a significant potential is effective to ionize a plurality of gas tubes between the marked terminal and the center of the Network. In a fully equipped idle network, i.e., a distribution network having six stages and 10,000 input 10,000 output trunks, a mark signal on one trunk terminal will ionize ten tubes in the first stage, 100 tubes in the second stage and 1000 tubes in the third stage. Although the mark current flowing in any particular tube is low, the sum of the 1110 mark currents adds up to an appreciable amount. The active propagators such as 1305 and 1404 are inserted between the first and second stages and between the fifth and sixth stages to overcome the fan-out loss encountered. The active propagator circuit is a regenerative amplifier which, when energized by the simultaneous ionization of a first or sixth-stage gas tube and a propagator pulse on conductor 1342 or 1428, will provide marking signals to the second and third-stage tubes when a mark is applied to an A side trunk or to the fifth and fourth-stage tubes in the case of a mark on a B trunk.

Bisector circuits between the third and fourth stages provide the final link between two marked terminals on the A and B sides of the Distribution Network. The bisector circuit provides two switching functions, namely, completing a connection between a trunk on the A side of the Network and a trunk on the B side of the Network and releasing a connection between a trunk on the A side of the Network and a trunk on the B side of the Network. In addition, indications are transmitted from the bisector circuit to Match and Release detector circuitry to indicate the occurrence of a connection between an A and B trunk and the release of a connection of an A and B trunk.

The bisector enabler 1410 is a free-running generator which operates at approximately 16 kc. The output of the bisector enabler is over conductors such as 1430 and 1431 which in combination are discrete to a particular bisector circuit. Therefore, the simultaneous presence of signals on 1430 and 1431 specifies the bisector circuit being enabled. In Fig. 13 a mark on the A side trunk, as supplied by the A selector 1310, will provide a signal at the bisector on conductor 1432 and a mark on the B trunk as supplied by the B selector 1422 will provide a mark at the bisector on conductor 1433.

The AND gate 1407 is enabled upon the simultaneous occurrence of marking potentials on conductors 1432 and 1433 and upon address conductors 1430 and 1431.

The output conductor 1434 of AND gate 1407 is connected to the control grid of latch gas tube 1408 and when conductor 1434 is energized, tube 1408 is shifted into the conducting state.

The release of a connection between an A and a B trunk is effected by simultaneously marking the A or B trunk requesting the release and pulsing the release tube 1409 over conductor 1435. Under these conditions the release tube 1409 will ionize and steal current from latch tube 1408 which consequently will be deionized. Subsequently the release tube 1409 is deionized by signal to the release pulser 1413 over conductor 1436.

The completion of a transmission path through a bisector circuit will be accompanied by an increase in hold current through conductor 1437 and similarly a release of a connection through a bisector circuit will be accompanied by a reduction in the hold current in conductor 1437. Accordingly, the Match Detector 1411 and the Release Detector 1412 respectively recognize an increase and a decrease in hold current.

The A Identifier 1302 and the B Identifier 1418 are translating circuits which accept an input from one of the 1000 trunks on the A and B sides of the Distribution Network, respectively, and provides an eleven-bit binary address as an output signal. The output conductors of the translator portion of the Identifier are connected to Common Control through transistor flip-flops in the A and B Identifier gates 1308 and 1421. Pulses from the read-out pulsers 1309 and 1417 are effective to read information from the A and B Identifiers 1302 and 1418 into the Identifier Registers 1308 and 1421, respectively.

The A and B selectors 1310 and 1416 accept an eleven-bit binary address from Common Control over conductor groups 1312 and 1422, respectively, and translate this information to a one out of 1000 code to select and mark a desired A or B trunk. The eleven-bit binary address sent from Common Control to one of the selector circuits to mark a particular trunk terminal is identical to the eleven-bit binary address which is sent from the Distribution Network through the Identifiers to indicate action at the same particular trunk terminal.

Addresses from Common Control are applied as D.-C. voltages to the conductors of conductor groups 1312 and 1422. The selectors comprise magnetic core circuitry which is connected directly to the binary address conductors in groups 1312 and 1422. Gas tubes in the output conductors of the A and B selectors 1310 and 1416 must be selectively fired before marking potential is passed to a trunk terminal. The selector output tubes are energized through the action of sequential pulsing circuits 1311 and 1415, labeled "Set and Read-out Pulser."

The Distribution Network Sequence Control labeled 302 in Fig. 3 is shown in functional form in Figs. 13 and 14. The Sequence Control circuitry included in the block labeled 1343 accepts network order information from the Common Control and generates answers to Common Control. As previously indicated, there are three possible commands to the Distribution Network, namely, "Connect," "Release A" and "Release B." These signals are transmitted from Common Control to the memory cells 1339, 1426 and 1427, respectively, over conductors 1344, 1437 and 1438. The operation of the Network Sequence Control can best be understood by the steps involved in implementing each of the above network commands.

A "Connect" command from Common Control over conductor 1344 sets the connect flip-flop 1339 to its "1" state to provide a signal on the Connect Bus 1345. The end product of a "Connect" signal is the enabling of a bisector circuit to selectively provide a transmission path between a predetermined trunk on the A side of the network and a predetermined trunk on the B side of the network.

It might be well at this point to note that within the Sequence Control circuit A.-C. effects are employed to accomplish certain results while D.-C. signals are employed in other parts of the Sequence circuit. As a matter of convenience, a capacitor has been included in any conductor which is connected to a device which responds to an A.-C. signal. This is merely a schematic representation of the circuitry and in the actual circuit an A.-C. amplifier or other D.-C. decoupling arrangements may be employed.

The first operation in the connect sequence is the reading of the A and B addresses on conductor groups 1312 and 1422 into the A and B Selectors 1310 and 1416, respectively, and to energize the gas tube in the particular A and B trunks to be marked. A pulse on the Connect Bus 1345 is connected to the start terminal of the "Set and Read-out" pulser 1311 through capacitor 1346 and OR gate 1317. Similarly, a pulse is transmitted to the start terminal of the "Set and Read-out" pulser 1415 through capacitor 1439 and OR gate 1419.

A pulse on the start lead of "Set and Read-out" pulsers 1311 and 1415 initiates operation of sequence circuits which first resets the cores in the Selector translator at a slow rate. Resetting of the cores at a slow rate does not fire the output gas tubes to pass a marking potential from the Selector to the Distribution Network. A short period of time after the cores in the translator have been reset, a set pulse from the Set and Read-out Pulser sets the cores in the Selector translator in accordance with the code found on the input conductors of groups 1312 and 1422. Subsequent fast Read-out of the cores ionizes the gas tubes in the particular conductors discrete to the A and B trunks to be marked. Therefore a pulse on the start terminal of a Set and Read-out pulser such as 1311 and 1415 resets all cores in the Selector translator to 0, sets these cores in accordance with the code on the address conductors from Common Control and a subsequent Read-out pulse ionizes the output gas tubes in accordance with the address codes and places a significant marking potential on the trunk terminals represented by those codes.

A pulse from the output of the Connect flip-flop 1339 on Connect Bus 1345 is also one of two possible input signals to the set terminal of the Busy Check Delay circuit 1322 which is a monostable flip-flop circuit. A set signal to the Busy Check Delay circuit 1322 energizes the "1" state output terminal of this circuit and deenergizes the "0" state output terminals. This circuit restores to its reset or "0" state 250 microseconds after the set pulse has been removed. The 250 microsecond period is adequate to ensure the completion of a busy test. When the Busy Check Delay flip-flop is in its "1" state, the Busy gate 1321 is enabled over conductor 1347 and if a signal is obtained from the Match Detector 1411 over conductor 1440, the Busy flip-flop 1338 will be set to its "1" state.

A match condition will be detected by the Match Detector 1411 by an increase in the hold current in conductor 1437 if a busy A or B trunk is marked or if a connection is effected between an A trunk and a B trunk. If a busy trunk is marked, the Match Detector will recognize this condition and transmit a signal over conductor 1440 to the Busy gate 1321. If the match condition occurs within the first 250 microseconds after the occurrence of the pulse on the Connect Bus, the Busy Check Delay circuit will be in its "1" state and the Busy gate 1321 will be fully enabled and the Busy flip-flop 1338 will be set to its "1" state. If the match is detected more than 250 microseconds after the occurrence of the input signal to the Busy Check Delay circuit, this circuit will have restored to its "0" state to inhibit the Busy gate 1321 and to enable the Operation Successful gate 1320. The simultaneous occurrence of an output signal from the Match Detector on 1440 and a signal on 1348 indicating that the Busy Check Delay circuit is in its "0" state will enable the Operation Successful gate 1320 and consequently set the Operation Successful flip-flop 1337.

Also when the Busy Check Delay flip-flop restores to its "0" state, a pulse will be sent to the bisector enabler gate 1323 over conductor 1349. If the Busy flip-flop has remained in its "0" state, an enabling signal for the bisector enabler gate 1323 will be present on conductor 1351 and a start signal will be transmitted to the bisector enabler 1410 over conductor 1352. As previously stated, the bisector enabler is a free-running stepping circuit which sequentially pulses the AND gates such as 1407 of the bisector circuits and upon finding an idle bisector having marked terminals entering from both the A and B sides of the network will effect firing of the bisector latch tube to effect a connection between a predetermined particular A trunk terminal and a predetermined B trunk terminal. If a connection is established between an A trunk terminal and a B trunk terminal, the increase in hold current in conductor 1437 will be recognized by the Match Detector 1411 and a signal will be transmitted to the Operation Successful gate 1320 over conductor 1440. After a sufficient time has passed for the performance of a busy check, the Busy Check Delay circuit 1322 will return to its "0" state and the OPS gate will be enabled by a signal over conductor 1348. Consequently, a signal will be transmitted over conductor 1353 to set the Operation Successful flip-flop to indicate to Common Control that the command has been successfully acted upon.

Having completed the performance of a Connect order, the Distribution Network Sequence Control is cleared in preparation for receipt of a subsequent order. A clear sequence is originated by any of several ways including the simultaneous occurrence of signals on Connect Bus 1345 and conductor 1440 indicating that the Connect flip-flop is in its "1" state and that the Match Detector 1411 has found either a busy condition or that a connection has been effected through the network. Signals on Bus 1345 and conductor 1440 will enable AND gate 1327 and OR gate 1328 to generate a pulse on RS1 Bus 1354.

The RS1 pulse on conductor 1354 is transmitted to the bisector enabler 1410 to stop its scanning of bisectors and to the Set and Read-out pulses 1311 and 1415 to remove the voltages from the ionized output tubes in the A and B Selectors 1310 and 1416. The marking potential is therefore removed from the previously selected A and B trunk terminals. The RS1 pulse is also transmitted to the propagator pulsers 1414 to remove the voltages from the ionized output gas tubes to halt propagator pulser output signals. The RS1 pulse is also transmitted to the 250 microsecond delay circuit 1423. The operation of the delay circuit 1423 is such that an RS2 pulse is generated on Bus 1441 250 microseconds after the receipt of an input RS1 pulse. The RS2 pulse is transmitted to a 50-microsecond delay circuit 1424, to the Set and Read-out pulsers 1311 and 1415, to the propagator pulsers 1414 and to the Release pulsers 1413. The RS2 signal to the Set and Read-out pulsers and the propagator pulsers restores the voltage to the output gas tubes of these circuits in preparation for a subsequent order. The RS2 signal to the Release pulser over the conductor 1436 removes the voltage from the Release tube 1409 and effects deionization thereof.

The output of the 50-microsecond delay circuit 1424 is passed to the Identifier Read-out pulsers 1302 and 1418 to transmit the information in the A and B Identifier cores to the A and B Identifier Registers 1308 and 1421, respectively, and to generate an input signal to the Operation Ended flip-flop 1340. The RS3 pulse appears on conductor 1442 as an enabling signal to the Connect and Release AND gates 1331 and 1332. These gates are selectively enabled upon simultaneous occurrence of a pulse on conductor 1442 and a pulse on Bus 1345 or 1443, respectively. In the case of a Connect order, the Connect AND gate 1331 is enabled and its output signal is transmitted through a 10-microsecond delay circuit 1333. In the case of a Release order, the Release AND gate 1332 is enabled and its output is transmitted through the 1.5-millisecond delay circuit 1334. The output conductors of the delay circuits 1333 and 1334 are connected through OR gate 1336 to the set conductor of the Operation Ended flip-flop 1340 and signals from these delay circuits are individually effective to set the flip-flop 1340. In the case of a circuit release, the delay in setting the Operation Ended flip-flop 1340 is much greater than in the case of a Connect order as the time required to deionize the Release gas tube such as 1409 is much greater than the time required to establish a connection through the network.

In summary, upon the receipt of a Connect order from Common Control, as indicated by the setting of the Connect flip-flop 1339 to its "1" state, the Distribution Network Sequence Control will mark trunks on the A and B sides of the Distribution Network in accordance with addresses from Common Control on conductor groups 1312 and 1422; will test the marked terminals for a busy condition and, if either terminal is busy, will set the Busy flip-flop 1338 to provide an indication to Common Control; will start the bisector enabler 1410 to scan bisectors and will establish a connection between the marked trunks if neither trunk is busy and an idle bisector is available; if the command is successfully executed, will set the Operation Successful flip-flop 1337 and, regardless of the success of the operation, will set the Operation Ended flip-flop 1340 to indicate to Common Control that sufficient time has elapsed to complete the received orders; and will initiate a clear cycle within the Network Control to remove marking potentials from the previously selected A and B trunks and to halt the action of the propagator pulsers and bisector enabler.

The Release A and Release B signals each promotes similar action within the Distribution Network Sequence Control and are initiated by signals from Common Control over conductors 1437 and 1438 to set the Release A and Release B flip-flops 1426 and 1427, respectively. Only the operation with regard to a Release command will be discussed at this point.

A signal from Common Control on conductor 1437 will set the Release A flip-flop 1426 to its "1" state and will provide an output signal on conductor 1444. A Release A command is executed by selectively marking an A trunk terminal in accordance with an address received from Common Control over conductor group 1312 and by starting the Release pulser 1413. The combined marking of a trunk terminal and the action of the Release pulser 1413 will cause the Release tube 1409 to ionize. Ionization of Release tube 1409 will draw current away from latch tube 1408 and will effect deionization thereof. Subsequently, hold potentials are removed from the Release tube 1409 and the connection through the network is extinguished.

An output signal from the Release A flip-flop 1426 on conductor 1444 will be passed to the Set and Read-out pulser 1311 through gate 1317 to clear the prior address in the A Selector and to read the address of the trunk into the Selector. The output signal of flip-flop 1426 is also passed to the Release Bus 1443 through the Release gate 1425; a pulse on Release Bus 1443 starts the Release pulser 1413 by a signal on the start conductor 1446; energizes the Identifier Read-out pulsers 1309 and 1417; sets the Release time-out pulser 1330; and enables Release gate 1332.

The start signal to the Release pulser 1413 and a mark on the trunk to be released effect ionization of the Release gas tube 1409 to extinguish latch tube 1408. Simultaneously the Release time-out pulser 1330 will start running and at the end of a period of time calculated to ensure deionization of the selected latch tube, the Release time-out pulser 1330 will provide a signal to the clear OR gate 1328 over conductor 1355. This input signal through the clear OR gate will initiate the previously described clear cycle and, as previously stated, 250 microseconds thereafter the RS2 pulse will be transmitted to the Release pulser to stop its action and to thereby deionize the Release tube 1409.

As explained in the discussion of the Connect order, the RS3 pulse which occurs 300 microseconds after the RS1 pulse will, in conjunction with a signal from the output of the Release OR gate 1425, enable Release AND gate 1332 to activate the 1.5-millisecond delay circuit 1334. Accordingly, 1.5-milliseconds after the receipt of the RS3 pulse the Operation Ended flip-flop 1340 will be set.

Upon receipt of a network command from Common Control and the setting of one of the flip-flops 1339, 1426 or 1427, a check signal will be generated for transmission to Common Control to indicate that a network order has been received. The check signal is transmitted as an output of OR gate 1335 which is enabled whenever one of the three command flip-flops 1339, 1426 and 1427 is in its "1" state. The check signal is transmitted to Common Control over conductor 1354 and, with reference to Figs. 3 and 5, the check signal on conductor 315 is effective to reset the flip-flops in the Distribution Network Control Register 538 to their "0" state. Since only the set conductors of the command flip-flops 1339, 1426 and 1427 are connected to Common Control, the action of the check lead within Common Control is effective to remove the potentials from the set conductors of the Command flip-flops.

The Response flip-flops 1337, 1338 and 1340 are subsequently reset to their "0" state upon the occurrence of a Reset signal from Common Control on conductor 1450.

The command memory cells 1339, 1426 and 1427 are reset upon the occurrence of an Operation Ended signal.

*Concentrator Network*

The Line Concentrator 203 and the Ringing Concentrator are both single stage end marked transmission networks comprising pluralities of gas tube crosspoints. The crosspoints may be identical to those employed in the previously described Distribution Network, as discussed above, and may thus also be of the type set forth in the above mentioned Townsend patent and White and Mueller-Stieritz application.

In the Line Concentrator, there are thirty lines concentrated to ten trunks with five trunks terminating on the A side of the Distribution Network and five trunks terminating on the B side of the Distribution Network. Each line has access to three A side and three B side trunks.

Figure 15:
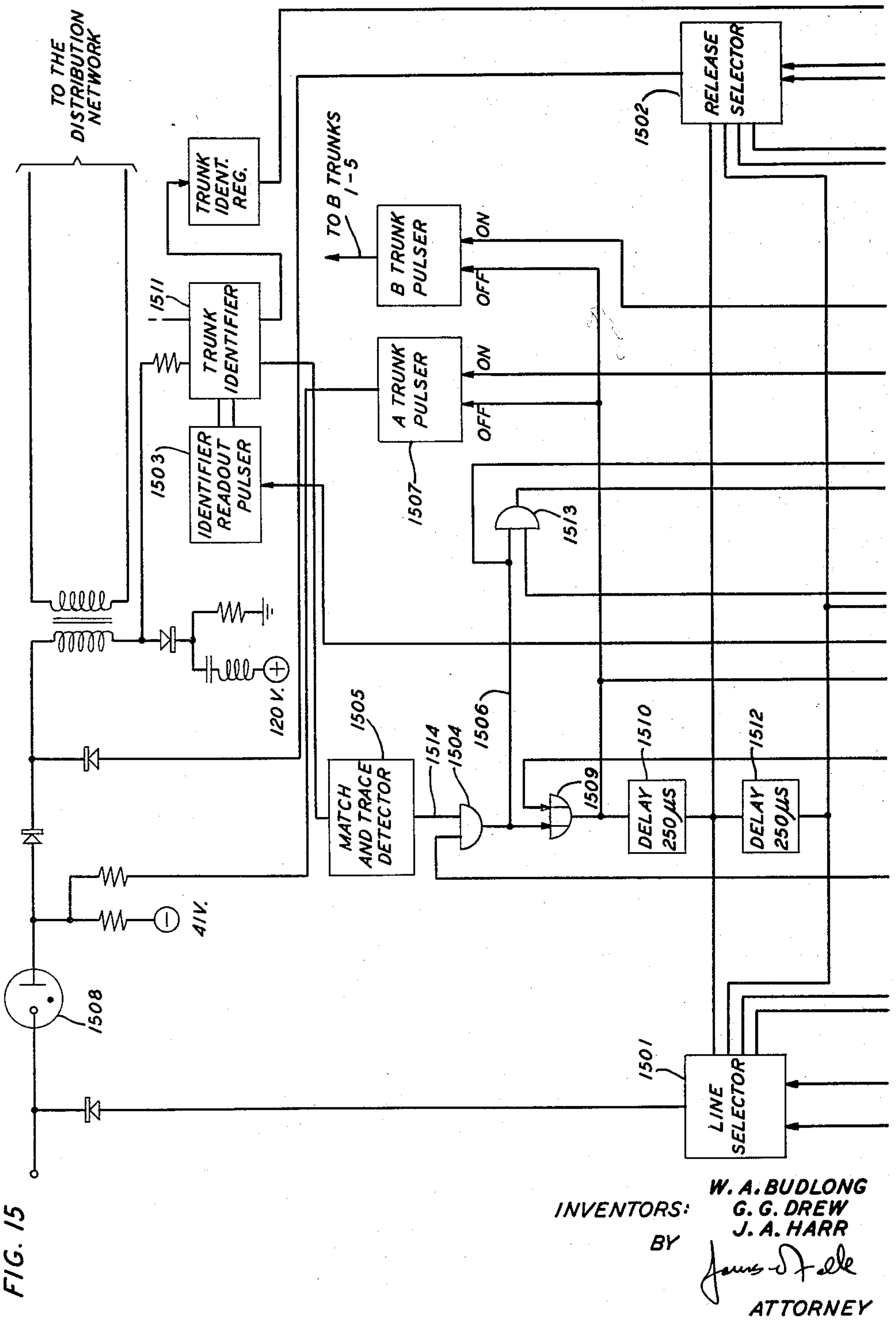
Figs. 15 and 16 are a detailed representation of a single transmission path through a concentrator switch and the attendant control circuitry.

The Concentrator Network as shown in Fig. 15 has an unbalanced input transmission circuit and a balanced output transmission circuit. The transformer of the line circuit such as 246 shown in Fig. 2 is employed to convert the balanced telephone line to an unbalanced transmission path as is employed within the concentrator.

There are five basic commands from Common Control to the Concentrator Network, namely, connect A, connect B, trace, connect and override busy and release, which are respectively orders to connect a marked line to an idle trunk to the A or B side of the Distribution Network, store the address of the trunk connected to the marked line in the trunk identifier register, make a connection to the marked line without regard for its supervisory condition, and release the connection to the marked trunk.

In each instance, the line or trunk to be acted upon is identified by binary addresses to the line selector 1501 or to the release selector 1502. The line address comprises twelve bits. The first seven bits identify the particular concentrator switch and the last five bits identify one out of thirty lines on that switch. The trunk address comprises eleven bits. Again, the first seven bits identify the particular concentrator switch and the remaining four bits identify the particular trunk.

The line and release selectors each comprise a translator which converts the twelve or eleven bit binary address to a one out of N code. The output of the translator, which is within the selector, is connected to the line or trunk through a gas tube which is selectively fired when an address is read into the selector. Accordingly, a line or trunk is marked when the gas tube assigned thereto is fired.

Figure 16:
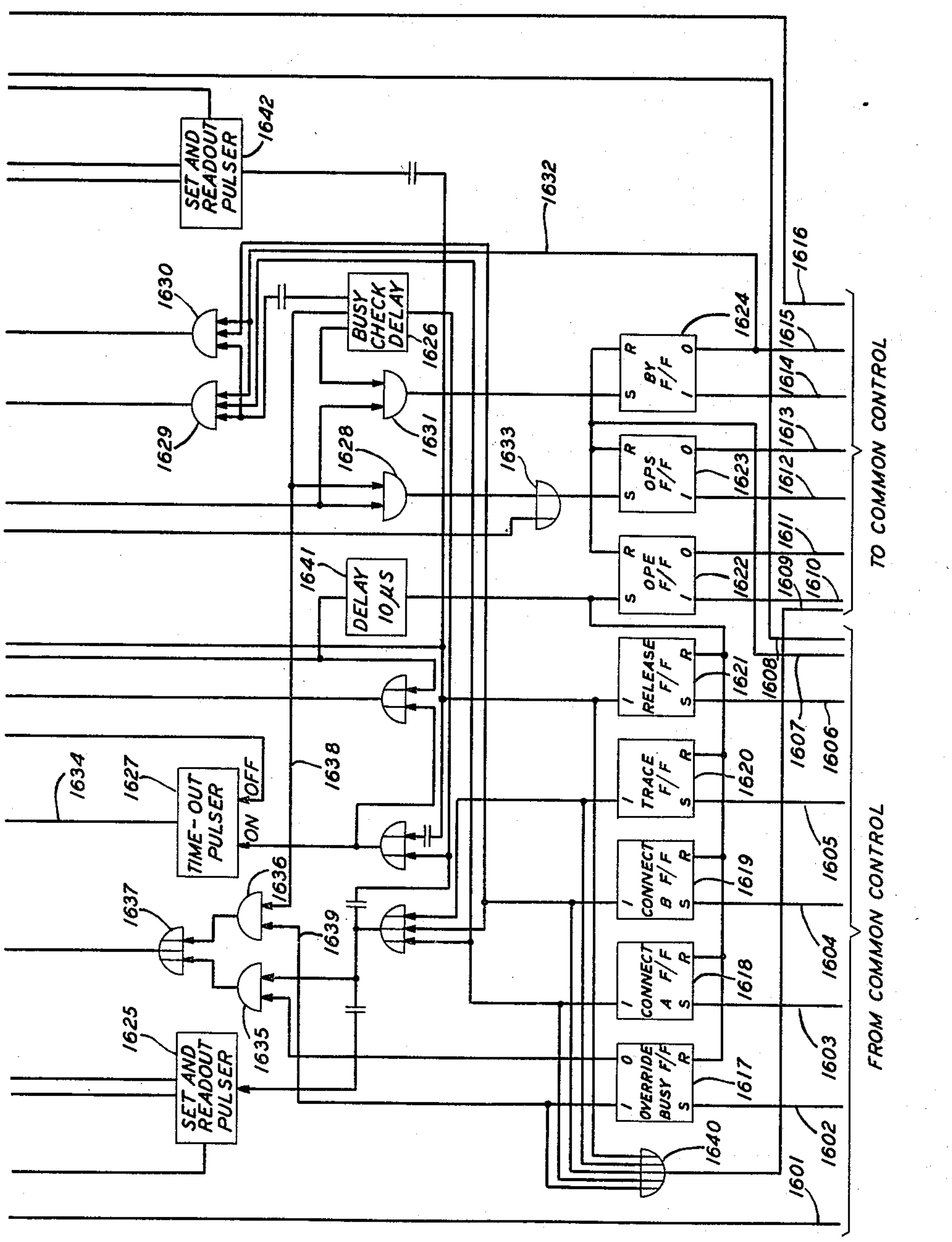

The commands indicating the action to be taken at the marked trunk terminals are transmitted from common control to the Concentrator Network sequence control 202 wherein work operations to implement the command are initiated. Responses to common control are generated in the Distribution Network sequence control to indicate the receipt of a command and to indicate whether or not the command was successfully executed. The concentrator sequence control is shown in considerable detail in Figs. 15 and 16.

*Connect sequence*

A connect order from common control is preceded by a line selector address being transmitted over conductor group 1601. A connect A or connect B order sets flip-flop 1618 or 1619, respectively, to its "1" state which, in turn, initiates the connect sequence within the concentrator sequence control. The setting of one of the connect flip-flops 1618 or 1619 initiates the following action:

(*a*) Energizes the set and Read-out pulser 1625 to clear the line selector and then set the line selector output in accordance with the address received on conductor group 1601. This marks the addressed line terminal;

(*b*) Sets the Busy Check Delay Circuit 1626 to its "1" state;

(*c*) Energizes the identifier Read-out pulser 1503 to clear the trunk identifier output;

(*d*) Energizes the time-out pulser 1627;

(*e*) Enables AND gate 1504 to permit a Clear Sequence; and (*f*) Transmits a check signal to common control over conductor 1609.

The match and trace detector 1505 is energized whenever a connection exists between a marked line and one of the trunks. The Busy Check Delay Circuit remains in its "1" state for 250 microseconds after it is energized, at which time it returns to its "0" state to enable the operations successful AND gate 1628 and the connect AND gates 1629 and 1630. While the Busy Check Delay Circuit is in its "1" state, the busy AND gate 1631 is energized. If a marked line is busy, the match and trace detector 1505 will be energized during the 250 microsecond period that the Busy Check Delay Circuit is in its "1" state, and the output of the match and trace detector will be transmitted through AND gate 1504, conductor 1506, and the busy AND gate 1631 to set the busy flip-flop 1624 to its "1" state. Accordingly, a busy indication will be transmitted to common control over conductor 1614.

If the marked line was not previously connected to a trunk through the Concentrator Network, action within the sequence control will be undertaken to connect the marked line to an idle trunk on the desired side of the network. Accordingly, the connect A or connect B AND gate 1629 or 1630, as is appropriate, will be energized when the Busy Check Delay Circuit returns to its "0" state as these gates are enabled by signals on conductor 1632, indicating that the busy flip-flop is in its "0" state and the appropriate signal from the connect A or connect B flip-flop. The output of the connect A, AND gate 1629, turns on the A trunk pulser 1507, which proceeds to sequentially scan the trunks in the A group, and upon the occurrence of a mark on an idle trunk to which the marked line has access, a gas tube such as 1508 will break down to provide a transmission path through the network.

Upon completion of a transmission path, the match and trace detector 1505 will provide an output signal on conductor 1514 to enable AND gate 1504. The output signal from AND gate 1504 energizes OR gate 1509, which serves to:

(*a*) Turn off the A and B trunk pulsers;

(*b*) Reset the time-out pulser 1627; and (*c*) Enable delay circuit 1510.

The trunk pulser and the time-out pulser are immediately turned off upon the occurrence of a connection to prevent an attempt at other connections and to prevent a time out occurring. Other action, however, must be slightly delayed to permit proper setting of the trunk identifier circuit 1511. Accordingly, the line and release selectors remain energized for 250 microseconds after the trunk pulsers and the time-out pulsers are restored to normal, a signal occurring at the output of delay circuit 1510, 250 microseconds after it is energized. This output signal serves to deionize the output tubes on the line and release selector, and also energizes a second 250 microsecond circuit, 1512, whose output serves to restore the voltage to the output gas tubes of the line and release selector.

Successful completion of a connect order is indicated by receipt of a match and trace detector output signal on conductor 1506 while the Busy Check Delay Circuit 1626 is in its "0" state. Under these conditions, the operation successful AND gate 1628 and OR gate 1633 are energized to set the operation successful flip-flop 1623 to its "1" state.

If all trunks to which the marked line has access are busy, a connection will not be completed and the time-out pulser 1627 will reach the end of its cycle, and an output signal will occur on conductor 1634. A signal on 1634 will energize OR gate 1509 to turn off the trunk pulsers and the time-out pulser and to initiate the clear sequence for the line and release selectors 1501 and 1502, and as in the case of a clear cycle initiated by successful completion of a connection, the 10 microsecond delay circuit 1641 will be energized when the voltages are returned to the selector gas tubes and the operation end flip-flop 1622 will be set to its "1" state 10 microseconds thereafter.

In summary, a connect order through the Concentrator Network is implemented from Common Control by means of a line address over conductor group 1601 and a connect A or connect B order over conductor 1603 or 1604. In return, the Concentrator Sequence Control transmits a check signal to Common Control over 1609 to indicate receipt of a command, transmits a busy, operation successful or operation ended signal, as is appropriate, and if a connection is established, provides the trunk identity over conductor group 1616.

*Override busy*

In some instances, it is desirable to connect two trunks to the same line, for instance, in the case of an emergency an operator may wish to interrupt a call to deliver a message. In these cases, the operator first attempts a connection in the normal manner and upon finding the called line in the busy condition, proceeds with simultaneous connect and override busy commands. Accordingly, one of the connect flip-flops 1618 or 1619 is energized as required, and the override busy flip-flop 1617 is set to its "1" state by a signal on conductor 1602.

The Busy Check Delay Circuit 1626 is set to its "1" state, the time-out pulser 1627 is turned on, and the set and read-out pulser 1625 is enabled to mark the addressed line. When the override busy flip-flop 1617 is set to its "1" state, gate 1635 is inhibited, and gate 1636 is enabled. Accordingly, on the override busy command, the connect A or connect B signal does not pass through gate 1635 and gate 1637 to enable gate 1504. When a connection is attempted to a busy line, a match indication will be received while the Busy Check Delay Circuit is in its "1" state. Since a connection is to be effected regardless of the state of the marked line, the output of the match detector is ignored and is not allowed to pass through gates 1504 and 1631 to the busy flip-flop 1624. Accordingly, when the 250 microsecond period of the Busy Check Delay Circuit has elapsed, the delay circuit will return to its "0" state and as is appropriate either the connect A or connect B AND gate 1629 or 1630 will be energized to turn on the appropriate trunk pulser. Also when the Busy Check Delay Circuit 1626 returns to its "0" state, its D.-C. output signal on conductor 1638 in conjunction with the override busy "1" state signal on conductor 1639 will enable AND gate 1636, OR gate 1637 and AND gate 1504. Accordingly, after the second connection has been effected and detected by the match detector, the output signal from gate 1504 will initiate a Clear Sequence to reset the line and release selectors, the time-out pulser, and operation ended and operation successful signals will be transmitted to Common Control.

*Trace*

In some instances, it is desirable to determine the identity of a trunk which is connected to a particular line. Such an operation is known as a Trace and is implemented by means of a line selector address on conductor group 1601 and a trace signal on conductor 1605 which sets the trace flip-flop 1620 to its "1" state.

This command is similar to a connect command in that it energizes the set and read-out pulser 1625 to mark the desired line, turns on the time-out pulser 1627, and enables AND gate 1635 and OR gate 1637 to prepare for the Clear Sequence upon completion of the job; however, the connect A or connect B AND gates are not enabled and the trunk pulsers will not be turned on.

The set and read-out pulsers selectively fire the proper output tubes in the line selector 1501 to mark the address line, and the identifier read-out pulser sets the trunk identifier register in accordance with the address of the trunk connected to the marked line. The match and trace detector is energized when the busy trunk is marked and it, in cooperation with the output signal from OR gate 1637, enables AND gate 1504 to initiate the previously described Clear Sequence and to cause generation of operation successful and operation ended signals.

*Release*

Connections between lines and trunks are destroyed by means of a release order over conductor 1606 to set the release flip-flop to its "1" state and a trunk address to the release selector over conductor group 1608.

When the release flip-flop 1621 reaches its "1" state, its output signal turns on the time-out pulser, energizes the set and read-out pulser 1642 to mark the trunk to be released, enables AND gate 1513, and enables OR gate 1640 to transmit the check signal to Common Control. The release selector serves to deionize the gas tube connected between the marked trunk and the line. The identity of the released trunk is read into the trunk identifier register through the trunk identifier and the decrease in current is noted in the match and trace detector 1505. The output of the match and trace detector on 1514, in conjunction with the output signal from OR gate 1637 enables AND gate 1504 to initiate the previously described Clear Sequence and to energize AND gate 1513 and OR gate 1633 to set the operation successful flip-flop to its "1" state.

*Program orders*

We have previously briefly mentioned the makeup of the Order Word obtained from the Flying Spot Store and at this point will delve more deeply into the detail of its makeup and its significance to the operation of the system. The eighteen-bit Order Word obtained from the Flying Spot Store is divided into four parts as shown below:

| Subdivision | A | B | C | D | Spare |
|---|---|---|---|---|---|
| Bits | 3 | 2 | 5 | 7 | 1 |
| Combinations | 8 | 4 | 32 | 128 | -------- |

The A portion of the Order Word always contains instruction information. The B and C portions usually contain instruction information, but when preceded by certain A codes, the B and C portions are used together to provide seven bits of address information. The D portion of the code usually contains address information.

As previously indicated program orders fall into two general classifications, namely decision orders and nondecision orders. In the case of decision orders, the A code has the value 0 or 1 and, in the case of nondecision orders, the A code is always other than 0 or 1. On decision orders the Flying Spot Store may advance to the next adjacent word location therein or may transfer to a new location at an address which has been stored in one of the two Transfer Registers in Common Control. Whether the Flying Spot Store advances or transfers is dependent upon the conditions found in the Common Control at the time of the decision order. A detailed discussion of the CTR and EP0 gate circuits outlines the conditions under which a transfer will occur and under which an advance will be made in the case of decision orders. Decision orders always require two Common Control operating cycles for their completion. That is, during the first cycle the order is read from the Flying Spot Store into Common Control and on the second cycle the decision is reached and Common Control proceeds in accordance with the terms thereof.

Nondecision orders are employed for the transfer of information within the Common Control; for example, for controlling the BGS operations and Network Operation and for setting up circuit conditions so that a decision order may be acted upon. Most nondecision orders are completed in one operating cycle of the Common Control; however, a few such orders require two cycles.

A0 C0–18

Those orders which are prefixed by A=0 are decision orders which may mean "Transfer if the reading of the Barrier Grid Store, the Scanner, or one of the various flip-flop memory cells is 0" or "Transfer if there is no match of the memory cells being compared." In order to differentiate the above two types of operations and to store the condition for use in the subsequent operating cycle when the decision will be reached, one of the memory cells in the Order Memory is set. The memory cells in the Order Memory are set in accordance with the C code when A equals 0. If the C code is any of the values 0 through 9, 13, 14 or 15, then the T0 memory cell 808 is set indicating that a transfer should be made if the reading of the Barrier Grid Store, the Scanner or one of the various flip-flop memory cells is 0. If the C code is equal to 10, 11, 12, 16, 17 or 18 when A is equal to 0, the T0M memory cell 810 is set indicating that a transfer should be made if no match occurs in the memory cells being compared.

A1 C0–18

Those orders which are prefixed by A=1 are the inverse of those just described above. The operations are similar and, as above, the precise operation is a function of the value of the C code in combination with the A code equal to 1. If the C code is equal to 0 through 9, 13, 14 or 15 when A equals 1, the T1 memory cell 809 will be set which means "Transfer if the reading of the Barrier Grid Store, the Scanner, or the flip-flop being considered is equal to 1." If the C code is equal to 10, 11, 12, 16, 17 or 18 when the A code equals 1, the T1M memory cell 811 will be set, which means "Transfer if a match occurs between the memory cells being considered."

It might be well at this point to review briefly the operation of the EP0 and CTR gate circuits 930 and 931, respectively. We have previously stated that an EP0 pulse will be generated immediately after a nondecision order and immediately after a decision order on which a transfer is not required, and that a CTR pulse will be generated immediately after a decision order upon which a transfer is required. In the above instances, the states of the T0, T1, T0M, and T1M memory cells are transmitted to the EP0 and CTR gate circuits and, as seen from the Boolean expression for these gates shown under the General heading "EP0 and CTR Gate Circuits," the conditions for the generation of an EP0 and a CTR pulse are clearly defined.

As previously indicated, two Transfer Registers 914 and 915 are provided for use on conditional transfer orders. The decision as to which Transfer Register will be employed is indicated by the B code of the Order Word when the A code is equal to 0 or 1. The Flying Spot Store will transfer to the address stored in the first Transfer Register 914 if the B code is 0 or 1 when the A code is equal to 0 or 1 and will transfer to the address stored in the second Transfer Register 915 when the B code is 2 and the A code is 0 or 1.

Another feature of the first Transfer Register 914 permits the incrementing of the Y address stored therein by 1. This operation is commanded when the B code is 1 and the A code is 0 or 1.

If the A code equals 0 or 1 and the B code equals 0 or 1, the address stored in the first Transfer Register 914 is to be employed upon the occurrence of a transfer order and the TR1 memory cell 812 in the Order Memory is set. If the A code equals 0 or 1 and the B code equals 2, the information stored in the second Transfer Register 915 is to be employed upon the occurrence of a transfer and the TR2 memory cell 813 in the Order Memory 800 is set.

*Decision orders*

In the following orders the symbolic representations of the order such as (RY) which are used in the implementation of the sequence charts of Figs. 20 through 50 are given along with the codes which command that particular order.

A0–1 B0–2 C01(RY)

This order states that the Barrier Grid Store should be read and regenerated at a Y or vertical address specified by the D part of the Order Word and at an X address previously stored in the part of the Barrier Grid Store Address Register 700. In the implementation of this order, the Y address indicated by the D part of the Order Word will also be stored in the Barrier Grid Store Address Register 700.

The Order Word from the Flying Spot Store on conductor group 1069 is gated through AND gate 402 to the Order Register 400 for storage therein. Gate 402 is enabled by a signal from the Flying Spot Store Translation Control 901 on conductor 404 which, when energized, indicates that the Flying Spot Store is addressed to an order area as opposed to a translation area. The word stored in the Order Register is translated in the Primary and Secondary Translators 410 and the Translator order codes cause the following actions in the first Common Control operating cycle: (1) OR gate 459 and AND gate 458 are enabled to gate the D portion of the Order Word on conductor group 490 to the Bus input circuit over conductor group 491. (2) OR gate 762 and AND gate 760 are enabled to gate the X portion of the Order Word stored in the Barrier Grid Store Address Register 700 to the Bus input circuit over conductor group 766.

Upon the occurrence of the EP0 pulse at the end of the first operating cycle succeeding receipt of an RY order, the following acts ordered by the RY order will be accomplished: (1) OR gate 824 and AND gate 844 are enabled to set the RBG memory cell 801. This memory cell is set for later use as the result of the Barrier Grid Store interrogation will not be known until the next operating cycle of Common Control. (2) Both the X and Y addresses which were gated to the Bus input circuit from the Barrier Grid Store Address Register 700 and from the Order Register 400 are gated from the Bus output circuit to the Horizontal and Vertical Address Registers 601 and 602 through gate 1101. (3) The Y portion of the address on the Bus output circuit, which was obtained from the D code of the word in the Order Register, is gated to the Barrier Grid Store Address Register 700 through AND gate 707 and OR gate 708. (4) The OR gate 1112 is enabled by the RY code which enters over conductor group 1116 and the output of gate 1112, in conjunction with an EP0 pulse on conductor 1118, enabled the Read and Regenerate gate 1108 in the Barrier Grid Store Read-Write Control to provide a RRG order on conductor group 620 to the Barrier Grid Tube Control circuit 619. (5) In accordance with the value of the A code, since the C code is 0, the T0 or T1 memory cell 808 or 809, respectively, will be set as previously described. (6) In accordance with the B code, the TR1 or TR3 gate 812 or 813 will be set to indicate which Transfer Register should be employed if the RY order results in a conditional transfer.

During the second operating cycle following receipt of an RY order, the Barrier Grid Store 600 will deflect to the indicated address and the State of the interrogated spot will be transmitted to the BGR memory cell 735 in Miscellaneous Memory 738 over conductor pair 617. The setting of the BGR memory cell 735 will in turn activate one of its two output conductors R0BG and R1BG indicating respectively that the interrogated spot was in the "0" state or in the "1" state.

As indicated in the discussion of the EP0 and CTR gate circuits, the states of the BGR memory cell and the Order Memory cells are combined in the logic circuitry of the EP0 and CTR gates 930 and 931 to generate either an EP0 or a CTR pulse. For example, if the T0 memory cell 808 was set, which means "Transfer if a 0 is read," and in fact the interrogated spot was in the "0" state, then a CTR pulse will be generated. However, if the T0 memory cell 808 had been set and in fact the interrogated spot was in the "1" state, an EP0 pulse will be generated. Similar reasoning applies had the T1 memory cell 809 been set.

If the conditions are such that a transfer is to be made, a CTR pulse is generated, causing the information in the first or second Transfer Register, in accordance with the previously described setting of cells 812 and 813 to be gated through the Flying Spot Store Address Control over conductor group 928 or 929 and to the Horizontal and Vertical Input Registers 1039 and 1040 over conductor groups 1070 and 1071, respectively.

If the conditions are such that no transfer is to be made, an EP0 pulse is generated and the operation required by the Order Word following the above-described RY Order Word is carried out. A pulse is also sent from the Flying Spot Store Control 940 over conductor pair 1077 to command the Flying Spot Store to advance to the next adjacent Order Word.

In the case of an advance of the Flying Spot Store, the order signal on conductor group 523 indicating that the order was not a direct transfer order and an EP0 pulse on 505 indicating that a conditional transfer did not occur will cause the Add 1 Control 503 to increment the X address from the Flying Spot Store Address Register 504 by 1 and this incremented address will be transmitted back to the X memory cells of the Flying Spot Store Address Register on conductor group 522.

Each RY order is completed in two 2.5 microsecond operating cycles of the Common Control, however, due to the overlapping of operations successive RY orders are initiated each operating cycle of Common Control. The RY order was read from the Flying Spot Store at the beginning of one operating cycle; the operations of this order requiring an EP0 pulse were effected at the end of the first operating cycle; the state of the addressed Barrier Grid Store spot was determined and the decision as to whether an EP0 or CTR pulse should be generated was reached during the second operating cycle; and an EP0 or CTR pulse as appropriate is generated at the termination thereof.

A0–1 B0–2 C1 (RX)

This order states that the Barrier Grid Store should be read and regenerated at the X address specified by the D portion of the Order Word and at the Y address which is presently in the Barrier Grid Store Address Register 700 and that the X address obtained from the D part of the Order Word should be read into the X portion of the Barrier Grid Store Address Register 700. The circuit operations of this order are similar to those described with regard to the RY order; however, different gates are activated.

The RX order read from the Flying Spot Store is gated into the Order Register 400 through gate 402 as again, gate 402 receives an enabling pulse from the Flying Spot Store Translation Control over conductor 404 indicating that the Flying Spot Store is directed to an order area and not to a translation area. The RX order which is stored in the Order Register is translated in the primary and secondary Translators 410 and the translated order codes cause the following actions: (1) Gates 459 and 458 are enabled to gate the D portion of the Order Word on conductor 490 to the Bus input circuit over conductor group 491. (2) OR gate 763 and AND gate 717 are enabled to transfer the Y0 through Y4 and Y6 bits of the Y address stored in the Barrier Grid Store Address Register 700 to the Bus input circuit over conductor group 767, and OR gate 764 and AND gate 718 are enabled to gate the Y5 portion of the Y address stored in the Barrier Grid Store Address Register 700 to the Bus input circuit, also over conductor group 767.

Upon the occurrence of the EP0 pulse at the end of the first operating cycle succeeding receipt of an RX order, the following operations will be performed: (1) AND gate 844 is enabled to set the RBG memory cell to its "1" state. (2) Both the X and Y addresses which were gated to the Bus input circuit from the Order Register 400 and from the Barrier Grid Store Address Register 700 are gated from the Bus output circuit to the Horizontal and Vertical Address Registers 601 and 602 through AND gate 1101 of the Barrier Grid Store Address Control 1100. (3) The X portion of the address on the Bus output circuit, which was obtained from the D code in the Order Word, is gated to the Barrier Grid Store Address Register 700 through AND gate 704 and OR gate 705. (4) OR gate 1112 is enabled by the occurrence of the RX code which enters over conductor group 1116. The output signal of gate 1112, in conjunction with an EP0 pulse on conductor 1118, enables the Read and Regenerate gate 1108 in the Barrier Grid Store Read-Write Control to provide an RRG order on conductor group 620 to the Barrier Grid Tube Control circuit 619. (5) In accordance with the value of the A code, since the C code is 1, the T1 or T0 memory cell 808 or 809, respectively, will be set as previously described. (6) In accordance with the B code of the Order Word, the TR1 or TR2 memory cell 812 or 813 will be set to indicate which Transfer Register will be employed in the case of a conditional transfer.

During the second operating cycle succeeding receipt of an RX order, the Barrier Grid Store 600 will deflect to the indicated address and the state of the interrogated spot will be transferred to the BGR memory cell 735 in Miscellaneous Memory 738 over conductor pair 617.

The setting of the BGR memory cell 735 will in turn activate one of its two output conductors R0BG and R1BG indicating, respectively, that the interrogated spot was in the "0" state or the "1" state. As indicated in the discussion of the EP0 and CTR gate circuits and of the RY order, the states of the BGR memory cell 735 and the order memory cells are combined in the logic of the EP0 and CTR gate circuits 930 and 931 to generate either an EP0 or CTR pulse at the end of the second Common Control operating cycle after receipt of an RX order.

If the conditions are such that a transfer is to be made, a CTR pulse is generated causing the information in the first or second Transfer Register, in accordance with the previously described setting of cells 812 and 813 to be gated through the Flying Spot Store Address Control over conductor group 928 or 929 and to the Horizontal and Vertical Input Registers 1039 and 1040 over conductor groups 1070 and 1071, respectively.

If the conditions are such that no transfer is to be made, an EP0 pulse is generated and the operation required by the Order Word immediately following the above-described RX Order Word is carried out. A pulse is also sent from the Flying Spot Store Control 940 over conductor pair 1077 to command the Flying Spot Store to advance to the next adjacent Order Word.

Upon the occurrence of an advance in the Flying Spot Store, the order signal on conductor group 523 indicating that the order was not a direct transfer and an EP0 pulse on 505 indicating that this is not a case of a conditional transfer will cause the Add 1 Control to increment the X address on conductor 504 from the Flying Spot Store Address Register and transmit the incremented address back to the Flying Spot Store Address Register.

A0–1 B0–2 C2 (EY)

This order is identical to the RY order described above except that a Read and Write 0 order is generated in the Barrier grid Store Read-Write Control 1107 instead of the Read and Regenerate order. The EY order, when translated in the Order Translator 410, provides an enabling signal on conductor 1148 to enable OR gate 1115. The output signal from OR gate 1115 in conjunction with an EP0 pulse on conductor 1118 enables AND gate 1111 to generate a Read and Write "0" order for transmission to the Barrier Grid Tube Control circuit 619 on conductor group 620.

This order therefore states that the Barrier Grid Store should be read and a 0 written at the storage area whose Y address is indicated in the D code of the Order Word and whose X address is stored in the Barrier Grid Store Address Register 700. This order is in effect a Read and Erase order and is employed where information in the Barrier Grid Store is to be used in arriving at a decision; however, that information will not be required in subsequent orders.

A0–1 B0–2 C3 (EX)

This order is identical to the RX order as described above except that a Read and Write 0 order is generated in the Barrier Grid Store Read-Write Control 1107 instead of a Read and Regenerate order as in the RX order. The EX order is the counterpart of the EY order and is employed where information from the Barrier Grid Store is to be used in arriving at a decision and where the information stored will not be required in subsequent orders.

The EX order, when translated in the Order Translator 410, provides an enabling signal on conductor 1148 to enable OR gate 1115. The output signal from OR gate 1115 in conjunction with an EP0 pulse on conductor 1118 enables AND gate 1111 to generate a Read and Write 0 order for transmission to the Barrier Grid Tube Control circuit 619 on conductor group 620.

This order therefore states that the Barrier Grid Store should be read a 0 written at the storage area whose X address is indicated in the D code of the Order Word and whose Y address is stored in the Barrier Grid Store Address Register 700.

A0–1 B0–2 C4 (CY)

This order is identical to the above-described RY and EY orders except that the Read and Change conductor to the Barrier Grid Tube Control circuit 619 is activated instead of the Read and Regenerate or Read and Write 0 conductors as in the above-mentioned orders.

The order received from the Flying Spot Store is gated to the Order Register and translated in the primary and secondary Order Translator circuits 410. The Translator output signals enable OR gate 1113 and the output of 1113 on conductor 1117 in conjunction with an EP0 pulse on conductor 1118 enables the Read and Change gate 1109 in the Barrier Grid Store Read-Write Control 1107. The Read and Change input conductor to the Barrier Grid Tube Control circuit 619 is therefore activated through conductor 620.

A0–1 B0–2 C5 (CX)

This order is the counterpart of the above-described CY order and states that the Barrier Grid Store should be read and the information changed at the X address indicated in the D code of the Order Word and at the Y address stored in the Barrier Grid Store Address Register 700. The translated Order Word, as in the CY order, activates OR gate 1113 and AND gate 1109 to generate the Read and Change order to the Barrier Grid Tube Control circuit 619.

A0–1 B0–2 C6 (RFA)

This order specifies that one of the memory cells in the Access Register 1150 shall be read and a transfer or advance of the Flying Spot Store made in accordance with the terms of the A and C codes of the RFA order.

The order is obtained from the Flying Spot Store and gated through AND gate 402 to the Order Register 400. The information stored in the Order Register 400 is processed in the Order Translator 410 and the Translator output signals cause the following actions within Common Control: (1) OR gate 822 is enabled and its output signal in conjunction with an EP0 pulse on conductor 874 enables AND gate 840 to set the RFF memory cell 804 in the Order Memory 800. The setting of the RFF memory cell indicates that a flip-flop is being read rather than the Barrier Grid Store as in the preceding orders. (2) The T0, T1, TR1 and TR2 memory cells 808, 809, 812 and 813, respectively, are set in accordance with the makeup of the A and B codes as previously discussed. (3) The state of the particular memory cell in the Access Register 1150 whose number is indicated by the decimal value of the D code is gated through AND gate 1183 to set or reset the FFR memory 734 in the Miscellaneous Memory 738. The state of the addressed memory cell is therefore stored in the Miscellaneous Memory for use in the succeeding operating cycle of Common Control to determine whether an EP0 or CTR pulse should be generated.

If an EP0 pulse appears at the end of the Common Control operating cycle immediately succeeding the receipt of an RFA order, the acts above requiring an EP0 pulse are completed. In the next succeeding operating cycle, the state of the memory cells in the Order Memory 800 and the state of the FFR memory cell 734 in Miscellaneous Memory 738 are combined in the EP0 and CTR gate circuits 930 and 931 to generate, as appropriate, either an EP0 or CTR pulse.

A0–1 B0–2 C7 (RP)

This order states that the Barrier Grid Store should be read and regenerated at a storage area whose address in both the X and Y coordinates has been preset in the Barrier Grid Store Address Register 700. This order is similar to the RY and RX orders except that the entire address is obtained from the Barrier Grid Store Address Register 700 rather than only the X or the Y address. The D code of the Order Word is not employed in this order.

The RP order is obtained from the Flying Spot Store and gated, as are all other orders, to the Order Register 400 through AND gate 402. The order is then processed in the Order Translator 410 and the Translator output signals implement the following acts within the Common Control: (1) OR gate 824 and AND gate 844 are each enabled to set the RBG memory cell 801 in the Order Memory 800. (2) OR gate 762 and AND gate 760 are enabled to gate the X address registered in the Barrier Grid Store Address Register 700 to the Bus input circuit over conductor group 766. OR gate 763 and AND gate 717 are enabled to gate the Y0 through Y4 and Y6 portions of the Y address stored in the Barrier Grid Store Address Register 700 to the Bus input circuit over conductor group 767. OR gate 764 and AND gate 718 are enabled to gate the Y5 portion of the address stored in the Barrier Grid Store Address Register 700 to the Bus input circuit over conductor group 767. (3) Both the X and Y addresses which were gated to the Bus input circuit from the Barrier Grid Store Address Register 700 are gated through AND gate 1101 of the Barrier Grid Store Address Control 1100 to the Horizontal and Vertical Address Registers 601 and 602 in the Barrier Grid Store. AND gate 1101 is enabled by the simultaneous occurrence of an output from OR gate 1102 and an EP0 pulse on conductor 1103. Gate 1102 is enabled in accordance with the translated order information. (4) The OR gate 1112 is enabled by the RP code which enters over conductor group 1116 and the output of OR gate 1112 in conjunction with an EP0 pulse on conductor 1118 enables the Read and Regenerate AND gate 1108 in the Barrier Grid Store Read-Write Control. This provides a RRG order on conductor group 620 to the Barrier Grid Tube Control circuit 619. (5) In accordance with the A and B codes, the T0, T1, TR1 and TR2 memory cells 808, 809, 812 and 813 in the Order Memory 800 will be set in accordance with the earlier discussion of these memory cells.

If an EP0 pulse occurs immediately after the operating cycle in which the RP order was received, the acts described above requiring an EP0 pulse will be accomplished and during the second 2.5 microsecond operating cycle of the Common Control, the decision will be reached as to whether an EP0 or CTR pulse is to be generated at the end of the second operating cycle.

The information preset in the Barrier Grid Store Address Register 700 is usually set therein by a non-decision order which occurs prior to the RP order.

A0–1 B0–2 C8 (RC)

This order is identical to the RP order except that the Barrier Grid Store is to be read and regenerated at a Y address wherein the second most significant bit of the Y address stored in the Barrier Grid Store Address Register 700 is complemented. Accordingly, the operations within Common Control performed under the RC order are the same as those performed under the RP order with the exception that OR gate 765 and AND gate 719 are energized rather than OR gate 764 and AND gate 718. Accordingly, under the RC order the complement of the Y5, second most significant bit of the Y address stored in the Barrier Grid Store Address Register 700, is transmitted to the Bus input circuit over conductor group 767.

A0–1 B0–2 C9 (RS)

Preceding this order, the Scanner Address Register 420 will have been set in accordance with the terms of a nondecision order. The output conductors of the Scanner Address Register are connected directly to the diode logic in the Line and Trunk Scanner input. Consequently, the state of the line interrogated in accordance with the address stored in the Scanner Address Register is present at the Scanner output conductor 231 which is connected to the Scanner Detector Amplifier. As previously indicated, two-rail logic is employed at the output of the Detector Amplifier 229.

The RS order, a decision order, is gated from the Flying Spot Store over conductor group 1069 to the Order Register 400 through AND gate 402. The codes stored in the Order Register are translated in the Order Translator 410 and the Translator output signals effect the following operations: (1) the T0 or T1 memory cells 808 and 809 in the Order Memory 800 are set in accordance with the A code. (2) The Read Scanner memory cell 803 is set upon the occurrence of an EP0 pulse to indicate that the Scanner is being read. (3) The state of the line interrogated by the Scanner at the address indicated in the Scanner Address Register 420 is gated to the S memory cell 737 in the Miscellaneous Memory 738.

If an EP0 pulse occurs at the end of the first operating cycle succeeding the receipt of an RS order, the operations above requiring an EP0 pulse are completed and during the succeeding operating cycle of Common Control a decision is reached in the EP0 and CTR gate circuits 930 and 931 as to whether an EP0 or CTR pulse should be generated at the end of the second Common Control operating cycle.

A0–1 B0–2 C10 (RSL)

This order commands the supervisory scanning of subscribers' lines and trunks. The supervisory state of a subscriber's line or a trunk is compared with the state of the L1 or T1 spot in the Barrier Grid Tube assigned to that particular line or trunk. In accordance with the relative states of the subscriber's line and the associated line spot, either an EP0 or a CTR pulse is generated at the termination of the second operating cycle succeeding the receipt of an RSL order.

This order is unlike previously described orders in that it comprises a command regarding an address received under a previous order and a new address to establish conditions in Common Control for use in the next succeeding order. This procedure is characterized as overlap operation.

Preceding the first RSL order, non-decision orders are employed to establish initial address conditions in the Scanner Address Register. For the purpose of discussion of the RSL order it will be assumed that an address has been established in the Scanner Address Register and the information therein is made available to the Bus input circuit by the enabling of gate 426.

Two operating cycles are required to complete an RSL order and it will be assumed in the following description that the first RSL order was received at time $t0$, a second RSL order at time $t1$, and a third RSL order at time $t2$, where times $t0$, $t1$ and $t2$ occur at 2.5 microsecond intervals established by the clock pulse generator 933.

*Operations between t0 and t1*

On occurrence of the EP0 pulse accompanying the first RSL order, gate 422 is enabled to gate the fourteen-bit X and Y address on the Bus output circuit to the Scanner Address Register 420. The Scanner is therefore directed to the address obtained from the Bus.

Gate 426 is enabled to put the fourteen-bit X and Y address in the Scanner Address Register onto the Bus input circuit.

*Operations between t1 and t2*

At this time an EP0 pulse occurs and the second RSL order is received from the Flying Spot Store. The second RSL order is gated to the Order Register 400 and is translated in the Order Translator 410.

Upon occurrence of the EP0 pulse accompanyng the second RSL order, the T0M, T1M, TR1 and TR2 memory cells 810, 811, 812 and 813 are set in accordance with the A and B codes of the first RSL order received at time $t0$.

Also, since the order at $t0$ comprises A=0–1 and C=10, the RS and RBG memory cells 803 and 801, respectively, in the Order Memory 800 are set.

The Barrier Grid Store Address Control gate 1101 is enabled by the prior RSL order and the present EP0 pulse to gate the fourteen-bit X and Y address from the Bus to the Barrier Grid Store Horizontal and Vertical Input Registers 601 and 602.

The Read and Regenerate conductor to the Barrier Grid Store is activated by enabling OR gate 1112 and AND gate 1108.

The fourteen-bit X and Y address on the Bus output is gated to the Barrier Grid Store Address Register 700 through AND gates 704 and 707.

The state of the line whose address was set in the Scanner prior to receipt of the first RSL order is read to the S memory cell 737 in the Miscellaneous Memory 738. During the cycle from $t1$ to $t2$, the state of the addressed Barrier Grid Store spot becomes known and the BGR memory cell 735 is positioned in accordance therewith. During this second cycle succeeding the receipt of the first RSL order, the conditions are established to generate either an EP0 or CTR pulse and one or the other will occur at the end of the second operating cycle in accordance with the relative states of the scanned line and its associated L1 or L2 spot.

The preceding discussion concerning the period from $t1$ to $t2$ has been concerned with actions at the address established in Common Control preceding receipt of the first RSL order. Also during this period, the new RSL order must be read into the Order Register and translated and the D code of the Order Word must be gated into the X memory cells of the Scanner Address Register through AND gate 421. It should be noted that the gating of information into the Scanner Address Register does not interfere with the previously described gating of information from the Scanner Address Register as the two operations are separated by a short interval of time.

If an EP0 pulse is obtained at time $t2$ as the result of the first RSL order, the events will proceed as previously described but now with respect to the address received at time $t0$. Scanning of lines and trunks proceeds until the program dictates a direct transfer to a different order or a conditional transfer results in the generation of a CTR pulse at which time the scanning operation will be temporarily halted and other required acts will be performed.

A0–1 B0–2 C11 (RSY)

Preceding the RSY order, X and Y addresses are set in the Scanner Address Register and a different X—Y address is set in the Barrier Grid Store Register to establish the initial conditions for the receipt of the RSY order.

This order specifies that the Scanner shall be addressed to a line in accordance with the X and Y address previously established in the Scanner Address Register 420, that the Barrier Grid Store shall be read and regenerated at the Y address indicated by the D code of the Order Word and at the X address obtained from the X memory cells of the Barrier Grid Store Address Register, and that the states of the addressed line and addressed Barrier Grid spot shall be compared in accordance with the conditions established by the A and B codes of the RSY order to generate either an EP0 or CTR pulse.

The RSY order is gated to the Order Register 400 through AND gate 402 and translated in the Order Translator 410.

The output signals from the Order Translator enable OR gate 762 and AND gate 760 to gate the X address in the Barrier Grid Store Address Register 700 to the Bus input circuit over conductor group 766 and enable AND gate 458 to transmit the D code of the Order Word stored in the Order Register 400 to the Y conductors of the Bus input circuit over conductor group 491.

Upon the occurrence of the EP0 pulse at the end of the first operating cycle succeeding receipt of the RSY order, the fourteen-bit X and Y address on the Bus output is transmitted through AND gate 1101 to the Barrier Grid Store Horizontal and Vertical Address Registers 601 and 602; the Read and Regenerate gate 1108 in the Barrier Grid Store Read-Write Control is enabled to activate the Read and Regenerate conductor to the Barrier Grid Tube Control circuit 619; the T0M, T1M, TR1 and TR2 memory cells in the Order Memory 800 are positioned in accordance with the A, B and C codes of the RSY order; the RS and RBG memory cells 803 and 801 are set to indicate that the Scanner and the Barrier Grid Tube are being read; and gate 771 or gate 772 is enabled to position the S memory cell 737 to indicate the state of the line read by the Scanner 201.

During the second operating cycle succeeding the receipt of an RSY order, the state of the addressed Barrier Grid Storage spot will become known and will be registered in the BGR memory cell 735.

The conditions have now been established within the Order Memory and Miscellaneous Memory to arrive at a decision as to whether an EP0 or CTR pulse will be generated. The states of the memory cells in the Order Memory and the Miscellaneous Memory are combined in the EP0 and CTR gate circuits 930 and 931 to generate either an EP0 or CTR pulse in accordance with our discussion of these gate circuits.

A0–1 B0–2 C12 (RSX)

Preceding the RSX order, X and Y addresses are set in the Scanner Address Register and a different X and Y address is set in the Barrier Grid Store Register to establish the initial conditions for the receipt of the RSX order.

This order specifies that the Scanner shall be addressed to a line in accordance with the X and Y address previously established in the Scanner Address Register 420, that the Barrier Grid Store shall be read and regenerated at the X address indicated by the D code of the Order Word and at the Y address obtained from the Y memory cells of the Barrier Grid Store Register, and that the states of the addressed line and addressed Barrier Grid Store spot shall be compared in accordance with the conditions established by the A and C codes of the RSX order to generate either an EP0 or CTR pulse.

The RSX order is gated to the Order Register 400 through AND gate 402 and translated in the Order Translator 410.

The output signals from the Order Translator enable OR gates 763 and 764 and AND gates 717 and 718 to gate the Y address in the Barrier Grid Store Address Register 700 to the Bus input circuit over conductor group 767. AND gate 458 is enabled to transmit the D code of the Order Word stored in the Order Translator 400 to the X conductors of the Bus input circuit over conductor group 491.

Upon the occurrence of the EP0 pulse at the end of the first operating cycle succeeding receipt of the RSX order, the fourteen-bit X and Y address on the Bus is transmitted through AND gate 1101 to the Barrier Grid Store Horizontal and Vertical Address Registers 601 and 602; the Read and Regenerate gate 1108 in the Barrier Grid Store Read-Write Control is enabled to activate the Read and Regenerate conductor to the Barrier Grid Tube Control circuit 619; the T0M, T1M, TR1 and TR2 memory cells in the Order Memory 800 are positioned in accordance with the A, B and C codes of the RSX order; the RS and RBG memory cells 803 and 801 are set to indicate that the Scanner and the Barrier Grid Tube are being read; and gate 771 or gate 772 is enabled to position the S memory cell 737 to indicate the state of the line read by the Scanner 201.

During the second operating cycle succeeding the receipt of an RSX order, the state of the addressed Barrier Grid storage spot will become known and will be registered in the BGR memory cell 735.

The conditions have now been established within the Order Memory and the Miscellaneous Memory to arrive at a decision as to whether an EP0 or CTR pulse will be generated. The states of the memory cells in the Order Memory and Miscellaneous Memory are combined in the EP0 and CTR gate circuits 930 and 931 to generate either an EP0 or CTR pulse in accordance with our discussion of these gate circuits.

A0–1 B0–2 C13 (RFF)

This order specifies that the state of one of the individually addressable Miscellaneous Memory cells in the system be stored in the FFR memory cell 734 in Miscellaneous Memory and that an EP0 or a CTR pulse be generated in accordance with the state stored therein and the setting of the T0 or T1 memory cells in the Order Memory in accordance with the A code of the RFF order. The various Miscellaneous Memory cells are addressed in accordance with the D code of the Order Word upon the occurrence of the RFF order. The following is a list of the D code decimal values and the Miscellaneous Memory cells addressed thereby:

D0—SM memory cell 736
D6—10 millisecond memory cell 946
D8—Ringing state memory cell in the tone source 208
D25—The Distribution Network Busy memory cell
D26—The Distribution Network Operation Successful memory cell
D27—The Distribution Network Operation Ended memory cell
D28—The break-in memory cell. (This memory cell is set to its "1" state if either or both of the Distribution Network and office concentrator network Operation Ended memory cells are in their "1" state.)
D29—The Concentrator Operation Ended memory cell
D30—The Concentrator Operation Successful memory cell
D31—The Concentrator Busy memory cell

A0–1 B0–2 C14 (RYN)

This order states that the Barrier Grid Tube shall be read and regenerated at a Y address determined by the D code of the Order Word and at an X code obtained from the Barrier Grid Store Address Register 700. This order is the same as the RY order except that the Y address used herein is not read into the Y memory cells of the Barrier Grid Store Address Register 700.

The Order Word is read to the Order Register and translated and the Translator signals obtained thereby enable gate 458 to gate the D code of the Order Word to the Bus input circuit and through OR gate 762 enable gate 760 to gate the X code stored in the Barrier Grid Store Address Register to the Bus input circuit.

Upon the occurrence of the EP0 pulse immediately succeeding the receipt of the RYN order, the following operations are performed: (1) The T0, T1, TR1 and TR2 memory cells 808, 809, 812 and 813 are set in accordance with the A and B code of the Order Word. (2) The X and Y addresses on the Bus circuit are gated to the Barrier Grid Store Horizontal and Vertical Address Registers 601 and 602. (3) The Read and Regenerate gate 1108 is enabled. (4) The RBG memory cell 801 in the Order Memory 800 is set.

During the second cycle succeeding receipt of an RYN order, the state of the addressed Barrier Grid spot is set in the BGR memory cell 735 in Miscellaneous Memory 738.

In accordance with the terms established in the Order Memory by the A and C codes of the RYN order and the state of the addressed Barrier Grid Tube storage area, either an EP0 or a CTR pulse is generated at the end of the second operating cycle.

A0–1 B0–2 C15 (RXN)

This order specifies that the Barrier Grid Store should be read and regenerated at an X address determined by the D code of the Order Word and at a Y address obtained from the Y memory cells of the Barrier Grid Store Address Register 700. This order is identical to the RX order except that herein the X address obtained from the D code of the Order Word is not read into the Barrier Grid Store Address Register.

Upon translation, gate 458 is enabled to gate the D code of the Order Word to the X conductors of the Bus input and gates 717 and 718 are enabled to gate the Y codes from the Barrier Grid Store Address Register 700 to the Y conductors of the Bus input circuit.

Upon occurrence of the EP0 pulse succeeding receipt of an RXN order, the following operations are performed: (1) The T0, T1, TR1 and TR2 memory cells 808, 809, 812 and 813 are set in accordance with the A and B code of the Order Word. (2) The X and Y addresses on the Bus circuit are gated to the Barrier Grid Store Horizontal and Vertical Address Registers 601 and 602. (3) The Read and Regenerate gate 1108 is enabled. (4) The RBG memory cell 801 in the Order Memory 800 is set.

During the second cycle succeeding receipt of an RXN order, the state of the addressed Barrier Grid spot is set in the BGR memory cell 735 in Miscellaneous Memory 738.

In accordance with the terms established in the Order Memory by the A and C codes of the RXN order and the state of the addressed Barrier Grid Tube storage area, either an EP0 or a CTR pulse is generated at the end of the second operating cycle.

A0–1 B0–2 C16 (MX)

This order specifies that the seven bits of an X word obtained from one of the various memory units in Common Control shall be compared with seven X hits previously registered in the Memory and Match Register 743 and that Register 775 shall be set to its "1" state if a mismatch occurs.

In accordance with the D code of the Order Word accompanying the MX order, the full X and Y word in the addressed memory cell group is transmitted to the Bus input circuit. The following table shows the decimal value of the D code accompanying the MX order and the memory unit addressed by that D code:

D2—First Transfer Register 914
D3—Return Address Register 502
D4—Barrier Grid Store Address Register 700
D5—Scanner Address Register 420
D6—First fourteen cells of the Access Register 1150
D7—Last fourteen cells of the Access Register 1150
D8—First Memory Register 902
D9—Second Transfer Register 915
D10—Second Memory Register 903
D11—Third Memory Register 904
D12—Memory and Match Register 743
D20—X cells of Barrier Grid Store Address Register 700
D21—Y cells of Barrier Grid Store Address Register 700
D29—Concentrator Trunk Identifier 209
D30—B Network Identifier 305
D31—A Network Identifier 304

Upon receipt of the EP0 pulse succeeding receipt of an MX order, the following operations are accomplished: (1) The MFG memory cell 805 is set. (2) The T1M or T0M memory cells 810 and 811 and the TR1 and TR2 memory cells 812 and 813 are set in accordance with the A, B and C code. (3) The X code of the word stored in the Memory and Match Register is gated to the Parallel Matcher over conductor group 748.

A comparison of the X word gated from the Memory and Match Register 743 to the Parallel Matcher 742 and the X portion of the word from the Bus output circuit on conductor group 773 is made in the Parallel Matcher 742 and the Match Register 775 is set if a mismatch occurs. If a match occurs, the Mismatch Register 775 remains in its reset or "0" state.

During the second Common Control operating cycle succeeding the receipt of an MX order, the states of the T1M and T0M memory cells and the output of the Parallel Matcher Register 775 are processed in the EP0 and CTR gate circuits 930 and 931 to generate the appropriate pulse in accordance with the terms of the order.

A0–1 B0–2 C17 (MY)

This order specifies that the seven bits of a Y word obtained from one of the various memory units of Common Control shall be compared with seven Y bits previously registered in the Memory and Match Register 743 and that Register 775 shall be set to its "1" state if a mismatch occurs.

As in the preceding order, the full X and Y word in the addressed memory cell group is transmitted to the Bus input circuit. The particular memory cell group addressed is determined by the D code of the Order Word as in the preceding order.

The operations herein are the same as in the MX order except that the Y code is transmitted from the Memory and Match Register to the Parallel Matcher rather than the X code as in the preceding order. A comparison is made in the Parallel Matcher and if a mismatch occurs, Register 775 is set to its "1" state.

A0–1 B0–2 C18 (MB)

This order is a combination of the MX and MY orders and specifies that the fourteen-bit X and Y words from one of the various memory cell groups in Common Control, determined in accordance with the D code of the Order Word, shall be compared with the fourteen-bit word previously set in the Memory and Match Register 743. As in the preceding orders, the Register 775 is set to its "1" state if a mismatch occurs between the compared words and during the second operating cycle succeeding receipt of an MB order, the state of the T1M and T0M memory cells in the Order Memory, along with the state of the Match Register 775, are joined in the EP0 and CTR gate circuits 930 and 931 to generate either an EP0 or CTR pulse.

*Non-decision orders*

A2 (T)

This order commands the direct transfer of the Flying Spot Store to the address indicated by the B, C and D portions of the Order Word. When the A part of the Order Word is translated in the Order Translator 410 and found to be equal to 2, the seven bits of the B and C portions of the Order Word are gated through AND gate 458 to the Bus input circuit to form the X portion of the Flying Spot Store address, and the seven bits of the D code are gated also through AND gate 458 to the Bus input circuit to form the Y address of the Flying Spot Store. The B code comprises the two most significant bits of the X word and the C code the five least significant bits of the X word.

At the end of the Common Control operating cycle following receipt of the T order, the EP0 pulse in conjunction with the A2 code will enable AND gate 561 and OR gate 563 in the Flying Spot Store Address Control 500 to gate the X and Y address to the Horizontal and Vertical Input Registers 1039 and 1040, respectively, in the Flying Spot Store. The transfer conductor from the Flying Spot Store Control 940 to the Flying Spot Store Program Control circuit 1067 must be energized before the Flying Spot Store will transfer to the new address which was received from the Bus output circuit. The transfer conductor to the Flying Spot Store Program Control is energized at the initiation of a transfer. The start of a transfer is marked by the simultaneous occurrence of an EP0 pulse on 917, the A2 code on 949, and an indication that the Flying Spot Store is presently in the order area on 950. The termination of the transfer is marked by an indication that the transfer cycle is completed on conductor 919.

At the same time that the X and Y addresses are transmitted to the Horizontal and Vertical Input Registers 1039 and 1040, the same addresses are transmitted over conductor group 521 to the Flying Spot Store Address Register 501. Before the memory cells in the Flying Spot Store Address Register cells change their state, the A2 code indication is transmitted to the Add 1 Control 503 over conductor group 523 to command the incrementing of the address in the X cells of the Flying Spot Store Address Register 501 by 1. The incremented X address is transmitted to the X cells of the Return Address Register 502 over conductor group 527 and OR gate 563. The Y address in the Flying Spot Store Address Register is transmitted to the Return Address Register without alteration. Accordingly, the address in the Flying Spot Store Return Address Register 502 is the address of the Flying Spot Store adjacent to the address from which the transfer was made.

A3 B3 (G)

In accordance with this order, information is transferred in parallel from one memory cell group, designated by the C portion of the Order Word to another memory cell group designated by the D part of the Order Word. The Order Translator output signals activate a selected conductor in accordance with the order codes which enables a gate in the output of a selected memory cell group to gate the states of that memory cell to the Bus input circuit and a second conductor which enables another selected gate to gate the information on the Bus output circuit to the other selected memory cell group. The gating of information is in synchronism with an EP0 pulse. In accordance with this code, information may be gated to and from any of the various memory cell groups having access to the Bus circuit.

C2—First Transfer Register 914
C3—Return Address Register 502
C4—Barrier Grid Store Register 700
C5—Scanner Address Register 420
C6—First 14 cells of the Access Register 1150
C7—Last 14 cells of the Access Register 1150
C8—First Memory Register 902
C9—Second Transfer Register 915
C10—Secondary Memory Register 903
C11—Third Memory Register 904
C12—Memory and Match Register 743
C20—X cells of Barrier Grid Store Address Register 700
C21—Y cells of Barrier Grid Store Address Register 700
C29—Concentrator Trunk Identifier 209
C30—B Network Identifier 305
C31—A Network Identifier 304

The following is a list of D codes and the storage areas to which information may be made:

D2—First Transfer Register 914
D4—Barrier Grid Store Register 700
D5—Scanner Address Register 420
D6—First 14 cells of the Access Register 1150
D7—Last 14 cells of the Access Register 1150
D8—First Memory Register 902
D9—Second Transfer Register 915
D10—Second Memory Register 903
D11—Third Memory Register 904
D12—Memory and Match Register 743
D20—X cells of Barrier Grid Store Address Register 700
D21—Y cells of Barrier Grid Store Address Register 700
D23—Trunk Signalling Selector Register 508
D24—Network and Concentrator Control Registers 516 and 538
D25—B Trunk Selector Register 540
D26—A Trunk Selector Register 539
D27—Concentrator Release Selector Register 429
D28—Line Selector Register 436
D29—Concentrator Trunk Identifier 209
D30—B Network Identifier 305
D31—A Network Identifier 304

A4 (ST)

In accordance with this order, the fourteen memory cells of the first Transfer Register 914 are set in accordance with the B, C and D parts of the Order Word. In this order, the B and C parts of the Order Word comprise the X address and the D part comprises the Y address. The B, C and D codes are gated through AND gate 458 to the Bus input circuit and the Order Translator signals through OR gate 942 in conjunction with an EP0 pulse on conductor 941 enable AND gate 922 thereby gating the X address to the X transfer and through OR gate 943 gating the Y addresses from the Bus output circuit on conductor group 920 to the first Transfer Register memory cells.

A5 (SLA)

This order is similar to the ST order except that the B, C and D parts of the Order Word are transmitted to the first fourteen memory cells in the Access Register 1150 rather than memory cells in the first Transfer Register.

The A5 code enables OR gate 1162 and its output signal in conjunction with an EP0 pulse on conductor 1163 enables AND gate 1124 to gate the information from the Bus output circuit on conductor group 1164 through OR gates 1165 and 1166 to set the first fourteen memory cells in the Access Register 1150.

A6 (SSA)

This order is identical to the SLA order except that information is set in the last fourteen memory cells of the Access Register 1150 rather than the first fourteen cells. The A6 code enables OR gate 1167 and its output in conjunction with an EP0 pulse on 1168 enables AND gate 1125 to gate the information from the Bus output circuit on conductor group 1169 through OR gates 1170 and 1171 to the last fourteen memory cells of the Access Register 1150.

A7 B0 (RYFA)

This order specifies that the Barrier Grid Store is to be read and regenerated at a Y address determined by the D portion of the Order Word and at an X address obtained from the Barrier Grid Store Address Register 700, and that the state of the interrogated spot in the Barrier Grid Store is to be stored in one of the memory cells of the Access Register 1150. The particular one of the thirty-two cells in the Access Register in which this information is to be stored is determined by the C portion of the Order Word which may assume any one of the thirty-two values 0 through 31. The Barrier Grid Store Y address as determined from the D portion of the Order Word is also gated to the Y memory cells of the Barrier Grid Store Address Register 700.

Upon the occurrence of this order, the following operations within Common Control are performed: (1) The AND gate 832 is enabled to set the RYFA memory cell 802 in the Order Memory 800. (2) AND gate 844 is enabled to set the Read Barrier Grid memory cell 801.

(3) The D code of the Order Word is transmitted through AND gate 458 to the Bus input circuit to form the Y address for the Barrier Grid Store and the X code stored in the Barrier Grid Store Address Register 700 is gated through AND gate 760 to the Bus input circuit to form the X address to be assumed by the Barrier Grid Store. (4) The X and Y address obtained from the Barrier Grid Store Address Register 700 and from the D code of the Order Word are gated through AND gate 1101, upon the occurrence of an EP0 pulse on conductor 1104, to the Horizontal and Vertical Address Registers 601 and 602. (5) The information on the Y conductors of the Bus output circuit is gated to the Y memory cells of the Barrier Grid Store Address Register 700 through AND gate 707 and OR gate 708. (6) The Order Translator signal in conjunction with an EP0 pulse on conductor 1118 enables the Read and Regenerate gate 1108 to transmit a Read and Regenerate order to the Barrier Grid Tube Control circuit 619 over conductor group 620. (7) AND gate 405 is enabled by an output signal from OR gate 492 and an EP0 pulse to set the cells in the C Memory Register 432 in accordance with the C portion of the Order Word.

In the Common Control operating cycle following the first EP0 pulse after receipt of an RYFA order, the state of the interrogated spot in the Barrier Grid Store becomes known and is registered in the BGR memory cell 735 in Miscellaneous Memory 738. The output signals from the BGR memory cell 735, the RYFA memory cell 802, the C Memory Translator 434, and the EP0 pulse in concert effect the setting of one of the thirty-two memory cells in the Access Register 1150. For example, if the value of the C code is 16 and the state of the interrogated Barrier Grid spot was "1," the sixteenth memory cell in the Access Register 1150 will be set to its "1" state by the enabling of AND gates 1135 and 1136.

A7 B1 (EYFA)

This order is the same as the RYFA order except that the information read from the interrogated spot in the Barrier Grid Store is not to be regenerated as it will not be required for subsequent operations. Accordingly, the Read and Write 0 conductor from the Barrier Grid Store Read-Write Control is activated rather than the RRG conductor as in the preceding order.

A7 B2 (WFAY)

This order specifies that a particular one of the thirty-two memory cells in the Access Register 1150 shall be read and the state of that memory cell written in a storage spot in the Barrier Grid Store at the Y address specified by the D part of the Order Word and at an X address stored in the Barrier Grid Store Address Register 700. In this order, the D part of the Order Word is transmitted through gate 458 and conductor group 491 to the Bus input circuit to form the Y portion of the Barrier Grid Store address and the X address stored in the Barrier Grid Store Address Register 700 is transmitted through AND gate 760 and conductor group 766 to the Bus input circuit to form the X portion of the address to be assumed by the Barrier Grid Store. Both the X and Y addresses in the Bus circuit are gated to the Barrier Grid Store Horizontal and Vertical Address Registers 601 and 602 through AND gate 1101 and conductor group 1106 and the Y address from hte Bus output circuit is gated to the Y memory cells of the Barrier Grid Store Address Register 700 through AND gate 707 and OR gate 708.

The C code conductors from the Order Translator over conductor group 1172 selectively enable AND gate 1161 to the Barrier Grid Store Read-Write Control over either conductor group 1146 or 1147, depending on whether the interrogated memory cell was in the "0" or the "1" state, respectively. In accordance with the state of the selected memory cell in the Access Register, either the Read and Write 0 gate 1111 or the Read and Write 1 gate 1110 in the Barrier Grid Store Read-Write Control 1107 is energized to command the writing of the state of the selected memory cell in the desired address of the Barrier Grid Store.

Under this order, none of the memory cells in the Order Memory are set as the order is complete within one operating cycle of the Common Control.

A7 B3 C0 (W0Y)

This order specifies that a 0 shall be written on the Barrier Grid Store at a Y address specified by the D part of the Order Word and an X address specified by the address stored in the X portion of the Barrier Grid Store Address Register 700. Further, the Y address obtained from the D code of the Order Word is to be stored in the Y memory cells in the Barrier Grid Store Address Register 700. In this order the following Common Control operations are performed: (1) The D code of the Order Word is gated through AND gate 458 and conductor group 491 to the Bus input circuit to form the Y address for the Barrier Grid Store. (2) The X address stored in the X memory cells of the Barrier Grid Store Address Register 700 are gated through AND gate 760 and conductor group 766 to the Bus input circuit. (3) The X and Y addresses in the Bus output circuit are gated to the Horizontal and Vertical Address Registers 601 and 602 in the Barrier Grid Store and the Y address from the Bus output circuit is gated to the Y memory cells of the Barrier Grid Store Address Register 700 through AND gate 707 and OR gate 708. (4) OR gate 1115 and AND gate 1111 are enabled to energize the Read and Write 0 conductor in conductor group 620 to the Barrier Grid Tube Control circuit 619.

The above acts requiring an EP0 pulse are completed during the second Common Control operating cycle after the receipt of a W0Y order as the EP0 pulse required to complete these acts appears at the end of the first operating cycle subsequent to the receipt of a W0Y order.

A7 B3 C1 (W1Y)

This order is the same as the W0Y order except that OR gate 1114 and AND gate 1110 are enabled to energize the Read and Write 1 conductor in conductor group 620 rather than the Read and Write 0 conductor in the same conductor group as in the preceding order.

A7 B3 C2 (W0X)

This order specifies that a 0 is to be written on the Barrier Grid Store at an X address determined by the D code of the Order Word and at a Y address determined by the setting of the Y memory cells of the Barrier Grid Store Address Register 700.

This order is identical to the W0Y order except that the D part of the Order Word is used to form the X portion of the Barrier Grid Store Address and the Y part of the Barrier Grid Store Address is obtained from the Barrier Grid Store Address Register 700. Consequently, the D part of the Order Word is gated into the X memory cells of the Barrier Grid Store Address Register 700 through AND gate 704 and OR gate 705.

A7 B3 C3 (W1X)

This order is identical to the W0X order except that the Read and Write 1 gate 1110 is energized rather than the Read and Write 0 gate 1111 as in the preceding order.

A7 B3 C4 (W0P)

This order specifies that a 0 shall be written on the Barrier Grid Store at the address determined by the setting of the X and Y memory cells of the Barrier Grid Store Address Register 700.

Accordingly, the states of the X and Y memory cells in the Barrier Grid Store Address Register are gated to the Bus input circuit through AND gate 760, AND gate 717 and AND gate 718. Upon the occurrence of the EP0 pulse at the end of the first operating cycle after receipt of a W0P order, the X and Y addresses from the Bus are gated through the Barrier Grid Store Address Control gate 1101 to the horizontal and Vertical Address Registers 601 and 602 and the Read and Write 0 gate 1111 is enabled to energize the Read and Write 0 conductor in conductor group 620.

A7 B3 C5 (W1P)

This order specifies that a 1 shall be written on the Barrier Grid Store at the address determined by the code stored in the X and Y memory cells of the Barrier Grid Store Address Register 700.

This order is identical to the W0P order except that the Read and Write 1 gate 1110 in the Barrier Grid Store Read-Write Control 1107 is energized rather than the Read and Write 0 gate 1111 as in the preceding order.

A7 B3 C6 (W0FA)

This order specifies that one of the thirty-two memory cells in the Access Register is to be reset to its "0" state. The particular memory cell to be reset is determined by the D Code of the Order Word which may assume any one of the thirty-two values 0 through 31.

In this order the Order Translator conductor energized upon the occurrence of the A7 B3 C6 code in conjunction with an EP0 pulse and the energization of one of the thirty-two D code conductors energizes AND gate 1142 or AND gate 1144 to reset one of the memory cells in either the first group of eighteen cells or in the second group of fourteen cells, respectively.

A7 B3 C7 (W1FA)

This order specifies that one of the thirty-two memory cells in the Access Register 1150 shall be set to its "1" state. The particular memory cell to be set is determined by the D code of the Order Word which may assume any one of the thirty-two values 0 through 31. In this instance, gates 1141 and 1143 are respectively energized to set a memory cell in the first group of eighteen memory cells or the second group of fourteen memory cells.

A7 B3 C8 (RGY)

From time to time spots on the Barrier Grid Store which have not been addressed for a period of time tend to lose their meaning and must be regenerated. This order specifies that the Barrier Grid Store should be read and regenerated at the Y address determined by the D code of the Order Word and at an X address in accordance with the setting of the X memory cells of the Barrier Grid Store Address Register 700. This order is similar to the RY order; however, no decision is reached hereunder and none of the memory cells in the Order Memory 800 are set upon the occurrence of this order. The D code of the Order Word is gated to the Bus and the states of the X cells in the Barrier Grid Store Address Register 700 are gated to the Bus input circuit and upon the occurrence of the EP0 pulse, both the X and Y addresses are gated to the Barrier Grid Store Horizontal and Vertical Address Registers through the Barrier Grid Store Address Control 1100. At the same time OR gate 1112 is energized and its output in conjunction with the EP0 pulse on conductor 1118 enables gate 1108 to energize the Read and Regenerate conductor in conductor group 620.

A7 B3 C9 (RGX)

This order specifies that the Barrier Grid Store shall be read and regenerated at an X address determined from the D code of the Order Word and at a Y address obtained from the Y memory cells of the Barrier Grid Store Address Register 700. This order is similar to the RGY order except that the words of the X and Y addresses are interchanged.

A7 B3 C10 (SY)

This order specifies that the Y memory cells on the Barrier Grid Store Address Register shall be set in accordance with the D code of the Order Word.

The D code is gated through AND gate 458 and conductor group 491 to the Y conductors of the Bus input circuit and upon the occurrence of the EP0 pulse at the end of the first Common Control operating cycle after receipt of an SY order, the Y address from the Bus output circuit is gated through AND gate 707 and OR gate 708 to the Y memory cells of the Barrier Grid Store Address Register 700.

A7 B3 C11 (SX)

This order is similar to the SY order and states that the X memory cells of the Barrier Grid Store Address Register 700 shall be set in accordance with the D code of the Order Word. Accordingly, the D code is gated to the Bus input circuit as before and upon the occurrence of the EP0 pulse the codes on the X conductors of the Bus output circuit are transmitted to the X memory cells through AND gate 704 and OR gate 705.

A7 B3 C12 (TFG)

This order specifies that the Flying Spot Store shall transfer to an address stored in one of the memory units having access to the Bus input circuit. The particular memory unit from which the X and Y addresses are to be gated is specified by the D code of the Order Word. The following is a list of the D codes applicable to this order and the memory units from which information is gated upon the occurrence of the accompanying D code and a TFG order:

D2—First Transfer Register
D3—Return Address Register 502
D4—Barrier Grid Store Address Register 700
D5—Scanner Address Register 420
D6—First Fourteen Memory Cells of Access Register 1150
D7—Last Fourteen Memory Cells of Access Register 1150
D8—First Memory Register 902
D9—Second Transfer Register
D10—Second Memory Register 903
D11—Third Memory Register 904
D12—Memory and Match Register The D part of the Order Word is translated and is used in conjunction with the A7 B3 C12 output conductor of the Order Translator 410 to selectively gate information to the Bus input circuit in accordance with the above table. This is a direct transfer order and is similar to the T order described above. The Bus output circuit is connected to the Flying Spot Store Horizontal and Vertical Input Registers 1039 and 1040 through Flying Spot Store Address Control gates 561 and 563 as in the T order.

The transfer conductor in conductor group 1077 is energized by the Flying Spot Store Control 940 and the Flying Spot Store transfers to the address received from Flying Spot Store Address Control 500. The address adjacent to the address from which the transfer is made is stored in the Return Address Register 502 by gating the X address stored in the Flying Spot Store Address Register 501 to the Add 1 Control over conductor group 504 and thence to the Return Address Register X memory cells through OR gate 564. The Y address from the Flying Spot Store Address Register is transmitted to the Return Address Register without alteration. The address is transmitted from the Flying Spot Store Address Register to the Return Address Register prior to the time that the Flying Spot Store Address Control is enabled and therefore prior to the time that the new X address is stored in the Flying Spot Store Address Register.

A7 B3 C13 (W0PC)

This order specifies that a 0 shall be written on the Barrier Grid Store at an X address determined by the code in the Barrier Grid Store Address Register 700 and at a Y address determined by the code in the Barrier Grid Store Address Register altered to the extent that the second most significant bit is complemented.

In this order the code stored in the X memory cells of the Barrier Grid Store Adress Register are gated to the X conductors of the Bus input circuit through AND gate 760 and the Y0 through Y4 and Y6 bits of the address stored in the Barrier Grid Store Address Register 700 are gated to the Bus input circuit through AND gate 717. The Y5 or second most significant bit of the Y code is complemented and transmitted through AND gate 719 to the Bus input circuit. The act of complementing the second most significant bit of the Y address is effective to shift the Barrier Grid Store beam by one quadrant. Complementing is accomplished by connecting the 0 output conductor of the Y5 memory cell to the 1 conductor of the Bus input circuit and the 1 output conductor of the Y5 memory cell to the 0 conductor of the Bus circuit.

The X and Y addresses so obtained are transmitted through the Barrier Grid Store Address Control AND gate 1101 to the Horizontal and Vertical Address Registers 601 and 602. The Read and Write 0 gate 1111 is energized and therefore a 0 is written at the desired address.

A7 B3 C14 (W1PC)

This order specifies that a 1 shall be written on the Barrier Grid Store at X and Y addresses determined by the codes stored in the Barrier Grid Store Address Register 700 altered to the extent that the Y address stored therein is complemented in the second most significant bit to shift the Barrier Grid Store address by one quadrant.

This order is identical to the W0PC order except that the Read and Write 1 gate 1110 in the Barrier Grid Store Read-Write Control 1107 is enabled rather than the Read or Write 0 gate 1111 as in the preceding order.

A7 B3 C15 (W0FF)

This order specifies that an individually addressable memory cell outside the Access Register be reset. The memory cell to be reset is determined by the D code of the Order Word.

The code A7 B3 C15 D6 is employed to reset the 10 millisecond memory cell 946 and to gate the state of this memory cell to Miscellaneous Memory.

A7 B3 C16 (W1FF)

This order specifies that an individually addressable memory cell outside the Access Register be set to its "1" state. The particular memory cell to be set is determined by the D code of the Order Word.

The code A7 B3 C16 D0 is employed to set the TRL0 memory cell in the Flying Spot Store Translation Control 901 by way of a signal over conductor group 953. The setting of the TRL0 memory cell indicates that a direct transfer to a translation area will immediately follow.

This order specifies that a direct transfer to a translation area will immediately follow and therefore sets the TRL0 memory cell in the Flying Spot Store Translation Control 901. This Order Translator signal enters the Flying Spot Store Translation Control over conductor group 953.

A7 B3 C17 (AXFG)

This order specifies that an X address stored in any one of the various memory groups having access to the Bus input circuit shall be incremented by 1 and stored in the X memory cells of the Barrier Grid Store Address Register 700. The D code of the Order Word selects the memory group from which the address shall be transmitted to the Bus.

This order is accomplished in two steps as follows: During the operating cycle succeeding receipt of an AXFG order, the address to be incremented is gated to the Bus input circuit and during the second operating cycle after receipt of an AXFG order the address on the Bus output circuit is transmitted to the Barrier Grid Store Address Register through the Add 1 X Control 701 and OR gate 705.

A7 B3 C18 (AYFG)

This order specifies that a Y address stored in any one of the various memory cells in Common Control having access to the Bus circuit shall be incremented by 1 and stored in the Barrier Grid Store Address Register 700.

The operation of this order is the same as the AXFG order except that the Add 1 Y Control, the Y memory cells of the Barrier Grid Store Address Register, the Y conductors of the Bus circuit and the Y memory cells of one of the various memory cell groups are employed rather than their X counterparts as in the preceding order.

A7 B3 C20 (CYN)

This order specifies that a storage area in the Barrier Grid Store shall be read and changed at a Y address specified by the D code of the Order Word and at an X address obtained from the X memory cells of the Barrier Grid Store Address Register 700.

This order is similar to the CY order except that a decision is not to be reached thereunder. Accordingly, none of the memory cells in the Order Memory 800 are set on this order and no transfer can occur at the completion thereof.

*Detailed progress of a call*

We have described the major divisions of a telephone switching office in accordance with our invention as shown in Fig. 1 and have explained in general terms the completion of both intraoffice and interoffice calls with respect thereto. We have also described the detailed functional divisions of our invention as shown in Figs. 2 through 16 and have fully described the program orders employed in this system.

We shall now proceed to a detailed explanation of the progress of a call through our invention employing the philosophy that common control and network operations relevant to the handling of other than our illustrative call are being interleaved in time and, except for minor references thereto, these other actions will be ignored.

Programing of work operations with respect to time is at the discretion of the system programer and his decisions are based on traffic requirements.

Figure 51A:
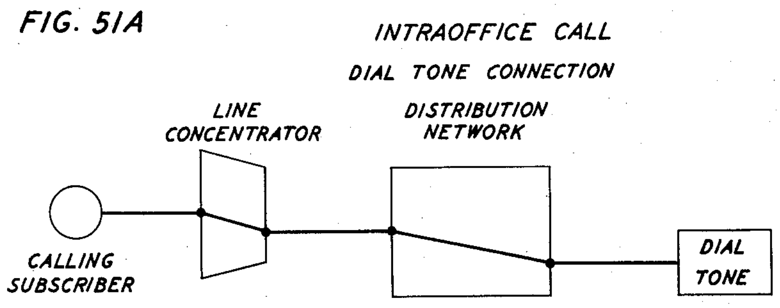
Fig. 51 is a schematic representation of the various connections through the distribution and concentrator networks during intraoffice calls.
Figure 51B:
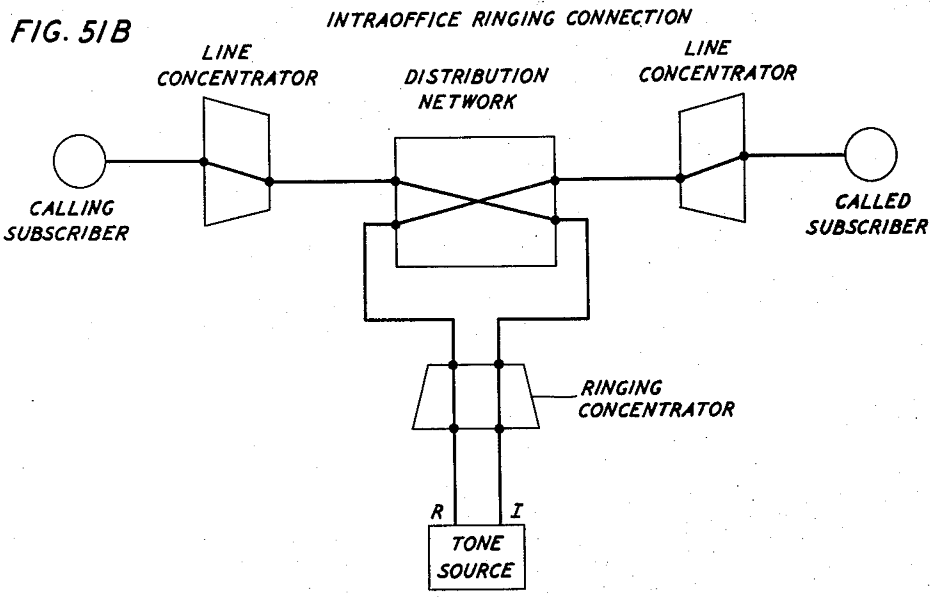
Figure 51C:
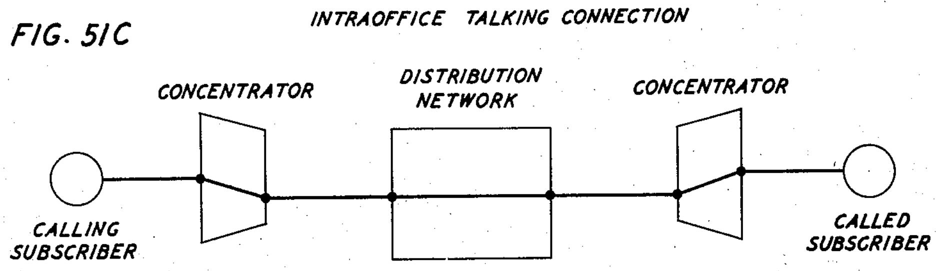
Figure 52A:
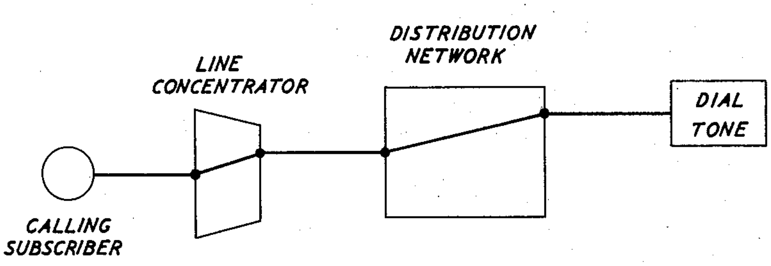
Fig. 52 is a schematic representation of the various connections through the distribution and concentrator networks during outgoing calls to a distant office.
Figure 52B:
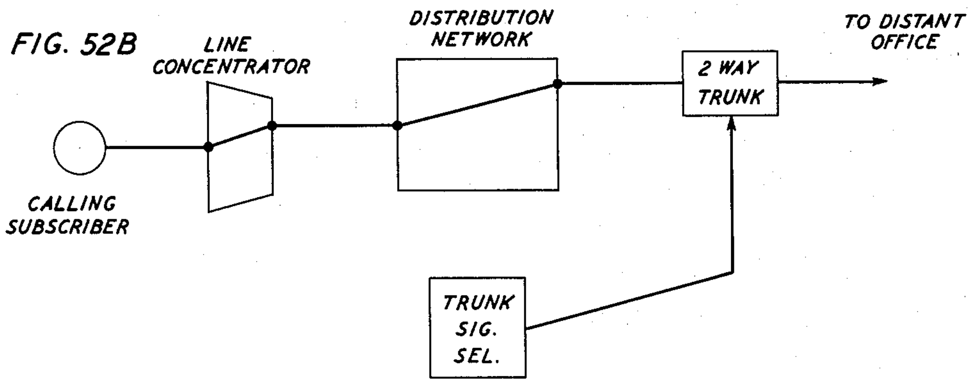
Figure 52C:
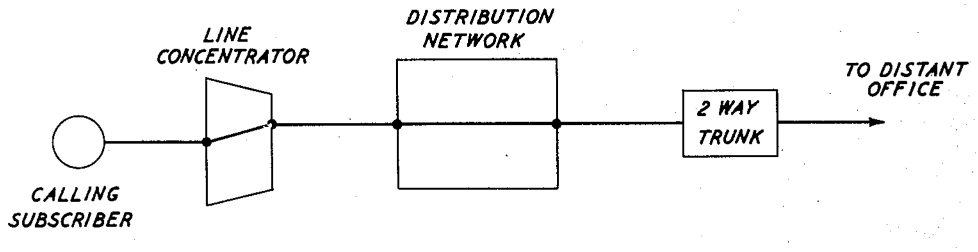
Figure 53A:
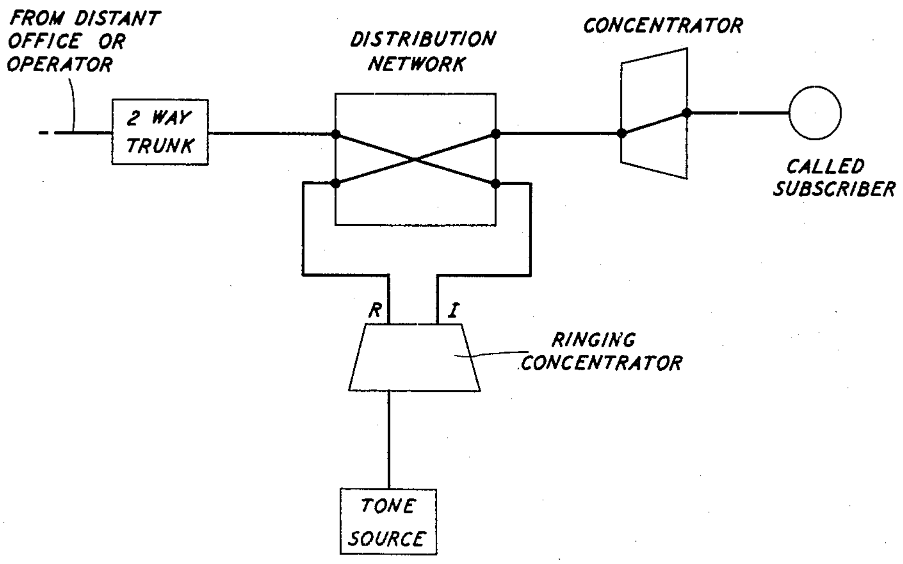
Fig. 53 is a schematic representation of the distribution and concentrator network connections during an incoming call from a distant office.

Progress through the office will be explained in reference to the time diagrams, Fig. 19, the operational sequence chart, Figs. 20 through 50, and the call progress block diagrams of Figs. 51 through 53. The functions described in the sequence charts are implemented in our invention by means of the previously enumerated program orders. Certain of the sequence chart work operations require several 2.5 microsecond operating cycles of Common Control while others are completed in one cycle. The symbolic language of the charts is obvious from the accompanying discussion.

We shall first examine the progress of and explain in detail an intraoffice call originating at the subscriber's station having the local office directory number 23-4-0925 and directed to the local office subscriber station having the directory number 23-4-1209. Station 1209 is the fourth party on a six-party line. Following this, we will proceed to a discussion of interoffice calls. In the typical local office described in this invention, the complete directory number comprises seven digits wherein the first three digits define the local office and the last four digits define the subscriber's station within that office. The connections required to complete an intraoffice call are shown in Figs. 51A through 51C.

*100 millisecond supervisory scan*

Figure 19:
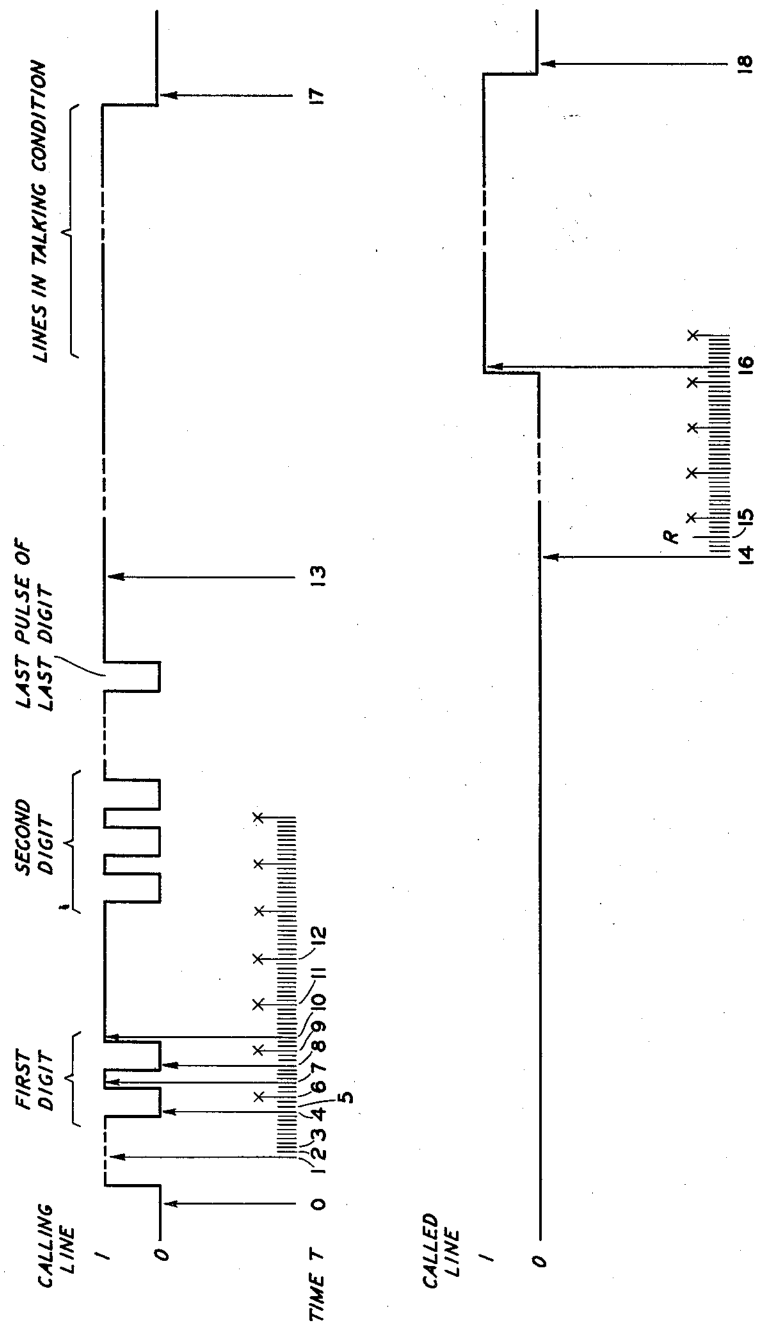
Fig. 19 is a time diagram with regard to an illustrative call.

Our call originates with a service request from station 0925 which is detected at time T1 in Fig. 19, during the supervisory scan of subscribers' lines and trunks.

The supervisory scan of lines and trunks is arranged to interrogate each line and trunk in the office for service requests and disconnect signals at least once every 100 milliseconds.

Figure 20:
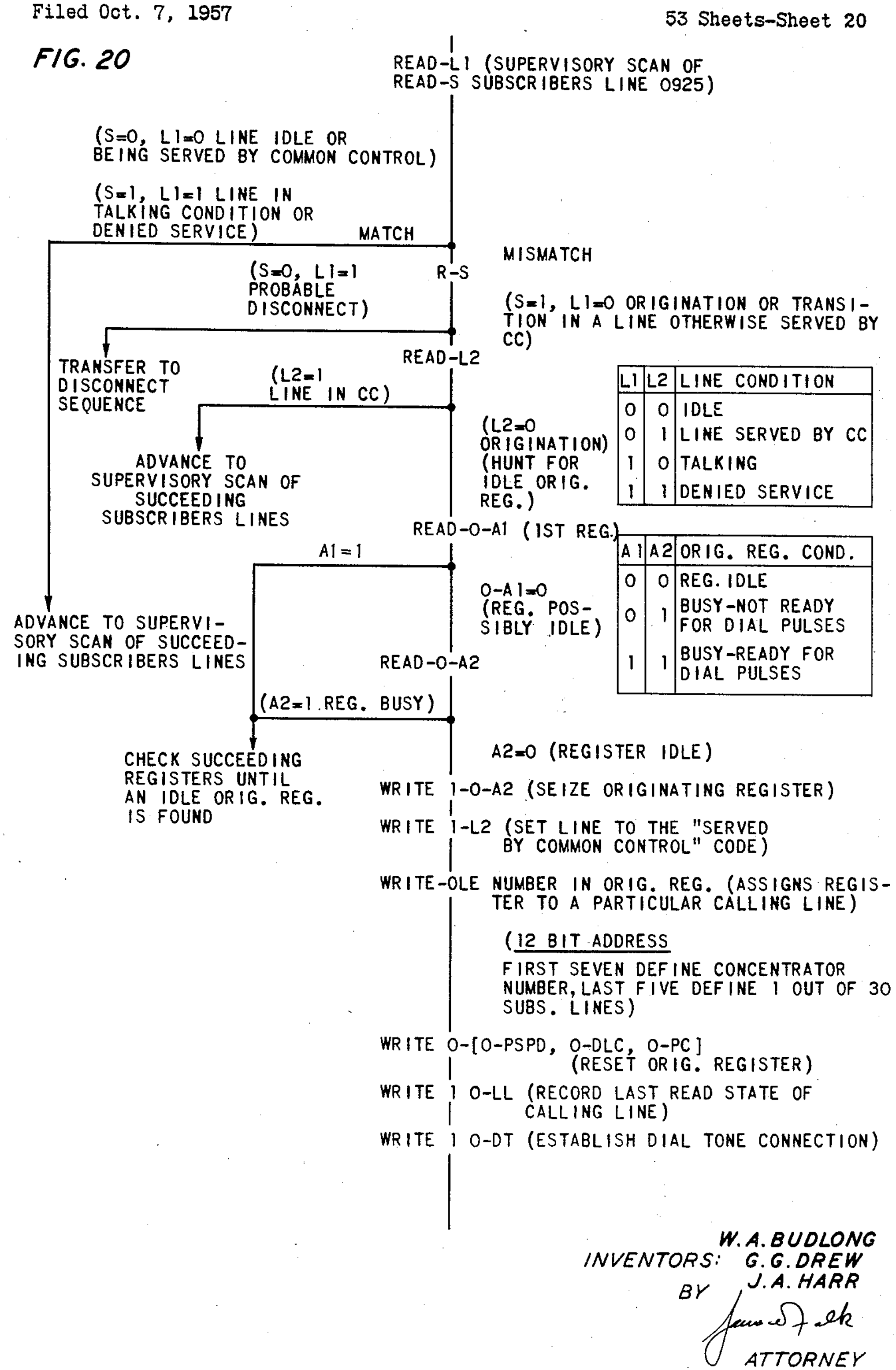

As indicated in Fig. 20, the states of the Scanner and the L1 spot associated with the station to which the Scanner is addressed are compared. If a match condition exists between the Scanner and the L1 spot, the program advances to the supervisory scan of succeeding subscribers' lines as, if both are in the "0" state, the interrogated line is either idle or being served by Common Control, and if both are in the "1" state, the line is in talking condition. In either event, a request for service or disconnect is not indicated.

If the scanned line is in the "0" state and the L1 spot in the "1" state, a disconnect is indicated and the program transfers to a disconnect sequence, which will be explained in detail with respect to the termination of our call.

When the scanned line is in the "1" state and the L1 spot in the "0" state, the subscriber is requesting service or is otherwise served by the Common Control and the L2 spot must be read to differentiate between these possibilities. If the L2 spot is in the "1" state, we have the L1–L2 code combination which indicates that the line is served elsewhere by Common Control. If the L2 spot is also in the "0" state, the L1 and L2 spots indicate that the line was previously idle; therefore, with the Scanner in the "1" state, a request for service is indicated.

*Seizing an Originating Register*

An originating call requires the services of an Originating Register which, as previously mentioned, consists of a group of spots in the Barrier Grid Store. Accordingly, we sequentially read the activity spots O–A1 and O–A2, of the Originating Registers until a Register is found having both activity spots in the "0" state, indicating that the Register is idle. As shown in Fig. 20, if the O–A1 spot is in the "1" state, the Register is indicated busy and some succeeding Register must be used. However, if the O–A1 spot is in the "0" state, the A2 spot must be interrogated and, if the latter is in the "1" state, again the Register is busy and succeeding Registers must be checked.

Having found an idle Originating Register, we write a "1" in the O–A2 spot to seize the Originating Register. The combination code wherein the O–A1 equals 0 and the O–A2 equals 1 indicates that the Originating Register is busy but not yet ready to detect dial pulses.

A "1" is written in the L2 spot assigned to the calling subscriber to place the L1 and L2 spots in the "0" and "1" states, respectively, to indicate that the line is being served by Common Control. The combinational codes for the L1 and L2 spots and the states they represent are shown in the upper table at the right side of Fig. 20.

The Originating Register is assigned to the particular calling line by writing the originating line equipment number of the calling line in the O–OLE0 through O–OLE11 spots. The first seven bits of this address define the particular concentrator to which the calling subscriber is connected and the last five bits define the particular subscriber out of the possible thirty subscribers connected to the line side of the concentrator.

We write a "0" in the O–PSPD spot to start the permanent signal partial dialing timer; write "0's" in the O–DLC and O–PC spot groups to prepare the Originating Register for the detection of dial pulses; write a "1" in the O–LL spot to record the last-read state of the calling line; and write a "1" in the O–DT spot to indicate that a dial tone connection is to be established.

*Seizing the Network*

Having established the initial conditions in the Originating Register, the Network Register activity spot, N–A, is interrogated to determine whether the Network is idle or busy.

The Network Register is assigned to both the Distribution Network and the Concentrator Networks. Commands to the Concentrator Networks and the Distribution Network may be assigned simultaneously or serially. If orders to the Concentrator and Distribution Networks are transmitted on a serial basis, transmission of succeeding orders always awaits completion of a preceding order and orders to the Concentrator are never transmitted while a Distribution Network job is in progress, or vice versa.

Figure 21:
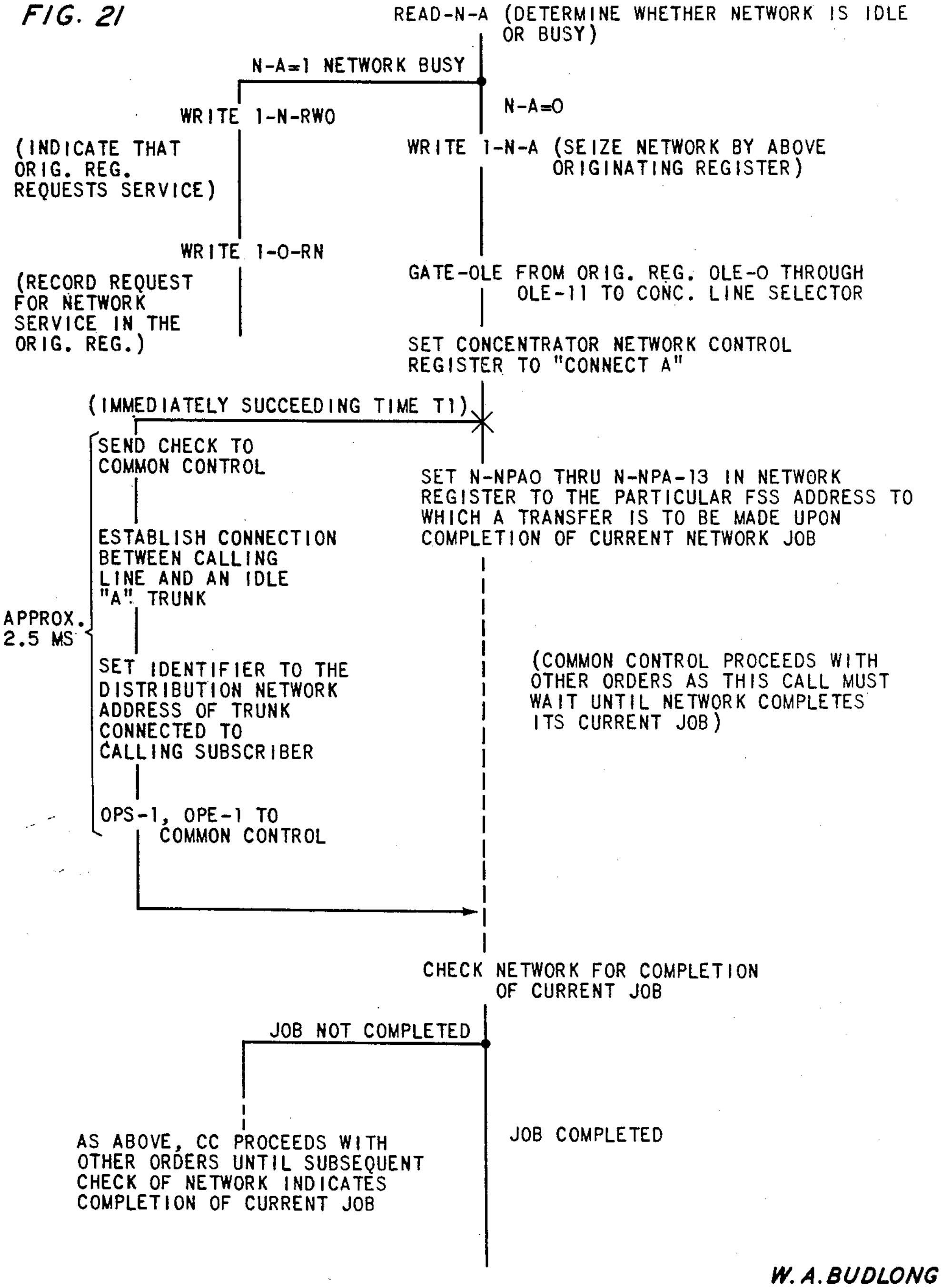

If, as shown in Fig. 21, the N–A spot is found to be in the "1" state, the Network is busy and our call must await completion of the job currently in process in the Network. To establish a request for Network service, we write a "1" in the Network Register at the N–RW0 spot to indicate a request waiting from the Originating Register and we write a "1" in the Originating Register at the O–RN spot to indicate that this particular Register is awaiting the services of the Network. We will assume throughout our discussion that the Network is idle and ready to respond to commands. The Network is seized by writing a "1" in the N–A spot.

*Establishing a path through the Concentrator*

The line side of the Concentrator is marked at the address of the calling line by gating the originating line equipment number from the OLE spots of the Originating Register to the Concentrator Line Selector Register 435 and thence to the Concentrator Line Selector 211. A connection through the Concentrator between the marked calling line and an idle trunk from the Concentrator to the A side of the Distribution Network is ordered by setting the Concentrator Network Control Register 516 to the Connect A condition.

At the point marked X, in Fig. 21, immediately succeeding the Connect A order, we are at a point in time just succeeding time T1 in Fig. 19. At this point, the Concentrator Sequence Control undertakes action to establish the desired connection through the Concentrator and, since Concentrator action is slow compared to Common Control actions, Common Control proceeds with orders pertaining to other calls as further action with regard to our illustrative call must await completion of the connection through the Concentrator.

The program orders the setting of the Network Program address, N–NPA0 through N–NPA13 spots, in the Network Register to the particular Flying Spot Store address to which a transfer is to be made upon completion of the current Network job. Accordingly, when the Concentrator connection is established, further actions with regard to this call may be undertaken.

Concentrator Sequence Control transmits a check signal back to the Concentrator Network Control Register 516 to indicate receipt of an order and proceeds independently of common control to establish a concentrator connection between the marked calling line and an idle trunk to the A side of the Distribution Network. Having established the connection, the Concentrator Trunk Identifier is set to the address of the particular trunk connected to the calling subscriber and the Operation Successful and Operation Ended signals are transmitted to Common Control through AND gate 453.

From time to time the program causes Common Control to question whether or not the current Network job has been completed. Since the Distribution Network and Concentrator Networks are taken as one for the purposes of job assignments, the Operation Ended conductors from the Concentrator Sequence Control 202 and from the Distribution Networks Sequence Control 302 are both interrogated to detect completion of current Network jobs. If the current job has not been completed at the time a check for completion has been made, Common Control again proceeds with other work operations until a subsequent check of the Network indicates completion of the current job, at which time the Flying Spot Store transfers to the address previously established in the Network Register N–NPA spots. Before proceeding further, a check is made to determine whether or not the Concentrator Operation Successful signal has been received. If an OPS signal is not received, a further attempt is made to establish the desired connection through the Concentrator. However, if the Operation Successful signal is present, we are ready to proceed with the operations necesary to establish the connection in the Distribution Network between the trunk to which the calling subscriber is connected and an idle dial tone trunk.

*Seizing an idle dial tone trunk*

Figure 22:
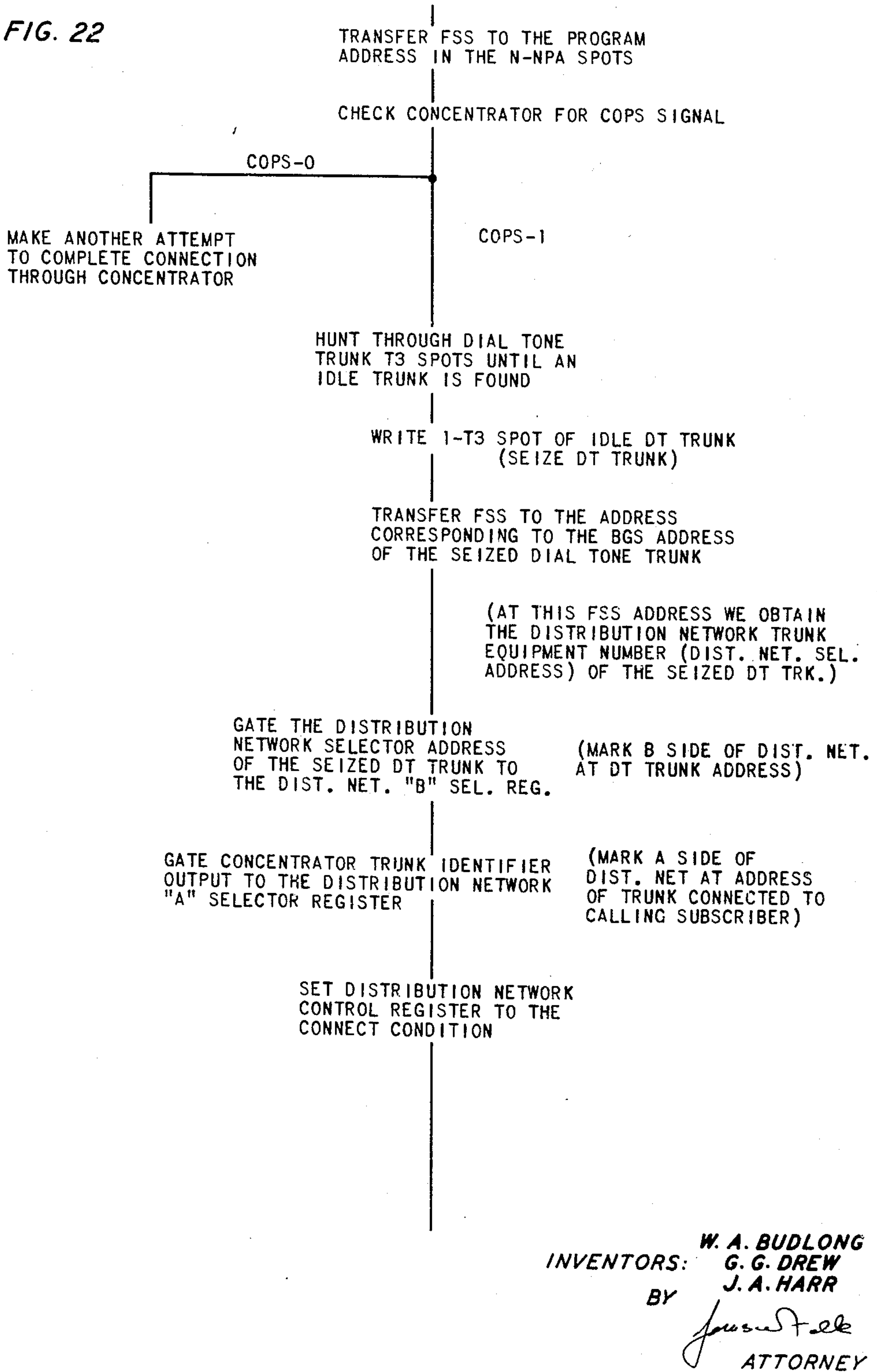

Dial tone trunks are assigned T3 spots in the Barrier Grid Store as they form a traffic group; however, these trunks are not assigned T1 and T2 spots as the supervisory state of the trunk cannot be changed by actions other than Common Control establishing connection thereto. The T3 spots assigned to the dial tone trunks are sequentially interrogated, as indicated in Fig. 22, until an idle trunk is found as indicated by the T3 spot being in the "0" state. Accordingly, we write a "1" in the T3 spot to seize the idle dial tone trunk.

*Establishing the dial tone connection*

We must now transfer the Flying Spot Store to the address corresponding to the Barrier Grid Store address of the seized dial tone trunk. For example, if the T3 spot of the seized trunk is, as shown in Fig. 18, at the Barrier Grid Store address X125Y64, the Flying Spot Store is also addressed to the address X125Y64. At this point, we obtain the Distribution Network trunk equipment number of the seized dial tone trunk. This address is the eleven-bit address which must be set in the Distribution Network Trunk Selector to mark the seized dial tone trunk. The address obtained from the Flying Spot Store is gated to the Distribution Network B trunk Selector Register to mark the Distribution Network at the dial tone trunk address.

The A side of the Distribution Network is marked at the address of the Concentrator trunk connected to the calling subscriber by gating the output of the Concentrator Trunk Identifier to the Distribution Network A Selector Register.

We have now marked the A and B sides of the Network in preparation for establishing a call therethrough which is commanded by setting the Distribution Network Control Register 538 to the Connect condition.

Figure 23:
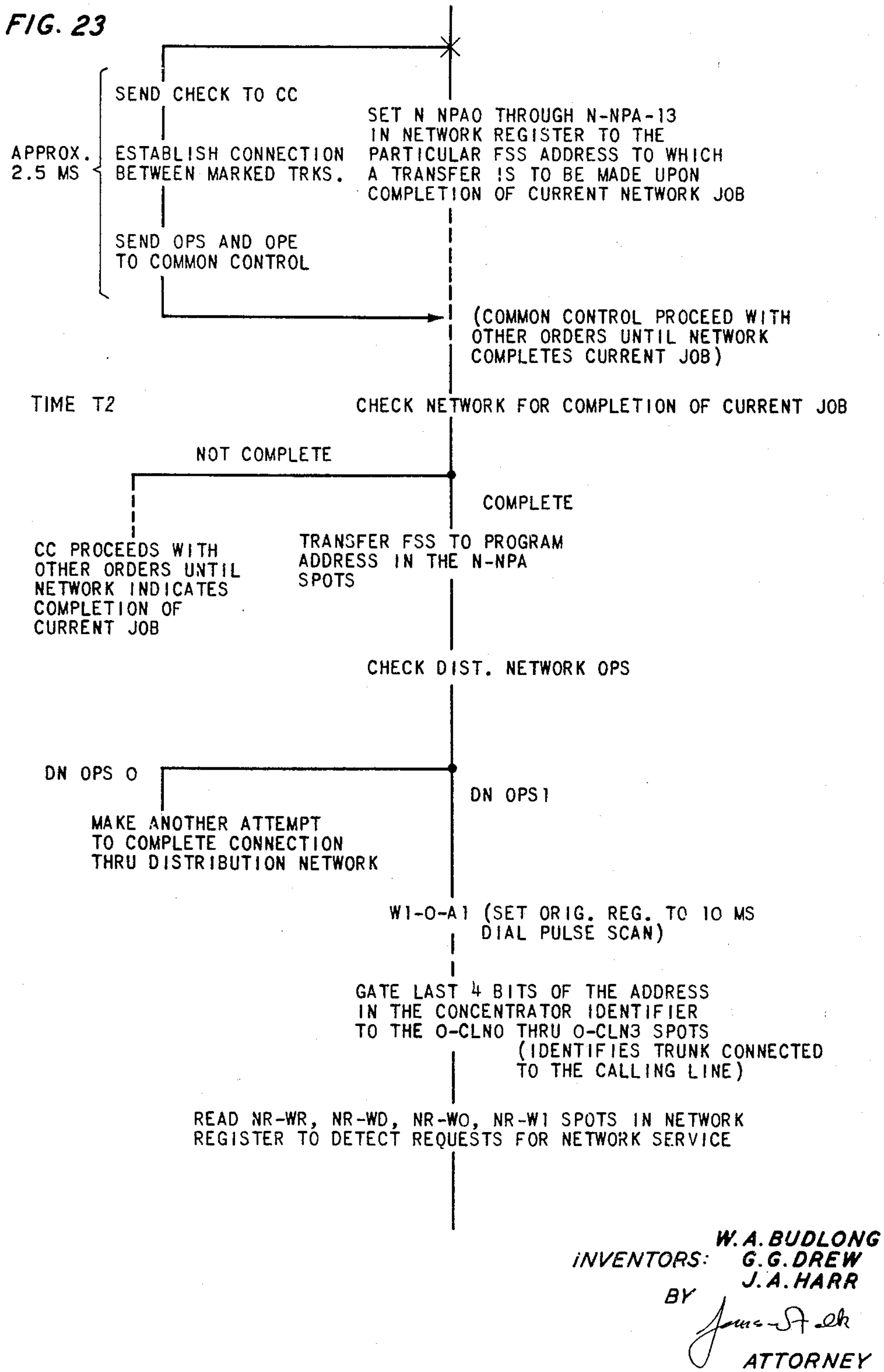

The slow Network sequence, shown in Fig. 23, is undertaken, the Network Register NPA spots are set to the Flying Spot Store address to which a transfer is to be made upon completion of the current Network job and Common Control proceeds with other orders until the Network completes its current job.

The Network sends the check signal back to Common Control to acknowledge receipt of an order, proceeds to establish a connection between the marked trunks and subsequently transmits Operation Successful and Operation Ended signals back to Common Control through AND gate 454.

Again Common Control from time to time checks the Network for a completion of the current job, as previously described, and upon a completed indication, the Flying Spot Store transfers to the program address obtained from the NPA spots in the Network Register. The Distribution Network response is checked to make sure that an Operation Successful signal was received and, if present, succeeding actions with regard to this call are undertaken. If the Operation Successful signal is absent, further attempts are made to establish the connection through the Distribution Network.

We have reached time T2 in Fig. 19, the dial tone connection through the Network, as shown in Fig. 51A, has been established, and provisions must be made to scan the subscriber's line once every 10 milliseconds to ensure detection of all dial pulses. Accordingly, the Originating Register is set to the 10 millisecond dial pulse scan by writing a "1" in the O–A1 spot. The A1 and A2 spots of the Originating Register are now both in the "1" state, indicating that the detection of dial pulses is to be undertaken.

The equipment number or level of the Concentrator trunk connected to the calling subscriber is set into the Originating Register O–CLN0 through O–CLN3 spots for future reference. This information is obtained from the last four bits contained in the Concentrator Trunk Identifier.

*Ten millisecond dial pulse scan*

Figure 24:
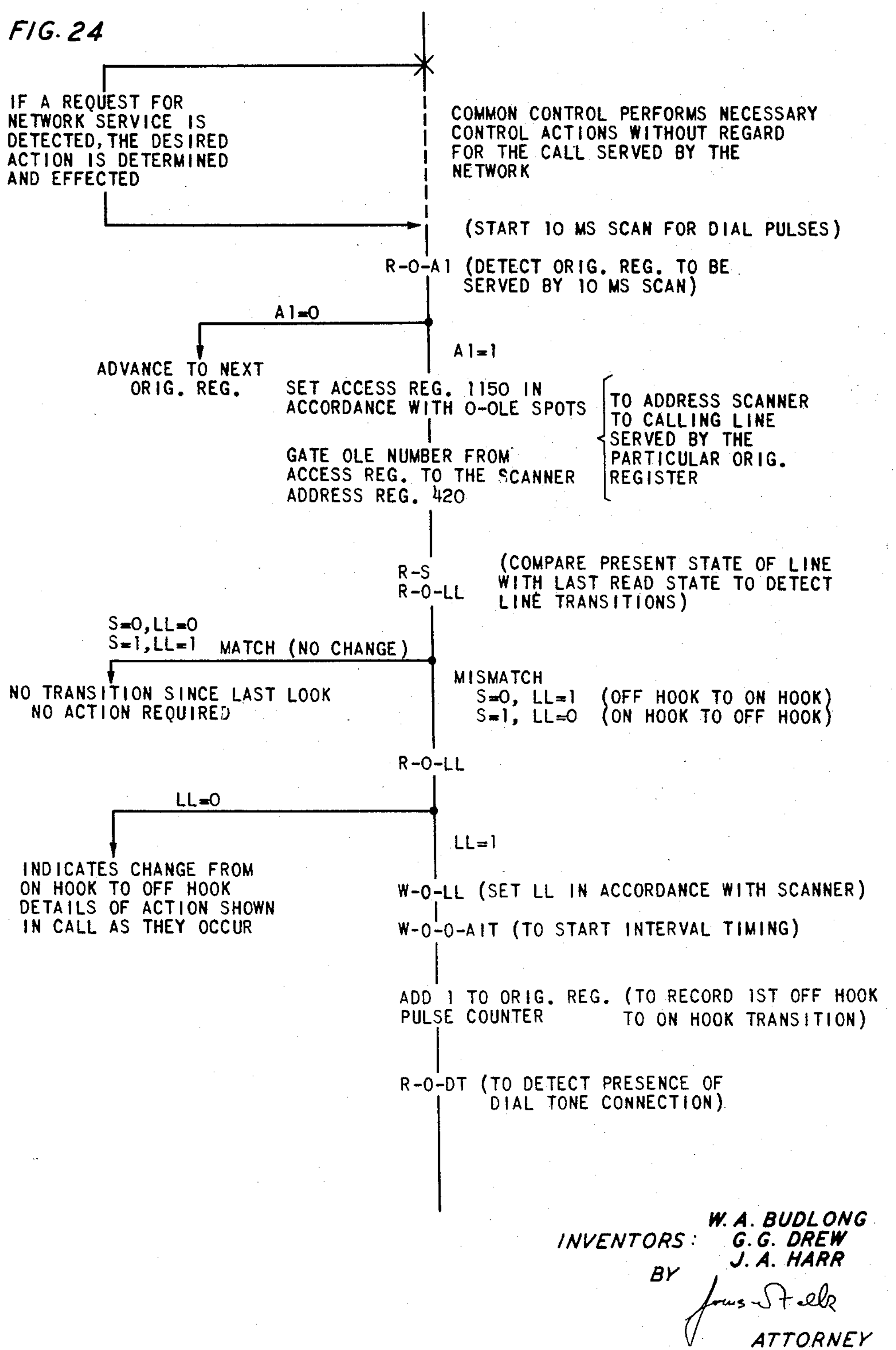
Figure 25:
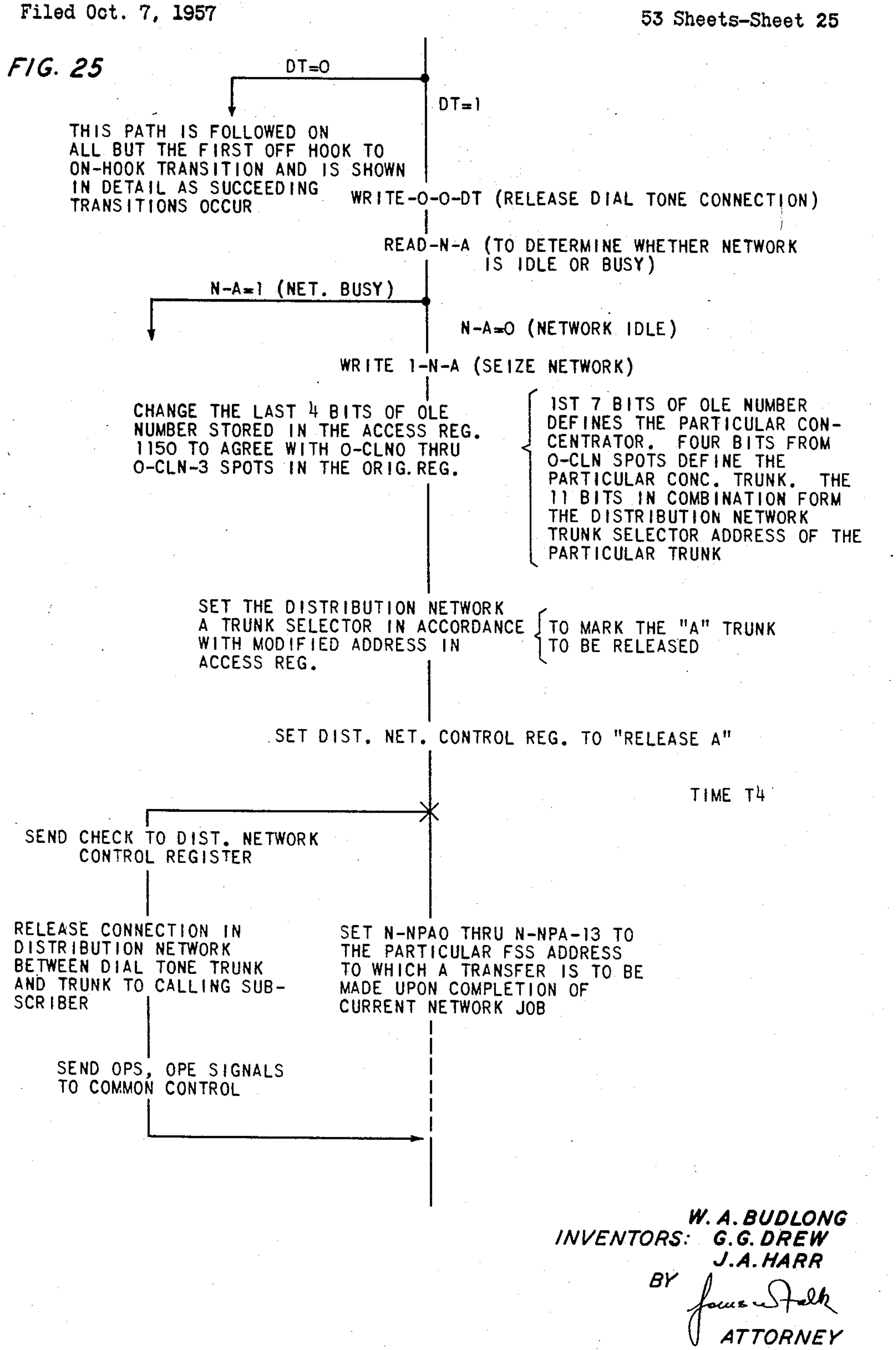

To detect Originating Registers to be served by the 10-millisecond scan, the A1 spot in each Originating Register is read as indicated in Fig. 24. If the A1 spot is in the "0" state, detection of dial pulses is not under way and Common Control advances to read the A1 spot of the succeeding Originating Register. However, if the A1 spot is equal to "1," dial pulses are to be detected at the Scanner address found in the originating line equipment spots of the Originating Register. The Scanner address is read from the O–OLE0 through O–OLE11 spots to the Access Register 1150 and thence to the Scanner Address Register 420. The Scanner is thereby adressed to the calling line served by the subject Originating Register.

At this point, the state of the Scanner and the state of the Last Look spot in the Originating Register are compared to detect changes in supervisory state of the calling line. If the states of the Scanner output and the Last Look spot match as at time T3, no transition has occurred since the last look and no action is required with respect to this line. The system will then proceed to serve the next Originating Register.

If a mismatch occurs, as at time T4, there has been a transition from off-hook to on-hook or vice versa since the last time the line was scanned. The above types of transitions are distinguished by reading the Last Look spot in the Originating Register. If the Last Look spot is in the "0" state, a transition from on-hook to off-hook is indicated and the details of actions under these conditions are shown later as they occur in the progress of our illustrative call.

If the Last Look spot is in the "1" state, the line has experienced a transition from off-hook to on-hook, indicating the start of a dial pulse or the abandonment of a call. (See Fig. 19.)

It is assumed as a starting point that this is a dial transition and the Originating Register is set accordingly. The Originating Register is brought up to date by writing a "0" in the Last Look spot to set it in accordance with the Scanner output; a "0" is written in the A1T spot of the Originating Register to start the abandoned call interdigital timing sequence; and the pulse counter is incremented by 1 to record the first off-hook to on-hook transition.

*Release of dial tone connection (Fig. 25)*

Having detected a dial transition, the DT spot in the Originating Register is read to determine whether or not a dial tone connection exists. On all but the first off-hook to on-hook transition the DT spot will be in the "0" state and a path which is shown in detail later in the progress of our call is followed. However, on the occurrence of the first transition from off-hook to on-hook, the dial tone spot is in its "1" state and accordingly the dial tone connection must be destroyed.

The dial tone spot is reset to its "0" state to indicate that the dial tone connection will be destroyed and the activity spot of the Network Register is read to determine whether the Network is idle or busy. Assuming the Network to be idle, the N–A spot will be equal to 0 and Network actions in connection with the release of dial tone may be started. The Network is seized by writing a "1" in the Network Register activity spot.

The dial tone connection through the Distribution Network is destroyed by marking the concentrator trunk connected to the calling subscriber and subsequently transmitting a Release A order to the Distribution Network Sequence Control. At this time, the twelve-bit address in the Access Register is the Scanner address of the calling subscriber. The first seven bits of the Scanner address define the particular concentrator to which the calling subscriber is connected and the remaining five bits define the subscriber's line as one out of thirty possible lines connected to that concentrator.

The trunk address to be marked comprises the same seven bits found in the Scanner address to identify the particular concentrator and the last four bits identify the one trunk connected to the calling subscriber out of the ten possible trunks connected to that particular concentrator. Accordingly, the bits 8 through 11 of the originating line equipment number stored in the Access Register 1150 are changed to agree with the concentrator level number found in the Originating Register O–CLN0 through O–CLN3 spots. The A trunk connected to the calling subscriber is marked at the Distribution Network by setting the Distribution Network A Trunk Selector in accordance with the eleven-bit modified address in the Access Register.

Network action is initiated by setting the Distribution Network Control Register 538 to the Release A code. Again, at the point marked X in Fig. 25, the Network proceeds with the task of destroying the connection between the dial tone trunk and the concentrator trunk connected to the calling subscriber.

Immediately after sending the commands to the Distribution Network, the N–NPA0 through N–NPA13 spots in the Network Register are set to the particular Flying Spot Store address to which a transfer is to be made upon completion of the current job in the Network and Common Control then proceeds with other necessary work operations while awaiting completion of the current Network job.

Simultaneously, the Network Sequence Control sends back a check signal to the Distribution Network Control Register to acknowledge receipt of a command and then, in due time, releases the connection through the Distribution Network between the dial tone trunk and the concentrator trunk connected to the calling subscriber. Upon successful completion of the order, the Operation Successful signal is transmitted and a short time thereafter the Operation Ended signal is also transmitted to Common Control.

From time to time Common Control checks to determine whether or not the Network has completed its job. Assuming completion of the current job, the Flying Spot Store transfers to the address stored in the N–NPA spots of the Network Register.

Once the dial tone connection has been destroyed, the T3 spot associated with that particular dial tone connection must be reset to its "0" state. A process of elimination is employed to determine which of the dial tone trunks is to be released. The Distribution Network address of the trunk released is gated from the Distribution Network B Identifier to the Memory and Match Register 743.

The Flying Spot Store is then sequentially directed to the Translation addresses assigned to the T3 spots of the dial tone trunks. The word read from Translation is a Selector address such as was gated from the B Identifier to the Memory and Match Register. The Translation word is compared with the address in the Memory and Match Register and, upon the occurrence of a match, the particular dial tone trunk to be released is identified.

Figure 26:
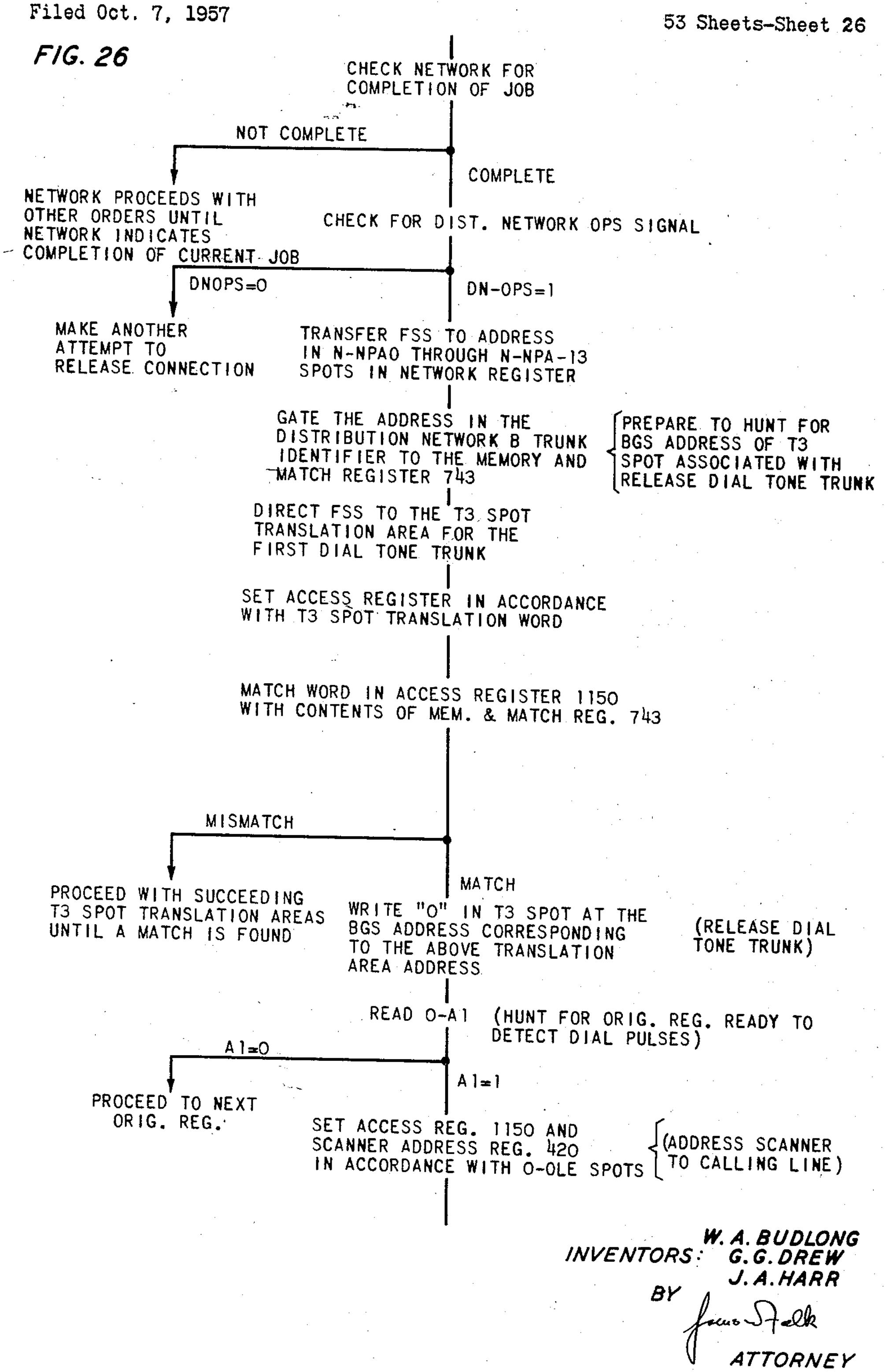

Upon occurrence of a match of the information from the Memory and Match Register obtained from the Identifier and the Translation word as indicated in Fig. 26, the Barrier Grid Store is addressed to the T3 spot whose address is the same as the address of the matching Translation word. A "0" is written at this Barrier Grid Store address to reset the particular T3 spot.

*Pulse counting and recording*

With reference to the diagram of Fig. 19, the dial tone connection is destroyed some time intermediate to the points marked T4 and T5. At T5 a second 10-millisecond dial pulse scan occurs; however, at this point the states of the Scanner and the Last Look spot agree and the scan advances to serve succeeding subscribers' lines. As shown in Fig. 19, several 10-millisecond scans occur before the transition from on-hook to off-hook is noted; however, during this period in which no transition occurs, a 100-millisecond timing scan and a 100-millisecond supervisory scan occur. The 100-millisecond supervisory scan finds the Scanner in the "0" state, the L1 spot in the "1" state and the L2 spot in the "1" spot to indicate that this Originating Register is being served by the 10-millisecond dial pulse scan and action under the 100-millisecond supervisory scan is to be ignored. The 100-millisecond timing scan which occurs within a small period of time of the 100-millisecond supervisory scan successively interrogates the A1 spots in the Originating Registers. If, as in the case of our illustrative call, the Originating Register A1 spot is in its "1" state, the AIT spot in that Register is read. If, as in our case at time T6, the AIT spot is "0," it is changed to read a "1" and succeeding Originating Registers are served. If the AIT spot is equal to 1, a time-out has occurred and a more complex sequence, which will be explained in detail at the end of the first digit, must be followed.

Common Control actions with regard to other calls in the system and with regard to 10-millisecond scans of our calling line occur between time T6 and recognition of the transition from on-hook to off-hook at time T7.

Figure 27:
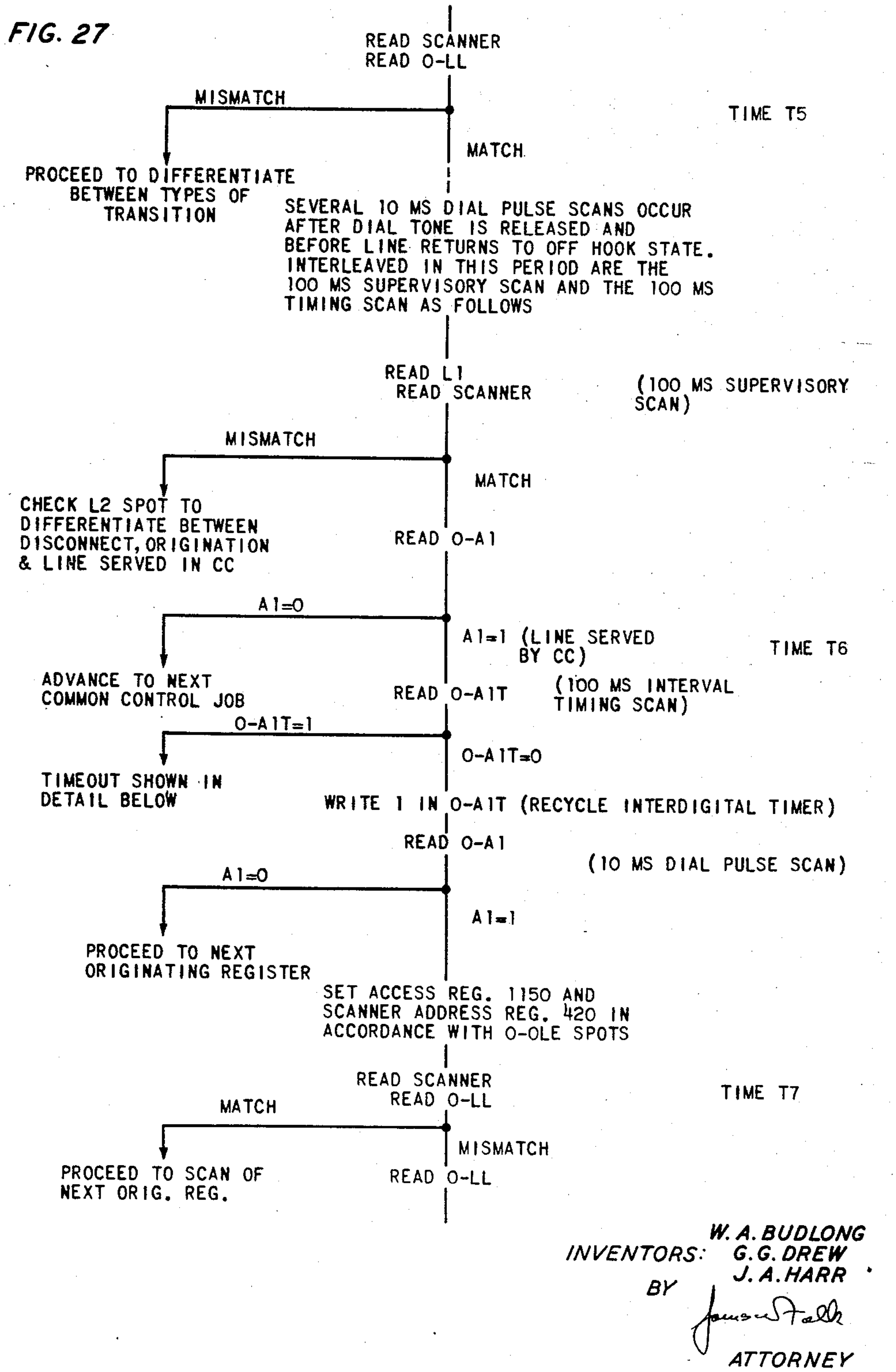

As in preceding dial pulse scans, the A1 spot is read and if it equals 0, the program advances to the next Originating Register. However, at time T7, having found the Originating Register activity spot in the "1" state, the Access Register 1150, as indicated in Fig. 27, is set in accordance with the originating line equipment spots in the Originating Register and subsequently the Scanner Address Register 420 is set in accordance with the originating line equipment number.

The states of the Scanner and the Last Look spot are compared. Had a match condition occurred as in the several preceding cycles, the program would have transferred to serve other lines. However, since the state of the Scanner and the Last Look spot do not agree, the Last Look spot must be read to determine whether the transition is from off-hook to on-hook or vice versa. The Last Look spot is read and found to equal "0"; therefore, this is a transition from on-hook to off-hook and, although actions with respect to timing must be undertaken, the pulse counter will not be incremented.

Figure 28:
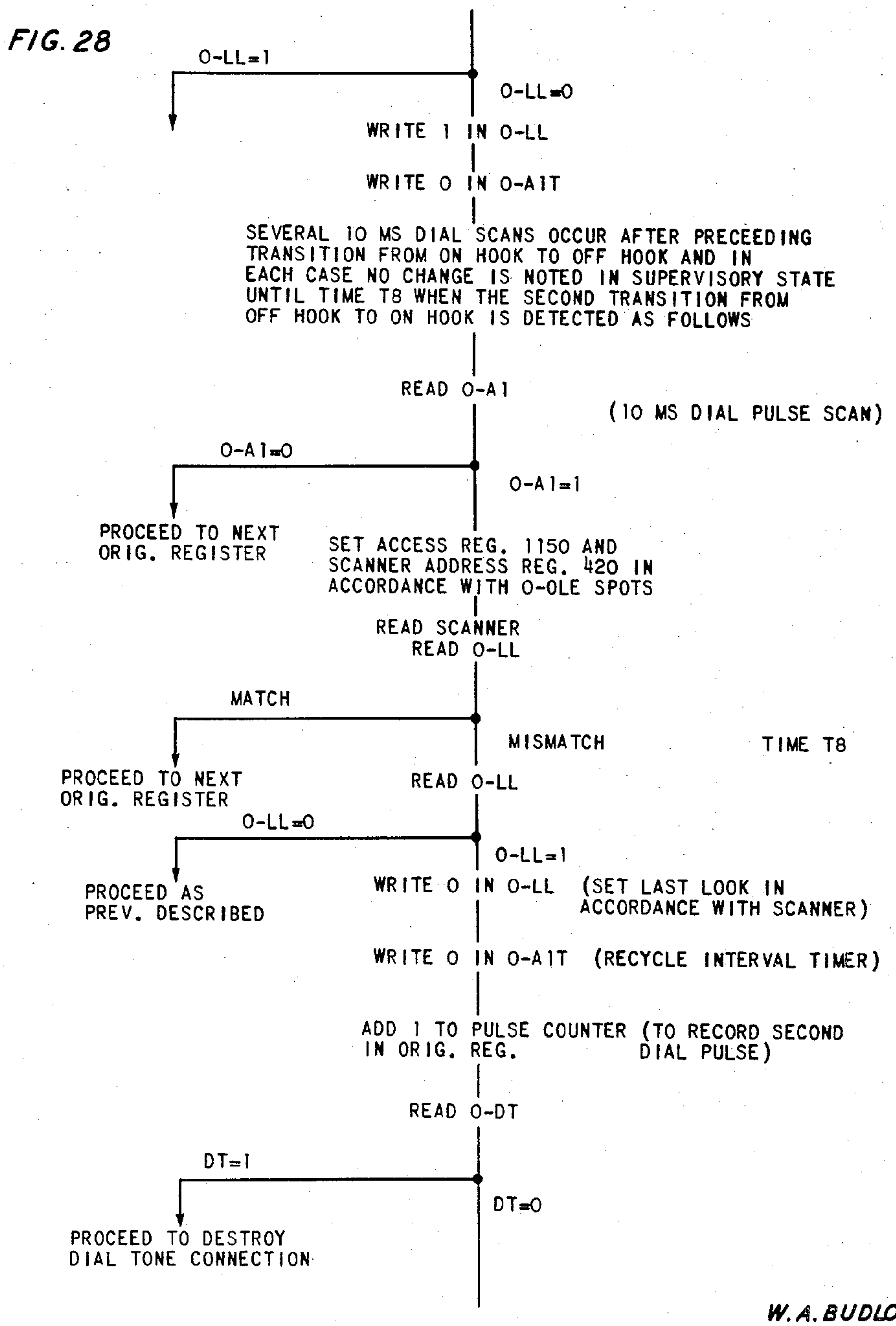

A "1" is written in the Last Look spot as indicated in Fig. 28, to bring it up to date and a "0" is written in the AIT spot of the Originating Register to recycle the interdigital timer.

For several succeeding dial pulse scans between times T7 and T8, no change in supervisory state of the calling subscriber's line will be noted and each time Common Control will advance to serve other lines without any action with regard to the particular line of our example.

At time T8, the Scanner is addressed to the calling subscriber's line and its state compared with the Last Look spot in the Originating Register. At this point a mismatch is found and interrogation of the Last Look spot indicates a transition from off-hook to on-hook to mark the beginning of the second dial pulse. A "0" is written in the Last Look spot to bring it in accordance with the Scanner; a "0" is written in the AIT spot to recycle the interdigital timer; the pulse counter is incremented by 1 to record the second dial pulse; and the dial tone spot is read to determine whether or not this is the first dial transition. Having found the DT spot in the Originating Register in the "0" state, it is indicated that the dial tone connection has been destroyed and that actions with regard to this call may proceed.

Between times T8 and T11, the action described with respect to the period of time immediately after time T5 and time T7 is repeated. During this period many 10-millisecond dial pulse scans interrogate the calling line without noting any change until time T10, at which time an on-hook to off-hook transition is noted and actions similar to those at time T7 are completed. Also at time T9, as at time T6, a 100-millisecond supervisory scan and a 100-millisecond timing scan are employed as previously described.

Figure 29:
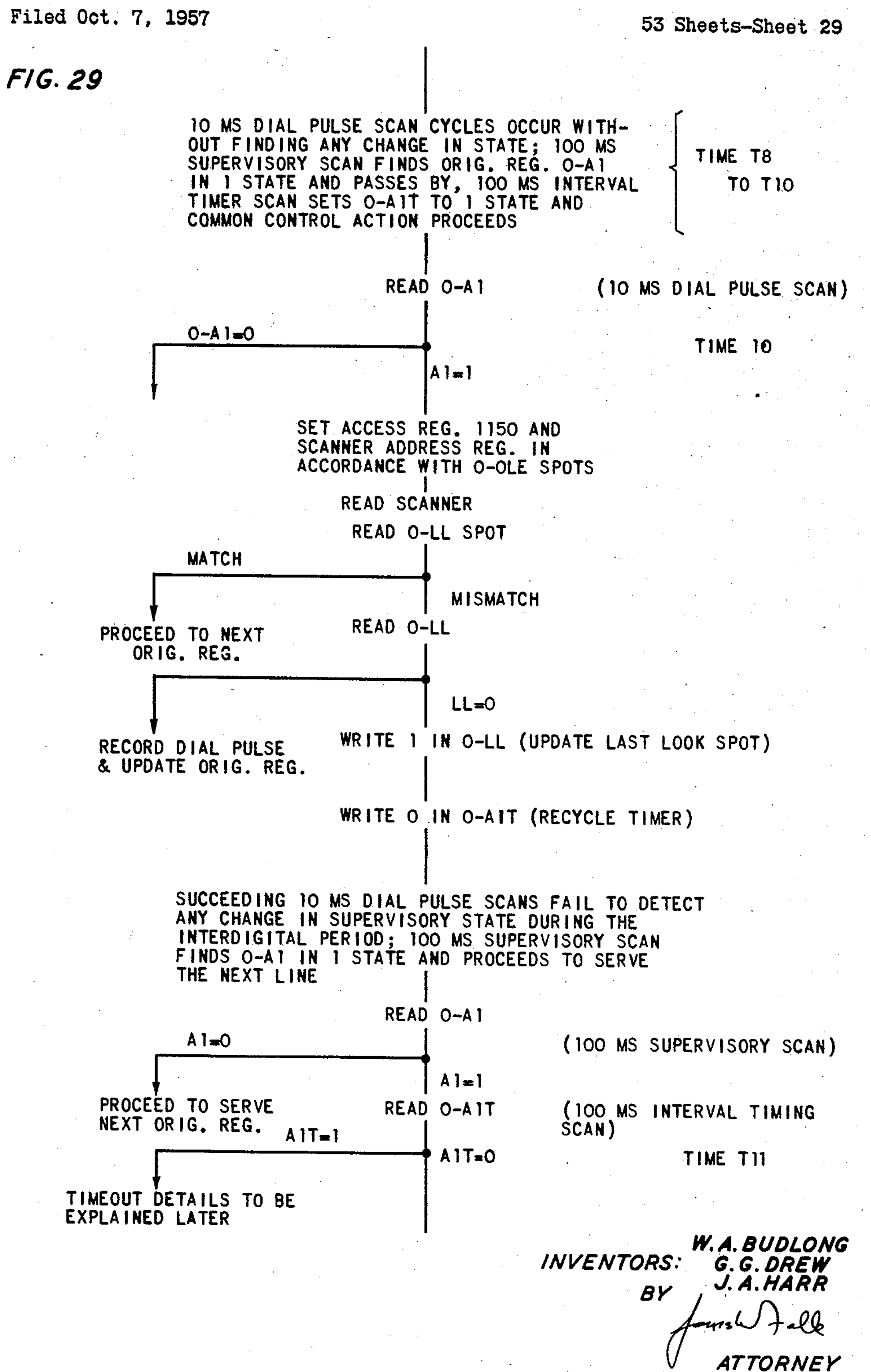
Figure 30:
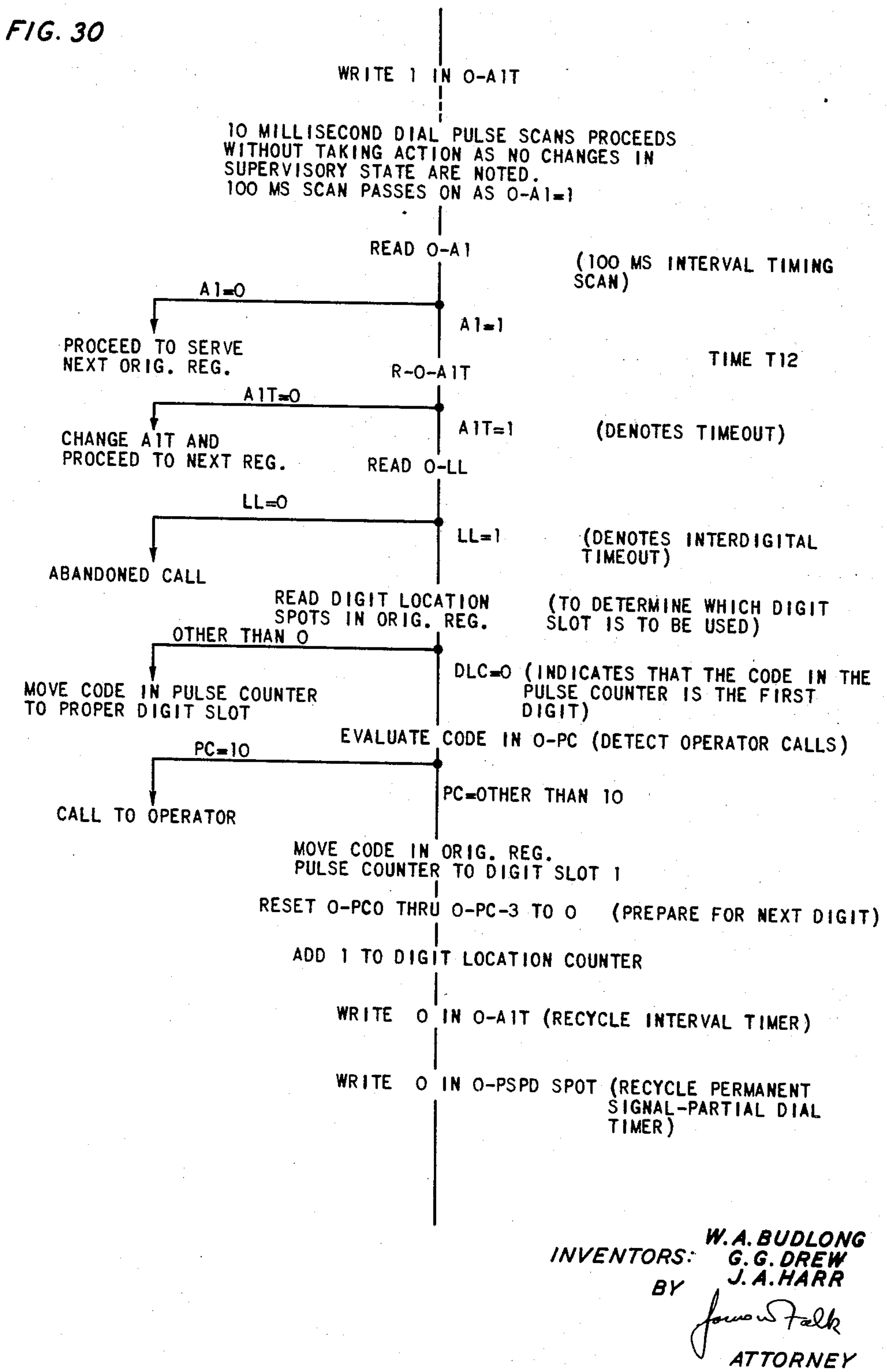

With reference to Figs. 19 and 29, the calling subscriber's line will be interrogated several times by the 10-millisecond dial pulse scan without noting any change from the last recorded off-hook condition. At time T11, the 100-millisecond supervisory scan will occur and, as previously indicated, with the A1 spot of the Originating Registering in the "1" state, the results of the supervisory scan will be ignored. Also at a point in time near T11, a 100-millisecond timing scan will occur, at which time the A1 spot of the Originating Register serving our calling line will be found in the "1" state. Accordingly, the AIT spot of this Register will be read and, if found in the "1" state, a time-out is indicated as will be shown later; however, assuming the AIT spot to be in the "0" state, action is taken to write "1" in the AIT spot and then proceed with other necessary system actions.

*Interdigital time-out and recording first dialed digit*

Succeeding 10-millisecond dial pulse scans and supervisory scans occur at times between T11 and T12; at time T12 a 100-millisecond interval timing scan occurs. At this time, the A1 spot is in the "1" state and the AIT spot is in the "1" spot, indicating that a dial transition has not occurred since the last 100-millisecond interval scan. Accordingly, the Last Look spot is read to distinguish between an abandoned call and an interdigital time-out. If the Last Look spot was in the "0" state, this would indicate an abandoned call and action would be taken to destroy the attendant concentrator connection, to restore the L1 and L2 of the calling line and to release the originating register. Since the Last Look spot is found to be in the "1" state, an interdigital time-out is indicated.

Calls to the operator are detected by examining the first digit to determine whether it is "10" or other than "10." If the first digit is "10," a call to the operator is indicated and a sequence must be originated to establish a connection through the Distribution Network between the calling subscriber and the operator. However, if as in the illustrative call the first digit is other than "10," action must be taken to transfer the information in the pulse counter to the proper digit storage slot in the originating Register, to update the digit location counter so that the next digit stored in the pulse counter will be properly transferred and to reset the pulse counter in preparation for the next digit.

In this instance, the first digit is moved from the pulse counter to digit slot 1 and the pulse counter is reset to "0." The digit location counter is incremented by 1 to indicate that the next digit registered in the pulse counter will be the second digit, a "0" is written in the AIT spot to recycle the interdigital timer, and a "0" is written in the O–PSPD spot to reset the permanent signal partial dialing timer.

*Recording second and third digits*

The second and third digits are detected under the 10-millisecond dial pulse scan, as was the first digit, and are sequentially moved to the respective digit storage slots. No evaluation of the dialed digits is necessary after the second digit as operator calls have already been distinguished and service codes require three digits.

*Action after third digit is registered (Fig. 31)*

At the end of the third digit, action is undertaken to determine whether the dialed call is to be an intraoffice, an interoffice, or a service code call. After the first three digits are stored in their respective digit slots, these codes are evaluated and grouped as follows: If the codes in digit slots 1 and 2 are both equal to 1, a service code call is indicated; if the codes in the first, second and third digit slots are equal to 2, 3 and 4, respectively, an intraoffice call is indicated; if the codes in the first three digit slots are other than 11X or 234, an interoffice call is indicated and further evaluation to determine the office of destination must be undertaken.

In our illustrative call, the first, second and third digit slots are found to contain the digits 234, denoting an intraoffice call. Accordingly a "0" is written in the OGC spot of the Originating Register. Having made this determination, the succeeding digits 4 through 7 are counted in the Originating Register Pulse Counter, as were digits 1, 2 and 3, and subsequently stored in digit slots 4 through 7, respectively. Upon the completion of dialing, an interdigital time-out occurs and the digit location counter reaches the count of 6, indicating that dialing is completed. Accordingly, at time T13 a "0" is written in the A1 spot of the Originating Register to stop action under the 10-millisecond dial pulse scan.

*Code compression translation of called directory number (Fig. 32)*

The last four digits of a called directory number are encoded in binary form, digit by digit, which is a noneconomical coding scheme. Accordingly, before proceeding to obtain the equipment number of the called subscriber, the eight-code bits comprising the fourth and fifth digits and the eight-code bits comprising the sixth and seventh digits are processed to obtain more economical seven-bit codes representative of these digit groups. The seven-bit code obtained from compression of digits 4 and 5 is the Flying Spot Store X address of the directory number to equipment number translation area of the called subscriber, and the seven-bit code obtained from the compression of the digits 6 and 7 is the Flying Spot Store Y address of the directory number to equipment number translation area for the called subscriber.

The code compression is achieved through a translation obtained from the Flying Spot Store. The code compression translation area starts at the Flying Spot Store Y address 33 and X address 33. The last fourteen cells of the access register 1150 are set to initial conditions such that cell groups 19 through 25 and 26 through 32 each have the value 32, thereby establishing an address which lies just outside the lower left hand corner of the code compression translation area. The particular horizontal row and vertical column in the code compression area to be addressed is determined from the codes of the fourth and fifth or sixth and seventh digits of the called directory number, depending upon which group of digits is to be compressed. The directory number groups are employed to modify the base address stored in the access register. The X address in cells 19 through 25 of the access register is modified so that cells 22 through 25 are set in accordance with the value of the fourth digit and the Y address is modified so that cells 29 through 32 have the value of the fifth digit. Accordingly, the Flying Spot Store will be addressed to an X address which is removed from the base address of 32.32 by a number of columns equal to the value of the fourth digit and to a Y address removed from the base address of 32.32 by a number of horizontal rows equal to the value of the fifth digit. The Flying Spot Store is directed to the modified address and in the case of the translation of the fourth and fifth digits the compressed code is obtained from Flying Spot Store information channels 3 through 9 and in the case of the compression of the sixth and seventh digits, the compressed code is obtained from information channels 10 through 16. Separate translations are required since the directory number to line equipment number translation area in the Flying Spot Store starts at a point at which the X and Y addresses are different.

The directory number to line equipment number translation area shown in Fig. 18 is arranged so that the horizontal rows each represent a group of 100 lines arranged by directory number and the vertical columns represent the particular line within the row. For example, the translation area for the directory number 1209 is found in the twelfth row and ninth column from the base address of the directory number to line equipment number translation area.

*Scan of Recent Change Registers (Fig. 33)*

Before proceeding to the directory number to line equipment number translation area in the Flying Spot Store, the Recent Change Registers in the Barrier Grid Store must be checked to determine whether or not the called subscriber has had equipment or directory number changes since the directory number to equipment number translation plates have been brought up to date.

The first fourteen spots in each Recent Change Register contain a fourteen-bit Flying Spot Store address as was obtained from the previously discussed code compression operation. The fourteen-bit code, resulting from the above-described translation and stored in the first Memory Register 902, is transferred to the Memory and Match Register 743. The first fourteen spots of the first Recent Change Register are compared with the codes in the Memory and Match Register and, if these codes match, the directory number to line equipment number translation is obtained by interrogating the last eighteen spots of the matching Recent Change Register. If a mismatch occurs between the address in the first fourteen cells of the first Recent Change Register and that in the Memory and Match Register, succeeding Recent Change Registers are scanned until either a match has been found or all of the registers have been checked. Once all registers have been checked, we proceed to the Flying Spot Store address obtained by the code compression translation. Accordingly, the Flying Spot Store transfers to the XY address in cells 1 to 14 of the first Memory Register and the first eighteen cells of the Access Register are set in accordance with the translation word obtained at that address.

The eighteen-bit translation word comprises the twelve-bit equipment number of the called subscriber and six coded bits which define the class of service of the called subscriber and the appropriate ringing tone to be used. The table in Fig. 33 shows the coding of the aforementioned six bits and the indications obtained thereunder. Where an X is shown in the table, the bit may assume the value "0" or "1."

Although only six ringing codes and a limited number of classes of subscribers have been shown, it should be understood that the class and ringing bits may be coded to provide additional classes in this area of information.

The class and ringing code bits 1 through 6 are evaluated by first reading the sixth bit. If the sixth bit equals 1, the called directory number is a vacant number and the program proceeds to connect the calling party to the no such number tone. If the sixth bit equals 0, the line is not vacant and the fifth bit must be read to distinguish between individual line subscribers and party line subscribers. If the fifth bit equals 1, the call is to an individual line subscriber and the program proceeds to test for busy and to establish the proper ringing connections. If the fifth bit is equal to 0, the called subscriber is on a party line and a test must be conducted to determine whether this is a reverting or a nonreverting call.

In a reverting call, the equipment numbers of the originating line and the called line will be the same as both subscribers' lines terminate at one equipment location. Accordingly, to test for a reverting call, the originating line equipment number is moved to the Memory and Match Register 743 and a comparison is made between the called line equipment number which is still in the Access Register and the contents of the Memory and Match Register. If a match is obtained, a reverting call is indicated and a special procedure to permit a connection to a busy line and to ring both the calling and called parties must be undertaken.

If, as in our call, a mismatch is detected, a non-reverting call is indicated. The twelve-bit calling line equipment number and the three-bit ringing code stored in the Access Register are moved to the Originating Register digit slots 3, 4, 5 and 6 for future reference.

*Busy test of called line (Fig. 34)*

The line spots of the called party are read to determine whether the called subscriber's line is idle or busy. If the L1 spot is in the "1" state, the subscriber is either in the talking condition or is denied service. These two conditions are distinguished by reading the L2 spot. If the L2 spot equals 1 while the L1 equals 1, the called subscriber is denied service and the calling party is connected to the intercept operator.

If the L1 spot is "0," the called subscriber's line is either idle or being served by Common Control and these states are distinguished by reading the L2 spot of the called line. If the L2 spot is equal to "1" while the L1 spot is equal to "0," the called line is served by Common Control and accordingly is busy. If both the L1 and L2 spots equal "0," the called subscriber's line is idle and may be seized by writing a "1" in its L2 spot.

After the called line is seized, the A spot of the Network Register is read to determine whether the Network is idle or busy. If the A spot is equal to "0," the Network is idle and may be seized by writing a "1" in the N–A spot.

*Ringing connection*

We are now ready to establish the ringing connection shown in Fig. 51B, including the connection through the concentrator between the called subscriber and a trunk to the B side of the Distribution Network. The called subscriber's line is marked at the concentrator by setting the Line Selector Register 436 in accordance with the twelve-bit digit slots called line equipment number in the Originating Register digit 4 through 6. The Concentrator Network Control Register 516 is set to the Connect B order and the Concentrator Network Sequence Control 202 proceeds to send a check signal to Common Control; establish a connection between the called line and an idle trunk to the B side of the Network; set the Concentrator Identifier to the Distribution Network address of the trunk which is connected to the called subscriber; and the OPS and OPE signals are transmitted to Common Control to signify successful completion of the current job in the Network. As previously described and indicated in Fig. 36, Common Control from time to time checks for completion of the Network job and, having detected this completion, checks for an Operation Successful signal. If the Operation Successful is present, Common Control proceeds to perform other necessary actions with regard to our illustrative call.

As in the case of prior actions by Common Control, the Flying Spot Store address to which a transfer is to be made upon completion of the Network job is set in the Network Register at the N–NPA spots and then Common Control proceeds with other necessary orders.

*Scan for idle ringing supply (Fig. 36)*

The Ringing Concentrator 204 has thirty-two input trunks arranged in four groups. Each group comprises six ringing tones, induction tone and one supervisory tone. These tones are arranged in groups of eight. The ringing induction tone is the first line in each tone group and is followed by the six ringing tones and the supervisory tone. Accordingly, ringing induction is at lines 1, 9, 17, 25; the first ringing tone at lines 2, 10, 18, 26, et cetera. The trunk side of the Ringing Concentrator has four trunks connected to the A side of the Distribution Network and four trunks connected to the B side of the Distribution Network.

As in the case of a dial tone trunk, the T3 spots in the Barrier Grid Store associated with the ringing sources are read until an idle trunk is found as denoted by the T3 spot being in the "0" state. The idle ringing supply is seized by writing a "1" in its T3 spot.

The equipment number of the seized ringing tone source is obtained by transferring the Flying Spot Store to the address corresponding to the Barrier Grid Store address of the seized ringing supply T3 spot. At this Flying Spot Store address we obtain a twelve-bit address which comprises seven bits to identify the Ringing Concentrator number, two bits to define the particular ringing supply number and three bits to define the particular tone of the ringing supply. In each case the equipment number obtained from the translation area is the address of the ringing induction tone of the seized tone source. The selector address of the ringing induction tone is stored in the Access Register and then transferred to the Line Selector Register to mark the induction tone of the seized ringing supply.

The twelve-bit line equipment number of the seized ringing induction tone is gated to the second Memory Register 903 and the concentrator identifier output is gated to the first Memory Register 902 for future reference. The concentrator identifier output is the equipment number of the trunk connected to the called line. The Concentrator Network Control Register 516 is set to the Connect B condition to provide a transmission path between ringing induction tone and a trunk to the B side of the Distribution Network. After this connection is established, the calling party will receive ringing induction. The Network actions necessary to establish the desired connection proceed independently of the other Common Control operations with respect to other calls and, upon completion of the subject Network job, Common Control checks for an Operation Successful signal from the Concentrator Sequence Control. Having received an Operation Successful signal, the Distribution Network B Trunk Selector Register 540 is set in accordance with the concentrator identifier output to mark the B side of the Network at the address of the trunk connected to the ringing induction tone.

The address of the trunk connected to the calling subscriber is obtained by storing the first eleven bits of the equipment number of the calling line, as obtained from the originating line equipment spots in the Originating Register, in cells 19 through 29 of the Access Register and modifying this equipment number in accordance with the concentrator level information from the Originating Register. The concentrator level number is read into cells 26 through 29 in the Access Register and the modified eleven-bit address defines the selector address of the trunk connected to the calling subscriber. The Distribution Network A Selector Register 539 is set in accordance with the modified code in cells 19 through 29 in the Access Register to mark the trunk connected to the calling subscriber and the Distribution Network Control Register 538 is set to the Connect order to establish a transmission path between the calling party and ringing induction tone.

Upon successful completion of the aforenoted Network connection, the Access Register cells 19 through 30 are set in accordance with the line selector address of the seized and connected ringing induction tone as obtained from the second Memory Register 903. The last three bits of this address are set in accordance with the ringing code information of the called subscriber which is stored in digit cell 7 of the Originating Register. The first seven bits of the address in the Access Register identify the particular ringing concentrator switch, the eighth and ninth bits identify the ringing supply, and the last three bits define the particular tone of that ringing supply. The Line Selector Register 436 is set in accordance with the modified address in cells 19 through 30 of the Access Register to mark the ringing concentrator at the desired ringing tone source.

The Concentrator Network Control Register is set to the Connect A condition and the Concentrator Sequence Control proceeds to establish a path in the ringing concentrator from the desired ringing code to a concentrator trunk to the A side of the Distribution Network.

Upon successful completion of this concentrator action, the Distribution Network A Selector Register 539 is set in accordance with the concentrator identifier output to mark the Distribution Network at the A side address of the trunk connected to the desired ringing tone. The Distribution Network B Selector Register is set in accordance with the address in the first Memory Register to mark the Distribution Network at the trunk which is connected to the called subscriber and the Distribution Network Control Register is set to the Connect condition. The Distribution Network Sequence Control then proceeds to establish a transmission path between the called subscriber and the trunk connected to the desired ringing tone.

The ringing connections shown in Fig. 51C comprising a transmission path between the calling subscriber and ringing induction tone and between the called subscriber and the desired ringing tone required to signal that subscriber are completed and steps must be taken to detect the called party's transition from on-hook to off-hook indicating an answer to the call.

*Scanning of called line for answer*

Figure 41:
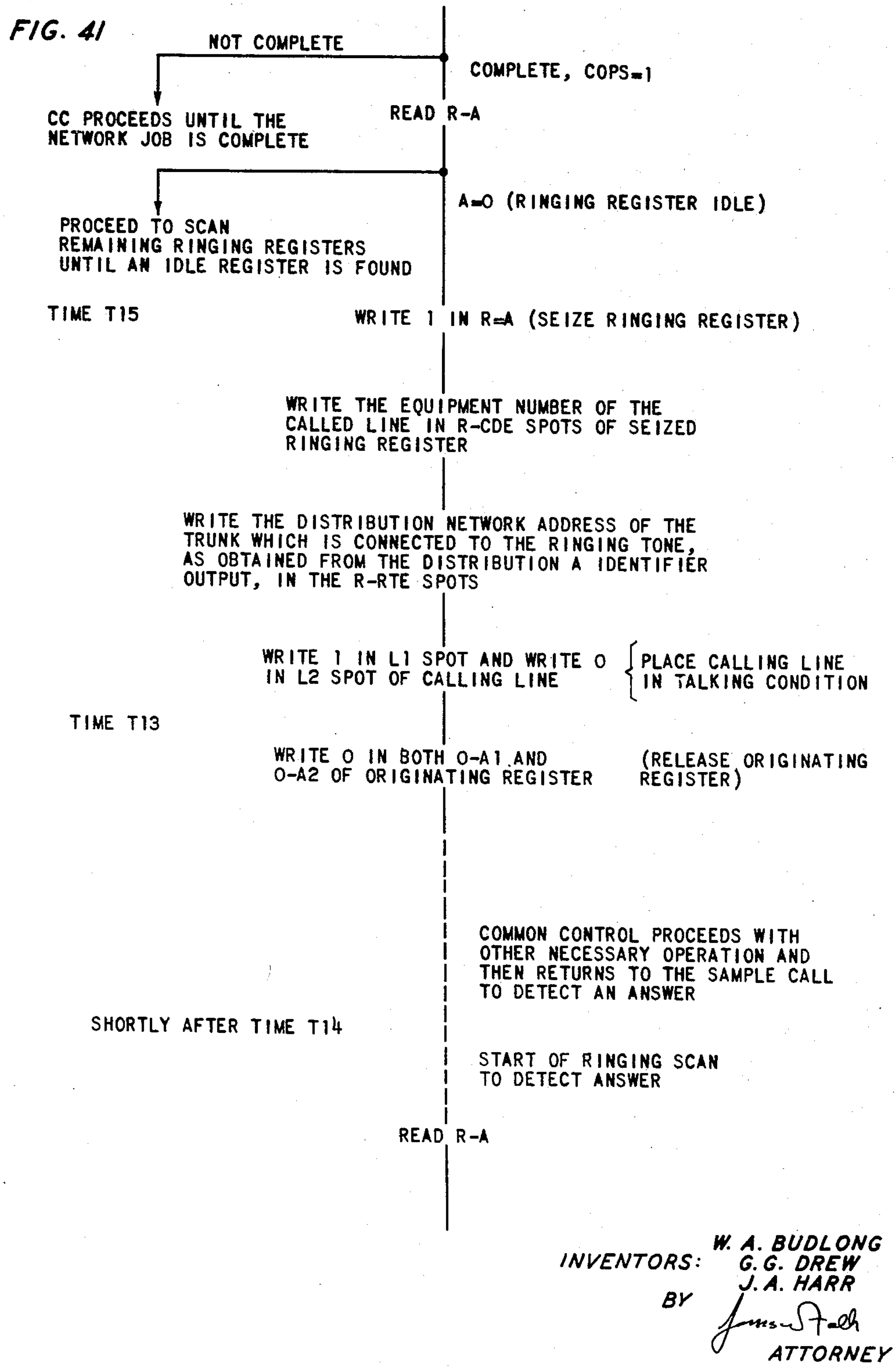

The ringing connection between ringing tone and the called subscriber line is completed at time T13 shown in Fig. 19 and shortly thereafter as shown in Fig. 41 steps are taken to transfer control of the call from the Originating Register to the Ringing Register. Accordingly, the activity spots of the Ringing Registers are successively interrogated until an activity spot has been found to be in its "0" state, thereby indicating an idle register. Having found an idle register, a "1" is written in the Ringing Register activtiy spot to seize the Register; the equipment number of the called line spots, as obtained from the Originating Register, is written in the R–CDE spots in the Ringing Register; and the Distribution Network address of the trunk which is connected to ringing tone, as obtained from the Distribution Network A Identifier output, is set in the R–RTE spots of the Ringing Register.

The calling line is placed in the talking condition by writing a "1" in its associated L1 spot and a "0" in its L2 spot and the Originating Register is released by writing a "0" in the O–A1 and O–A2 spots of the Originating Register. We have now reached time T14 in Fig. 19 and at this point the Ringing Register is in control of this call and the Originating Register is free for other use.

*Detection of an Answer (Fig. 42)*

Shortly after time T14, Common Control arranges to scan the called line to detect an answer. The activity spots of the Ringing Registers are sequentially scanned and if an activity spot is in the "1" state, action is undertaken to interrogate the called line to detect changes in supervisory state. The twelve-bit called line equipment number is moved from the Ringing Register CDE spots to the Access Register and thence to the Scanner Address Register. The scanner is read at the address of the called line and if the called line is in the "0" state, the line is still in the on-hook condition and scanning of other lines proceeds. The answering scan occurs once every 10 milliseconds; therefore between the time ringing is initiated and the time an answer is detected, many scans will have found the called line in the "0" state. If the called party does not answer within three minutes, the ringing connection will be broken, the calling party will be notified and all connections destroyed. The answering timer comprises the R–TA0 and R–TA1 spots in a Ringing Register. At three-quarter minute intervals, a scanning pulse changes the states of the TA0 and TA1 spots as though they in combination comprise a two-bit pulse counter. Accordingly, at the end of four three-quarter minute periods, the counter has been reset to its "0"–"0" state and timing is complete.

If, however, as at time T16, the scanner finds the called line in the off-hook state as indicated by the scanner being in its "1" state, action is undertaken to break down the ringing connection; to establish a talking connection as shown in Fig. 51C; to set the called line in the talking condition; and to release the Ringing Register.

The Network activity spot is interrogated and if N–A equals zero, we write a "1" in the N–A spot to seize the Network; and a "1" in the L1 spot and a "0" in the L2 spot of the called line to put the called line in the talking condition and proceed to set addresses in the Concentrator and Network to effect release of the ringing connections.

The Concentrator Release Selector Register 429 and the Distribution Network A Trunk Selector Register 539 are set in accordance with the address of the trunk which is connected to the ringing tone. This address is obtained from the R–RTE spots in the Ringing Register. By this action the trunks to be released are marked with distinctive potentials.

Next the Concentrator Network Control Register is set to the release order and the Distribution Network Control Register 538 is set to the Release B condition.

Figure 42:
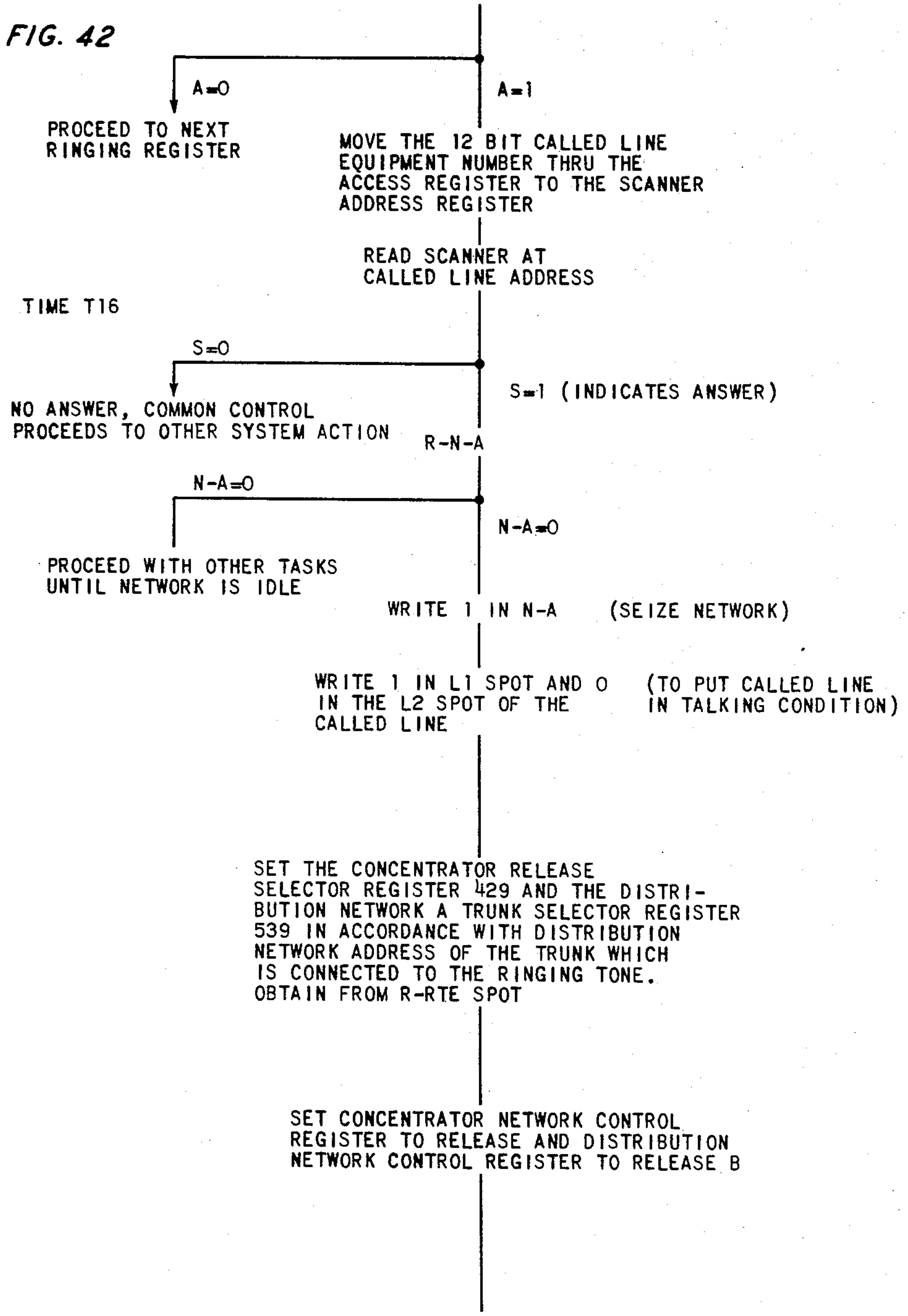

It should be noted that, as indicated in Fig. 42, orders have been transmitted simultaneously to the Distribution Network and the Concentrator Network and these actions may proceed in parallel independent of each other. The N–NPA spots are set in the Network Register as in all prior Network actions and while the Network completes its current job, Common Control proceeds with other jobs awaiting action.

Figure 43:
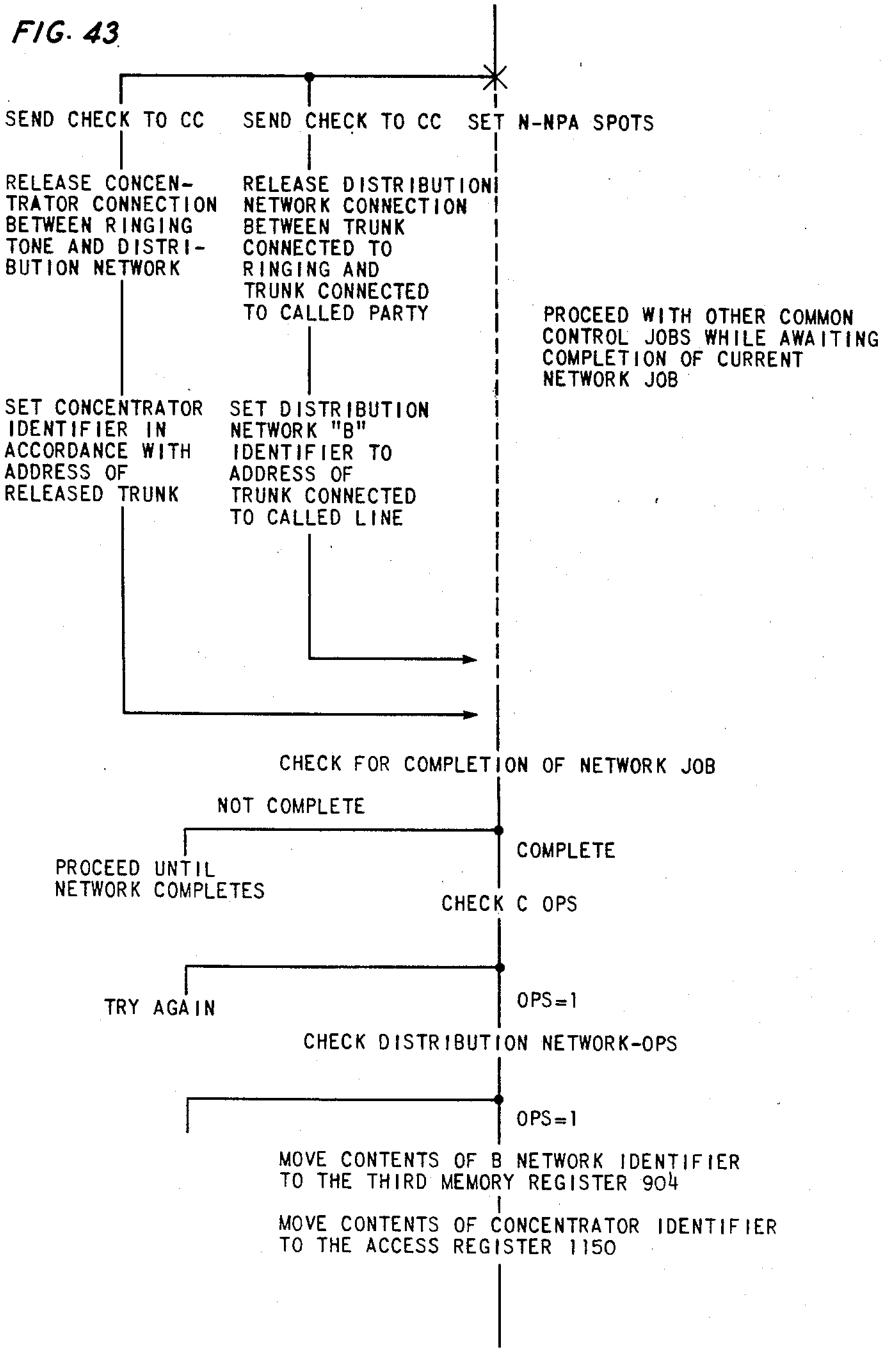
Figure 44:
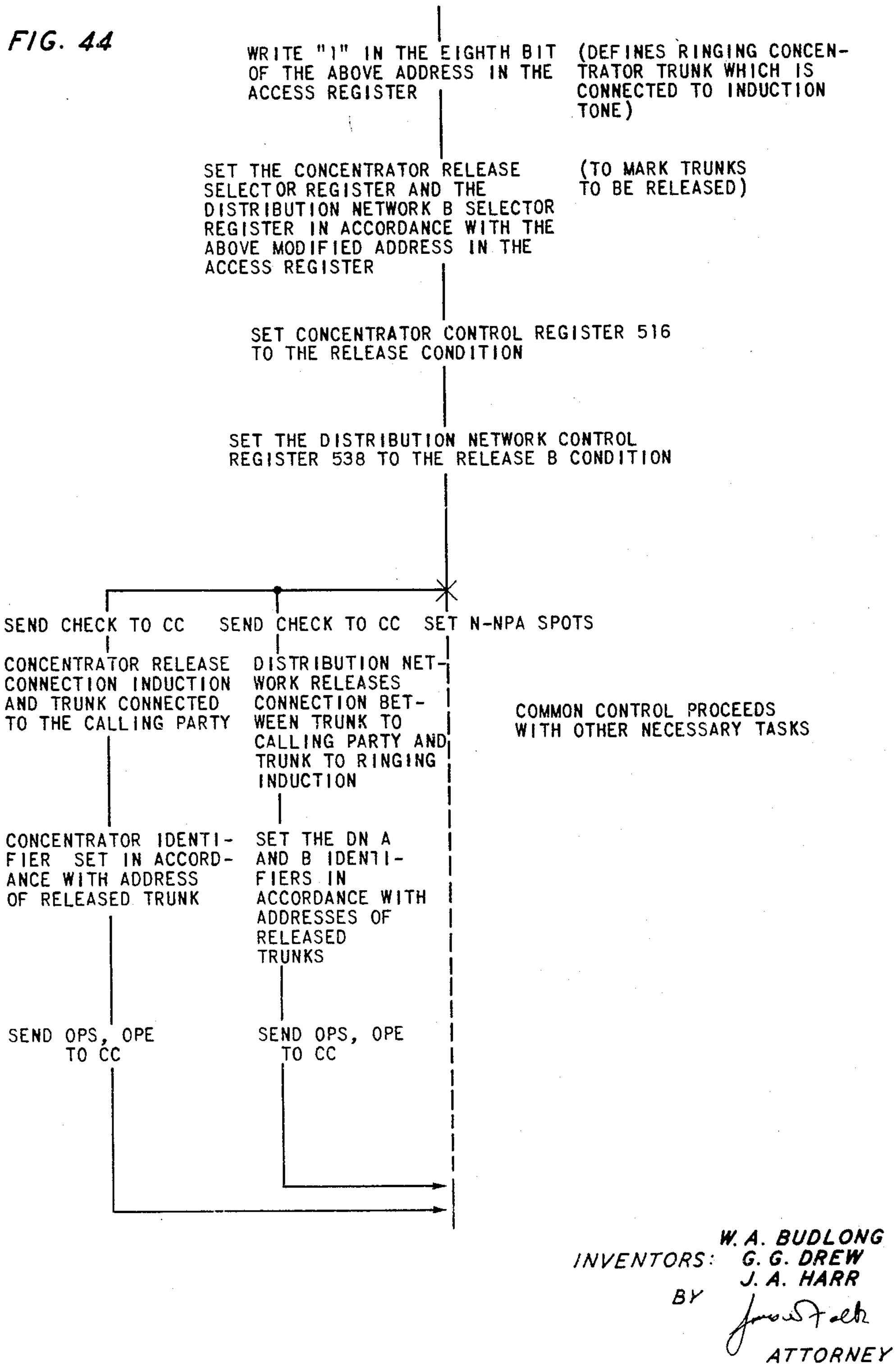
Figure 45:
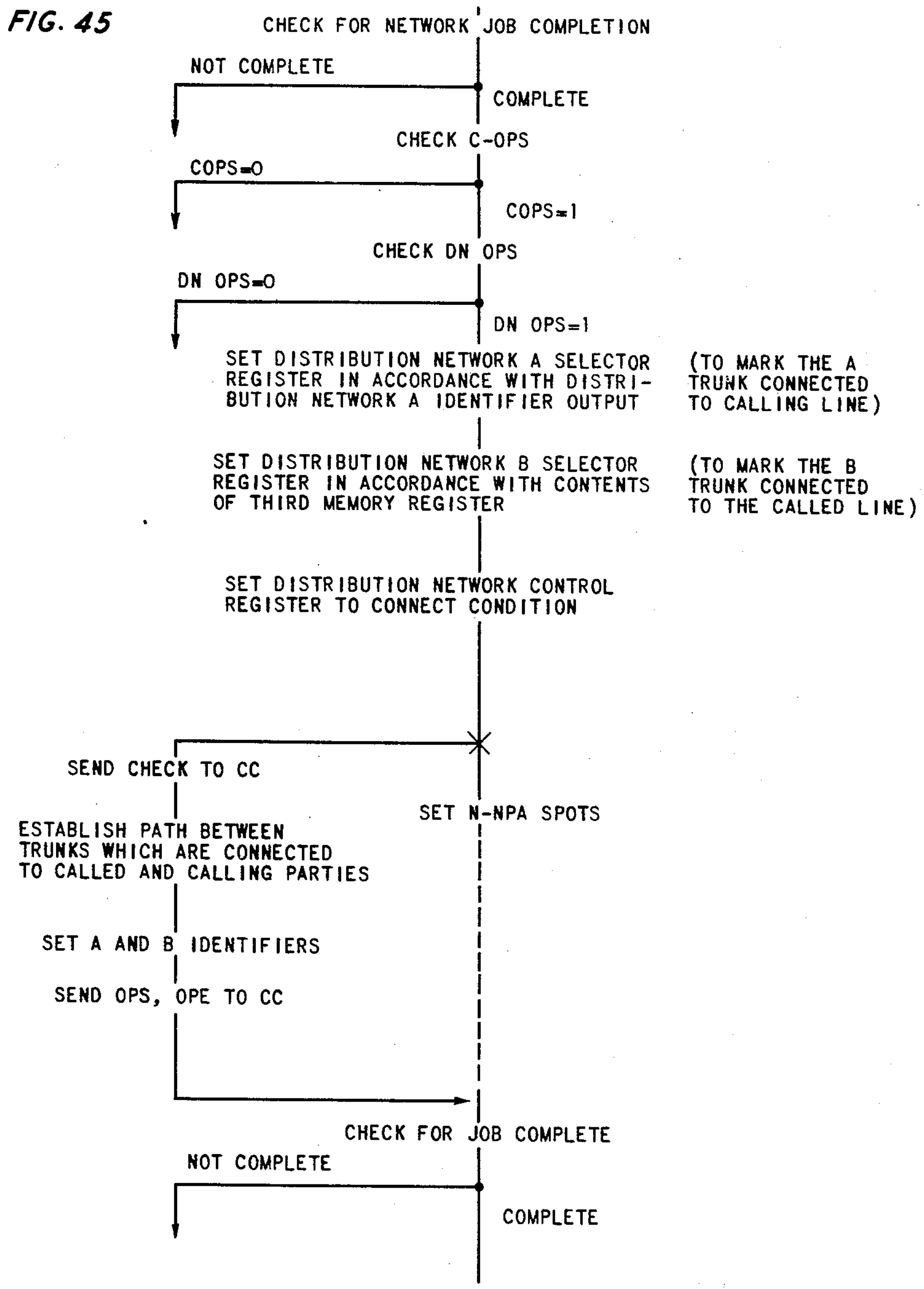
Figure 46:
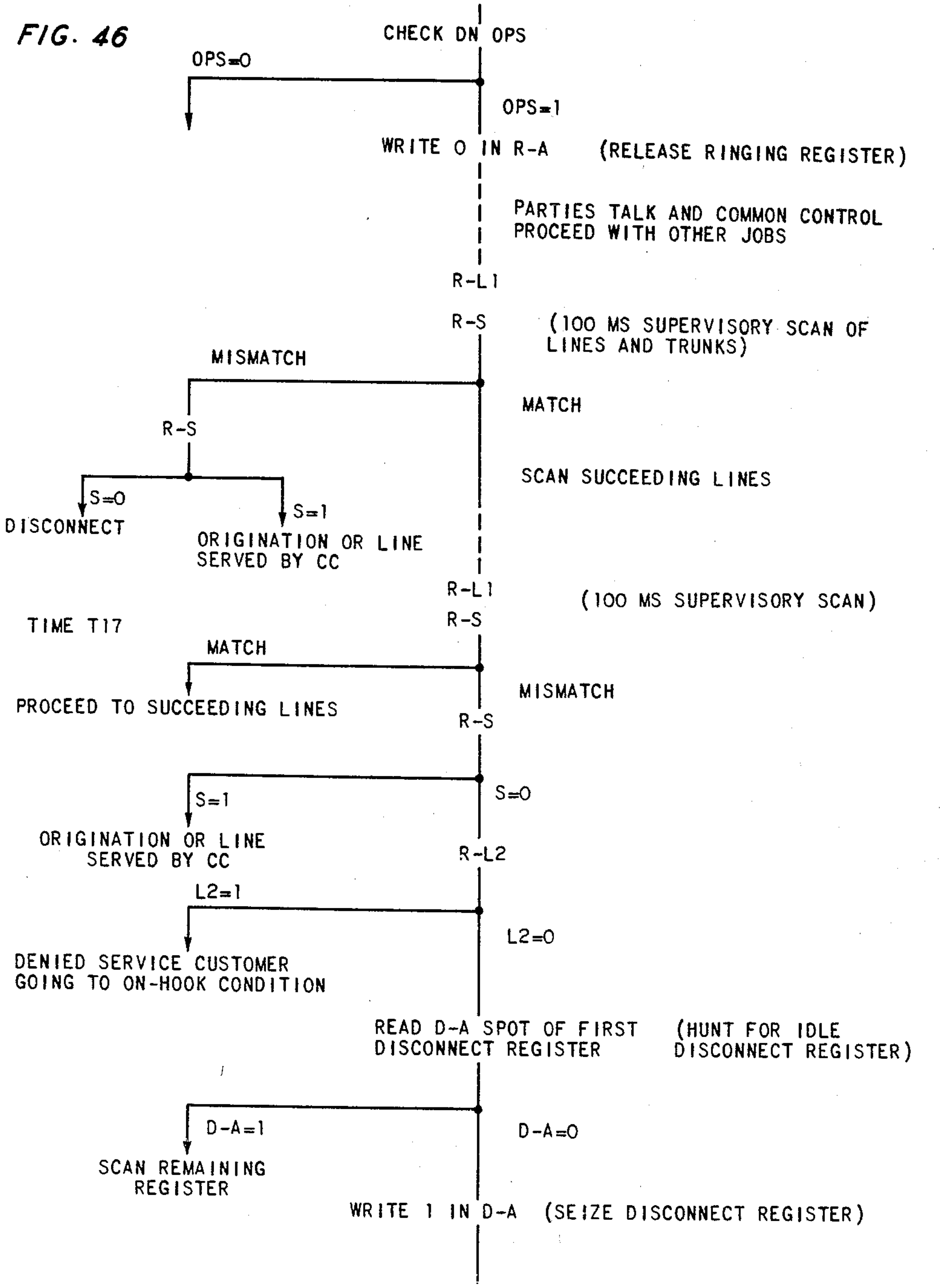

Both the Concentrator and the Distribution Network, as shown in Fig. 43, transmit check signals back to Common Control acknowledging receipt of an order, the Concentrator releases the connection between the ringing tone and the Distribution Network, the Distribution Network releases the connection between the trunk which is connected to ringing and the trunk which is connected to the called party and sets the Distribution Network B Identifier to the address of the trunk which is connected to the called line.

Common Control detects completion of the above Network job and then proceeds to check both the Concentrator and Distribution Network Operation Successful memories to ensure completion of both tasks.

Upon completion of this Network job, the contents of the B Network Identifier are moved to the third Memory Register 904 for future reference and the address of the ringing concentrator trunk connected to ringing tone is set in the Access Register 1150. The concentrator trunk address is obtained from the Concentrator Identifier. The address of the trunk connected to ringing tone and the address of the trunk connected to induction tone are related in that there is a one-to-one relation between the concentrator trunks to the A side of the Network and the trunks to the B side of the Network. When the ringing connections are established, the induction tone is first marked and the first idle trunk to the B side of the Network is connected to induction tone upon the occurrence of a Connect B order. The desired ringing tone is then marked and the first idle A trunk is connected to this ringing tone. The A and B trunks are always scanned in numerical order and since ringing trunks are always used in pairs, the same numbered trunks in the A and B groups will be employed on a call. In the ringing concentrator trunk address, the first seven bits identify the particular concentrator switch, the eighth bit determines whether the trunk is in the A or B trunk group, and the remaining three bits identify the particular one out of four trunks in the case of the ringing concentrator or the one out of five trunks in the case of a line concentrator. Accordingly, the address of the trunk connected to the ringing tone is modified by writing a "1" in the eighth bit of the Access Register to obtain the address of the trunk connected to induction tone. A "0" in the eighth bit indicates that the trunk lies in the A trunk group and a "1" that the trunk lies in the B trunk group.

The Concentrator Release Selector and the Distribution Network B Selector Registers are set in accordance with the modified address in the Access Register to mark the Concentrator and Distribution Network trunks to be released. The Concentrator Control Register 516 is set to the Release condition and the Distribution Network Control Register 538 is set to the Release B condition. Again, Concentrator and Distribution Network actions proceed in parallel to release the concentrator connection between induction tone and the trunk connected to the calling party and to release the Distribution Network connection between the trunk connected to the calling party and the trunk connected to ringing induction. Both Concentrator and Distribution Network A and B Identifiers are set in accordance with the addresses of the released trunks and both Concentrator and Distribution Network Operation Successful and Operation Ended signals are transmitted to Common Control.

After release of the ringing connection is ordered, steps are taken to restore the T3 spot of the ringing tone source to its idle state so that it may be employed on subsequent calls.

A check is made from time to time to detect completion of the Network jobs and then checks are made to ensure that Operation Successful signals have been received.

*Establishment of talking connection of Fig. 51C (Fig. 45)*

We are now in a position to mark the trunks connected to the calling and called lines to establish a talking connection through the Distribution Network. The Distribution Network A Selector Register is set in accordance with the Distribution Network A Identifier output to mark the trunk connected to the calling line and the B Selector Register is set in accordance with the contents of the third Memory Register to mark the trunk connected to the called line. The Distribution Network Control Register is set to the Connect condition and actions within the Distribution Network Sequence Control proceed to establish the desired path through the Distribution Network. As in all other Network actions, the Network Register NPA spots are set to the Flying Spot Store address to which a transfer is to be made upon completion of the Network job and Common Control proceeds with its other necessary tasks awaiting an indication that the Network job is completed. The receipt of the Operation Successful signal from the Distribution Network indicates that the desired talking connection is established and that the Ringing Register may be released. Accordingly, we write a "0" in the activity spot of the Ringing Register.

*Detecting a disconnect signal (Fig. 46)*

Figure 47:
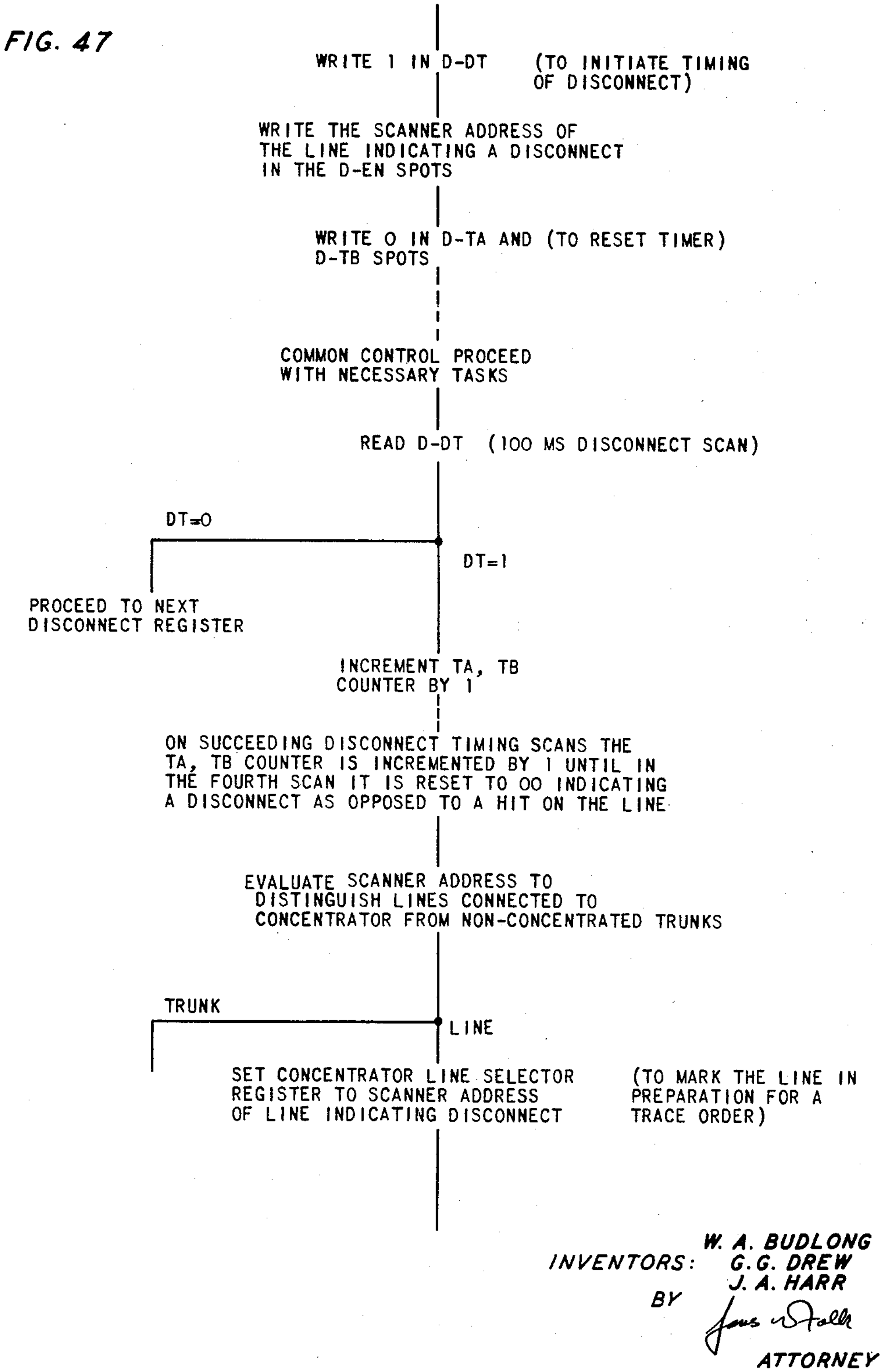
Figure 48:
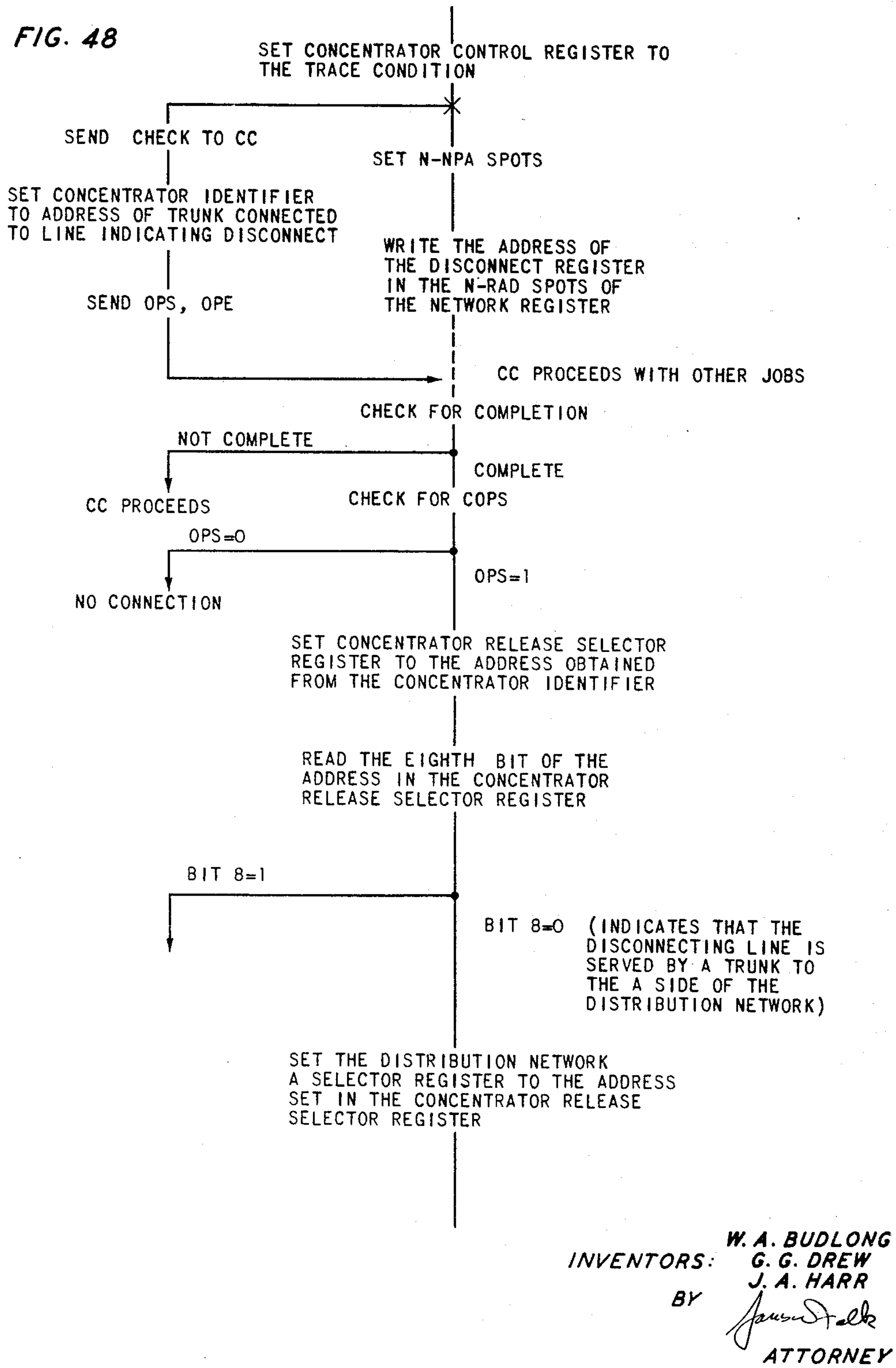

The parties are now talking and Common Control may proceed with other tasks; however, as indicated at the beginning of this discussion, the supervisory scan of lines and trunks proceeds to interrogate each line and trunk once every hundred milliseconds. Both the calling and called lines are scanned for changes in supervisory state and actions with respect to line transitions are all treated in a similar manner as once the talking connection is established, the system does not have an indication as to which party originated the call. The L1 spot and the scanner are simultaneously interrogated and, if a match condition exists as would be the case during the talking period, Common Control proceeds to scan succeeding lines and trunks. Many supervisory scans will be performed without detecting a change in supervisory state; however, at time T17 the L1 spot is read and the scanner read and a mismatch detected. The scanner signal is found to be a "0" indicating a possible disconnect. To differentiate between a disconnect signal and a supervisory transition on a line denied service, the L2 spot is read. If the L2 spot equals "1," the transition is on the line of a customer denied service and no further action need be taken; however, if the L2 spot equals "0," a sequence must be undertaken to destroy the paths through the Distribution Network and both line concentrators. The Disconnect Registers are sequentially scanned until an idle register is indicated by its activity spot being in the "0" state. Havng found an idle register, as shown in Fig. 47, we write a "1" in the activity spot to seize the register.

A timing sequence is initiated to enable Common Control to distinguish between hits on the line and an actual disconnect signal from a subscriber. If the on-hook condition persists for more than 400 milliseconds, it is considered to be a disconnect and not a hit on the line. Timing is accomplished through the two-bit timer in the Disconnect Register comprising spots D–TA and D–TB. Disconnect timing is initiated by writing a "1" in the D–DT spot. In addition, the scanner address of the line indicating a disconnect request is written in the EN spots of the Disconnect Register for future reference and a "0" is written in the TA and TB spots to reset the timer.

Common Control proceeds with necessary tasks with regard to other lines and trunks in the office and at 100-millisecond intervals makes a disconnect timing scan of the Disconnect Registers in which the DT spot in each Disconnect Register is read and, if this spot equals "0," the scan proceeds to the succeeding Register; however, if the DT spot equals "1," the TA–TB counter is incremented by 1. On succeeding timing scans, the TA and TB counter is further incremented until on the fourth scan it is set to the "0"–"0" state indicating completion of the disconnect interval time-out. Accordingly, this line transition is treated as a disconnect request and not as a hit on the line.

Figure 49:
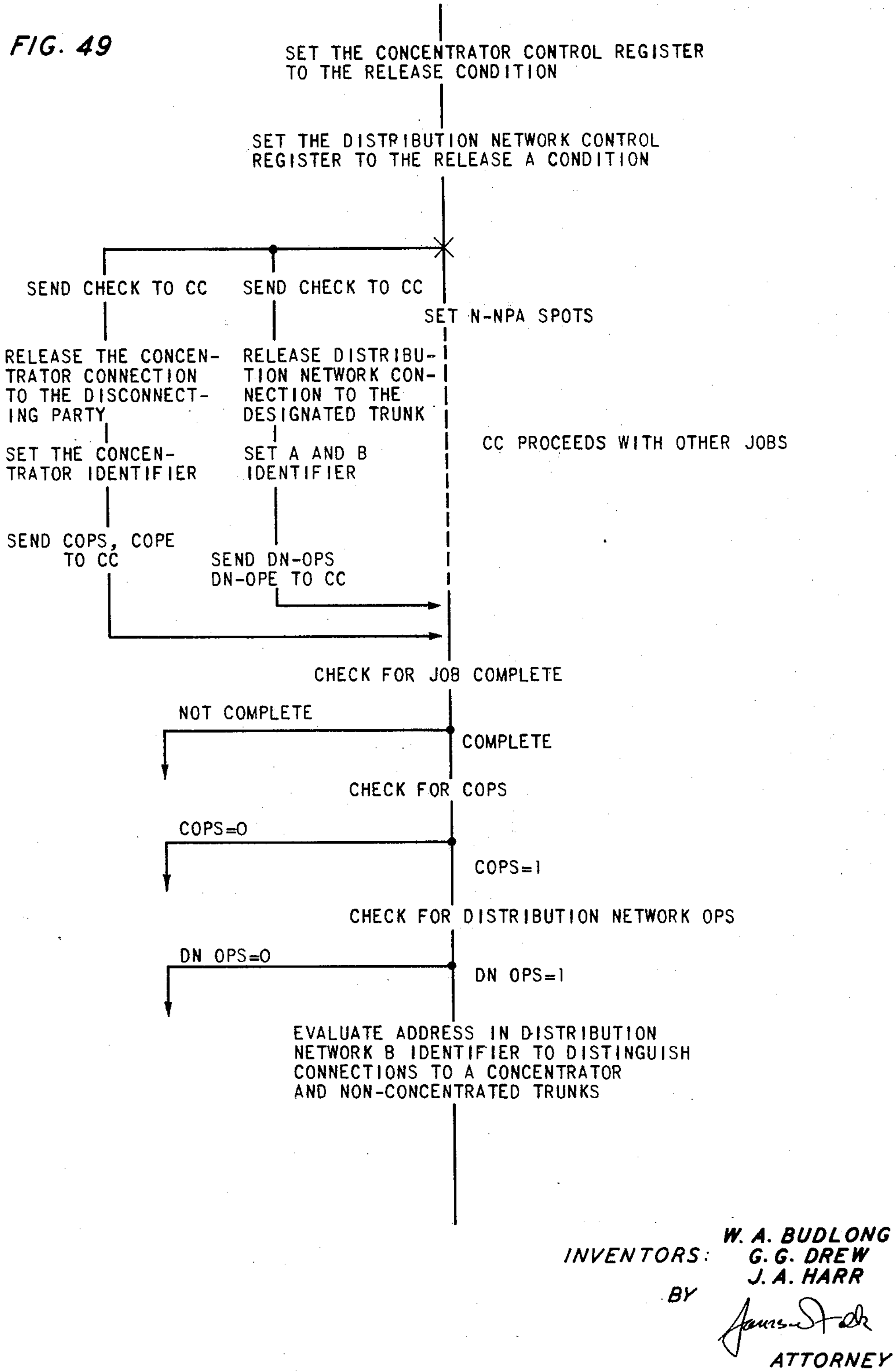
Figure 50:
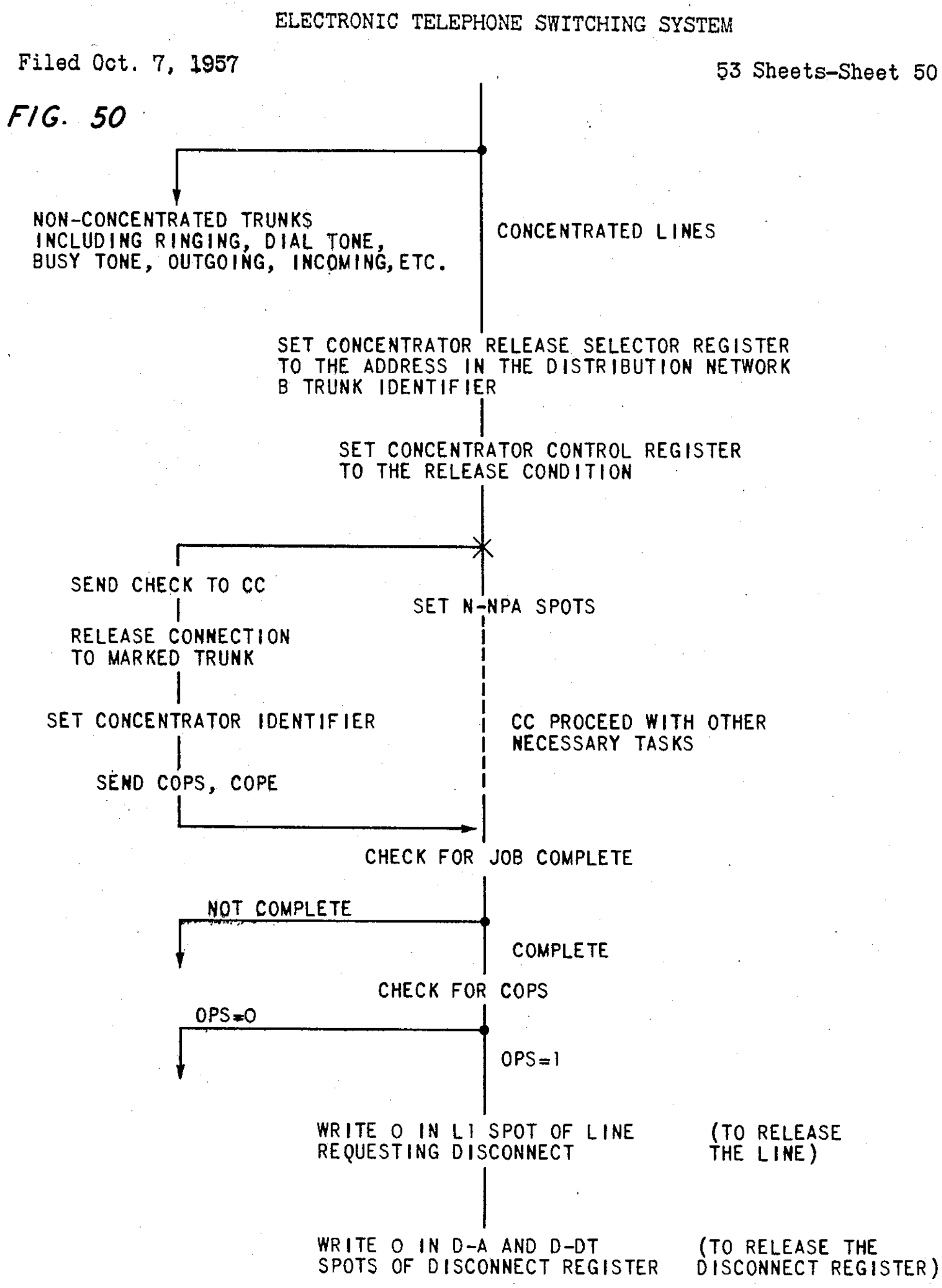

The scanner address of the line indicating a disconnect is evaluated, as indicated in Fig. 49, to distinguish lines connected to concentrators from unconcentrated trunk groups. This is possible as the numbering of concentrator trunks and unconcentrated trunks is maintained in an orderly fashion. If it is indicated that a concentrated line is requesting the disconnect sequence, the Concentrator Line Selector Register is set to the scanner address of the line indicating a disconnect to mark the line in preparation for a trace order. The trace order is employed to determine the Distribution Network address of the trunk connected to the disconnecting line. The Concentrator Control Register is set to the Trace condition; the concentrator sends back a check signal to Common Control, proceeds with the sequence to set the Concentrator Identifier to the address of the desired trunk, and sends back OPS and OPE signals to Common Control. In the meantime, the Flying Spot Store address to be returned to upon completion of the Network order is set in the NPA spots of the Network Register and the X address of the Disconnect Register is set in the RAD spots of the Network Register. Common Control proceeds with other necessary tasks and from time to time checks for completion of the current Network job. Having found a Complete signal, Common Control checks for an Operation Successful indication and, having found one, proceeds with steps to release the concentrator connection to the line requesting a disconnect and release of the Distribution Network transmission path connected to the line requesting the disconnect.

The Concentrator Release Selector Register is set to the address stored in the Concentrator Identifier and the eighth bit of this address is read to determine whether the subject trunk is connected to the A or B side of the distribution Network. If the eighth bit equals "1," the trunk is connected to the B side of the Network; if the eighth bit equals "0," the trunk is connected to the A side of the Network. In our example, having determined that the trunk terminates on the A side of the Network, the Distribution Network A Selector Register is set to the address found in the Concentrator Release Selector Register to mark the trunk to be released. The Concentrator Control Register is set to the Release condition and the Distribution Network Control Register is set to the Release A condition to initiate simultaneous but independent sequences within the concentrator and Distribution Network circuitry to destroy the identified connections. Both the concentrator and Distribution Network send check signals to Common Control; the concentrator releases the connection to the disconnecting party, sets the Concentrator Identifier and transmits the OPS and OPE signals to Common Control. The Distribution Network releases the connection to the designated trunk, sets the A and B Identifiers and transmits OPS and OPE signals to Common Control. As in preceding Network operations, Common Control from time to time interrogates Network responses to detect completion of the current job and, having found an indication that the job is complete, checks for Operation Successful indications from both the Concentrator and the Distribution Network.

One connection now remains between the B side of the Network and the party connected thereto through the Concentrator. Since not all calls, for instance trunk calls, operator calls and so forth, will be completed through line concentrator switches, steps must be taken to distinguish trunks to concentrated lines and trunks to unconcentrated lines. Again this determination is made by evaluation of trunk addresses which are maintained in a consistent fashion in accordance with identifying assignments. In the instant case it is indicated that the trunk yet to be released is connected to a concentrated line; accordingly, the Concentrator Release Selector Register is set to the address found in the Distribution Network B Trunk Identifier and the Concentrator Control Register is set to the Release condition. The Network proceeds to release the connection to the marked trunk, to set the Concentrator Identifier and to transmit Operation Successful and Operation Ended signals back to Common Control.

Upon receipt of an indication that the Network job is successfully completed, we write a "0" in the L1 spot of the line requesting a disconnect to release that line and the Disconnect Register is released by writing a "0" in the D–A and D–DT spots.

As a supervisory scan of lines and trunks proceeds, the subscriber's line connected to the Concentrator trunk which was last released will go from the off-hook to on-hook condition when the subscriber completes his call. At this time a 100-millisecond supervisory scan of this line will find the line in the "0" state and, in the course of the disconnect sequence, will perform a trace operation to determine the address of the trunk connected to the line requesting a disconnect. At this point it will be determined that a connection through the Concentrator does not exist and the L1 spot is reset to its "0" state to release the line.

*Interoffice calls*

Interoffice calls may be either outgoing from the local office of the applicants' invention or incoming thereto and in either case the connection between the local office and the distant office or operator is through the two-way trunks such as 314 and 315. Detailed sequence charts for the interoffice calls are not provided and the discussion of these calls is in the terms of the intraoffice sequence charts with the necessary modifications.

*Outgoing calls (Fig. 52)*

Figure 31:
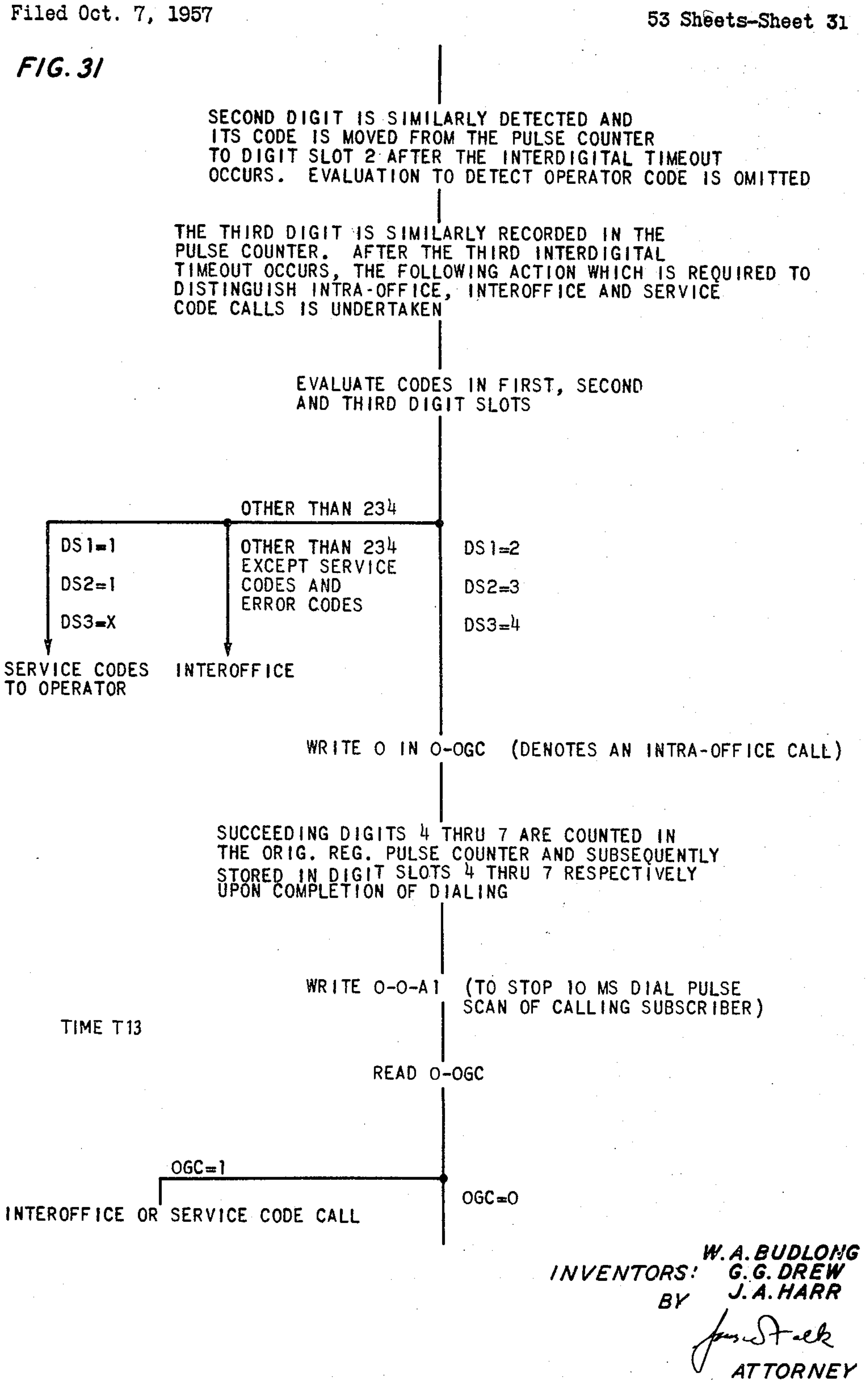
Figure 34:
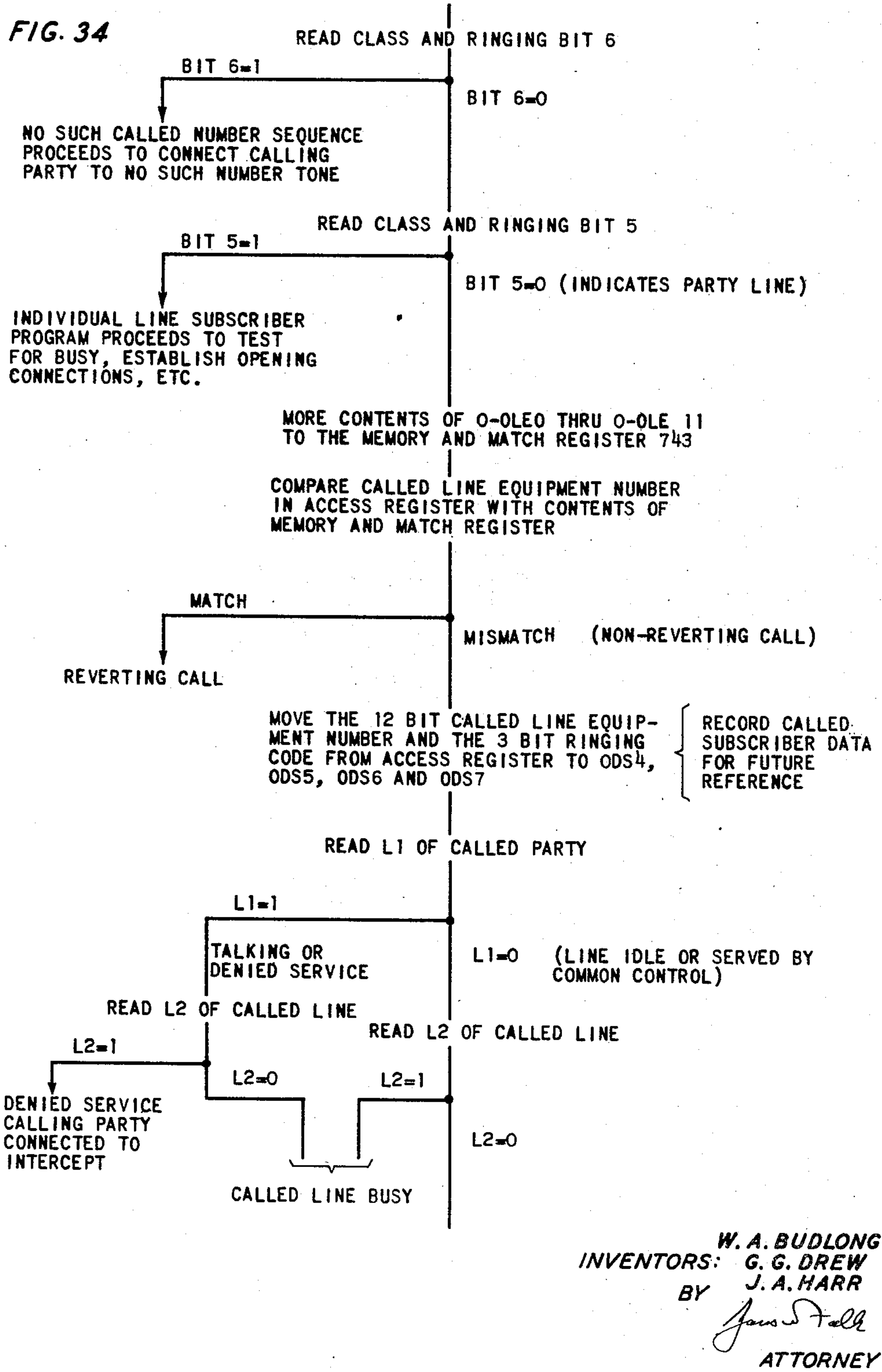
Figure 35:
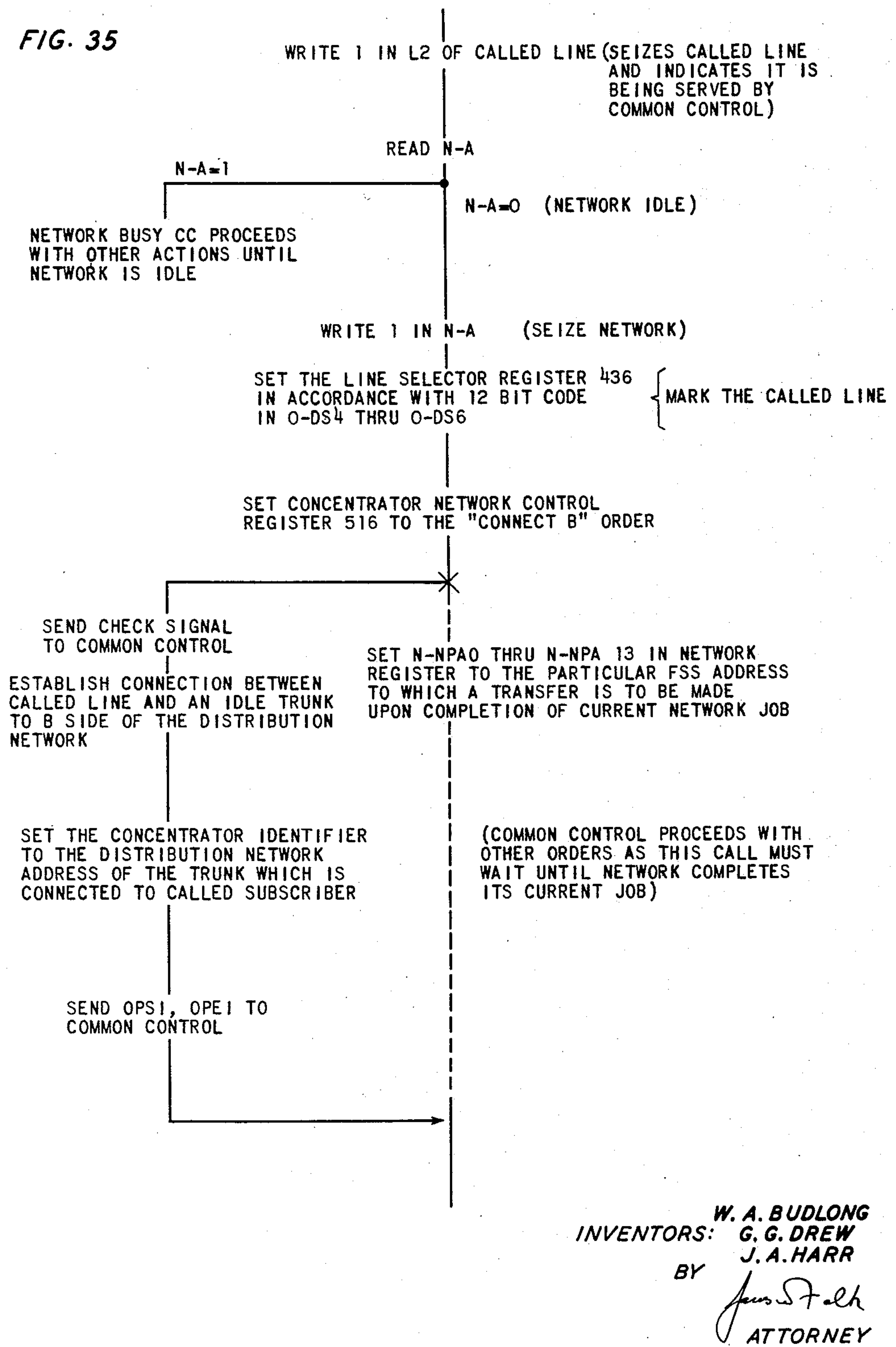
Figure 36:
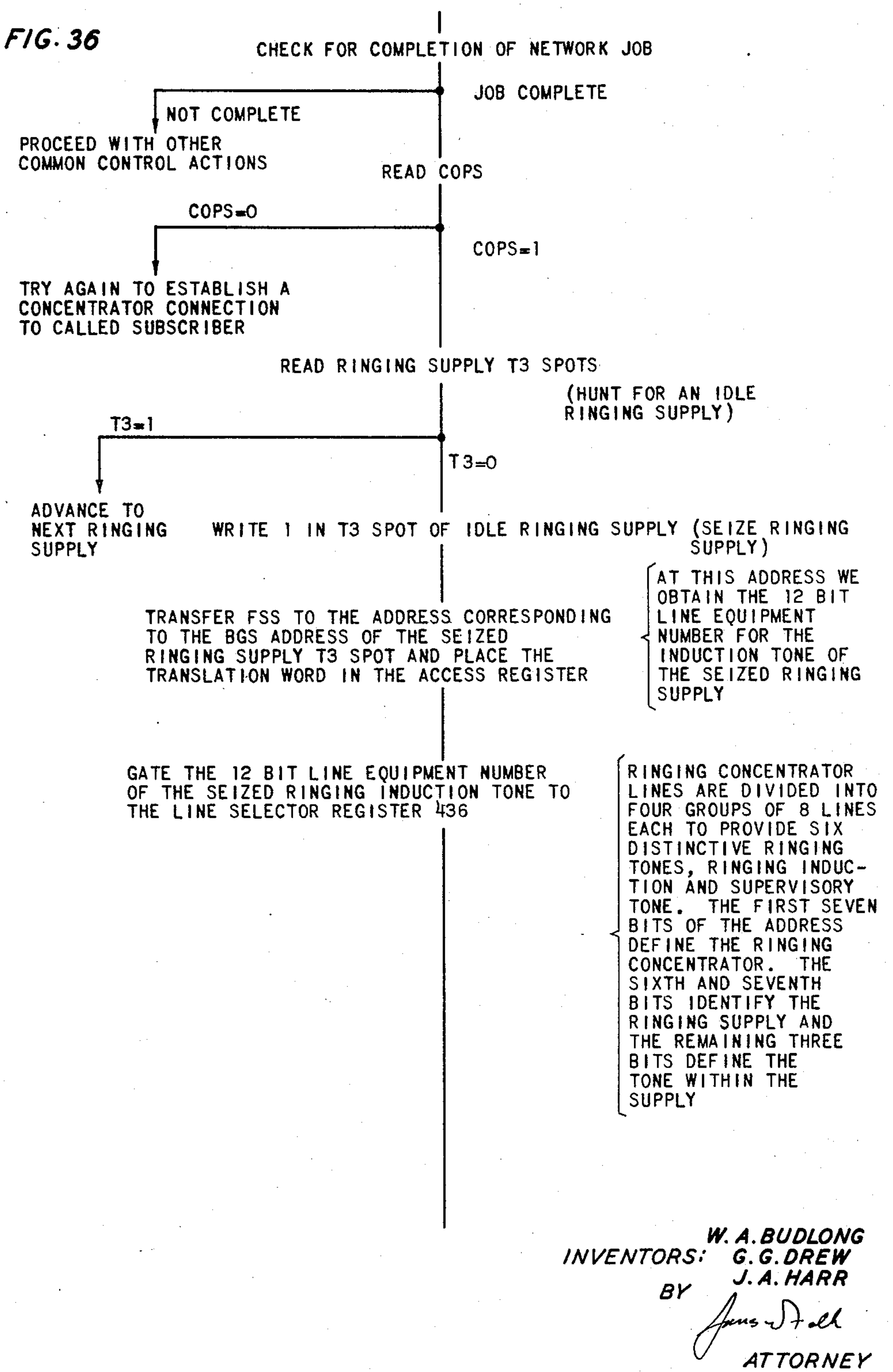
Figure 37:
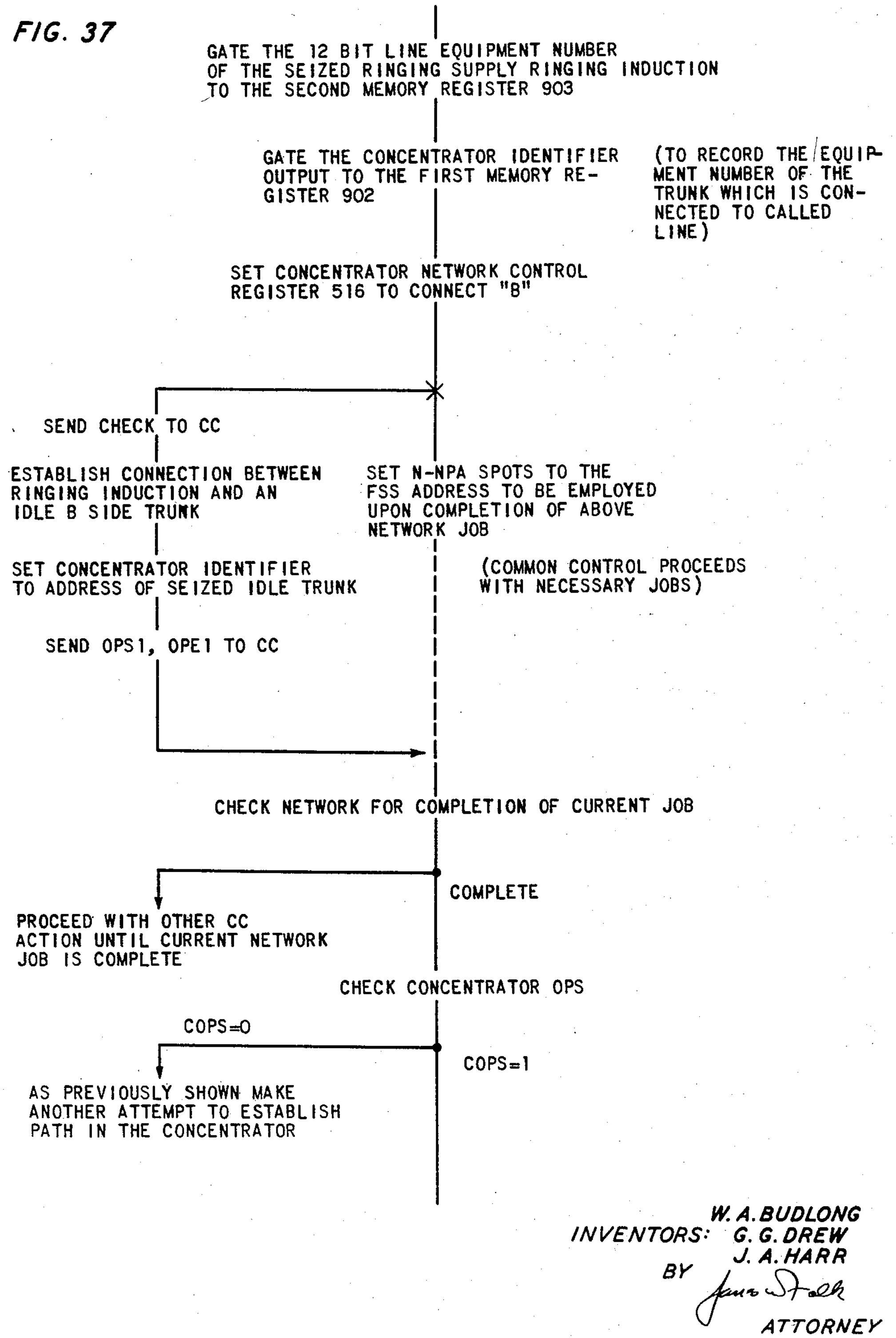
Figure 38:
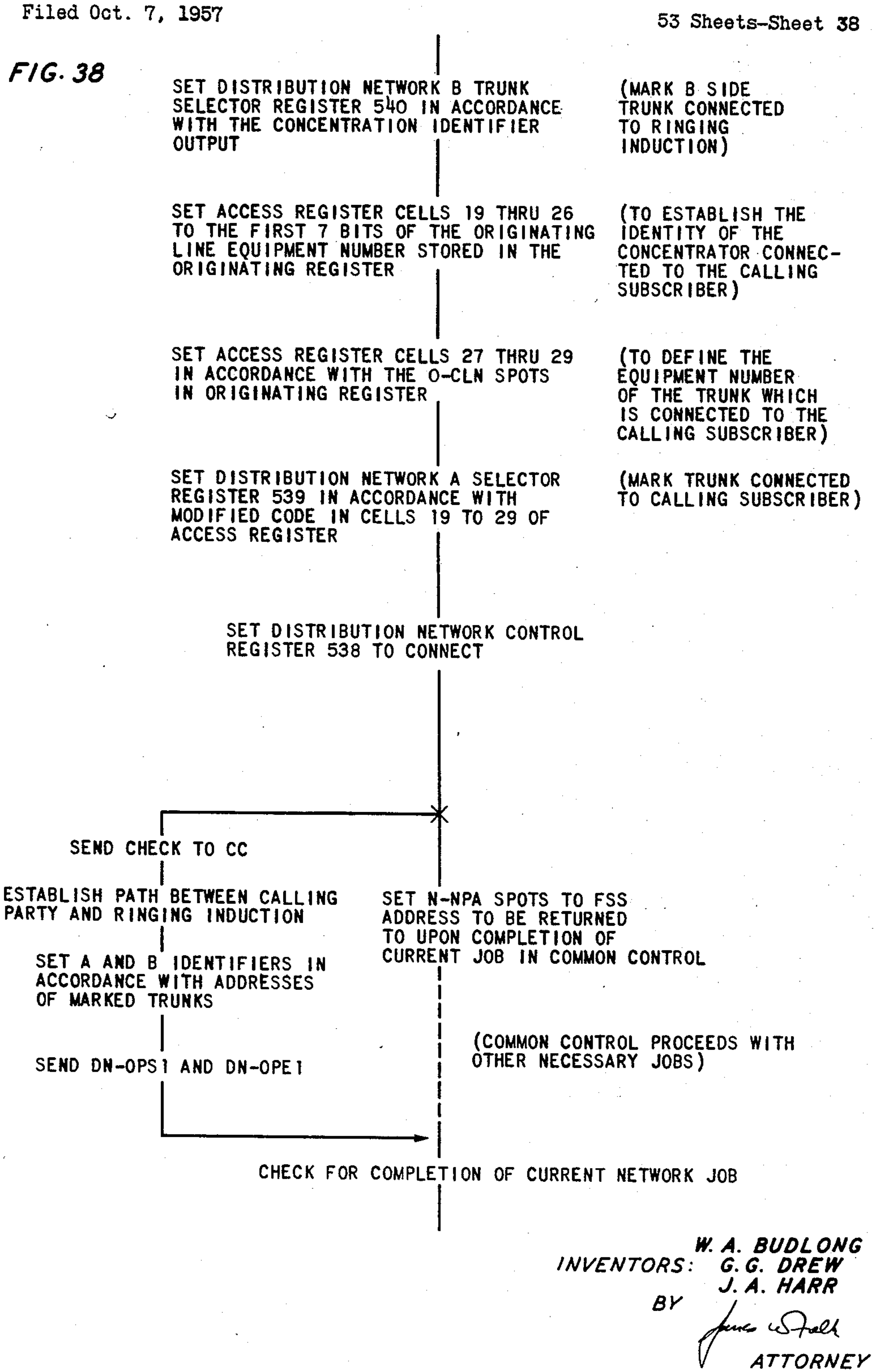
Figure 39:
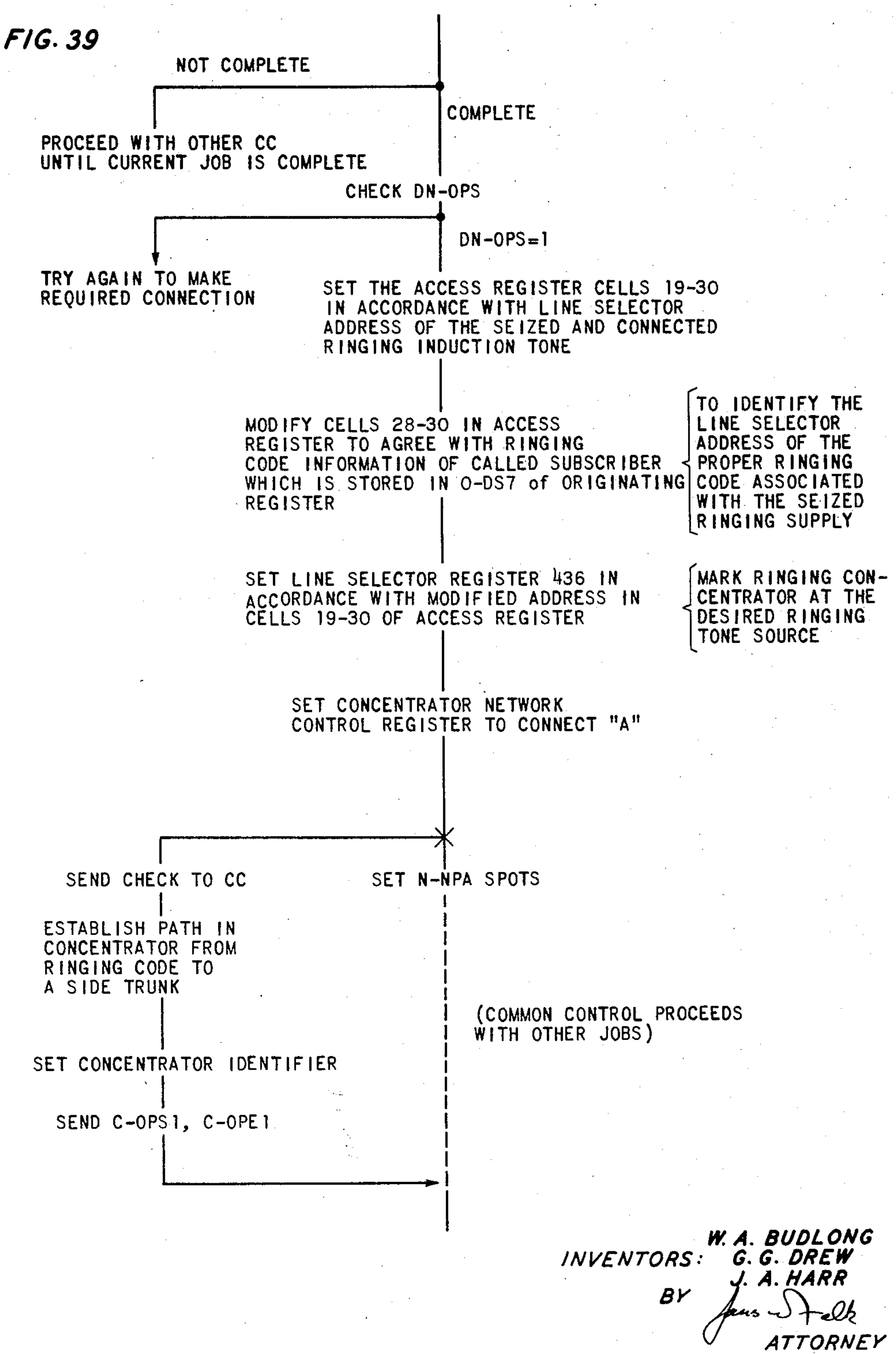
Figure 40:
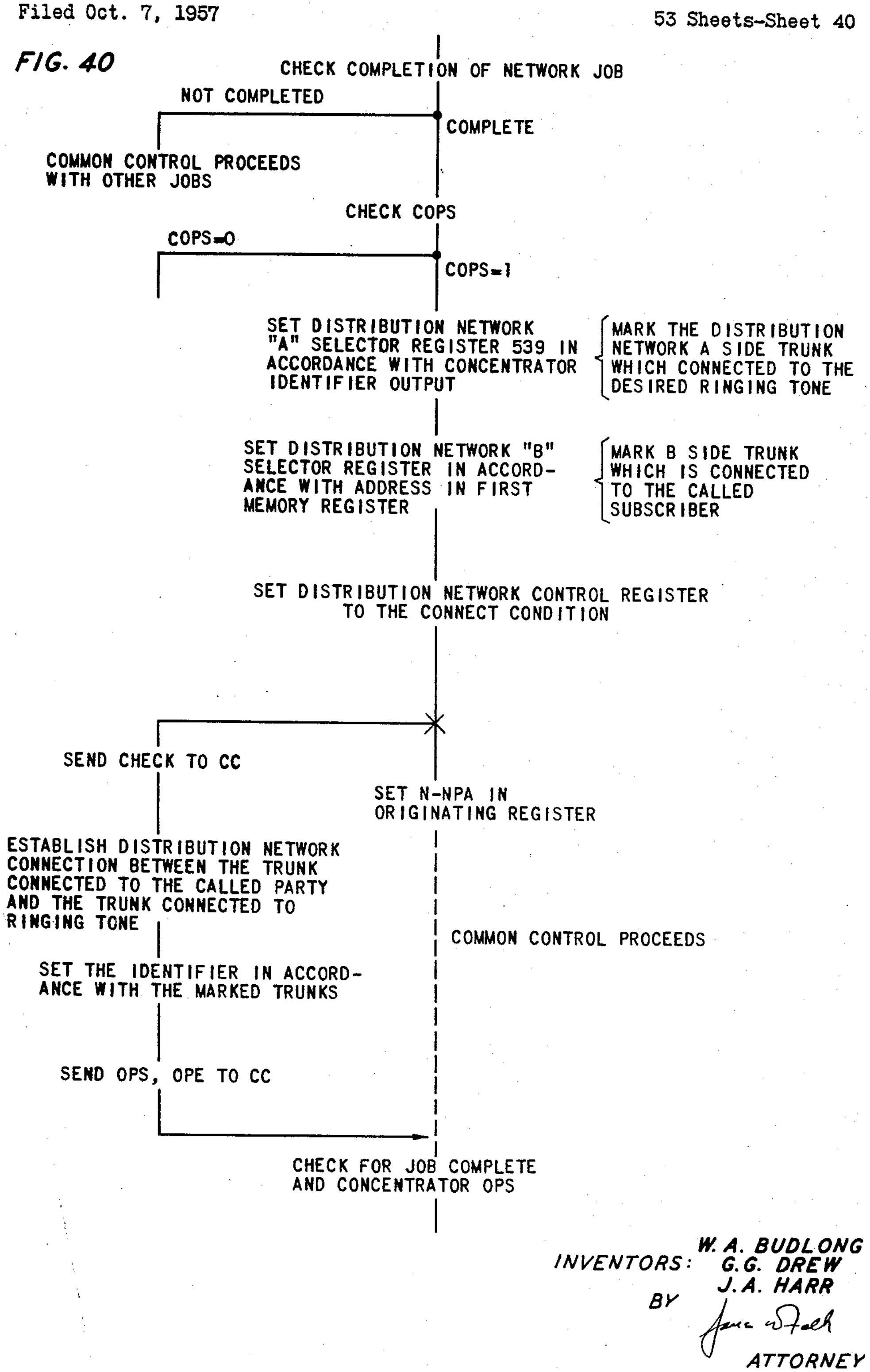

Interoffice and intraoffice calls proceed in an identical manner up to the point in Fig. 31 at which the codes in the first, second and third digit slots of the originating register are evaluated to determine the destination of the call. As shown at the middle of Fig. 31, the codes in the first, second and third digit slots are evaluated and, if these codes are found to be other than the local office code of 234 or one of the service codes of the form 11X, an interoffice call is indicated. Upon the occurrence of an interoffice call, the information in the first, second and third digit slots is further evaluated to determine the identity of the distant office. In the case of an interoffice call, a "1" is written in the OGC spot in the Originating Register rather than a "0" as in the case of an intraoffice call and a code representative of the distant office is written in digit slot 3 of the Originating Register for future reference. Upon completion of these operations which in effect comprise a memorandum to the system that an outgoing call is in progress, the action proceeds as in the case of an intraoffice call until after the seventh digit has been counted, stored, and a "0" has been written in the A1 spot of the Originating Register to stop the 10-millisecond dial pulse scan of the calling subscriber's line.

At this point the OGC spot is read and, if found to be in the "1" state, an interoffice call is indicated. In the event of other than an intraoffice call, reference is made to information stored in digit slot 3 of the Originating Register. In the case of a service code call, action to establish a connection is taken after the first three digits have been recorded. The information in digit slot 3 is the X portion of that service code and identifies the particular service code trunk to which the call is to be connected. In the case of an interoffice call, as previously mentioned, a code representative of the particular distant office was stored in digit slot 3.

Having detected an interoffice call, the T3 spots associated with the particular trunk group indicated by the code in digit slot 3 are searched until an idle trunk is found at which time the idle T3 spot is set to its "1" state to seize the trunk and the Flying Spot Store is addressed to the storage area having the same address as the Barrier Grid Store address of the seized T3 spot. This Barrier Grid Store address is all written in the first Memory Register for future reference.

Outpulsing Registers are scanned until an idle Register is found, at which time a "1" is written in its activity spot to seize the Register. Having seized an idle Outpulsing Register, the fourth, fifth, sixth and seventh digits stored in the Originating Register are moved to the pulse counter and the first, second and third digit slots in the Outpulsing Register, respectively; a "0" is written in the L–PTA and DLC spots; a "1" is written in the ITA spot and "0011" is written in the TA, TB, TC and TD spots.

We must now make two translations, the first to obtain the Distribution Network equipment number of the seized two-way trunk, and the second to determine the trunk signaling selector address of the outgoing trunk. The Distribution Network equipment number is obtained at the translation area address corresponding to the Barrier Grid Store address of the seized trunk T3 spot and the latter is obtained at a Flying Spot Store address one quadrant upward from the previously mentioned translation area. The address of the first translation area may be obtained from the first Memory Register area which was stored for reference at this time. The trunk translation areas are shown on Fig. 18 at the upper right hand corner of the storage area. The Distribution Network address of the trunk is written in the Outpulsing Register at the L–TE spots and the trunk signaling selector address is stored in the L–TSN spots. The conditions are now established for initiating outpulsing of the station code of the distant office.

The Outpulsing Registers are interrogated at 5-millisecond and at 50-millisecond intervals to accomplish the necessary timing functions. In outpulsing, four basic times must be established, namely: (*a*) A seizure period of at least 150 milliseconds must precede the first dial pulse; (*b*) a pulse period of 55 milliseconds; (*c*) an interpulse period of 45 milliseconds; and (*d*) an interdigital period of 600 milliseconds. Timing of these intervals is accomplished through the four-bit timer spots TA, TB, TC and TD in combination with the L–PTA and L–ITA spot indications. If the PTA spot is in the "1" state, the 5-millisecond scan is used to operate on the four-bit timer, and if the ITA spot is in the "1" state, the 50-millisecond scan serves the four-bit timer. Timing of the initial seizure and the interdigital period is accomplished under this later scan. When the Outpulsing Register was seized, the interdigital timing indicator spot L–ITA was set to its "1" state and the TA, TB, TC and TD timer spots were placed in the "0011" state. At each 50-millisecond scan of the Outpulsing Register, the ITA spot will be found in the "1" state and, accordingly, the timer will be decremented by 1 until the counter reaches the "0000" state indicating the end of the timing cycle. Having set the timer to the decimal value of 3, four timing scans will be required to bring the counter to "0"; therefore, the initial timing period for seizure will lie between 150 and 200 milliseconds. Once the initial seizure period has been established, the ITA spot is set to the "0" state, the PTA spot is set to the "1" state to indicate that timing of pulses is to be undertaken, and, since a 55-millisecond dial pulse is to be generated, the timer is set to the "1011" state representing the decimal 11. Each 5-millisecond scan of the Outpulsing Register will decrement the timer by 1 until a period of time between 55 and 60 milliseconds has elapsed, at which time the timer will have reached the "0000" state. At the end of this period, the timer is set to the "1001" state representative of the decimal number 9 to permit establishment of an interpulse timing period between 45 and 50 milliseconds long. Each time a 55-millisecond timing interval is started, the pulse counter comprising spots LPC0 through LPC3 is decremented by 1. After the pulse counter has reached the zero count, indicating completion of transmission of the digit previously stored therein, the L–ITA spot is set to the "1" state to start timing of a 600-millisecond interdigital period, the TA, TB, TC and TD spots are set to the "1100" state, the L–PTA is set to the "0" state to stop pulse timing, and the codes stored in the first digit spots L–DSI–0 through L–DSI–3 are moved to the pulse counter in preparation for transmitting the second digit to the line. Also, each time a digit is moved from its digit slot to the pulse counter, the digit counter comprising the L–DC0 and L–DC1 spots is incremented by 1 to indicate which digit of the called number is being transmitted. At the end of each interdigital period other than the last, steps are again taken to start pulse period and interpulse period timing and transmission of the appropriate supervisory state. The L–LS spot in the Outpulsing Register is set to the "1" state every time a pulse has been generated and to the "0" state when an interpulse period has been generated.

Outpulsing to the distant office is accomplished through the Trunk Signaling Selector. The Trunk Signaling Selector is directed to the particular trunk by means of the nine-bit address stored in the TSN spots of the Outpulsing Register and the supervisory state to be transmittted by means of the Trunk Signaling Selector is determined from the sequence of the Outpulsing Register. Supervisory state commands are transmitted to the Trunk Signaling Selector by means of a single bit which is set to the "0" state when a pulse is to be transmitted and to the "1" state when the seizure or interpulse period is to be transmitted.

Ringing tone is applied to the line of the called subscriber from the distant office; therefore, a ringing connection need not be established at the local office of origination. However, a connection as shown in Figs. 52B and 52C must be established in the Distribution Network between the trunk which is connected to the calling subscriber and the trunk to the distant office which was seized and outpulsed over.

As previously indicated, the trunks are scanned by the 100-millisecond supervisory scan, the 10-millisecond dial pulse scan when required, and the 10-millisecond answering scan when required. Once outpulsing is completed, the Trunk Signaling Selector no longer serves the two-way trunk as the trunk holds in the off-hook condition toward the distant office until the calling party releases. When the distant office answers, the T1 and T2 spots of the outgoing trunk are set to the "10" state to indicate the talking condition.

Termination of an outgoing call to a distant office may be initiated by either the calling party or the party at the distant end of the trunk. If terminated by the calling party, the connections will be destroyed in the order outlined with regard to calling party release of an intraoffice call.

*Incoming calls (Fig. 53)*

Figure 53B:
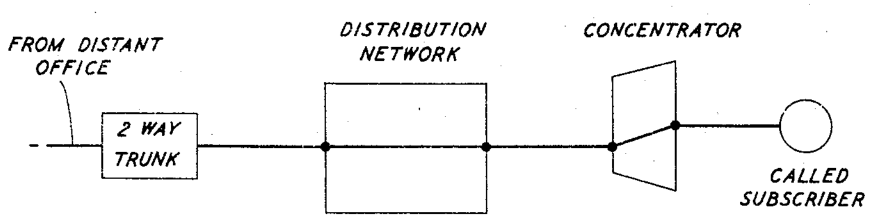

A subscriber at a distant office may initiate a call to the local office in which case an incoming register is seized rather than an outgoing register. As in the case of local subscribers, service requests from trunk circuits are detected during the 100-millisecond supervisory scan and dial pulses are detected during the 10-millisecond dial scan. After all four incoming station digits have been registered, the ringing connection is established with induction transmitted back to the subscriber of the distant office and ringing tone is connected to the called local subscriber. The 10-millisecond answering scan of the called subscriber's line is repeated until an answering time-out is completed or an answer detected. If an answer is detected, the talking condition is established as shown in Fig. 53B.

As in the case of an outgoing call to a distant office, an incoming call may be terminated by action of either the calling or called parties and the order in which the transmission paths in the concentrator and the Distribution Network are destroyed is different in the two cases.

*Operator calls*

An operator call is detected after the first digit is registered in accordance with the sequence shown in Fig. 28. If the code of the first digit is found to be 10, a call to the operator is indicated and if the code in the pulse counter is other than 10, the call proceeds as shown in Fig. 28 since additional information must be gathered.

In the case of a call to an operator, the Trunk Signaling Selector places an operator trunk circuit in the off-hook condition to transmit a service request to the operator. The operator trunk is scanned to detect an answer by the operator, at which time a connection is established through the Distribution Network between the calling party and the seized operator trunk.

*Conclusion*

In the preceding discussion, we have described the major functions required of a telephone switching center. It is obvious to one skilled in the art that many functions over and above those outlined in our discussion must be performed and that the usual and unusual services of a telephone switching center over and above those explicitly mentioned may be accomplished through the teachings of our invention without departing from the scope thereof. As previously mentioned, all services are implemented through detailed program orders such as we have previously described and it is to be understood that these program orders are by way of example only and are in no way limiting.

Obviously, the functions, both usual and unusual, required of the telephone switching system may be achieved through a variety of sequential operations which may differ substantially from the illustrative operational sequences employed herein. Accordingly, a telephone system designer, having determined the sequence of operations necessary to perform a given telephone function or operation, can implement these sequences with the illustrative or other orders in accordance with the teachings of our invention.

Illustrative of services and functions not described specifically in detail but certainly attainable through our invention are reverting calls, which have been only briefly mentioned, P.B.X services, subscriber rate classification, automatic accounting, and trouble locating. Further, although standard dial pulse signaling is employed herein, it is possible to use other methods of customer signaling such as multifrequency, pulse length, code, and so forth. It is to be also understood that error detecting and error correcting codes may be used throughout the system to add to system reliability without departing from the scope of our invention.

It is to be further understood that the above-described arrangements are illustrative of the application of the principles of the invention. Numerous other arrangements may be devised by those skilled in the art without departing from the spirit and scope of the invention.

What is claimed is:

1. A telephone switching system comprising a plurality of lines, a plurality of trunks, a switching network for interconnecting said lines and trunks; and a control circuit including a permanent memory for storing control program sequences, a temporary memory for storing the service states of said lines and trunks, the progress of calls served by said system and translation information; means for transferring information in and out of said temporary memory means, means for reading information out of said permanent memory means, means for controlling said switching network; and gating means responsive to said control program sequences and the information stored in said temporary memory for energizing said control circuit.

2. A telephone switching system comprising a plurality of lines, a plurality of trunks, a switching network for interconnecting said lines and trunks; and a control circuit including a permanent memory for storing control program sequences, a temporary memory for storing the service states of said lines and trunks, the progress of calls served by said system and translation information; means for transferring information in and out of said temporary memory means, means for reading information out of said permanent memory means, means for controlling said switching network; and gating means responsive to said control program sequences and the information stored in said temporary memory for determining the operation of said control circuit.

3. A telephone switching system comprising a plurality of lines, a plurality of trunks, a switching network for interconnecting said lines and trunks; and a control circuit including a permanent memory for storing control program sequences, a temporary memory for storing the service states of said lines and trunks, the progress of calls served by said sytsem and translation information; means for transferring information in and out of said temporary memory means, means for reading information out of said permanent memory means, means for controlling said switching network; and gating means responsive to said control program sequences and the information stored in said temporary memory means for selectively energizing said means for controlling.

4. A telephone switching system comprising a plurality of lines, a plurality of trunks, a switching network for interconnecting said lines and trunks, a random access permanent memory having a plurality of information cells for storing sequences of control program words and translation information, a temporary memory, means for controlling said switching network, and means for determining the operation of said controlling means in accordance with the program sequences stored in said permanent memory.

5. A telephone switching system comprising a plurality of lines, a plurality of trunks, a switching network for interconnecting said lines and trunks, a permanent memory for storing control program sequences and translation information, a temporary memory for storing the service states of said lines and trunks, the progress of calls served by said switching system and translation information, means for scanning said lines and trunks to detect changes in the supervisory state thereof, means responsive to scanner indications of supervisory states of said lines and trunks and to information from said temporary memory as to the service states of said lines and trunks for detecting requests for service, dial pulse transitions, answer and disconnect signals, means for storing said dial transitions in said temporary memory, means including said program sequences and said translation information for translating said stored dial transitions, and means for selectively effecting connections between said lines and said trunks through said network in accordance with said translated dial transitions and said progress of calls information stored in said temporary memory.

6. A telephone switching system comprising a plurality of lines, a plurality of trunks, a switching network for interconnecting said lines and trunks, a permanent memory containing control program sequences and translation information, high speed temporary memory for registering the service states of said lines, scanning means connected to said lines for indicating the current supervisory state thereof, comparison means responsive to control signals from said permanent memory for periodically detecting and comparing the service states of said lines as indicated by said temporary storage and the supervisory states of said lines as indicated by said scanning means, means responsive to the output signals of said comparison means for changing the service state of said lines in said temporary storage means when appropriate, and means controlled by the program sequences established in said permanent memory for controlling said network to provide the service for each line indicated by said temporary memory and said scanning means.

7. An electronic switching system comprising a plurality of subscriber lines, means for scanning said lines, temporary memory means having a plurality of information address positions arranged in an ordered array for storing the service states of said lines, each of said lines being assigned a first address position in one portion of said array and a second address position in a second portion of said array, means for applying a digital address to said temporary storage means corresponding to one of said first address positions, and means for taking the complement of at least a portion of said digital address to determine the address of said one second address position assigned to the same one of said lines.

8. A telephone switching system comprising a plurality of lines, a plurality of trunks, a switching network for interconnecting said lines and trunks, a permanent memory for storing control program sequences and translation information, a temporary memory for storing the service states of said lines and trunks, the progress of calls served by said switching system and translation information, means for scanning said lines and trunks to detect changes in the supervisory state thereof, means responsive to scanner indications of supervisory states of said lines and trunks and to the information stored in said temporary memory for detecting requests for changes in service state, and means for selectively energizing said switching network to provide desired connections between said lines and trunks.

9. A telephone system comprising a first plurality of lines, a second plurality of lines, switching network means for interconnecting said first and second plurality of lines, means for scanning said lines, means including temporary memory and logic means for determining the operation of said switching network means, permanent memory means storing programs for sequencing said temporary storage and logic means, means for reading program information out of said memory means and applying said program information to said temporary storage and logic means, first gating means for causing said reading means to read out one sequence of information from said memory means on receipt of certain signals from said scanning means and said temporary storage and logic means, and second gating means for causing said reading means to read out an alternative sequence of information from said memory means on receipt of certain other signals from said scanning means and said temporary storage and logic means.

10. A telephone system comprising a first plurality of lines, a second plurality of lines, switching network means for interconnecting said first and second plurality of lines, means for scanning said lines, means including temporary memory and logic means for determining the operation of said switching network, permanent memory means storing programs for sequencing said temporary storage and logic means, means for reading program information out of said memory means and applying said program information to said temporary storage and logic means, first gating means for causing said reading means to read out the next succeeding program information from said memory means on receipt of certain signals from said scanning means and said temporary storage and logic means, and second gating means for causing said reading means to read out alternative program information from said memory means on receipt of certain other signals from said scanning means and said temporary storage and logic means.

11. A telephone switching system comprising a plurality of electrical signal transmission circuits, a switching network interconnected with said transmission circuits for selectively establishing individual electrical signal transmission paths between selected ones of said transmission circuits, permanent memory means for storing a program of sequences of indicia representing electrical control signals, and control means interconnected between said network and said storage means and responsive to said indicia stored in said memory means for selectively controlling the establishment of transmission paths through said network between said selected ones of said transmission circuits.

12. A telephone switching system comprising a plurality of lines, a plurality of trunks, a switching network for interconnecting said lines and said trunks, a permanent memory device for storing sequences of indicia representing electrical control signals, a temporary memory, means for transferring information in and out of said temporary memory, means for reading information out of said permanent memory, and means responsive to said sequences stored in said permanent memory device and said information stored in said temporary memory device for controlling the connections of said lines and said trunks through said network.

13. A telephone system comprising a switching network, a plurality of lines coupled by said network, means for controlling the operation of said network to selectively interconnect said lines, memory means containing stored program information at distinct addresses for determining the operation of said controlling means in accordance with a stored program, register means for storing an address of information contained in said memory means, means for adding a constant number to said stored address to obtain the next address of information in the sequence of a particular program, and second register means for storing said next address.

14. In a telephone system, the combination in accordance with claim 13 further comprising third register means for storing an alternate information address and logic means for determining the application of one of said next address and said alternate address to said memory means.

15. An electronic switching system comprising pluralities of trunks assigned in groups to services and traffic destinations, a plurality of subscriber lines, a switching network for interconnecting said lines and said trunks, temporary memory means having a first plurality of information address positions arranged in an ordered array for storing the supervisory states of said trunks, said address positions being assigned in groups to said trunks in accordance with said services and said traffic destinations, and a permanent memory means having a second plurality of information address positions arranged in an ordered array for storing the addresses of said trunks on said switching network, said trunks each assigned identical address positions in said temporary and said permanent memory means.

16. An electronic telephone switching system comprising a plurality of communication paths, a switching network for interconnecting said paths, a common control circuit including logic and memory circuits, storage means containing program information, means applying said program information to said common control circuit, and means responsive to operation of said common control circuit for operating said switching network.

17. An electronic telephone switching system comprising a plurality of subscriber lines, a switching network for interconnecting said lines, a common control circuit, memory means containing program orders for sequencing the operation of said common control circuit, means for scanning said lines, and means for periodically interrupting the sequential operation of said common control circuit by particular program orders to actuate said scanning means.

18. An electronic telephone switching system in accordance with claim 17 further comprising means for storing an indication of the program order on operation of said interrupting means, and means controlled by said last mentioned means for continuing said sequential operation after said periodic actuation of said scanning means.

19. An electronic telephone system comprising a plurality of communication paths, first and second storage means each having coordinate information locations, each of said plurality of communication paths being assigned to particular ones of said locations, means for storing information at said first storage means locations dependent on the conditions of said paths, means for recognizing a particular state of one of said first storage means locations, means for applying the location address of said one first storage means location to said second storage means, and means for reading out the information stored in said second storage means at said location address.

20. An electronic telephone system comprising a plurality of communication paths, first storage means for maintaining a record of the state of said paths, second storage means containing translation information for each of said paths, means for applying successive storage location addresses to said first storage means, means for detecting a particular storage state in said first storage means at a particular first storage address, and means for applying said same storage address to said second storage means to obtain the translation information for the path assigned to said particular first storage means address.

21. An electronic telephone system comprising a plurality of communication paths, temporary storage means having coordinate information locations, each of said communication paths being assigned a particular one of said locations, means for storing at a particular one of said locations a service indication of the path assigned thereto, second storage means having coordinate information locations, means for applying location addresses to said temporary storage means, means for recognizing a particular service state at one of said temporary storage information locations, and means for applying the location address of said one temporary storage information location to said second storage means.

22. An electronic telephone switching system comprising a plurality of communication paths, first storage means containing program orders, means for translating said orders, second storage means for storing the state of said paths, memory means for storing the state of operation of the telephone system, logic means, means for applying signals from said second storage means, said translating means, and said memory means to said logic means, and means responsive to the output of said logic means for determining the next order to be obtained from said first storage means.

23. A telephone switching system comprising a plurality of lines, a plurality of busy tone trunks, a switching network for selectively interconnecting said lines and trunks, a permanent memory for storing control program sequences, a temporary memory for storing the service states of said lines and trunks, means for detecting and registering dial signals from said lines representing called directory numbers, means for reading said temporary memory at the address therein reserved for said registered directory number, and means for establishing a connection through said network between said calling subscriber and one of said busy tone trunks if the indicia stored in said temporary memory indicates that the called line having said registered directory number is busy.

24. A telephone switching system comprising a plurality of lines, a plurality of trunks, means to scan said lines and trunks to detect changes in supervisory state thereof, temporary memory means, permanent memory means for storing a plurality of program sequences of indicia, said program sequences including a line scanning sequence to detect requests for service and a dial pulse scanning sequence to detect and register dialed pulses, means to read said sequences from said permanent memory means, and means to address said reading means to said dial pulse scanning sequence with respect to a particular line upon the detection of a request for service from said line in the course of said line scanning sequence.

25. A telephone switching system comprising a plurality of lines, a plurality of trunks, means to scan said lines and trunks to detect changes in supervisory state thereof, temporary memory means, permanent memory means for storing a plurality of program sequences of indicia, said program sequences including a line scanning sequence to detect requests for service and a dial pulse scanning sequence to detect and register dialed pulses, said line scanning sequence and said dial pulse scanning sequence each arranged to serve said lines and trunks at non-synchronous rates, successive scans of lines by said line scanning sequence occurring within a first predetermined period of time, successive scans of each line served by said dial pulse scanning sequence occurring within a second predetermined period of time, said second period shorter than said first period, means to read said sequences from said permanent memory means, and means to address said reading means to said dial pulse scanning sequence with respect to a particular line upon the detection of a request for service from said line in the course of said line scanning sequence.

26. A telephone switching system comprising a plurality of lines, a plurality of trunks, means to scan said lines and trunks to detect changes in supervisory state thereof, temporary memory means, permanent memory means for storing a plurality of program sequences of indicia, said program sequences including a line scanning sequence to detect requests for service, a dial pulse scanning sequence to detect and register dialed pulses, means to read said sequences from said permanent memory means, means for controlling said sequence reading means, and means to switch said reading means from said line scanning sequence to said dial pulse scanning sequence with respect to a particular line upon the detection of a request for service from said line in the course of said line scanning sequence.

27. A telephone switching system comprising a plurality of lines, a plurality of trunks, means to scan said lines and trunks to detect changes in supervisory state thereof, temporary memory means, permanent memory means for storing a plurality of program sequences of indicia, said program sequences including a line scanning sequence to detect requests for service, a dial pulse scanning sequence to detect and register dialed pulses, means to read said sequences from said permanent memory means, first gating means for causing said reading means to advance through said line scanning sequence to sequentially scan said lines so long as a request for service is not detected, and second gating means for causing said reading means to read out said dial pulse scanning sequence from said memory means with respect to a particular line upon detection of a request for service from said particular line in the course of said line scanning sequence.

28. An electronic switching system comprising in combination a plurality of lines, a plurality of busy signal trunks, a switching network for selectively establishing individual paths between selected ones of said lines and trunks, permanent memory means for storing program sequences of indicia for controlling the selective establishment of transmission paths through said switching network between calling and called lines and selectively controlling the establishment of transmission paths between selected ones of said calling lines and said busy signal trunks, temporary memory means for storing indicia representing the busy condition of said lines, and means responsive to said stored busy signal of one of said selected called lines for selecting a sequence of indicia for the establishment of a transmission path through said switching network from a particular one of said lines to said busy signal trunk.

29. A telephone switching system comprising in combination a plurality of lines, a switching network for establishing transmission paths between selected ones of said lines, permanent memory means for storing a plurality of program sequences of indicia for controlling said switching network, interconnecting means between said switching network and said permanent memory means including means for storing the address in said permanent memory means of the last program sequence indicia received therefrom, and means controlled by the electrical condition of said network and said lines for discontinuing one of said program sequences and initiating program operations from another of said sequences.

30. A telephone switching system comprising in combination a plurality of lines, a switching network for establishing transmission paths between selected ones of said lines, permanent memory means for storing a plurality of program sequences of indicia for controlling said switching network, interconnecting means between said switching network and said permanent memory means including means for storing the address in said permanent memory means of the last indicia of a first program sequence received therefrom, means responsive to the electrical condition of said network and said lines for interrupting said first one of said program sequences and initiating program operations from a second of said sequences, and means controlled by the termination of said second sequence for resuming operation of said network in accordance with the remainder of said first sequence.

31. A telephone switching system comprising a plurality of lines, a plurality of trunks, a switching network to selectively provide transmission paths between said lines and trunks, means to scan said lines and trunks to detect changes in supervisory state thereof, temporary memory means for maintaining a record of the service states of said lines and trunks and for maintaining a record of the progress of calls served by said telephone switching system, permanent memory means for storing a plurality of program sequences of indicia for determining the operation of said telephone switching system, said program sequences including a main program sequence to provide timing and coordination of operations within said telephone switching system, a dial pulse scanning sequence for registering the identity of a calling subscriber and to detect and register dialed pulses originating with said calling line, said dialed pulses in combination representative of a called directory number, a sequence to establish connections through said switching network in accordance with the identity of said calling line and said dialed directory number, means to selectively read said sequences from said permanent memory means, and means to address said reading means to said connection establishing sequence upon registration of a complete called directory number.

32. A telephone switching system comprising a plurality of lines, a plurality of trunks, a switching network to selectively provide transmission paths between said lines and trunks, means to scan said lines and trunks to detect changes in supervisory state thereof, temporary memory means for maintaining a record of the service states of said lines and trunks and for maintaining a record of the progress of calls served by said telephone switching system, permanent memory means for storing a plurality of program sequences of indicia for determining the operation of said telephone switching system, said program sequences including a main program sequence to provide timing and coordination of operations within said telephone switching system, a dial pulse scanning sequence for registering the identity of a calling subscriber and to detect and register dialed pulses originating with said calling line, said dialed pulses in combination representative of a called directory number, a sequence to establish connections through said switching network in accordance with the identity of said calling line and said dialed directory number, means to selectively read said sequences from said permanent memory means, means for controlling said sequence reading means, and means to switch from said dial pulse scanning sequence to said connection establishing sequence upon completion of registration of said dialed directory number.

33. An electronic telephone system comprising a plurality of communication paths, a switching network for interconnecting said paths, means for controlling said switching network, and means for determining the operation of said control means, said last mentioned means including permanent storage means including a plurality of program sequences, first memory means for storing the state of said communication paths, second memory means for storing the state of said control means, means for reading said sequences from said storage means, and logic means controlled by a particular sequence from said storage means and by said first and second memory means for causing said reading means to interrupt the reading of said particular sequence to read a different one of said sequences.

34. In a telephone system having a plurality of communication paths and means for interconnecting said paths, means for controlling said interconnecting means comprising memory means storing program sequence indicia, said indicia in a sequence including order and address information, means for reading out said order and address information, means for translating said address information, a plurality of logic circuit means, means for applying a signal from said translating means to a particular one of said logic circuit means dependent on the address read from said memory means, and means for applying said order to said particular logic circuit means to direct the operation of said particular logic circuit means.

35. In a telephone system in accordance with claim 34 wherein said indicia in a sequence further includes information as to the address in said memory means of the next information in said sequence, means connected to said reading means for storing said next sequence information address.

36. In a telephone system in accordance with claim 35 the combination further comprising means responsive to operation of said particular logic circuit means for applying said next sequence information address from said means connected to said reading means to said memory means.

37. An electronic telephone switching system comprising a plurality of communication paths, a switching network for interconnecting said paths, common control circuitry for effecting operation of said switching network, and random access storage means containing program sequence indicia at unique addresses in said storage means, said indicia being read out in parallel from said storage means, said common control circuit including means for providing one of said addresses to said storage means, means for providing the next address in a sequence to direct said storage means, means for applying an alternate address to said storage means to direct said storage means to an alternate sequence, and logic means for selecting one of said next and said alternate addresses to be applied to said storage means.

38. In an electronic telephone switching system wherein a plurality of communication paths are interconnected by a switching network, control circuit means for effectuating operation of said network, storage means containing indicia of a plurality of program sequences, said indicia including decision and nondecision orders, and means for reading out said indicia from said storage means, said control circuit means including a plurality of logic circuits, means responsive to nondecision order indicia read from said storage means for conditioning certain of said logic circuits, means responsive to decision orders read from said storage means for enabling said certain logic circuits, and means responsive to enablement of said logic circuits for determining the next program sequence indicia to be read from said storage means.

39. In an electronic telephone system the combination of claim 38 wherein said storage means comprises a Flying Spot Store and said program sequence indicia are read therefrom as parallel output words.

40. In an electronic telephone switching system wherein a plurality of communication paths are interconnected by a switching network, control circuit means for effectuating operation of said network, storage means containing indicia of a plurality of program sequences, said indicia including decision and nondecision orders, and means for reading out said indicia from said storage means, said control circuit means including a plurality of logic circuits, means responsive to nondecision order indicia read from said storage means for conditioning certain of said logic circuits, means responsive to decision orders read from said storage means for applying signals to said certain logic circuits, and means responsive to output signals from said logic circuits for determining the next program sequence indicia to be read from said storage means.

41. A telephone switching system comprising a plurality of lines, a plurality of trunks, a switching network for interconnecting said lines and said trunks, permanent memory means for storing control program sequences and translation information, temporary memory means for storing the service state of said lines and trunks, the progress of calls and translation information, means for scanning said lines and trunks to detect changes in supervisory state thereof, means responsive to scanner indications of supervisory states of said lines and trunks and information from said temporary memory means as to the service condition of said lines and trunks for detecting requests for changes of service state and dial pulses, means for storing said dial pulses in said temporary memory means, means for translating said stored dial pulses, and means for selectively effecting connections between said lines and said trunks through said network in accordance with said translated dial pulses.

42. In an electronic switching system, hundreds of telephone lines, a switching network for interconnecting said lines, a control circuit for effectuating control of said network and for effectuating examination of the state of said telephone lines, storage means containing indicia of a plurality of program sequences, means for reading out said indicia from said storage means during successive high speed reading cycles, said control circuit including means for registering two alternative addresses in said storage means and also including logic circuitry, and means for controlling said logic circuitry to perform not more than the single binary logic operation of selecting one of said two addresses during each reading cycle.

43. A telephone switching system comprising a plurality of lines, a plurality of trunks, a switching network interconnecting said lines and trunks, a temporary memory for maintaining a record of the progress of calls through said switching system, a permanent memory containing program sequences of indicia, means responsive to said sequences and said progress of calls for selectively establishing talking connections through said distribution network, and means for destroying all progress of call information in said temporary memory relating to calls which have resulted in a talking connection between calling and called parties.

44. A telephone switching system comprising a plurality of lines, a plurality of trunks, means to scan said lines and trunks to detect changes in supervisory state thereof, temporary memory means, permanent memory means for storing a plurality of program sequences of indicia, said program sequences including a dial pulse scanning sequence to detect and register dialed pulses and a trouble timing sequence to detect the abandonment of calls and permanent signals occurring during said dialing sequences, means to read said sequences from said permanent memory means, means to address said reading means to said trouble timing sequence intermediate said dial pulse scanning sequences, and means to provide a trouble signal to said switching system whenever successive trouble timing sequences occur with respect to a particular line without dial pulse transitions occurring on said line intermediate to said trouble timing sequences.

45. A telephone switching system comprising a plurality of lines, a switching network interconnecting said lines, a permanent memory means, temporary memory means for maintaining a record of the progress of calls through said telephone system, said record including a record of calling line equipment numbers and called line directory numbers, said directory numbers comprising four digits each registered in a four-bit binary code, means to translate the binary codes representative of the first two digits of said called directory number to a seven-bit binary code representative of a vertical address within said permanent memory, means to translate the binary codes representative of the third and fourth digits of the called directory number to a seven-bit binary code representative of a horizontal address within said permanent memory, means for reading said permanent memory at the areas defined by said vertical and horizontal addresses to obtain the number of the equipment on said switching network assigned to said called directory number, and means for selectively effecting a connection between said registered calling line equipment number and said called line equipment number through said switching network.

46. A telephone switching system comprising a plurality of lines, a switching network coupling said lines and common control means for selectively controlling said switching network to provide transmission paths between desired ones of said lines, said common control means including temporary memory means for maintaining a record of the progress of calls through said switching system, logic means, permanent memory means for storing program sequences of indicia to be applied to said logic means, and a multiple conductor busbar interconnecting said logic means, said temporary memory and said permanent memory.

47. A telephone switching system comprising a plurality of lines, a plurality of ringing tone sources, a plurality of ringing induction tone sources, a switching network for selectively interconnecting said lines and said sources, a permanent memory, a temporary memory, common control means for selectively effecting individual connections through said network between particular ones of said lines and said ringing induction tone sources and between others of said lines and particular ones of said ringing tone sources, means for scanning said lines connected to said ringing tone sources to detect an answer, and means for inhibiting the scanning for detection of an answer during the time that said ringing tone source is active.

48. An electronic switching system comprising in combination a plurality of lines, a multistage switching network interconnected with said lines for selectively establishing transmission paths between selected ones of said lines, random access memory means for storing a plurality of sequences of indicia representing electrical control signals, means interconnected between said storage means and said network responsive to certain of said stored sequences for controlling selective establishment of a path through said switching network between selected ones of said lines and other means responsive to others of said sequences for interrupting an established path between selected ones of said lines.

References Cited in the file of this patent

UNITED STATES PATENTS

| | | |
|---|---|---|
| 2,585,904 | Busch | Feb. 19, 1952 |
| 2,683,772 | Flowers | July 13, 1954 |
| 2,805,286 | Baker | Sept. 3, 1957 |